(12) United States Patent
Sun et al.

(10) Patent No.: US 10,930,922 B2
(45) Date of Patent: *Feb. 23, 2021

(54) POSITIVE ELECTRODE ACTIVE MATERIAL AND SECONDARY BATTERY COMPRISING THE SAME

(71) Applicant: INDUSTRY-UNIVERSITY COOPERATION FOUNDATION HANYANG UNIVERSITY, Seoul (KR)

(72) Inventors: Yang-Kook Sun, Seoul (KR); Hyung-Joo Noh, Bucheon-si (KR); Sung-June Youn, Busan (KR)

(73) Assignee: INDUSTRY-UNIVERSITY COOPERATION FOUNDATION HANYANG UNIVERSITY, Seoul (KR)

(*) Notice: Subject to any disclaimer, the term of this patent is extended or adjusted under 35 U.S.C. 154(b) by 25 days.

This patent is subject to a terminal disclaimer.

(21) Appl. No.: 15/264,829

(22) Filed: Sep. 14, 2016

(65) Prior Publication Data

US 2017/0092935 A1 Mar. 30, 2017
US 2019/0393483 A9 Dec. 26, 2019

Related U.S. Application Data

(63) Continuation-in-part of application No. 14/463,170, filed on Aug. 19, 2014, now Pat. No. 9,463,984, (Continued)

(30) Foreign Application Priority Data

Jan. 5, 2011 (KR) .................. 10-2011-0000841
Mar. 10, 2011 (KR) .................. 10-2011-0021579

(Continued)

(51) Int. Cl.
*H01M 4/36* (2006.01)
*C01G 53/00* (2006.01)
(Continued)

(52) U.S. Cl.
CPC ............ *H01M 4/364* (2013.01); *C01D 15/02* (2013.01); *C01G 53/00* (2013.01); *C01G 53/006* (2013.01);
(Continued)

(58) Field of Classification Search
CPC ...... H01M 4/364; H01M 4/485; H01M 4/366; H01M 4/131; H01M 4/505; H01M 4/525;
(Continued)

(56) References Cited

U.S. PATENT DOCUMENTS 6,413,673 B1 7/2002 Kasai
2003/0180615 A1* 9/2003 Johnson ............. C01G 45/1242
429/231.1

(Continued)

FOREIGN PATENT DOCUMENTS

JP 2007242288 A 9/2007
KR 1020090082790 A 7/2009
KR 1020130111413 A 10/2013

OTHER PUBLICATIONS

Y.K. Sun et al., "A Novel Cathode Material with a Concentration-Gradient for High-Energy and Safe Lithium-Ion Batteries", Adv. Funct. Mater. 2012, 20, 485-491.
(Continued)

*Primary Examiner* — Andrew J. Oyer
(74) *Attorney, Agent, or Firm* — Lucas & Mercanti, LLP

(57) ABSTRACT

In the positive electrode active material according to the inventive concept, A positive active material for lithium secondary battery comprises a particle comprising M1, M2, and Li, wherein the particle comprises a center, a surface,
(Continued)

and an intermediate portion between the center and the surface, wherein M1 and M2 are selected from transition metal and are different each other, and wherein concentrations of M1 and M2 have continuous concentration gradients from the center to the intermediate portion.

5 Claims, 72 Drawing Sheets

Related U.S. Application Data which is a continuation of application No. 13/978,067, filed as application No. PCT/KR2011/010173 on Dec. 27, 2011, now Pat. No. 8,926,860, application No. 15/264,829, which is a continuation-in-part of application No. 14/926,770, filed on Oct. 29, 2015, which is a continuation-in-part of application No. PCT/KR2014/003809, filed on Apr. 29, 2014, and a continuation-in-part of application No. PCT/KR2014/003815, filed on Apr. 29, 2014, application No. 15/264,829, which is a continuation-in-part of application No. 14/926,821, filed on Oct. 29, 2015, now Pat. No. 10,707,480, which is a continuation of application No. PCT/KR2014/003810, filed on Apr. 29, 2014, application No. 15/264,829, which is a continuation-in-part of application No. 14/926,864, filed on Oct. 29, 2015, now Pat. No. 10,490,809, which is a continuation of application No. PCT/KR2014/003808, filed on Apr. 29, 2014, which is a continuation-in-part of application No. 13/978,041, filed as application No. PCT/KR2011/010175 on Dec. 27, 2011, now Pat. No. 9,493,365.

(30) Foreign Application Priority Data

| Nov. 22, 2011 | (KR) | 10-2011-0122542 |
| Nov. 22, 2011 | (KR) | 10-2011-0122544 |
| Apr. 29, 2013 | (KR) | 10-2013-0047797 |
| Jul. 31, 2013 | (KR) | 10-2013-0091250 |
| Apr. 29, 2014 | (KR) | 10-2014-0051395 |
| Apr. 29, 2014 | (KR) | 10-2014-0051571 |
| Apr. 29, 2014 | (KR) | 10-2014-0051899 |
| Apr. 29, 2014 | (KR) | 10-2014-0051935 |
| Apr. 29, 2014 | (KR) | 10-2014-0051970 |
| Oct. 29, 2014 | (KR) | 10-2014-0148503 |

(51) Int. Cl.

| H01M 4/131 | (2010.01) |
| C01D 15/02 | (2006.01) |
| H01M 4/485 | (2010.01) |
| H01M 4/525 | (2010.01) |
| H01M 4/505 | (2010.01) |
| H01M 4/02 | (2006.01) |
| H01M 4/1391 | (2010.01) |

(52) U.S. Cl.
CPC ............ *C01G 53/42* (2013.01); *C01G 53/44* (2013.01); *C01G 53/50* (2013.01); *H01M 4/131* (2013.01); *H01M 4/366* (2013.01); *H01M 4/485* (2013.01); *H01M 4/505* (2013.01); *H01M 4/525* (2013.01); *C01P 2002/85* (2013.01); *C01P 2002/88* (2013.01); *C01P 2004/03* (2013.01); *C01P 2004/61* (2013.01); *C01P 2004/84* (2013.01); *C01P 2004/88* (2013.01); *C01P 2006/40* (2013.01); *H01M 4/1391* (2013.01); *H01M 2004/028* (2013.01)

(58) Field of Classification Search
CPC .......... H01M 4/1391; H01M 2004/028; C01G 53/00; C01G 53/006; C01G 53/42; C01G 53/50; C01D 15/02; C01P 2002/85; C01P 2004/84; C01P 2004/03; C01P 2006/40; C01P 2002/88; C01P 2004/61; C01P 2004/88

See application file for complete search history.

(56) References Cited

U.S. PATENT DOCUMENTS

| 2009/0068561 | A1* | 3/2009 | Sun ...................... H01M 4/131 429/223 |
| 2012/0080649 | A1 | 4/2012 | Koenig, Jr. | |
| 2015/0349327 | A1* | 12/2015 | Hwang ................. H01M 4/131 429/219 |

OTHER PUBLICATIONS

Z. Chen et al., "Advance Cathode Materials for Lithium-ion Batteries", MRS Bulletin, vol. 36, Jul. 2011, pp. 498-505.
G.M. Koenig, Jr. et al., "Composition-Tailored Synthesis of Gradient Transition Metal Precursor Particles for Lithium-ion Battery . . . ", Chem. of Mater. 2011, 23, 1954-1963.
H.J. Noh et al., "Cathode Material with Nanorod Structure-An Application for Advance High-Energy and Safe Lithium Batteries", Chem. Mater. 2013, 25, 2109-2115.
Y.K. Sun et al.; "High-energy cathode material for long-life and safe lithium batteries" Nature Materials, vol. 8, Apr. 2009, pp. 320-324.
Y.K. Sun et al., "Nanostructured high-energy cathode materials for advanced lithium batteries", Nature Materials; vol. 11, Nov. 2012, pp. 942-947.
S.T. Myung et al., "Surface modification of cathode materials from nono- to microscale for rechargeable lithium-ion batteries" J. Mater. Chem, 2010, 20, 7074-7095.
Y.K. Sun, "A novel concentration-gradient Li cathode material for high-energy lithium-ion batteries" J. Mater. Chem., 2011, 21, 10108-10112.
Y.K. Sun, "Effect of Mn Content in Surface on the Electrochemical Properties of Core-Shell Structured Cathode Materials", J. Electrochem. So., 159 (1) A1-A5 (2012).
H.J. Noh et al. "Formation of a Continuous Solid-Solution Particle and its Application to Rechargeable Lithium Batteries" Adv. Funct. Mater. 2012, pp. 1-9.
Y.K. Sun et al. "High-voltage performance of concentration-gradient Li cathode material for lithium-ion batteries", Electrochimica Acta 55 (2010) 8621-8627.
Z. Chen, "Role of surface coating on cathode materials for lithium-ion batteries", J. Mater. Chem, 2010, 20, 7606-7612.

* cited by examiner (a)

(b)

(a)

(b)

(a)

(b)

(a)

(b)

(a)

(b)

(a)

(b)

(a)

(b)

(a)

(b)

(a)

(b)

(a)

(b)

POSITIVE ELECTRODE ACTIVE MATERIAL AND SECONDARY BATTERY COMPRISING THE SAME

CROSS-REFERENCE TO RELATED APPLICATIONS

This application is a continuation-in-part of U.S. patent application Ser. No. 13/978,041 filed Oct. 8, 2013, now U.S. Pat. No. 9,493,365, which is a 371 of PCT/KR2011/010175 filed Dec. 27, 2011, which claimed the priority of Korean Patent Application No. 10-2011-0000841 filed Jan. 5, 2011, Korean Patent Application No. 10-2011-0021579 filed Mar. 10, 2011 and Korean Patent Application No. 10-2011-0122544 filed. Nov. 22, 2011.

This application is a continuation-in-part of U.S. patent application Ser. No. 14/463,170 filed Aug. 19, 2014, now U.S. Pat. No. 9,463,984, which is a continuation of U.S. patent application Ser. No. 13/978,067 filed Oct. 8, 2013, now U.S. Pat. No. 8,926,860, which is a 371 of PCT/KR2011/010173 filed Dec. 27, 2011, which claimed the priority of Korean Patent Application No. 10-2011-0000841 filed Jan. 5, 2011, Korean Patent Application No. 10-2011-0021579 filed Mar. 10, 2011 and Korean Patent Application No. 10-2011-0122542 filed Nov. 22, 2011, contents of each of which are incorporated herein by reference in their entirety.

This application is also a continuation-in-part of U.S. patent application Ser. No. 14/926,770 filed Oct. 29, 2015, which claims priority from Korean Patent Application No. 10-2014-0148503 filed on Oct. 29, 2014, and is a continuation-in-part of International Application Nos. PCT/KR2014/003809 and PCT/KR2014/003815 both filed on Apr. 29, 2014, which claim priority from Korean Patent Application Nos. 10-2013-0047797 filed Apr. 29, 2013, 10-2014-0051899 filed Apr. 29, 2014, 10-2013-0091250 filed Jul. 31, 2013, 10-2014-0051571 filed Apr. 29, 2014, and 10-2014-0051970 filed on Apr. 29, 2014, the entire contents of each of which are incorporated herein by reference. This application further claims priority from Korean Patent Application No. 10-2014-0148503 filed on Oct. 29, 2014, the entire contents of which is incorporated herein by reference.

In addition, this application is a continuation-in-part of U.S. patent application Ser. No. 14/926,821 filed Oct. 29, 2015, which is a continuation of International Application No. PCT/KR2014/003810 filed on Apr. 29, 2014, which claims priority from Korean Patent Application Nos. 10-2013-0047797 filed Apr. 29, 2013 and 10-2014-0051395 filed Apr. 29, 2014, the entire contents of each of which are incorporated herein by reference.

Furthermore, this application is a continuation-in-part of U.S. patent application Ser. No. 14/926,864 filed Oct. 29, 2015, which is a continuation of International Application No. PCT/KR2014/003808 filed on Apr. 29, 2014, which claims priority from Korean Patent Application Nos. 10-2013-0047797 filed Apr. 29, 2013 and 10-2014-0051935 filed Apr. 29, 2014, the entire contents of each of which are incorporated herein by reference.

FIELD OF THE INVENTION

Embodiments of the inventive concepts described herein relates to a cathode active material with whole particle concentration gradient for a lithium secondary battery, a method for preparing same, and a lithium secondary battery having same, and more specifically, to a cathode active material with whole particle concentration gradient for a lithium secondary battery, a method for preparing same, and a lithium secondary battery having same, which has excellent lifetime characteristics and charge/discharge characteristics through the stabilization of crystal structure, and has thermostability even in high temperatures.

In addition, embodiments of the inventive concepts described herein relates to an cathode active material with whole particle concentration gradient for a lithium secondary battery, a method for preparing same, and a lithium secondary battery having same, and more specifically, to a cathode active material with whole particle concentration gradient for a lithium secondary battery, a method for preparing same, and a lithium secondary battery having same, which has excellent lifetime characteristics and charge/discharge characteristics through the stabilization of crystal structure without rapid change on the concentration of a metal inside of the cathode active material particle, and has thermostability even in high temperatures.

In addition, embodiments of the inventive concepts described herein relate to a positive electrode active material for lithium secondary battery, and more particularly, relate to a positive electrode active material for lithium secondary battery including a core portion in which concentrations of nickel, manganese, and cobalt have gradients in a direction from the center to the surface or concentrations of nickel, manganese, and cobalt are constant; a concentration gradient portion which is formed on the outside of the core portion and in which concentrations of nickel, manganese, and cobalt have gradients; and a shell portion which is formed on the outside of the concentration gradient portion and in which concentrations of nickel, manganese, and cobalt are constant.

In addition, embodiments of the inventive concepts described herein relate to a positive electrode active material for lithium secondary battery, and more particularly, relate to a positive electrode active material for lithium secondary battery including a core portion in which concentrations of nickel, manganese, and cobalt have gradients in a direction from the center to the surface and a shell portion in which concentrations of nickel, manganese, and cobalt are constant.

In addition, embodiments of the inventive concepts described herein relate to a positive electrode active material and a secondary battery including the same, and more particularly, relate to a positive electrode active material including a concentration gradient portion and a concentration maintained portion and a secondary battery including the same.

In addition, embodiments of the inventive concepts described herein relate to a positive electrode active material for lithium secondary battery, and more particularly, relate to a positive electrode active material for lithium secondary battery which includes a first concentration gradient portion, a second concentration gradient portion, and a first concentration maintained portion. The first and second concentration gradient portions have gradients of concentrations of nickel, manganese, and cobalt in the direction from the center to the surface, and the first concentration maintained portion has constant concentrations of nickel, manganese, and cobalt between the first concentration gradient portion and the second concentration gradient portion.

Embodiments of the inventive concepts described herein relate to a positive electrode active material for lithium secondary battery, and more particularly, relate to a positive electrode active material for lithium secondary battery which includes two core portions having gradients of concentrations of nickel, manganese, and cobalt in the direction from the center to the surface and in which the magnitudes of concentration gradients of nickel, manganese, and cobalt are controlled in the two core portions.

BACKGROUND OF THE INVENTION

On the strength of recent rapid development of electronics, communications, computer industry, etc., the use of portable electronic devices such as camcorders, mobile phones, notebook PCs and the like becomes generalized. Accordingly, there is increasing demand for batteries which are lightweight and highly reliable, and can be used longer.

In particular, lithium secondary batteries, whose operating voltage is 3.7 V or more, have higher energy density per unit weight than nickel-cadmium batteries and nickel-hydrogen batteries. Accordingly, the demand for the lithium secondary batteries as a power source to drive the portable electronic communication devices is increasing day by day.

Recently, studies on power sources for electric vehicles by hybridizing an internal combustion engine and a lithium secondary battery are actively conducted in the United States, Japan, Europe and the like. The development of a plug-in hybrid (P-HEV) battery used in the car with a mileage of less than 60 miles is actively proceeding around United States. The P-HEV battery is a battery having characteristics, which are nearly the characteristics of an electric vehicle, and the biggest challenge is to develop high-capacity batteries. In particular, the biggest challenge is to develop cathode materials having higher tap density of 2.0 g/cc or more and high capacity characteristics of 230 mAh/g or more.

The materials, which are currently available or under development, are $LiCoO_2$, $LiNiO_2$, $LiMnO_2$, $LiMn_2O_4$, $Li_{1+x}[Mn_{2-x}M_x]O_4$, $LiFePO_4$ and the like. Of them, the $LiCoO_2$ is an excellent material having stable charge/discharge characteristics, excellent electronic conductivity, high cell voltage, high stability and even discharge voltage characteristics. However, because Co has low reserves and is expensive and toxic to the human body, it is needed to develop other cathode materials. Further, it has a defect of very poor thermal properties by unstable crystal structure by delithiation during discharging.

In order to improve it, there may be many attempts to shift the exothermic onset temperature to the side of the higher temperature and to make an exothermic peak broad in order to prevent rapid heat-emitting, by substitute a part of the nickel with transition metals. However, there is no satisfactory result yet.

Namely, $LiNi_{1-x}Co_xO_2$ (x=0.1-0.3) material, wherein a part of the nickel is substituted with cobalt, shows excellent charge/discharge characteristics and lifetime characteristics, but the thermostability problem is not solved yet. Furthermore, European Patent No. 0872450 discloses $Li_a$-$Co_bMn_cM_dNi_{1-(b+c+d)}O_2$ (M=B, Al, Si. Fe, Cr, Cu, Zn, W, Ti, Ga)-type, where the Ni is substituted with other metals as well as Co and Mn, but the thermostability of the Ni-based material is not solved yet.

In order to eliminate these shortcomings, Korean Patent Publication No. 2005-0083869 suggests lithium-transition metal oxides having metal composition representing concentration gradient. This method is a method that an internal materials with a certain composition is synthesized and materials with other composition is coated on the exterior thereof to obtain a bi-layer, and is mixed with a lithium salt followed by heat-treatment. The internal material may be commercially available lithium transition metal oxides. However, in this method, the metal composition of the cathode active material between the produced internal material and the external material is discontinuously changed, and is not continuously and gradually changed. Further, the powder synthesized by the invention, which does not use ammonia as a chelating agent, was not suitable for a cathode active material for a lithium secondary battery due to its lower tap density.

In order to improve this problem, Korean Patent Publication No. 2007-0097923 suggests a cathode active material, which has an internal bulk part and an external bulk part, and the metal ingredients have continuous concentration distribution depending on their position at the external bulk part. However, in this method, there was a need to develop a cathode active material of a new structure having better stability and capacity because the concentration is constant at the internal bulk part and the metal composition is changed at the external bulk part.

SUMMARY OF THE INVENTION

In order to solve the above-described problems associated with prior art, the present invention is objected to provide a cathode active material, which has excellent lifetime characteristics and charge/discharge characteristics through the stabilization of crystal structure, and has thermostability even in high temperatures.

Further, the present invention is objected to provide a method for preparing the cathode active material for lithium secondary battery.

Further, the present invention is objected to provide a lithium secondary battery including the cathode active material.

In order to accomplish one object of the present invention, the present invention provides, in a cathode active material for a lithium secondary battery, a cathode active material with whole particle concentration gradient for a lithium secondary battery, wherein the concentration of all metals making up the cathode active material for a lithium secondary battery shows continuous concentration gradient in the entire region, from the particle core to the surface part.

In the present invention, the cathode active material for a lithium secondary battery with whole particle concentration gradient is characterized that it may comprise:
the core expressed by the following formula 1; and
the surface part expressed by the following formula 2,
wherein the concentrations of the M1, the M2 and the M3 have continuous concentration gradient from the core to the surface.

   [Formula 1]

   [Formula 2]

(in the formulas 1 and 2, M1, M2 and M3 are selected from the group consisting of Ni, Co, Mn and a combination thereof; M4 is selected from the group consisting of Fe, Na, Mg, Ca, Ti, V, Cr, Cu, Zn, Ge, Sr, Ag, Ba, Zr, Nb, Mo, Al, Ga, B and a combination thereof; 0<a1≤1.1, 0<a2≤1.1, 0≤x1≤1, 0≤x2≤1, 0≤y1≤, 0≤y2≤1, 0≤z1≤1, 0≤z2≤1, 0≤w≤0.1, 0.0≤δ≤0.02, 0≤x1+y1+z1≤1, 0≤x2+y2+z2≤, x1≤x2, y1≤y2 and z2≤z1.)

Further, the present invention provides a method for preparing the cathode active material for a lithium secondary battery comprises:
a first step of preparing a metal salt aqueous solution for forming the core and a metal salt aqueous solution for forming the surface part, which contain the M1, the M2 and the M3 as a metal salt aqueous solution, wherein the concentrations of the M1, the M2 and the M3 are different each other;

a second step of forming precipitates by mixing the metal salt aqueous solution for forming the core and the metal salt aqueous solution for forming the surface part at a mixing ratio from 100 v %:0 v % to 0 v %:100 v % with gradual change and by mixing a chelating agent and a basic aqueous solution to a reactor at the same time, wherein the concentrations of the M1, the M2 and the M3 have continuous concentration gradient from the core to the surface part;

a third step of preparing an active material precursor by drying or heat-treating the obtained precipitates; and a fourth step of mixing the active material precursor and a lithium salt and then heat-treating thereof.

Further, the present invention provides a lithium secondary battery comprising the cathode active material according to the present invention.

In order to solve the above-described problems associated with prior art, the present invention is objected to provide an cathode active material with whole particle concentration gradient for a lithium secondary battery, which has excellent lifetime characteristics and charge/discharge characteristics through the stabilization of crystal structure, and has thermostability even in high temperatures.

Further, the present invention is objected to provide a method for preparing the cathode active material for lithium secondary battery.

Further, the present invention is objected to provide a lithium secondary battery including the cathode active material.

In order to accomplish one object of the present invention, the present invention provides, in an cathode active material for a lithium secondary battery, an cathode active material with whole particle concentration gradient for a lithium secondary battery, wherein the concentration of a metal making up the cathode active material shows continuous concentration gradient in the entire region, from the particle core to the surface part.

The cathode active material for a lithium secondary battery is characterized that it may comprise:

the core expressed by the following formula 1; and the surface part expressed by the following formula 2, wherein the concentration of the M1 is constant from the core to the surface part; and the concentration of the M2 and the concentration of the M3 have continuous concentration gradient from the core to the surface.

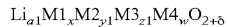  [Formula 1]

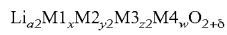  [Formula 2]

(in the formulas 1 and 2, M1, M2 and M3 are selected from the group consisting of Ni, Co, Mn and a combination thereof; M4 is selected from the group consisting of Fe, Na, Mg, Ca, Ti, V, Cr, Cu, Zn, Ge, Sr, Ag, Ba, Zr, Nb, Mo, Al, Ga, B and a combination thereof; $0<a1\leq1.1$, $0<a2\leq1.1$, $0\leq x\leq1$, $0\leq y1\leq1$, $0\leq y2\leq1$, $0\leq z1\leq1$, $0\leq z2\leq1$, $0\leq w\leq0.1$, $0.0\leq\delta\leq0.02$, $0\leq x+y1+z1\leq1$, $0<x+y2+z2\leq1$, and $y1\leq y2$, $z2\leq z1$.

Further, the present invention provides a method for preparing the cathode active material for a lithium secondary battery comprises:

a first step of preparing a metal salt aqueous solution for forming the core and a metal salt aqueous solution for forming the surface part, which contain the M1, the M2 and the M3 as a metal salt aqueous solution, wherein the concentration of the M1 is the same each other, and the concentration of the M2 and the concentration of the M3 are different each other;

a second step of forming precipitates by mixing the metal salt aqueous solution for forming the core and the metal salt aqueous solution for forming the surface part at a mixing ratio from 100 v %:0 v % to 0 v %:100 v % with gradual change and by mixing a chelating agent and a basic aqueous solution to a reactor at the same time, wherein the concentration of the M1 is constant from the core to the surface part, and the concentrations of the M2 and the M3 have continuous concentration gradient from the core to the surface part;

a third step of preparing an active material precursor by drying or heat-treating the obtained precipitates; and a fourth step of mixing the active material precursor and a lithium salt and then heat-treating thereof.

Further, the present invention provides a lithium secondary battery comprising the cathode active material.

Embodiments of the inventive concepts may provide a positive electrode active material having a new structure which includes a core portion and a shell portion and in which the content of nickel is increased to have a high capacity and the content of residual lithium is decreased.

Embodiments of the inventive concepts may also provide a positive electrode active material exhibiting high reliability and a secondary battery including the same.

Embodiments of the inventive concepts may also provide a secondary battery having a high capacity.

Embodiments of the inventive concepts may also provide a secondary battery exhibiting high stability.

Embodiments of the inventive concepts may also provide a secondary battery having a long cycle-life.

Embodiments of the inventive concepts may also provide a secondary battery having an improved charge and discharge efficiency.

Embodiments of the inventive concepts are not limited to those described above.

One aspect of embodiments of the inventive concept is directed to provide a positive electrode active material for lithium secondary battery.

According to an embodiment of the inventive concept, the positive electrode active material for lithium secondary battery may include a core portion, a concentration gradient portion that is formed on the outside of the core portion and has gradients of concentrations of nickel, manganese, and cobalt, and a shell portion that is formed on the outside of the concentration gradient portion and has constant concentrations of nickel, manganese, and cobalt.

According to an embodiment of the inventive concept, the positive electrode active material for lithium secondary battery includes the shell portion having the constant concentrations of nickel, manganese, and cobalt on the outside of the core portion, and thus it is possible to decrease the amount of residual lithium on the surface of a particle although the concentration of nickel in the inside of the particle is high.

According to an embodiment of the inventive concept, in the positive electrode active material, the core portion may have constant concentrations of nickel, manganese, and cobalt.

According to an embodiment of the inventive concept, in the positive electrode active material, the concentration of nickel in the core portion may be equal to the maximum value of the concentration of nickel in the concentration gradient portion.

According to an embodiment of the inventive concept, in the positive electrode active material, the core portion may have gradients of concentrations of nickel, manganese, and cobalt.

In embodiments of the inventive concept, the fact that the concentrations of nickel, manganese, and cobalt in the core portion have gradients may mean that the concentrations of nickel, manganese, and cobalt change depending on the distance from the center of the positive electrode active material particle.

According to an embodiment of the inventive concept, in the positive electrode active material, the core portion may have constant magnitudes of concentration gradients of nickel, manganese, and cobalt. According to embodiments of the inventive concept, the magnitudes of concentration gradients of nickel, manganese, and cobalt may be constant in the core portion, and thus relational functions of the concentrations of nickel, manganese, and cobalt according to the distance from the center may be linear.

In addition, according to embodiments of the inventive concept, the magnitudes of concentration gradients of nickel, manganese, and cobalt of the core portion may change depending on the distance from the center of the positive electrode active material particle. In other words, the relational function of the concentrations of nickel, manganese, and cobalt and the according to distance from the center may be curved. In other words, the rate of change in concentrations of nickel, manganese, and cobalt at the location having a distance D from the center in the core portion may include a constant, a linear function, or a polynomial function.

According to an embodiment of the inventive concept, in the positive electrode active material, the core portion may include n (5≥n≥1) core portions in which magnitudes of concentration gradients of nickel, manganese, and cobalt are represented by CSn-Ni, CSn-Mn, and CSn-Co, respectively. In a case in which n is 2, the core portion may include a first core portion in which magnitudes of concentration gradients of nickel, manganese, and cobalt are represented by CS1-Ni, CS1-Mn, and CS1-Co, respectively, and a second core portion in which magnitudes of concentration gradients of nickel, manganese, and cobalt are represented by CS2-Ni, CS2-Mn, and CS2-Co, respectively.

According to an embodiment of the inventive concept, in the positive electrode active material, the concentration gradients of nickel, manganese, and cobalt in the core portion may have linear shapes or curved shapes.

According to an embodiment of the inventive concept, in the positive electrode active material, the magnitudes |CSn-Ni|, |CSn-Mn|, and |CSn-Co| of concentration gradients of nickel, manganese, and cobalt in the n core portions and magnitudes |CG-Ni|, |CG-Mn|, and |CG-Co| of concentration gradients of nickel, manganese, and cobalt in the concentration gradient portion may satisfy the following relational expressions.

|CSn Ni|≤|CG-Ni|

|CSn-Mn|≤|CG-Mn|

|CSn-Co|≤|CG-Co|

In other words, according to an embodiment of the inventive concept, in the positive electrode active material, the absolute values of the magnitudes of concentration gradients in the concentration gradient portion may be equal to or greater than the absolute values of the magnitudes of concentration gradients in the core portion.

According to an embodiment of the inventive concept, in the positive electrode active material, the concentration gradient portion may include n (5≥n≥1) concentration gradient portions in which magnitudes of concentration gradients of nickel, manganese, and cobalt are represented by CGn-Ni, CGn-Mn, and CGn-Co, respectively.

According to an embodiment of the inventive concept, in the positive electrode active material, the shell portion may include n (5≥n≥1) shell portions in which concentrations of nickel, manganese, and cobalt are represented by SCn-Ni, SCn-Mn, and SCn-Co, respectively.

According to an embodiment of the inventive concept, in the positive electrode active material, the concentrations SCn-Ni, SCn-Mn, and SCn-Co of nickel, manganese, and cobalt in the $n^{th}$ shell portion may satisfy the following relational expressions.

0.3≤SCn-Ni≤0.8

0.2≤SCn-Mn≤0.4

0.05≤SCn-Co≤0.2

According to an embodiment of the inventive concept, in the positive electrode active material, the concentration of nickel in the $n^{th}$ shell portion preferably may satisfy the following relational expression.

0.5≤SCn-Ni≤0.7

According to an embodiment of the inventive concept, in the positive electrode active material, the concentrations SC1-Ni, SC1-Mn, and SC1-Co of nickel, manganese, and cobalt in the first shell portion may be equal to the concentrations of nickel, manganese, and cobalt of the outermost part of the concentration gradient portion, namely, the contact point between the concentration gradient portion and the first shell portion.

According to an embodiment of the inventive concept, in the positive electrode active material, the concentration SC1-Ni of nickel in the shell portion may be equal to the minimum value of the concentration of nickel in the concentration gradient portion. In other words, the concentration of nickel in the shell portion may be continuously connected to the concentration gradient of nickel in the concentration gradient portion.

According to an embodiment of the inventive concept, in the positive electrode active material, the concentration SC1-Ni of nickel in the shell portion may be different from the minimum value of the concentration of nickel in the concentration gradient portion. For example, the concentration SC1-Ni of nickel in the shell portion may be higher than the minimum value of the concentration of nickel in the concentration gradient portion. On the other hand, the concentration SC1-Ni of nickel in the shell portion may be lower than the minimum value of the concentration of nickel in the concentration gradient portion. In other words, the concentration SC1-Ni of nickel in the shell portion may be discontinuous from the concentration gradient of nickel in the concentration gradient portion.

According to an embodiment of the inventive concept, in the positive electrode active material, the concentration gradients of nickel, manganese, and cobalt in the concentration gradient portion may have linear shapes or curved shapes.

According to an embodiment of the inventive concept, in the positive electrode active material, the shell portion has a thickness of from 0.1 μm to 0.6 μm. In the positive electrode active material, an effect derived from the formation of the shell portion may be not obtained when the thickness of the shell portion is 0.1 µm or less and the overall capacity rather may decrease when the thickness is 0.6 µm or more.

According to an embodiment of the inventive concept, in the positive electrode active material, the volume of the shell portion may be 30% or less of the total volume of the particle.

According to an embodiment of the inventive concept, in the positive electrode active material, the content of $Li_2CO_3$ of the surface of the positive electrode active material may be 2,000 ppm or less.

According to an embodiment of the inventive concept, in the positive electrode active material, the content of LiOH of the surface of the positive electrode active material may be 2,000 ppm or less.

According to an embodiment of the inventive concept, the inventive concept is also directed to provide a lithium secondary battery including the positive electrode active material described above.

According to an embodiment of the inventive concept, a positive electrode active material for lithium secondary battery may include a core portion having gradients of concentrations of nickel, manganese, and cobalt in a direction from a center to a surface and a shell portion having constant concentrations of nickel, manganese, and cobalt. The concentrations of nickel, manganese, and cobalt in a center of the core portion may be represented by CC1-Ni, CC1-Mn, and CC1-Co. The core portion may include a first core portion in which magnitudes of concentration gradients of nickel, manganese, and cobalt are represented by CS1-Ni, CS1-Mn, and CS1-Co, respectively, and a second core portion in which magnitudes of concentration gradients of nickel, manganese, and cobalt are represented by CS2-Ni, CS2-Mn, and CS2-Co, respectively. The concentration of the nickel CC1-Ni in the center may be 0.95 or more, and the concentrations of nickel, manganese, and cobalt in the shell portion may be represented by SC-Ni, SC-Mn, and SC-Co, respectively. The concentration of nickel SC-Ni in the shell portion may be 0.6 or less.

According to an embodiment of the inventive concept, in the positive electrode active material, the magnitudes CS1-Ni, CS1-Mn, and CS1-Co of concentration gradients of nickel, manganese, and cobalt in the first core portion and the magnitudes CS2-Ni, CS2-Mn, and CS2-Co of concentration gradients of nickel, manganese, and cobalt in the second core portion may satisfy the following relation expressions: CS1-Ni<0, CS1-Mn>0, CS1-Co>0, CS2-Ni<0, CS2-Mn>0, and CS2-Co>0.

According to an embodiment of the inventive concept, in the positive electrode active material, the concentrations of nickel, manganese, and cobalt in the shell portion may be represented by SC1-Ni, SC1-Mn, and SC1-Co, respectively, and the concentrations of nickel, manganese, and cobalt in the shell portion may be constant.

According to an embodiment of the inventive concept, in the positive electrode active material, the concentrations SC1-Ni, SC1-Mn, and SC1-Co of nickel, manganese, and cobalt in the shell portion may be equal to the concentrations of nickel, manganese, and cobalt of the outermost part of the core portion.

According to an embodiment of the inventive concept, in the positive electrode active material, an average cobalt concentration of the core portion and the shell portion may be 6%. In the positive electrode active material according to the inventive concept, the average concentration of cobalt may be the average concentration of cobalt in the entire positive electrode active material particle prepared according to the inventive concept. Rate characteristics and capacity of the lithium secondary battery may decrease when the average concentration of cobalt in the entire particles is 6% or less.

According to an embodiment of the inventive concept, in the positive electrode active material, the concentration of nickel at the contact point between the first core portion and the second core portion may be 0.9. In other words, the minimum value of the concentration of nickel in the first core portion may be 0.9, and the maximum value of the concentration of nickel in the second core portion may be 0.9.

According to an embodiment of the inventive concept, in the positive electrode active material, the volume of the shell portion may be 30% or less of the total volume of the positive electrode active material particle.

Still another aspect of embodiments of the inventive concept is directed to provide a positive electrode active material.

According to an embodiment of the inventive concept, the positive electrode active material may include a first element formed of a plurality of metals including a first metal and a second element composed of one or more first elements. The first element may extend from a center part of the second element toward a surface part of the second element. The second element may include a concentration gradient portion in which a content of the first metal changes, and a concentration maintained portion in which a content of the first metal is constant.

According to an embodiment of the inventive concept, the plurality of metals may further include a second metal. The content of the second metal may decrease as the content of the first metal increases in a direction from the center part to the surface part in the concentration gradient portion. The content of the second metal may increase as the content of the first metal decreases in the direction from the center part to the surface part in the concentration gradient portion.

According to an embodiment of the inventive concept, the center part may include a region of the inside of the second element and the first element may have a rod shape radiated from the center part toward the surface part.

According to an embodiment of the inventive concept, an average content of the first metal in the concentration gradient portion may be higher than an average content of the first metal in the concentration maintained portion.

According to an embodiment of the inventive concept, a content of the first metal may continuously change in a direction from the center part to the surface part.

According to an embodiment of the inventive concept, a content of the first metal may discontinuously change between the concentration gradient portion and the concentration maintained portion.

According to an embodiment of the inventive concept, the concentration maintained portion may include a first concentration maintained portion and a second concentration maintained portion having a content of the first metal different from that in the first concentration maintained portion. A content of the first metal may discontinuously change between the first concentration maintained portion and the second concentration maintained portion.

According to an embodiment of the inventive concept, the content of the first metal in the concentration gradient portion may gradually increase or decrease in a direction from the center part to the surface part.

According to an embodiment of the inventive concept, each of the concentration gradient portion and the concentration maintained portion may be provided in plurality.

According to an embodiment of the inventive concept, the first metal may be nickel (Ni) and the second metal may be manganese (Mn).

Embodiments of the inventive concepts provide a positive electrode active material having a new structure in which the concentration of nickel has a gradient so as to have a high content of nickel and a high capacity and to exhibit improved charge and discharge characteristics and thermal stability.

One aspect of embodiments of the inventive concept is directed to provide a positive electrode active material for lithium secondary battery including: a first concentration gradient portion having gradients of concentrations of nickel, manganese, and cobalt in a direction from a center to a surface; a first concentration maintained portion that is formed on the outside of the first concentration gradient portion and has concentrations of nickel, manganese, and cobalt which are maintained at a terminal of the first concentration gradient portion; and a second concentration gradient portion that is formed on the outside of the first concentration maintained portion and has gradients of concentrations of nickel, manganese, and cobalt in the direction from the center to the surface.

In embodiments of the inventive concept, the fact that the core portion has the gradients of concentrations of nickel, manganese, and cobalt means that the concentrations of nickel, manganese, and cobalt change depending on the distance from the center of the positive electrode active material particle.

In the positive electrode active material according to embodiments of the inventive concept, the core portion has constant magnitudes of concentration gradients of nickel, manganese, and cobalt. According to embodiments of the inventive concept, the magnitudes of concentration gradients of nickel, manganese, and cobalt are constant in the entire core portion, and thus the functional relation between the concentrations of nickel, manganese, and cobalt and the distance from the center may be linear.

In addition, according to embodiments of the inventive concept, the magnitudes of concentration gradients of nickel, manganese, and cobalt may change depending on the distance from the center on the basis of the magnitudes at the center of the positive electrode active material particle in the core portion. In other words, the functional relation between the concentrations of nickel, manganese, and cobalt and the distance from the center may be curved. In other words, the rate of change in concentrations of nickel, manganese, and cobalt at the location having a distance D from the center in the core portion may include a constant, a linear function, or a polynomial function.

In the positive electrode active material according to embodiments of the inventive concept, the first concentration maintained portion is represented by the following Chemical Formula 1.

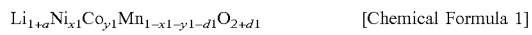

$Li_{1+a}Ni_{x1}Co_{y1}Mn_{1-x1-y1-d1}O_{2+d1}$ [Chemical Formula 1]

In Chemical Formula 1, 0.6≤x1≤0.8, 0.05≤y1≤0.2, 0.1≤1−x1−y1−d1≤0.25, 0.01≤a≤0.1, and 0.01≤d1≤0.1.

The positive electrode active material according to embodiments of the inventive concept may further include a second concentration maintained portion that is formed on the outside of the second concentration gradient portion and has concentrations of nickel, manganese, and cobalt which are maintained.

In the positive electrode active material according to embodiments of the inventive concept, the concentrations of nickel, manganese, and cobalt in the second concentration maintained portion are the same as the concentrations of nickel, manganese, and cobalt at a terminal of the second concentration gradient portion.

In the positive electrode active material according to embodiments of the inventive concept, the concentrations of nickel, manganese, and cobalt in the second concentration maintained portion are discontinuous with respect to the concentrations of nickel, manganese, and cobalt at a terminal of the second concentration gradient portion.

In the positive electrode active material according to embodiments of the inventive concept, the second concentration maintained portion is represented by the following Chemical Formula 2.

$Li_{1+a}Ni_{x2}Co_{y2}Mn_{1-x2-y2-d2}O_{2+d2}$ [Chemical Formula 2]

In Chemical Formula 2, 0.5≤x2≤0.6, 0.15≤y2≤0.25, 0.2≤1−x2−y2−d2≤0.35, 0.01≤a≤0.1, and 0.01≤d2≤0.1.

The positive electrode active material according to embodiments of the inventive concept may further include a third concentration maintained portion having constant concentrations of nickel, manganese, and cobalt inside the first concentration gradient portion in a center direction.

In the positive electrode active material according to embodiments of the inventive concept, the third concentration maintained portion is represented by the following Chemical Formula 3.

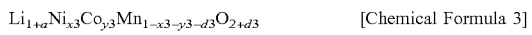

$Li_{1+a}Ni_{x3}Co_{y3}Mn_{1-x3-y3-d3}O_{2+d3}$ [Chemical Formula 3]

In Chemical Formula 3, 0.7≤x3≤0.9, 0.15≤y3≤0.25, 0.2≤1−x3−y3−d3≤0.35, 0.01≤a≤0.1, and 0.01≤d3≤0.1.

In the positive electrode active material according to embodiments of the inventive concept, the first concentration maintained portion has a thickness of from 0.1 μm to 0.6 μm.

In the positive electrode active material according to embodiments of the inventive concept, the second concentration maintained portion has a thickness of from 0.1 μm to 0.6 μm.

In the positive electrode active material according to embodiments of the inventive concept, an effect derived from the formation of the shell portion is not obtained when the thickness of each of the first and second concentration maintained portions is smaller than 0.1 μm, and the overall capacity rather decreases when the thickness is greater than 0.6 μm.

Another aspect of embodiments of the inventive concept is directed to provide a positive electrode active material for lithium secondary battery including: a first concentration gradient portion having gradients of concentrations of nickel, manganese, and cobalt in a direction from a center to a surface; a second concentration gradient portion having gradients of concentrations of nickel, manganese, and cobalt in the direction from the center to the surface; and a first concentration maintained portion that is positioned between the first concentration gradient portion and the second concentration gradient portion and has concentrations of nickel, manganese, and cobalt which are maintained.

In the positive electrode active material according to embodiments of the inventive concept, the concentration of nickel in the first concentration maintained portion may be the same as the minimum value of the concentration of nickel in the first concentration gradient portion.

In the positive electrode active material according to embodiments of the inventive concept, the concentration of nickel in the first concentration maintained portion may be the same as the maximum value of the concentration of nickel in the second concentration gradient portion.

In the positive electrode active material according to embodiments of the inventive concept, the concentration of nickel in the first concentration maintained portion may be different from the maximum value of the concentration of nickel in the first concentration gradient portion or the second concentration gradient portion. In other words, the concentration of nickel in the first concentration maintained portion may be discontinuous with respect to the concentration gradient of nickel in the first concentration gradient portion or the second concentration gradient portion.

Embodiments of the inventive concepts provide a positive electrode active material having a new structure which includes a core portion having gradients of concentrations of nickel, manganese, and cobalt and in which the concentration gradients of nickel, manganese, and cobalt have a vertex in the core portion.

One aspect of embodiments of the inventive concept is directed to provide a positive electrode active material for lithium secondary battery which includes a core portion having concentration gradients of nickel, manganese, and cobalt in a direction from a center to a surface. Each of the concentration gradients of nickel, manganese, and cobalt has at least one vertex in the core portion.

In embodiments of the inventive concept, the fact that the concentration gradient has a vertex may mean that the concentration gradient has a vertex at which a negative value changes to a positive value or a positive value changes to a negative value. For example, the vertex may be a point at which the concentration of nickel which has increased in the direction from the center to the surface begins to decrease or may be a point at which the concentration of nickel which has decreased in the direction from the center to the surface begins to increase.

Alternatively, in embodiments of the inventive concept, the vertex may be a point at which the concentration which has had a (+) gradient begins to be constant. For example, the vertex may be a point at which the concentration of nickel which has increased in the direction from the center to the surface begins to be constantly maintained or may be a point at which the concentration of nickel which has decreased in the direction from the center to the surface begins to be constantly maintained.

In the positive electrode active material according to embodiments of the inventive concept, the core portion may include a first core portion having magnitudes of the concentration gradients of nickel, manganese, and cobalt which are represented by CS1-Ni, CS1-Mn, and CS1-Co, respectively; and a second core portion having magnitudes of the concentration gradients of nickel, manganese, and cobalt which are represented by CS2-Ni, CS2-Mn, CS2-Co, respectively. The magnitude CS1-Ni of the concentration gradient of nickel in the first core portion and the magnitude CS2-Ni of the concentration gradient of nickel in the second core portion may satisfy the following Equation.

(CS1-Ni)×(CS2-Ni)<0

In other words, in the positive electrode active material according to embodiments of the inventive concept, the magnitude of the concentration gradient of nickel in the second core portion may be controlled to be negative when the magnitude of the concentration gradient of nickel in the first core portion is positive, and the magnitude of the concentration gradient of nickel in the second core portion may be controlled to be positive when the magnitude of the concentration gradient of nickel in the first core portion is negative.

In the positive electrode active material according to embodiments of the inventive concept, the magnitude CS1-Mn of the concentration gradient of manganese in the first core portion and the magnitude CS2-Mn of the concentration gradient of manganese in the second core portion may satisfy the following Equation.

(CS1-Mn)×(CS2-Mn)<0

In other words, in the positive electrode active material according to embodiments of the inventive concept, the magnitude of the concentration gradient of manganese in the second core portion may be controlled to be negative when the magnitude of the concentration gradient of manganese in the first core portion is positive, and the magnitude of the concentration gradient of manganese in the second core portion may be controlled to be positive when the magnitude of the concentration gradient of manganese in the first core portion is negative.

In the positive electrode active material according to embodiments of the inventive concept, the magnitude CS1-Co of the concentration gradient of cobalt in the first core portion and the magnitude CS2-Co of the concentration gradient of cobalt in the second core portion may satisfy the following Equation.

(CS1-Co)×(CS2-Co)<0

In other words, in the positive electrode active material according to embodiments of the inventive concept, the magnitude of the concentration gradient of cobalt in the second core portion may be controlled to be negative when the magnitude of the concentration gradient of cobalt in the first core portion is positive, and the magnitude of the concentration gradient of cobalt in the second core portion may be controlled to be positive when the magnitude of the concentration gradient of cobalt in the first core portion is negative.

In the positive electrode active material according to embodiments of the inventive concept, the core portion may further include a first concentration maintained portion having constant concentrations of nickel, manganese, and cobalt between the first core portion and the second core portion.

In the positive electrode active material according to embodiments of the inventive concept, the core portion may further include a second concentration maintained portion having constant concentrations of nickel, manganese, and cobalt inside the first core portion in a center direction.

The positive electrode active material according to embodiments of the inventive concept may further include a shell portion having constant concentrations of nickel, manganese, and cobalt on an outer peripheral surface of the core portion.

In the positive electrode active material according to embodiments of the inventive concept, the shell portion may include a first shell portion having constant concentrations of nickel, manganese, and cobalt which are represented by SC1-Ni, SC1-Mn, and SC1-Co, respectively; and a second shell portion having constant concentrations of nickel, manganese, and cobalt which are represented by SC2-Ni, SC2-Mn, and SC2-Co, respectively.

In the positive electrode active material according to embodiments of the inventive concept, a volume of the shell portion may be 30% or less of a total volume.

Another aspect of embodiments of the inventive concept is directed to provide a lithium secondary battery including the positive electrode active material according to embodiments of the inventive concept.

In the cathode active material for a lithium secondary battery according to the present invention, the concentrations of all metals contained in the cathode active material are increased or decreased with continuous concentration gradient from the core to the surface part. Accordingly, the crystal structure is stabilized and the thermostability is increased because there is no phase boundary having rapid concentration change from the core to the surface part.

In the cathode active material for a lithium secondary battery according to the present invention, the concentration of one metal is constant from the core to the surface part, and the concentrations of the other two metals are increased or decreased with continuous concentration gradient from the core to the surface part.

Accordingly, the crystal structure of the particle is stabilized and the thermostability is increased because there is no phase boundary having rapid concentration change from the particle core to the surface part.

Accordingly, the lithium secondary battery having the cathode active material shows excellent capacity characteristics as well as excellent lifetime characteristics and charge/discharge characteristics, and has thermostability even in high temperatures. Particularly, when the Ni concentration of the cathode active material according to the present invention, which shows the whole particle concentration gradient, is maintained constantly, a stable active material showing high capacity can be prepared.

BRIEF DESCRIPTION OF DRAWINGS

The above and other objects and features of the present invention will become apparent from the following description of the invention taken in conjunction with the following accompanying drawings, which respectively show.

DETAILED DESCRIPTION OF THE INVENTION

Figure 1:
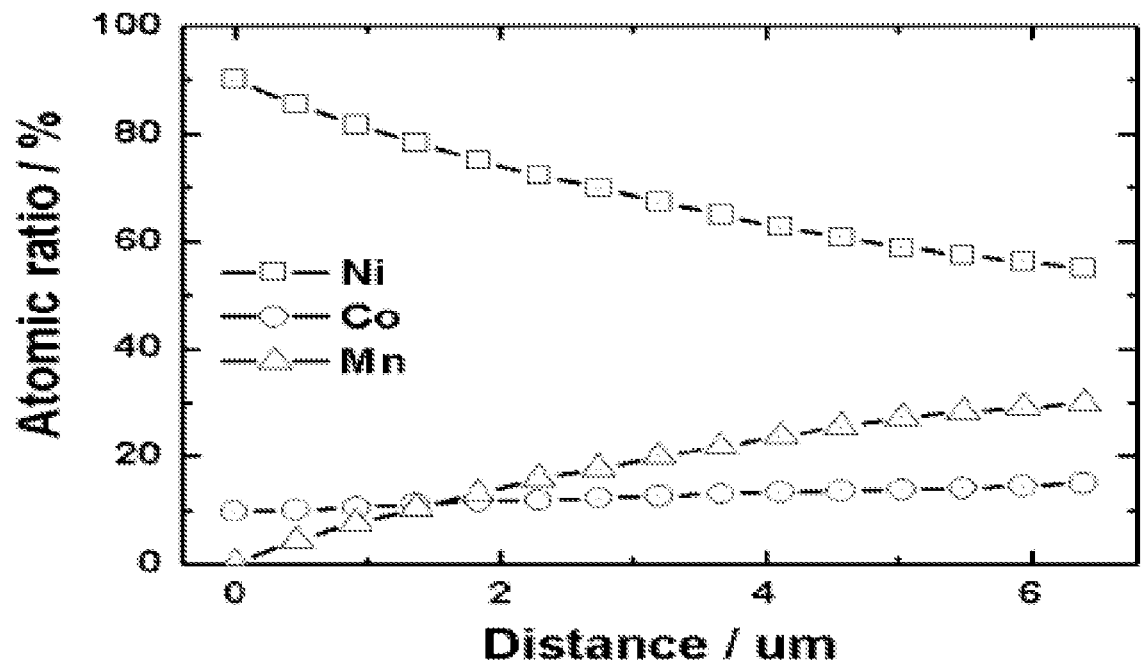
FIGS. 1 to 6: the results measuring the atomic ratio in each precursor particle prepared in Examples 1 to 6 of the present invention, respectively.
Figure 2:
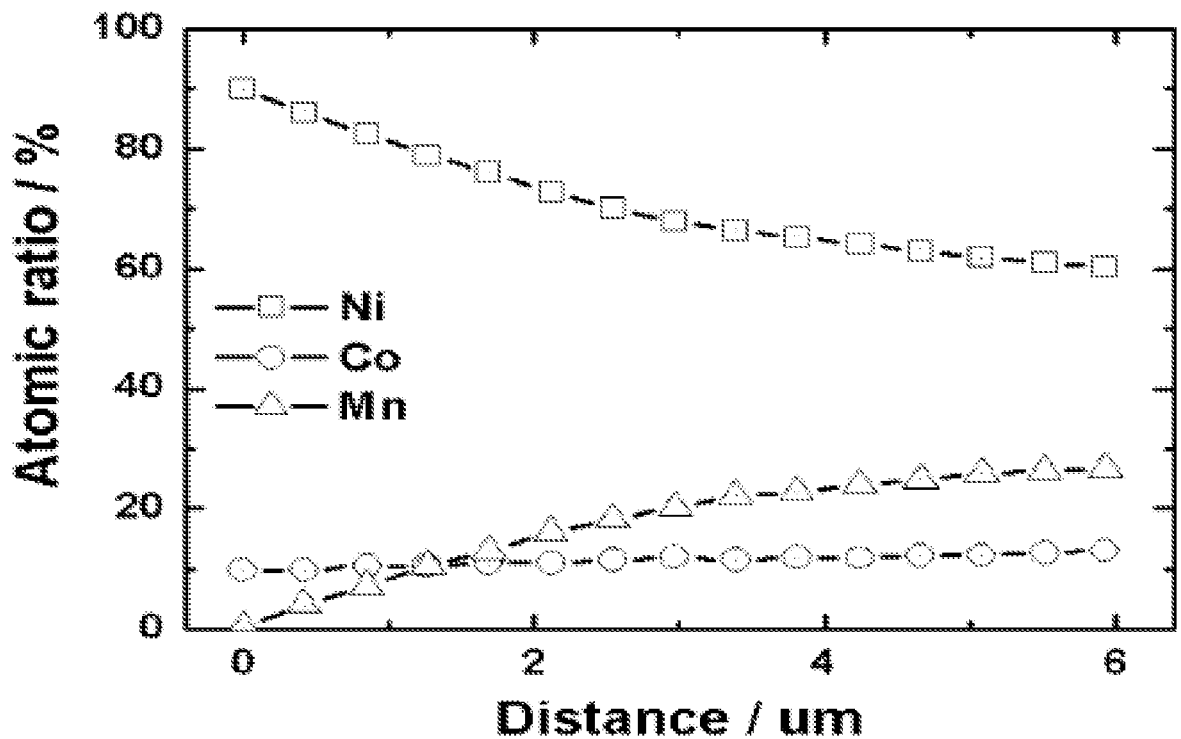
Figure 3:
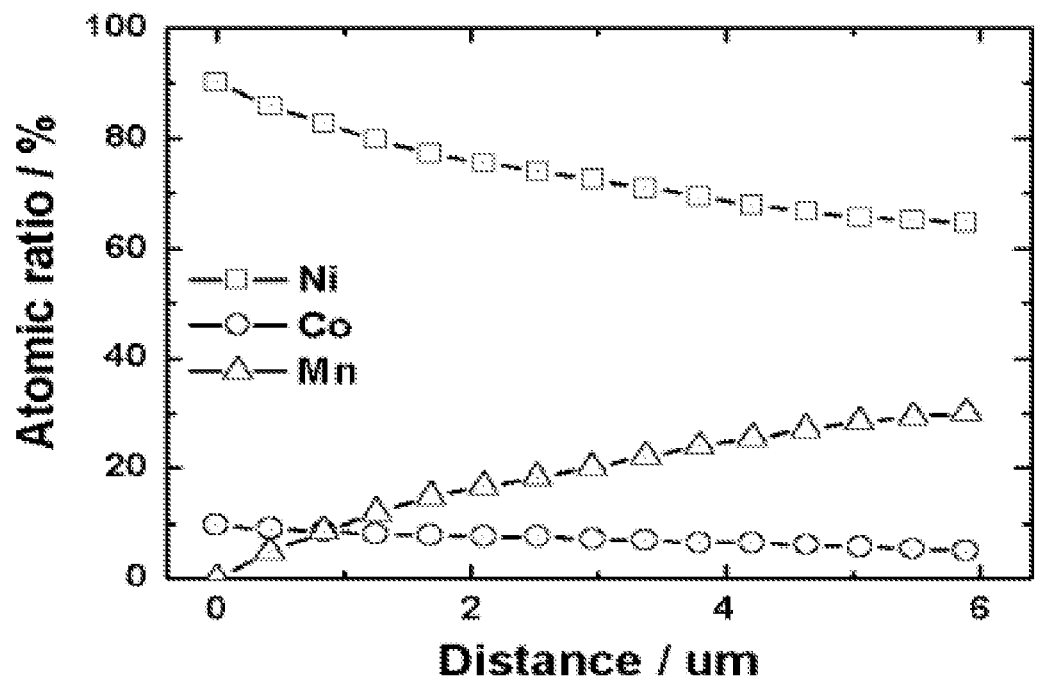
Figure 4:
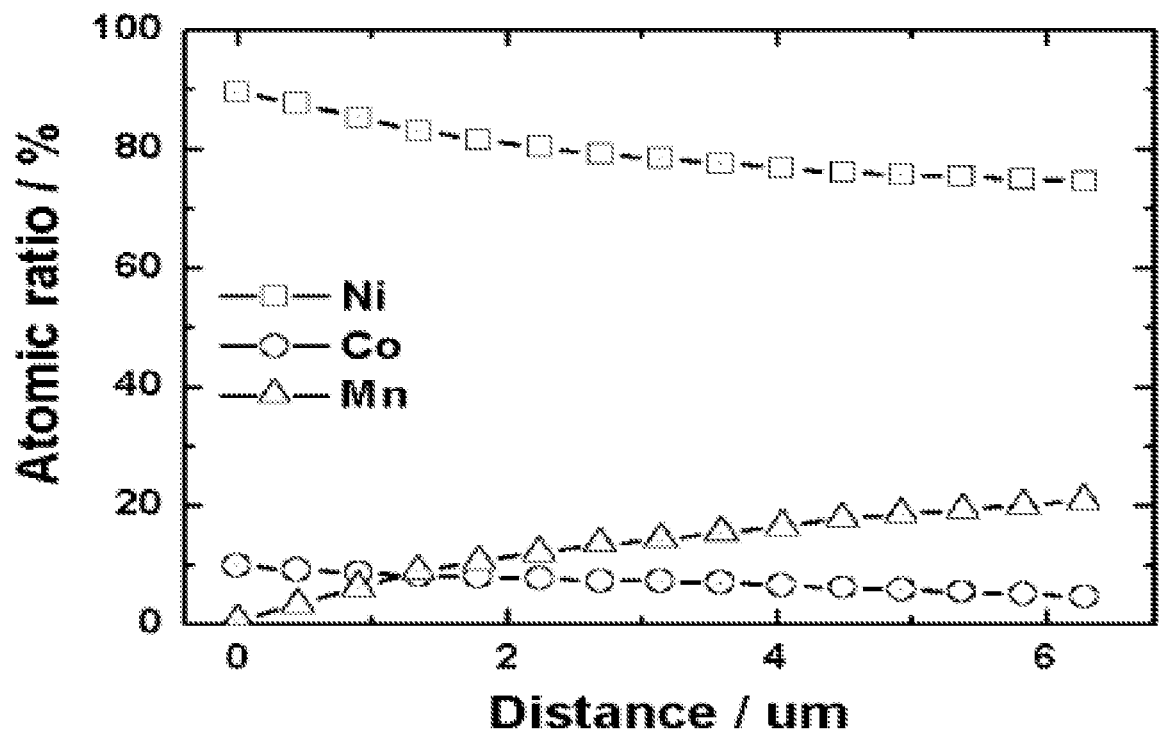

The inventive concepts will now be described more fully hereinafter with reference to the accompanying drawings, in which exemplary embodiments of the inventive concepts are shown. The advantages and features of the inventive concepts and methods of achieving them will be apparent from the following exemplary embodiments that will be described in more detail with reference to the accompanying drawings. It should be noted, however, that the inventive concepts are not limited to the following exemplary embodiments, and may be implemented in various forms. Accordingly, the exemplary embodiments are provided only to disclose the inventive concepts and let those skilled in the art know the category of the inventive concepts. In the drawings, embodiments of the inventive concepts are not limited to the specific examples provided herein and are exaggerated for clarity.

It will be understood that when an element such as a layer, region or substrate is referred to as being "on" another element, it can be directly on the other element or intervening elements may be present. In contrast, the term "directly" means that there are no intervening elements. In the drawings, the thicknesses of layers and regions are exaggerated for clarity.

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments. Exemplary embodiments of aspects of the present inventive concepts explained and illustrated herein include their complementary counterparts. As used herein, the term "and/or" includes any and all combinations of one or more of the associated listed items.

As used herein, the singular terms "a," "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

In addition, in explanation of the present invention, the descriptions to the elements and functions of related arts may be omitted if they obscure the subjects of the present invention.

The same reference numerals or the same reference designators denote the same elements throughout the specification.

In addition, the terms "to be constant" and/or "constant" as described herein are interpreted to mean to be substantially constant. In addition, the term "center part" as described herein is interpreted to mean to include a region of the inside, but it is not limited to the intermediate position and/or the central position. In addition, the term "content" as described herein is interpreted to include the atomic ratio and/or the concentration.

In the present specification, that a concentration of a metal has a concentration gradient may mean that the concentration of the metal is substantially varied in a particle. In addition, that a concentration of a metal is constant may mean that the concentration of the metal is substantially constant in a particle.

According to embodiments of the inventive concepts, a positive active material for a lithium secondary battery may include a particle including M1, M2, M3, and lithium (Li). The particle may include a center, a surface, and an intermediate portion disposed between the center and the surface.

M1, M2, and M3 may be transition metals of which kinds are different from each other. For example, each of the M1, M2, and M3 may be nickel (Ni), cobalt (Co), manganese (Mn), or aluminum (Al). Alternatively, in other embodiments, the particle may further include M4 that is different from M1, M2, and M3. For example, M4 may include at least one of iron (Fe), sodium (Na), magnesium (Mg), calcium (Ca), titanium (Ti), vanadium (V), chromium (Cr), copper (Cu), zinc (Zn), germanium (Ge), strontium (Sr), silver (Ag), barium (B a), zirconium (Zr), niobium (Nb), molybdenum (Mo), aluminum (Al), gallium (Ga), or boron (B).

For example, the particle may include Li, Ni, Co, and Mn. Alternatively, the particle may include Li, Ni, Co, and Al.

Concentrations of M1 and M2 may have continuous concentration gradients from the center to at least the intermediate portion.

In some embodiments, concentrations of M1, M2, and M3 may have continuous concentration gradients in an entire region of the particle. For example, the concentration of M1 (e.g., Ni) may decrease from the center to the surface in the entire region of the particle, and the concentrations of M2 (e.g., Co) and M3 (e.g., Mn) may increase from the center to the surface in the entire region of the particle. Alternatively, the concentrations of M1 (e.g., Ni) and M2 (e.g., Co) may decrease from the center to the surface, and the concentration of M3 (e.g., Mn) may increase from the center to the surface.

In other embodiments, the concentrations of M1 (e.g., Co) and M2 (e.g., Mn) may have continuous concentration gradients in the entire region of the particle, and the concentration of M3 (e.g., Ni) may be substantially constant in the entire region of the particle. For example, the concentration of M1 (e.g., Co) may decrease from the center to the surface in the entire region of the particle, the concentration of M2 (e.g., Mn) may increase from the center to the surface in the entire region of the particle, and the concentration of M3 (e.g., Ni) may be substantially constant in the entire region of the particle.

In still other embodiments, the concentrations of M1 (e.g., Ni) and M2 (e.g., Co) may have continuous concentration gradients in the entire region of the particle, the concentration of M3 (e.g., Al) may be substantially constant in the entire region of the particle, and the concentration of M3 may be lower than the concentrations of M1 and M2.

In yet other embodiments, the concentrations of M1, M2 and M3 may have continuous concentration gradients from the center to the intermediate portion and may be substantially constant from the intermediate portion to the surface. In this case, for example, the concentrations of M1, M2 and M3 from the intermediate portion to the surface may be equal to the concentrations of M1, M2 and M3 at the intermediate portion. In other words, the concentrations of M1, M2 and M3 may be continuous from the center to the surface. Alternatively, the concentrations of M1, M2 and M3 from the intermediate portion to the surface may be different from the concentrations of M1, M2 and M3 at the intermediate portion. In other words, the concentrations of M1, M2 and M3 may be discontinuous from the center to the surface.

In some embodiments, the particle may include a same concentration portion. The concentration of M1 and the concentration of M2 may be equal to each other in the same concentration portion. A distance between the center and the same concentration portion may be smaller than a distance between the surface and the same concentration portion. For example, the same concentration portion may be disposed between the center and the intermediate portion. Alternatively, the same concentration portion may be the center. In other words, the concentration of M1 and the concentration of M2 may be equal to each other at the center of the particle.

In some embodiments, the concentrations of M1, M2 and M3 may have substantially constant concentration gradients from the center to at least the intermediate portion. In other words, the concentration gradients of M1, M2 and M3 may be constant from the center to at least the intermediate portion. In certain embodiments, the concentration gradients of M1, M2 and M3 may be constant in the entire region of the particle.

In other embodiments, each of the concentrations of M1, M2 and M3 may have at least two concentration gradients from the center to at least the intermediate portion. For example, a magnitude of each of the concentration gradients of M1, M2 and M3 may decrease or increase from the center to at least the intermediate portion. Alternatively, each of the concentrations of M1, M2 and M3 from the center to at least the intermediate portion may increase and then decrease or may decrease and then increase. In this case, each of the concentration gradients of M1, M2 and M3 from the center to at least the intermediate portion may have a vertex.

In still other embodiments, the concentrations of M1, M2 and M3 from the center to at least the intermediate portion may have curved shapes.

In some embodiments, at least one concentration gradient portion and at least one concentration maintained portion may be provided between the intermediate portion and the surface. The concentrations of M1, M2 and M3 of the concentration gradient portion may have gradients, and the concentrations of M1, M2 and M3 of the concentration maintained portion may be constant.

The first embodiment of the inventive concept will be described with FIGS. 1 to 24.

Unlike the prior art that the metal concentration is constant at the interior region, but the metal concentration shows gradual concentration gradient at the exterior region, in the cathode active material of the present invention, all metals making up the cathode active material show continuous concentration gradient in the whole region from the particle core to the surface part.

Namely, in the cathode active material of the present invention, the concentrations of all metals making up the cathode active material are increased or decreased with continuous concentration gradient in the whole region from the particle core to the surface part.

The present invention is characterized that the concentrations of the M1 and the M2 are increased with continuous concentration gradient from the core to the surface part, and the concentration of the M3 is decreased with continuous concentration gradient from the core to the surface part.

Further, the present invention is characterized that the concentration of the M2 is increased with continuous concentration gradient from the core to the surface part, and the concentrations of the M1 and the M3 are decreased with continuous concentration gradient from the core to the surface part.

In the present invention, "metal concentration shows continuous concentration gradient" refers that the concentration of metal except for lithium exists with concentration distribution, which is changed gradually from the core of the active material particle to the surface part. The concentration gradient refers that there may be metal concentration difference of 0.1 to 30 mol %, preferably 0.1 to 20 mol %, more preferably 1 to 10 mol % per 0.1 .mu·m, from the particle core to the surface part. In the present invention, the particle core refers to the range within the diameter 0.2 .mu·m from the center of the active material particle, and the particle surface part refers to the range within the diameter 0.2 .mu·m from the outermost of the particle.

In the present invention, it is preferred that the concentration gradients of the M1, the M2 and the M3 are constant from the particle core to the surface part. Namely, in the present invention, in terms of the structure stability, it is preferred that the concentrations of the M1 and the M2 are continuously increased as continuous concentration gradient form the core to the surface part, and the concentration of the M3 is continuously decreased as continuous concentration gradient from the core to the surface part. Further, in the present invention, in terms of the structure stability, it is preferred that the concentration of the M2 is continuously increased as continuous concentration gradient from the core to the surface part, and the concentrations of the M1 and the M3 are continuously decreased as continuous concentration gradient from the core to the surface part.

In the present invention, the M1 may be Co, the M2 may be Mn, and the M3 may be Ni. Namely, the concentration of the Ni is decreased in the whole particle, the concentration of the Mn is increased in the whole particle, and the concentration of the Co shows concentration gradient in the whole particle, but any structure of increase or decrease may be used.

In the present invention, it is preferred that the concentration range of the M3 at the core, z1 may be $0.6 \leq z1 \leq 1$ so as to maintain the nickel concentration in the core high, and the concentration difference of the nickel between the core and the surface part of the M3 may be $0.2 \leq |z2-z1| \leq 0.4$ so as to show thermostability and to prevent the capacity reduction.

In the present invention, it is preferred that the concentration range of the M1 at the core, x1 may be $0 \leq x1 \leq 0.2$, and the concentration difference between the core and the surface part of the M1 may be $0.05 \leq |x2-x1| \leq 0.1$, so as to reduce the amount of the Co and to prevent the capacity reduction at the same time.

In the present invention, it is preferred that the concentration range of the M2 at the core, y1 may be $0 \leq y1 \leq 0.1$ and the Mn content a the surface par may be 0.2 or more, so as to have thermostability and the prevent the capacity reduction at the same time, and the concentration difference of the manganese between the core and the surface part of the M2 may be $0.2 \leq |y2-y1| \leq 0.4$.

Hereinafter, an example method for preparing the cathode active material of the present invention will be described.

First of all, a metal salt aqueous solution for forming the core and a metal salt aqueous solution for forming the surface part, which contain the M1, the M2 and the M3 as a metal salt aqueous solution, wherein the concentrations of the M1, the M2 and the M3 are different each other, are prepared.

The metal salt aqueous solution for forming the core and the metal salt aqueous solution for forming the surface part may be prepared by adding nickel salt, cobalt salt, manganese salt and salts containing M to a solvent, or may be prepared by preparing aqueous solution containing nickel salt, cobalt salt, manganese salt and salts containing M, respectively followed by mixing thereof for using. The metal salt may be sulfate, nitrate, acetate, halide, hydroxide and the like, and it may be any salt, which can be dissolved in water, without particular limitation.

Then, the metal salt aqueous solution for forming the core and the metal salt aqueous solution for forming the surface part are mixed together and simultaneously, the chelating agent and the basic aqueous solution are mixed in a reactor so as to obtain a precipitate wherein the concentrations of the M1, the M2 and the M3 have continuous concentration gradients from the core to the surface part.

In the present invention, a precipitate having continuous concentration gradient from the particle core to the surface part, from the particle forming process through one coprecipitation process, by mixing the metal salt aqueous solution for forming the core and the metal salt aqueous solution for forming the surface part from the initial stage of the particle forming process and supplying thereof continuously at the same time. The produced concentration gradient and its gradient may be controlled according to the compositions and the mixing and supplying ratio of the metal salt aqueous solution for forming the core and the metal salt aqueous solution for forming the surface part. The entire particle size may be controlled by adjusting the reaction time to 1 to 10 hours.

Further, the present invention is characterized that the molar ratio of the chelating agent and the metal salt may be 0.2 to 1.0:1.

The chelating agent may be ammonia aqueous solution, ammonium sulfate aqueous solution and a combination thereof. It is preferred that the molar ratio of the chelating agent and the metal salt may be 0.2 to 0.5:1, 0.2 to 0.4:1. The reason to set the molar ratio of the chelating agent to 0.2 to 1.0 based on the metal aqueous solution 1 mole, is that the chelating agent forms a complex by reacting with metal at the ratio of 1:1 or more, but the chelating agent remained after the reaction of sodium hydroxide and the complex may be changed to intermediates and then recovered as the chelating agent. Furthermore, the reason is that it is the best condition for improving and stabilizing the crystallinity of the cathode active material.

The concentration of the basic aqueous solution may be 2 M to 10 M, preferably. If the concentration of the basic aqueous solution is less than 2 M, particle forming may take longer, tap density may be deteriorated, and the yield of the co-precipitation reaction product may be reduced. And, if the concentration is over 10 M, it is not preferred because it may be difficult to form homogeneous particles due to rapid particle growth by rapid reaction, and the tap density may be also reduced.

In the second step, the reaction atmosphere of the transition metal aqueous solution may be under a nitrogen flow, pH may be within 10 to 12.5, reaction temperature is within 30 to 80° C., and reaction stirring speed may be within 100 to 2000 rpm, preferably.

Then, in the third step, the obtained precipitate may be dried or heat-treated to prepare an active material precursor. The drying process may be conducted at 110° C. to 400° C. for 15 to 30 hours.

Finally, the active material precursor and the lithium salt are mixed and then heat-treated to obtain an active material.

It is preferred that the heat-treating process after mixing the active material precursor and the lithium salt may be conducted at 700° C. to 1100° C. The heat-treating atmosphere may be in an oxidative atmosphere of air or oxygen or a reductive atmosphere of nitrogen or hydrogen, preferably, and the heat-treating time may be 10 to 30 hours, preferably. During this heat-treating process, metal may be diffused even at the part where the internal metal concentration is constant, and consequently, a metal oxide having continuous metal concentration distribution from the core to the surface may be obtained.

Before the heat-treating process, a pre-calcining process may be conducted by maintaining at 250 to 650° C. for 5 to 20 hours. Further, after the heat-treating process, an annealing process may be conducted at 600 to 750° C. for 10 to 20 hours.

Further, the present invention may further include a step of adding sintering additives when mixing the active material precursor and the lithium salt, preferably. The sintering additives may be any one selected from the group consisting of compounds containing ammonium ion, metal oxides, metal halides and a combination thereof, preferably.

The compounds containing ammonium ion may be any one selected from the group consisting of $NH_4F$, $NH_4NO_3$, $(NH_4)_2SO_4$, and a combination thereof, preferably; the metal oxides may be any one selected from the group consisting of $B_2O_3$, $Bi_2O_3$, and a combination thereof, preferably; and the metal halides may be any one selected from the group consisting of $NiCl_2$, $CaCl_2$, and a combination thereof, preferably.

The sintering additives may be used in an amount of 0.01.about.0.2 mole based on the active material precursor 1 mole, preferably. If the amount of the sintering additives is too low, the sintering effect of the active material precursor may not be improved a lot, and if the amount is higher than the said range, the initial capacity during charging/discharging may be reduced or the performance of the cathode active material may be deteriorated.

Further, the present invention provides a lithium secondary battery including the cathode active material according to the present invention.

The lithium battery may include a cathode including the cathode active material having the above constitution, an anode including anode active material and a separator existing between thereof. Further, it may include an electrolyte, which is immersed in the cathode, the anode and the separator. The anode active material may be a material which can reversibly absorb or release lithium ions, preferably, for example, a material including artificial graphite, natural graphite, graphitized carbon fiber, amorphous Carbon, and metal lithium also can be used as a cathode active material. The electrolyte may be a liquid electrolyte containing lithium salts and non-aqueous organic solvent, or polymer gel electrolyte.

EXAMPLES

Hereinafter, the present invention is explained by the following Examples and Test Examples in more detail. The following Examples and Test Examples are intended to further illustrate the present invention, and the scope of the present invention cannot be limited thereby in any way.

Examples 1

Example 1-1

In order to prepare a compound, wherein the Ni concentration is continuously decreased from the core to the surface, the Co and the Mn concentrations are continuously increased, a 2.4 M metal aqueous solution, prepared by mixing nickel sulfate and cobalt sulfate at the molar ratio of 80:20, as a metal salt aqueous solution for forming the core and a metal aqueous solution containing nickel sulfate, cobalt sulfate and manganese sulfate at the molar ratio of 55:15:30 as a metal salt aqueous solution for forming the surface part were prepared.

Distilled water 4 L was put into a coprecipitation reactor (Capacity: 4 L, power of a rotation motor: 80 W); nitrogen gas was supplied to the reactor at the speed of 0.5 L/min so as to remove dissolved oxygen; and stirred at 1000 rpm while maintaining the temperature of the reactor at 50° C.

The metal salt aqueous solution for forming the core and the metal salt aqueous solution for forming the surface part were mixed at a certain ratio, and simultaneously supplied into the reactor at the rate of 0.3 L/hour. Further, 3.6 M ammonia solution was continuously supplied into the reactor at the rate of 0.03 L/hour. Further, for adjusting pH, 4.8 M NaOH aqueous solution was supplied to maintain pH in the reactor at 11. Then, the impeller speed of the reactor was controlled to 1000 rpm, and the co-precipitation reaction was conducted until the diameter of the obtained precipitate became 1 .mu·m. At this time, the flow rate was controlled to make the average retention time of the solution in the reactor about 2 hours, and after the reaction reached to the steady state, the reactant was kept at the steady state for a certain time to so as to obtain a co-precipitated compound having higher density. The compound was filtered, washed with water, and dried with 110° C. warm air dryer for 15 hours so as to obtain an active material precursor.

LiNO$_3$ as a lithium salt was mixed to the obtained active material precursor, heated at a rate of 2° C./min, and then pre-calcined by maintaining at 280° C. for 10 hours followed by calcining at 750° C. for 15 hours to obtain a final active material particle. The size of the finally obtained active material particle was 12 μm.

Example 1-2 to Example 1-5

The procedure of Example 1-1 was repeated except for mixing nickel sulfate, cobalt sulfate and manganese sulfate of the metal salt aqueous solution for forming the core and the metal salt aqueous solution for forming the surface part at the molar ratio as listed in the following Table 1 so as to obtain an active material particle.

Example 1-6

A cathode active material, which has the same composition with Examples 1-1 was prepared by using a batch reactor.

Distilled water 2.5 L was put into a coprecipitation batch reactor (Capacity: 8 L, power of a rotation motor: 180 W); nitrogen gas was supplied to the reactor at the speed of 0.6 L/min so as to remove dissolved oxygen; and stirred at 450 rpm while maintaining the temperature of the reactor at 50° C.

The metal salt aqueous solution for forming the core and the metal salt aqueous solution for forming the surface part having the same concentration with Example 1-3 were mixed at a certain ratio, and simultaneously supplied into the reactor at the rate of 0.2 L/hour. Further, 4.8 M ammonia solution was continuously supplied into the reactor at the rate of 0.1 L/hour. Further, for adjusting pH, 10 M NaOH aqueous solution was supplied to maintain pH in the reactor at 11. Then, the impeller speed of the reactor was controlled to 450 rpm, and the reaction solution was supplied until the total amount of the initially added distilled water, the added metal aqueous solution, the ammonia solution and the NaOH solution became 8 L. The compound was filtered, washed with water, and dried with 110° C. warm air dryer for 15 hours so as to obtain an active material precursor.

LiNO$_3$ as a lithium salt was mixed to the obtained active material precursor, heated at a rate of 2° C. min, and then pre-calcined by maintaining at 280° C. for 10 hours followed by calcining at 750° C. for 15 hours to obtain a final active material. The size of the finally obtained active material particle was 12 μm.

TABLE 1-1

| | Metal salt aqueous solution for forming the core | | | Metal salt aqueous solution for forming the surface part | | |
| --- | --- | --- | --- | --- | --- | --- |
| | Ni | Co | Mn | Ni | Co | Mn |
| Example 1 | 90 | 10 | 0 | 55 | 15 | 30 |
| Example 2 | 90 | 10 | 0 | 60 | 13 | 27 |
| Example 3 | 90 | 10 | 0 | 65 | 05 | 33 |
| Example 4 | 90 | 10 | 0 | 75 | 05 | 20 |
| Example 5 | 85 | 10 | 5 | 70 | 05 | 25 |
| Example 6 | 90 | 10 | 0 | 55 | 15 | 30 |

Comparative Example

An cathode active material, wherein the molar ratio of the nickel, the cobalt and the manganese is as listed in the following Table 1-2, respectively, and each concentration in the whole active material is not changed so as to have constant composition, was prepared.

TABLE 1-2

| | Ni | Co | Mn |
| --- | --- | --- | --- |
| Comparative Example 1 | 80 | 07 | 13 |
| Comparative Example 2 | 75 | 07 | 18 |
| Comparative Example 3 | 70 | 09 | 21 |
| Comparative Example 4 | 65 | 10 | 25 |
| Comparative Example 5 | 75 | 07 | 18 |
| Comparative Example 6 | 90 | 10 | 0 |
| Comparative Example 7 | 85 | 10 | 5 |

Test Example 1-1

Confirmation of Concentration Gradient Structure in Precursor Particle

In order to confirm the concentration gradient structure of each metal from the core to the surface of the precursor particle of the present invention, the atomic ratio in each precursor particle prepared in Examples 1-1 to 1-6 was measured by using EPMA (Electron Probe Micro Analyzer) while moving form the core to the surface part, and the results are shown in FIGS. 1 to 6, respectively.

As shown in FIGS. 1 to 6, it was confirmed that in the case of the precursors prepared in Examples 1-1 to 1-6, the Ni metal concentration from the core to the surface was decreased, and the Mn and Co concentrations were gradually increased with certain gradient.

Test Example 1-2

Confirmation of Concentration Gradient Structure in Active Material Particle after Heat-Treatment In order to confirm whether each metal shows concentration gradient from the particle core to the surface part after heat-treating the precursor of the present invention, the atomic ratio was measured by using EPMA (Electron Probe Micro Analyzer) while moving from the core to the surface, and the results are shown in FIGS. 7 to 12, respectively.

In FIGS. 6 to 9, it could be confirmed that: the Ni metal concentration was decreased, and the concentrations of the Co and the Mn at the core were little changed by the diffusion between the metal salts, but the Co and Mn concentrations were gradually increased with certain gradient.

Test Example 1-3

Measuring Charging/Discharging Capacity and Cycle Characteristics

Cathodes were prepared by using the active materials prepared in Examples 1-1 to 1-6 and the active materials prepared in Comparative Examples 1-1 to 1-7, and applied to cylindrical lithium secondary batteries, respectively.

For the batteries prepared by using the active materials prepared in Examples 1-1 to 1-6, charging/discharging test and cycle characteristics were measured, and the results are shown in FIGS. 13 to 18. The charging/discharging was conducted 10 times per each sample at the condition of 2.7.about.4.3 V and 0.2 C, and the average value was taken.

In FIGS. 13 to 18, the results of charging/discharging of Examples 1-1 to 1-6, Comparative Examples corresponding to each bulk composition and Comparative Examples representing each core composition are shown. In FIGS. 13 to 18, Examples 1-1 to 1-6 showed similar charging/discharging characteristics with Comparative Examples corresponding to each bulk composition, but Comparative Examples representing the core composition showed very poor charging/discharging characteristics.

Test Example 1-4

Evaluation of Thermostability by DSC Measurement

The cathodes containing the active materials prepared in Examples 1-1 to 1-6 and the active materials prepared in Comparative Examples 1-1 to 1-4, were charged at 4.3 V, respectively, and thermostability was measured by using a differential scanning calorimeter (DSC) and heating at a rate of 10° C./min. The results are shown in FIGS. 19 to 24.

As shown in FIGS. 19 to 24, the results of charging/discharging of Examples 1-1 to 1-6, Comparative Examples corresponding to each bulk composition and Comparative Examples representing each core composition are shown.

As shown in FIGS. 19 to 24, when the active materials prepared in Examples 1-1 to 1-6 according to the present invention were contained, an exothermic peak was showed at the higher temperature than Comparative Examples corresponding to each bulk composition and Comparative Examples representing each core composition. Thus, when the active materials prepared in Examples 1-1 to 1-6 according to the present invention were contained, the thermostability was much improved than when the active materials prepared in Comparative Examples 1-1 to 1-7 were contained.

Namely, in the present invention, the concentrations of all metals are increased or decreased with continuous concentration gradient from the core to the surface part. Accordingly, because the structures are not rapidly changed and show stability, it could be confirmed that the thermostability is largely increased.

The second embodiment of the inventive concept will be described with FIGS. 25 to 60.

Unlike the prior art that the metal concentration is constant at the interior region, but the metal concentration shows gradual concentration gradient at the exterior region, in the cathode active material of the present invention, a part of the metal shows continuous concentration gradient at the whole region from the particle core to the surface part, but the other one metal shows constant metal concentration at the whole region from the particle core to the surface part.

In the cathode active material particle of the present invention, one of metals making up the cathode active material shows constant metal concentration at the whole region from the particle core to the surface part, but the other two metals show decreased or increased continuous concentration gradient at the whole region from the particle core to the surface part.

Namely, the present invention is characterized that the concentration of the M2 is increased with continuous concentration gradient from the core to the surface part, and the concentration of the M3 is decreased with continuous concentration gradient from the core to the surface part.

In the present invention, "metal concentration shows continuous concentration gradient" refers that the concentration of metal except for lithium exists with concentration distribution, which is changed gradually from the core of the active material particle to the surface part. The concentration gradient refers that there may be metal concentration difference of 0.1 to 30 mol %, preferably 0.1 to 20 mol %, more preferably 1 to 10 mol % per 0.1 .mu·m, from the particle core to the surface part. In the present invention, the particle core refers to the range within the diameter 0.2 .mu·m from the center of the active material particle, and the particle surface part refers to the range within the diameter 0.2 .mu·m from the outermost of the particle.

The present invention is characterized that the concentration gradients of the M2 and the M3 should be constant from the particle core to the surface, i.e., the concentrations of the M2 and the M3 may be continuously changed at the whole particle, preferably.

The present invention is characterized that the M1 is Ni, the M2 is Mn and the M3 is Co. The Ni concentration is maintained constantly so as to obtain high capacity, and the Mn concentration becomes increased at the surface and the Co concentration becomes decreased at the surface so as to obtain higher stability.

In the present invention, the constant concentration range of the M1, i.e., Ni, x may be 0.4≤x≤1, and it is more preferred that the Ni concentration should be maintained at high concentration of 0.6≤x≤0.9.

In the present invention, when the M1 is Ni, the concentration difference of the Co and the Mn between the particle core and the particle surface may be 0.2≤|y2−y1|0.4, 0.2≤|z2−z1|≤0.4, preferably, because there may be no rapid concentration change. And the concentrations of the Mn and the Co at the surface may be 0.2≤y2≤0.4, 0≤z2≤0.1, preferably. The Mn content at the surface should be 0.2 or more to obtain thermostability and to prevent capacity reduction.

The present invention is characterized that the M1 is Co, the M2 is Mn and the M3 is Ni.

The present invention is characterized that the M1 is Mn, the M2 is Co and the M3 is Ni.

Hereinafter, another method for preparing the cathode active material of the present invention will be described.

First of all, a metal salt aqueous solution for forming the core and a metal salt aqueous solution for forming the surface part, which contain the M1, the M2 and the M3 as a metal salt aqueous solution, wherein the concentration of the M1 is the same each other, and the concentration of the M2 and the concentration of the M3 are different each other, are prepared. The present invention is characterized that in order to constantly maintain the concentration of the M1 in the whole particle, the M1 concentration may be maintained same at the metal salt aqueous solution for forming the core and the metal salt aqueous solution for forming the surface part.

The metal salt aqueous solution for forming the core and the metal salt aqueous solution for forming the surface part may be prepared by adding nickel salt, cobalt salt, manganese salt and salts containing M to a solvent, or may be prepared by preparing aqueous solution containing nickel salt, cobalt salt, manganese salt and salts containing M, respectively followed by mixing thereof for using. The metal salt may be sulfate, nitrate, acetate, halide, hydroxide and the like, and it may be any salt, which can be dissolved in water, without particular limitation.

Then, the metal salt aqueous solution for forming the core and the metal salt aqueous solution for forming the surface part are mixed together and simultaneously, the chelating agent and the basic aqueous solution are mixed in a reactor so as to obtain a precipitate wherein the M1 concentration is constant from the core to the surface, and the M2 and M3 concentrations have continuous concentration gradients from the core to the surface part. Namely, the metal salt aqueous solution for forming the core and the metal salt aqueous solution for forming the surface part are mixed at the mixing ratio, which is gradually changed from 100 v %:0 v % to 0 v %:100 v %, and simultaneously, the chelating agent and the basic aqueous solution are mixed in a reactor, so as to form a precipitate, wherein the M1 concentration is constant from the core to the surface, and the M2 and M3 concentrations have continuous concentration gradients from the core to the surface part.

In the present invention, a precipitate having continuous concentration gradient from the particle core to the surface part, from the particle forming process through one coprecipitation process, by mixing the metal salt aqueous solution for forming the core and the metal salt aqueous solution for forming the surface part from the initial stage of the particle forming process and supplying thereof continuously at the same time. The produced concentration gradient and its gradient may be controlled according to the compositions and the mixing ratio of the metal salt aqueous solution for forming the core and the metal salt aqueous solution for forming the surface part. The entire particle size may be controlled by adjusting the reaction time to 1 to 10 hours.

Further, the present invention is characterized that the molar ratio of the chelating agent and the metal salt may be 0.2 to 1.0:1.

The chelating agent may be ammonia aqueous solution, ammonium sulfate aqueous solution and a combination thereof. It is preferred that the molar ratio of the chelating agent and the metal salt may be 0.2 to 0.5:1, 0.2 to 0.4:1. The reason to set the molar ratio of the chelating agent to 0.2 to 1.0 based on the metal aqueous solution 1 mole, is that the chelating agent forms a complex by reacting with metal at the ratio of 1:1 or more, but the chelating agent remained after the reaction of sodium hydroxide and the complex may be changed to intermediates and then recovered as the chelating agent. Furthermore, the reason is that it is the best condition for improving and stabilizing the crystallinity of the cathode active material.

The concentration of the basic aqueous solution may be 2 M to 10 M, preferably. If the concentration of the basic aqueous solution is less than 2 M, particle forming may take longer, tap density may be deteriorated, and the yield of the co-precipitation reaction product may be reduced. And, if the concentration is over 10 M, it is not preferred because it may be difficult to form homogeneous particles due to rapid particle growth by rapid reaction, and the tap density may be also reduced.

In the second step, the reaction atmosphere of the transition metal aqueous solution may be under a nitrogen flow, pH may be within 10 to 12.5, reaction temperature is within 30 to 80° C., and reaction stirring speed may be within 100 to 2000 rpm, preferably.

Then, in the third step, the obtained precipitate may be dried or heat-treated to prepare an active material precursor. The drying process may be conducted at 110° C. to 400° C. for 15 to 30 hours.

Finally, the active material precursor and the lithium salt are mixed and then heat-treated to obtain an active material.

It is preferred that the heat-treating process after mixing the active material precursor and the lithium salt may be conducted at 700° C. to 1100° C. The heat-treating atmosphere may be in an oxidative atmosphere of air or oxygen or a reductive atmosphere of nitrogen or hydrogen, preferably, and the heat-treating time may be 10 to 30 hours, preferably. During this heat-treating process, metal may be diffused even at the part where the internal metal concentration is constant at the initial stage of the particle forming process, and consequently, a metal oxide having continuous metal concentration distribution from the core to the surface part in the whole particle may be obtained.

Before the heat-treating process, a pre-calcining process may be conducted by maintaining at 250 to 650° C. for 5 to 20 hours. Further, after the heat-treating process, an annealing process may be conducted at 600 to 750° C. for 10 to 20 hours.

Further, the present invention may further include a step of adding sintering additives when mixing the active material precursor and the lithium salt, preferably. The sintering additives may be any one selected from the group consisting of compounds containing ammonium ion, metal oxides, metal halides and a combination thereof, preferably.

The compounds containing ammonium ion may be any one selected from the group consisting of $NH_4F$, $NH_4NO_3$, $(NH_4)_2SO_4$, and a combination thereof, preferably; the metal oxides may be any one selected from the group consisting of $B_2O_3$, $Bi_2O_3$, and a combination thereof, preferably; and the metal halides may be any one selected from the group consisting of $NiCl_2$, $CaCl_2$, and a combination thereof, preferably.

The sintering additives may be used in an amount of 0.01.about.0.2 mole based on the active material precursor 1 mole, preferably. If the amount of the sintering additives is too low, the sintering effect of the active material precursor may not be improved a lot, and if the amount is higher than the said range, the initial capacity during charging/discharging may be reduced or the performance of the cathode active material may be deteriorated.

Further, the present invention provides a lithium secondary battery including the cathode active material according to the present invention.

The lithium battery may include a cathode including the cathode active material having the above constitution, a cathode including cathode active material and a separator existing between thereof. Further, it may include an electrolyte, which is immersed in the cathode, the cathode and the separator. The cathode active material may be a material which can reversibly absorb or release lithium ions, preferably, for example, a material including artificial graphite, natural graphite, graphitized carbon fiber, Amorphous Carbon, and metal lithium also can be used as a cathode active material. The electrolyte may be a liquid electrolyte containing lithium salts and non-aqueous organic solvent, or polymer gel electrolyte.

Examples 2

Case of Constant Nickel Concentration

Example 2-1

In order to prepare a compound, wherein the Ni concentration is constant from the core to the surface, the Co concentration is decreased, and the Mn concentration is increased, a 2.4 M metal aqueous solution, prepared by mixing nickel sulfate and cobalt sulfate at the molar ratio of 80:20, as a metal salt aqueous solution for forming the core and a metal aqueous solution containing nickel sulfate and manganese sulfate at the molar ratio of 80:20 as a metal salt aqueous solution for forming the surface part were prepared. Distilled water 4 L was put into a coprecipitation reactor (Capacity: 4 L, power of a rotation motor: 80 W); nitrogen gas was supplied to the reactor at the speed of 0.5 L/min so as to remove dissolved oxygen; and stirred at 1000 rpm while maintaining the temperature of the reactor at 50° C.

The metal salt aqueous solution for forming the core and the metal salt aqueous solution for forming the surface part were mixed at a certain ratio, and simultaneously supplied into the reactor at the rate of 0.3 L/hour. Further, 3.6 M ammonia solution was continuously supplied into the reactor at the rate of 0.03 L/hour. Further, for adjusting pH, 4.8 M NaOH aqueous solution was supplied to maintain pH in the reactor at 11. Then, the impeller speed of the reactor was controlled to 1000 rpm, and the co-precipitation reaction was conducted until the diameter of the obtained precipitate became 1 .mu·m. At this time, the flow rate was controlled to make the average retention time of the solution in the reactor about 2 hours, and after the reaction reached to the steady state, the reactant was kept at the steady state for a certain time to so as to obtain a co-precipitated compound having higher density. The compound was filtered, washed with water, and dried with 110° C. warm air dryer for 15 hours so as to obtain an active material precursor.

$LiNO_3$ as a lithium salt was mixed to the obtained active material precursor, heated at a rate of 2° C./min, and then pre-calcined by maintaining at 280° C. for 10 hours followed by calcining at 750° C. for 15 hours to obtain a final active material particle. The size of the finally obtained active material particle was 12 μm.

Example 2-2 to Example 2-4

In order to prepare a compound, wherein the Ni concentration is constant from the core to the surface, the Co concentration is decreased and the Mn concentration is increased, the procedure of Example 2-1 was repeated except for mixing nickel sulfate, cobalt sulfate and manganese sulfate of the metal salt aqueous solution for forming the core and the metal salt aqueous solution for forming the surface part at the molar ratio as listed in the following Table 3 so as to obtain an active material particle.

Example 2-5

An cathode active material, which has the same composition and the same structure with Examples 2-3 was prepared by using a batch reactor.

Distilled water 2.5 L was put into a coprecipitation batch reactor (Capacity: 8 L, power of a rotation motor: 180 W); nitrogen gas was supplied to the reactor at the speed of 0.6 L/min so as to remove dissolved oxygen; and stirred at 450 rpm while maintaining the temperature of the reactor at 50° C.

The metal salt aqueous solution for forming the core and the metal salt aqueous solution for forming the surface part having the same concentration with Example 2-3 were mixed at a certain ratio, and simultaneously supplied into the reactor at the rate of 0.2 L/hour. Further, 4.8 M ammonia solution was continuously supplied into the reactor at the rate of 0.1 L/hour. Further, for adjusting pH, 10 M NaOH aqueous solution was supplied to maintain pH in the reactor at 11. Then, the impeller speed of the reactor was controlled to 450 rpm, and the reaction solution was supplied until the total amount of the initially added distilled water, the added metal aqueous solution, the ammonia solution and the NaOH solution became 8 L. The compound was filtered, washed with water, and dried with 110° C. warm air dryer for 15 hours so as to obtain an active material precursor.

$LiNO_3$ as a lithium salt was mixed to the obtained active material precursor, heated at a rate of 2° C./min, and then pre-calcined by maintaining at 280° C. for 10 hours followed by calcining at 750° C. for 15 hours to obtain a final active material. The size of the finally obtained active material particle was 12 μm.

TABLE 3

|  | Metal salt aqueous solution for forming the core | | | Metal salt aqueous solution for forming the surface part | | |
| --- | --- | --- | --- | --- | --- | --- |
| Example 2-1 | 80 | 20 | 0 | 80 | 0 | 20 |
| Example 2-2 | 75 | 25 | 0 | 75 | 02 | 23 |
| Example 2-3 | 70 | 30 | 0 | 70 | 02 | 28 |
| Example 2-4 | 65 | 35 | 0 | 65 | 02 | 33 |
| Example 2-5 | 70 | 30 | 0 | 70 | 02 | 28 |

Comparative Example

An cathode active material, wherein the molar ratio of the nickel, the cobalt and the manganese is as listed in the following Table 4, respectively, and each concentration in the whole active material is not changed so as to have constant composition, was prepared.

TABLE 4

|  | Ni | Co | Mn |
|---|---|---|---|
| Comparative Example 2-1 | 80 | 07 | 13 |
| Comparative Example 2-2 | 75 | 07 | 18 |
| Comparative Example 2-3 | 70 | 09 | 21 |
| Comparative Example 2-4 | 65 | 10 | 25 |

Test Example 2-1

Confirmation of Formation of Concentration Gradient in Precursor Particle

In order to confirm the concentration gradient structure of each metal from the core to the surface of the precursor particle of the present invention, the atomic ratio in each precursor particle prepared in Examples 2-1 to 2-5 was measured by using EPMA (Electron Probe Micro Analyzer) while moving form the core to the surface part, and the results are shown in FIGS. 25 to 29, respectively.

In FIGS. 25 to 28, it was confirmed that the Ni metal concentration from the core to the surface was constant, and there was concentration gradient, where the Mn concentration was gradually increased with certain gradient, but the Co concentration was gradually decreased with certain gradient.

Figure 29:
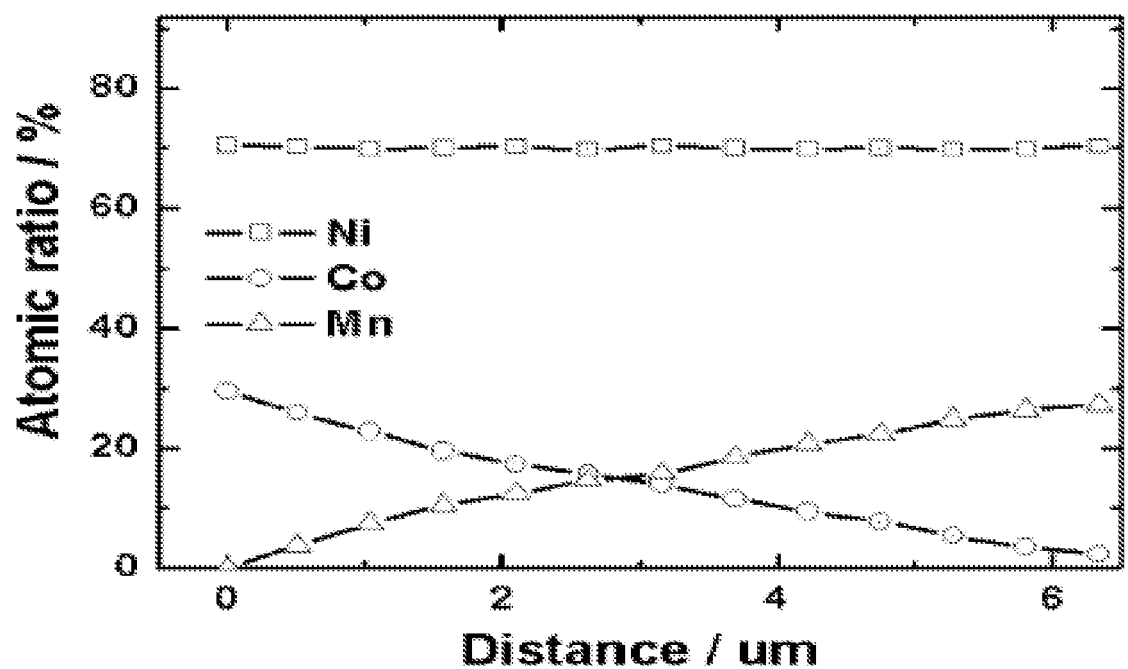
Figure 30:
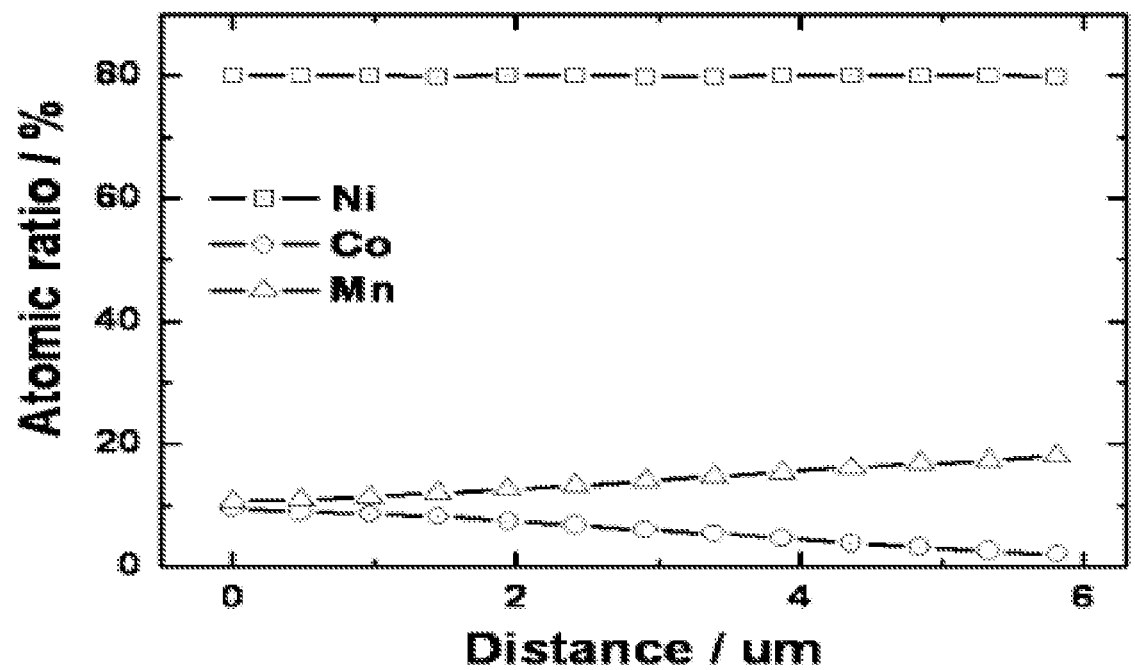
FIGS. 30 to 34: the results measuring the atomic ratio in each precursor particle prepared in Examples 2-1 to 2-5 of the present invention after heat-treating, respectively.
Figure 31:
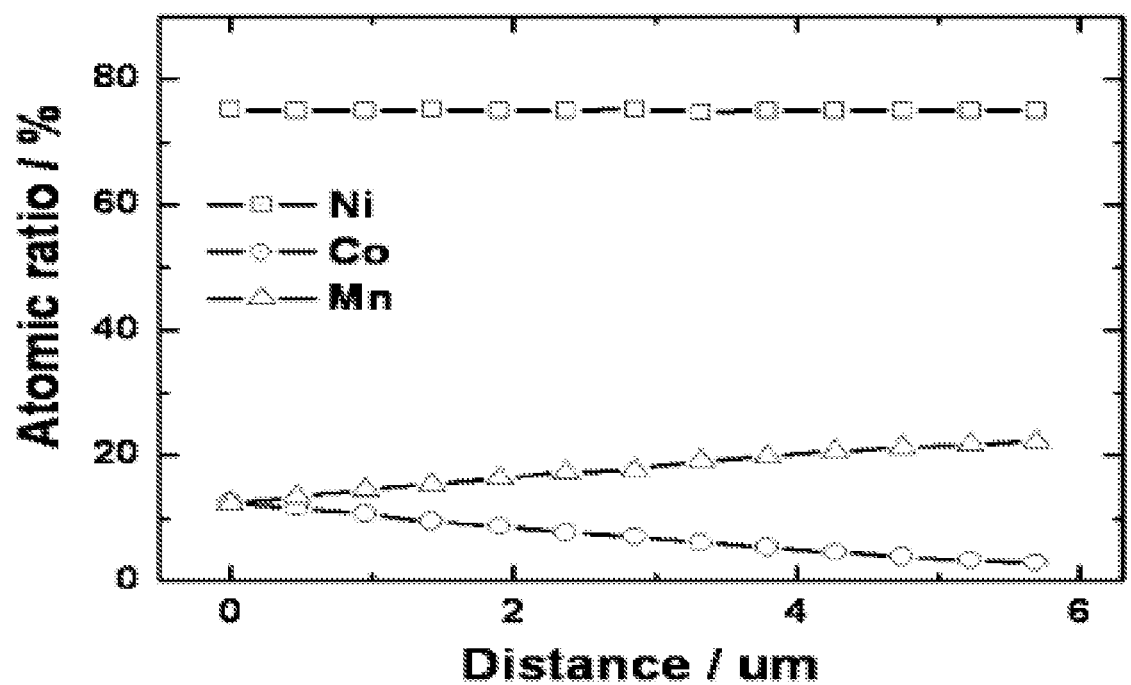
Figure 32:
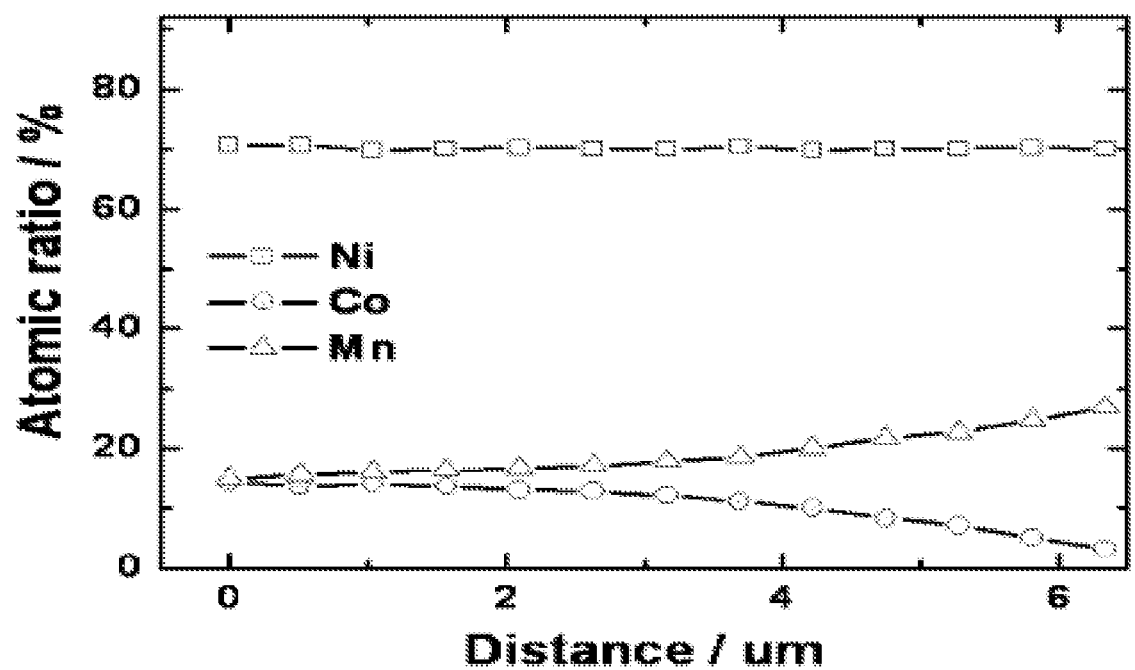
Figure 33:
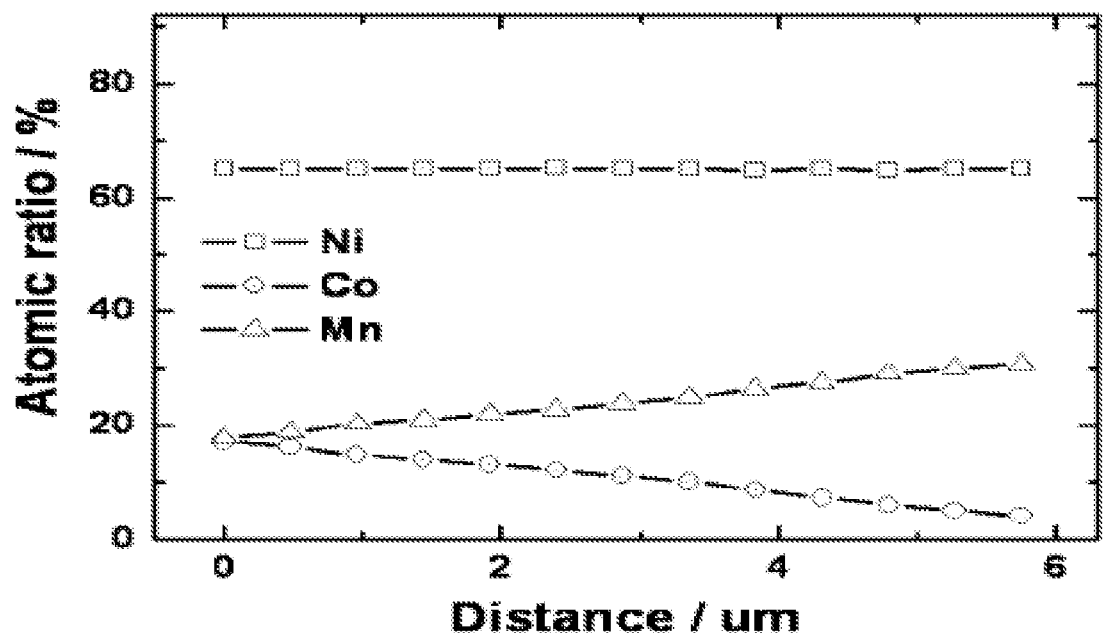

Further, for Example 2-5 prepared by using the batch type reactor, as shown in FIG. 29, it was confirmed that the Ni metal concentration from the core to the surface was constant, and there was concentration gradient, where the Mn concentration was gradually increased with certain gradient, but the Co concentration was gradually decreased with certain gradient.

Test Example 2-2

Confirmation of Formation of Concentration Gradient in Active Material Particle after Heat-Treatment In order to confirm whether each metal shows concentration gradient from the particle core to the surface part after heat-treating the precursor of the present invention, the particles prepared in Examples 2-1 to 2-5 were heat-treated. And then the atomic ratio was measured by using EPMA (Electron Probe Micro Analyzer) while moving from the core to the surface, and the results are shown in FIGS. 30 to 34, respectively.

In FIGS. 30 to 33, it could be confirmed that: the Ni metal concentration was constant from the core to the surface, and the precursor showed the concentration of the aqueous solution for forming the core; but after heat-treatment, the Co and Mn concentrations in the core were same each other, and later there was concentration gradient, where the Mn concentration was gradually increased with certain gradient, but the Co concentration was gradually decreased with certain gradient.

Figure 34:
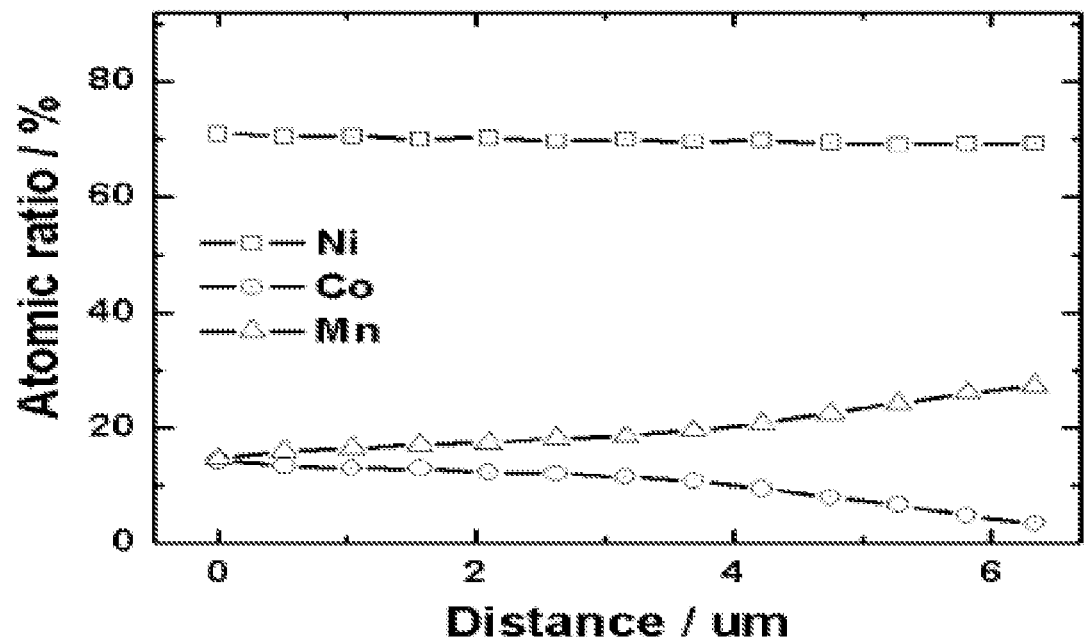
Figure 35:
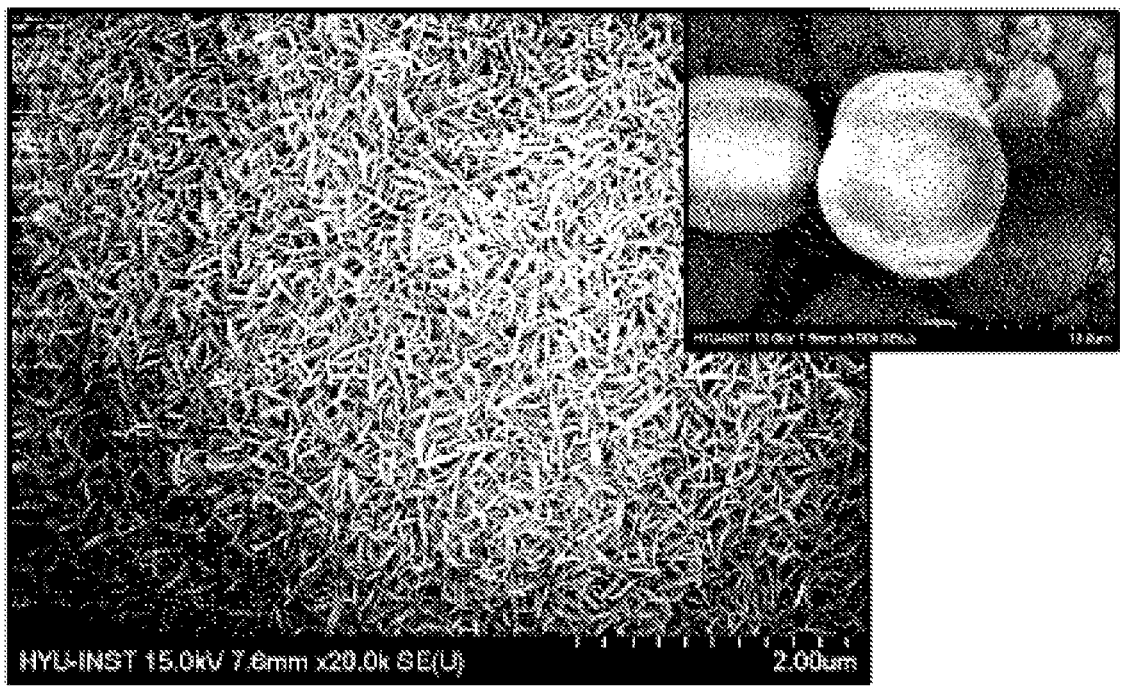
FIGS. 35 to 39 and FIGS. 40 to 44: the surface images of each precursor particle and the final active material prepared in Examples 2-1 to 2-5 of the present invention measured by scanning electron microscope, respectively.
Figure 36:
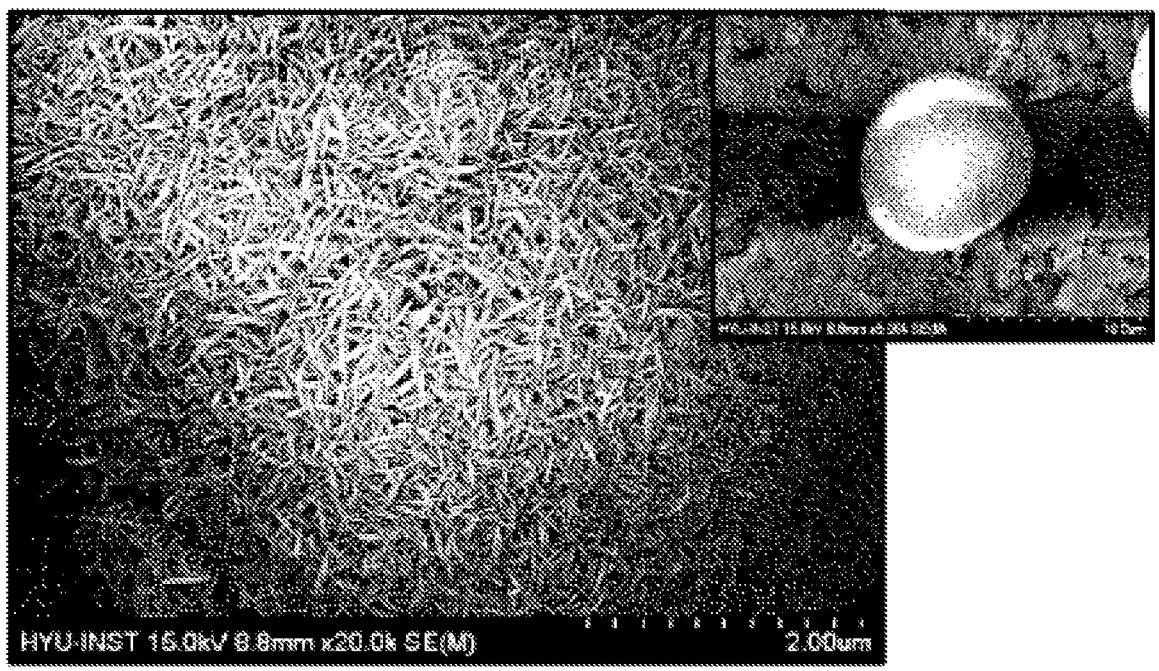
Figure 37:
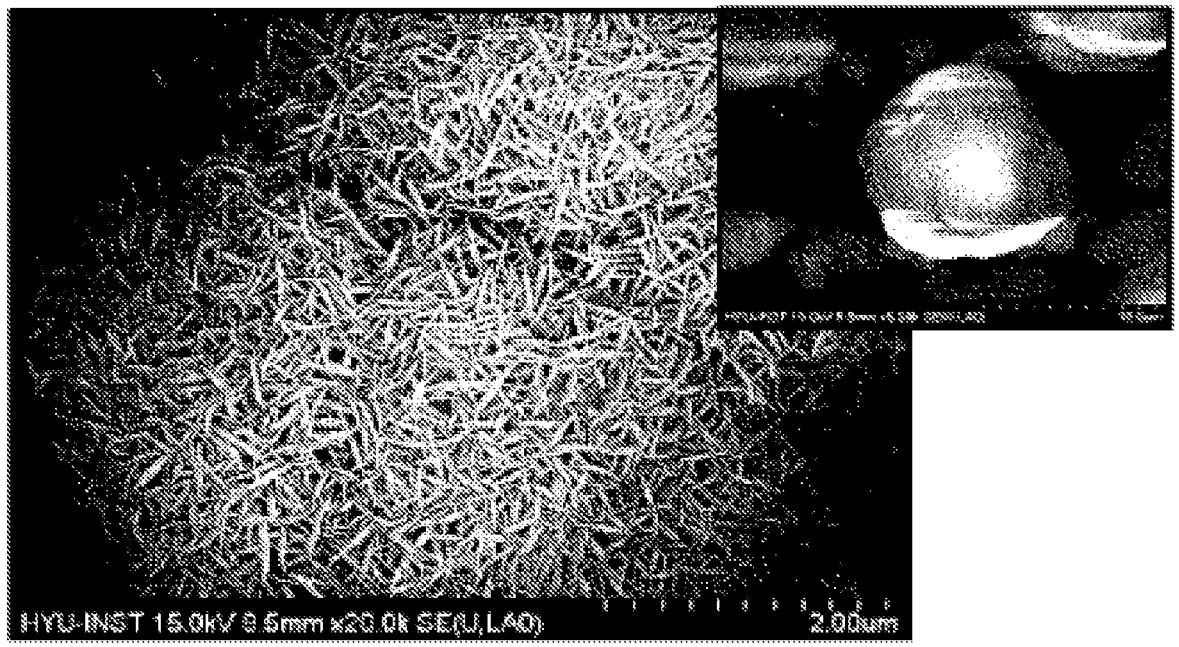
Figure 38:
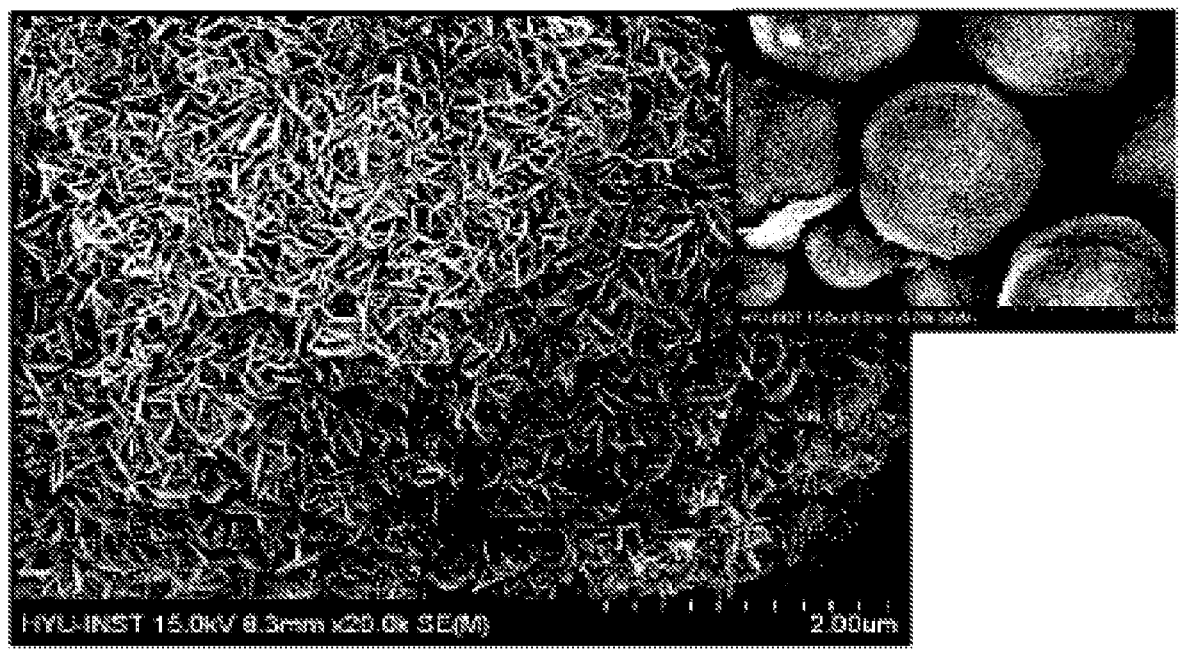
Figure 39:
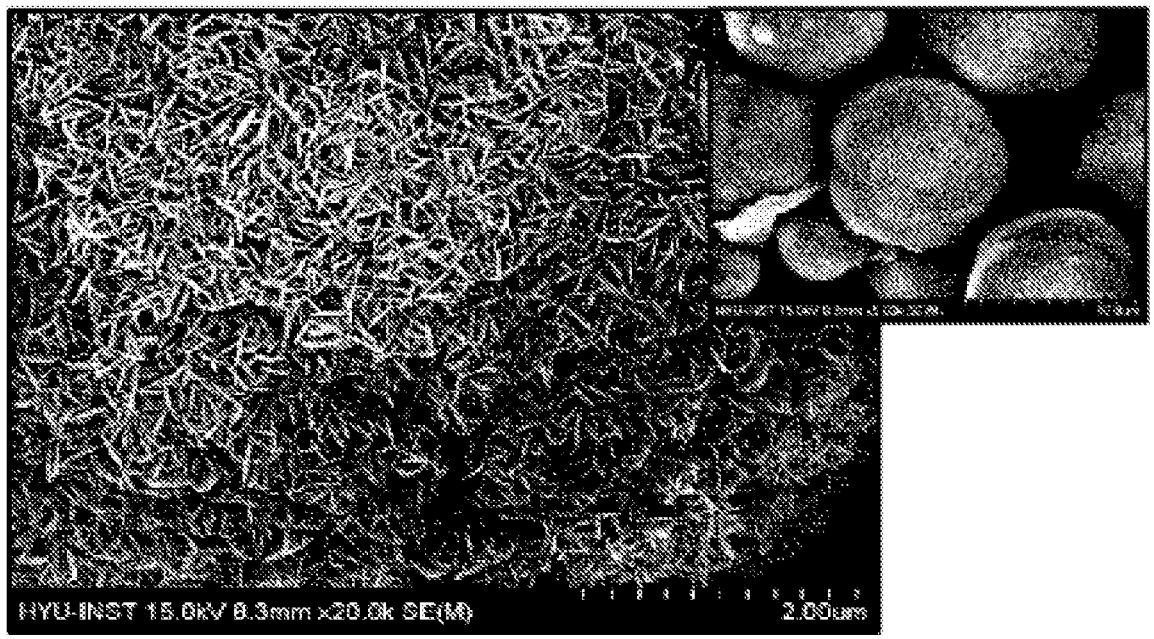
Figure 40:
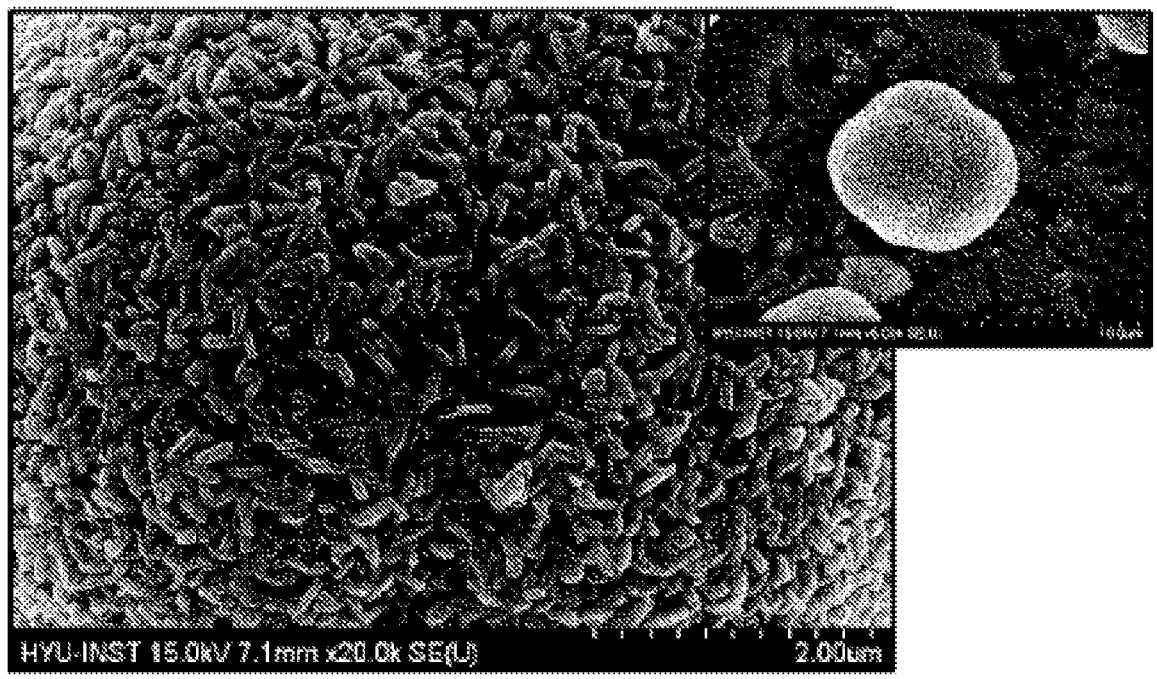
Figure 41:
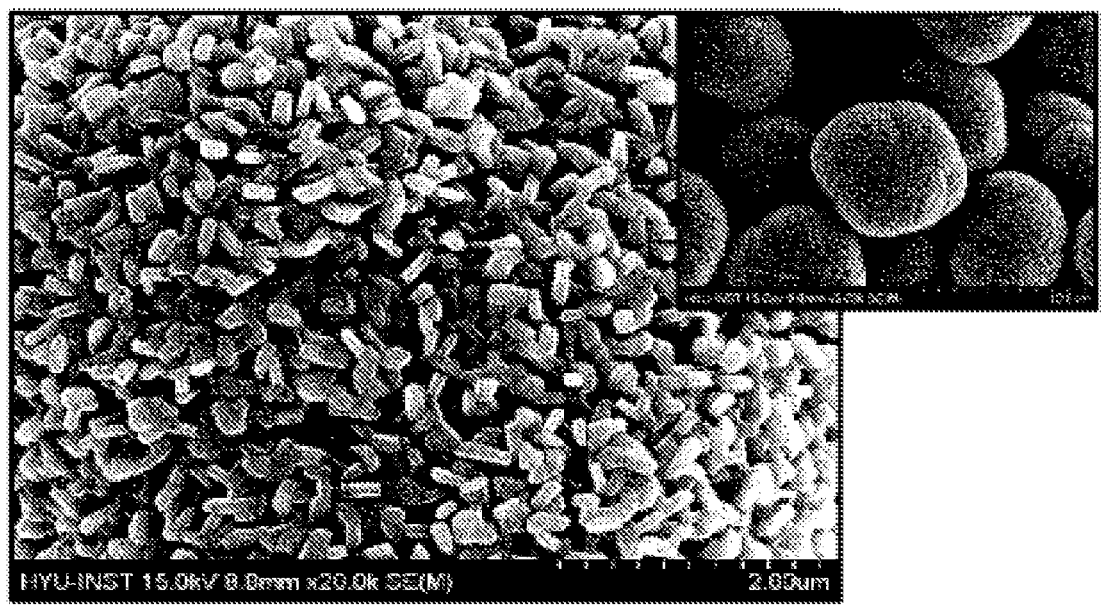
Figure 42:
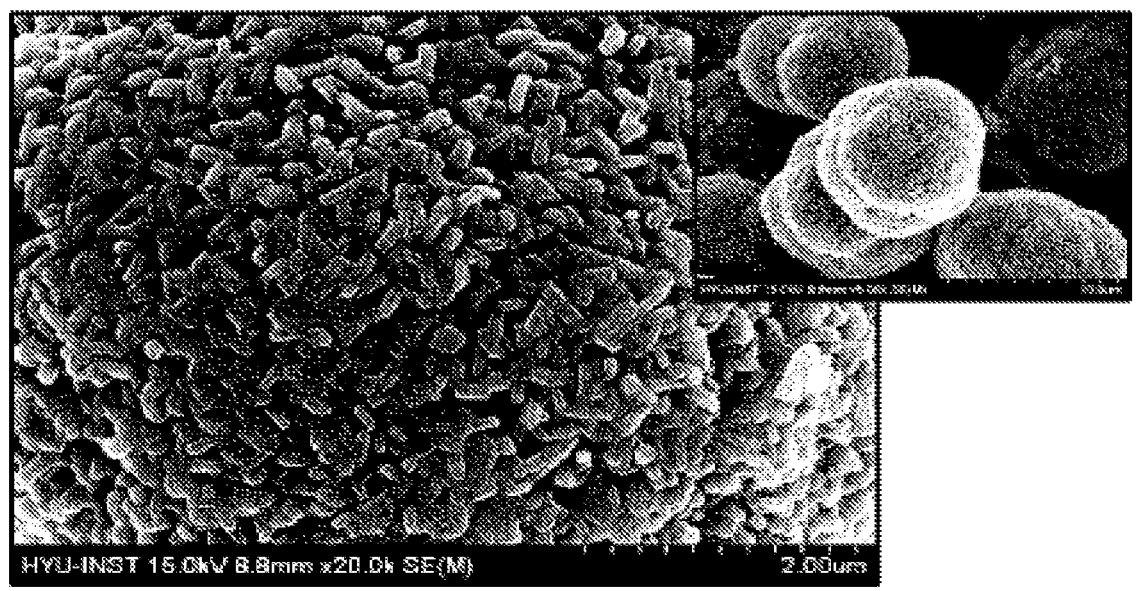
Figure 43:
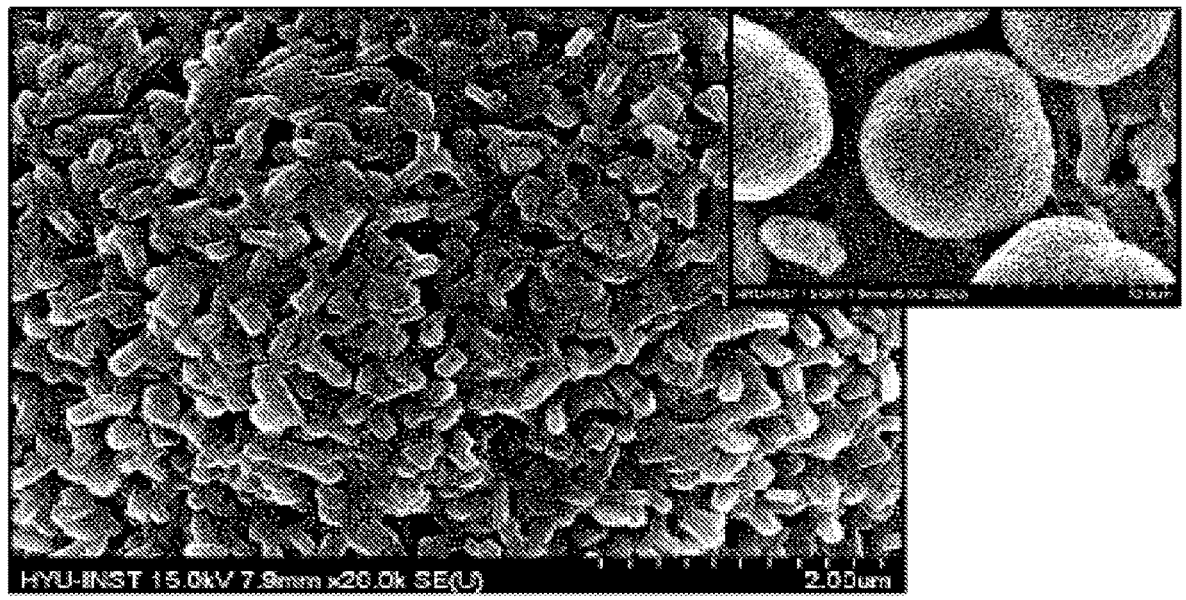
Figure 44:
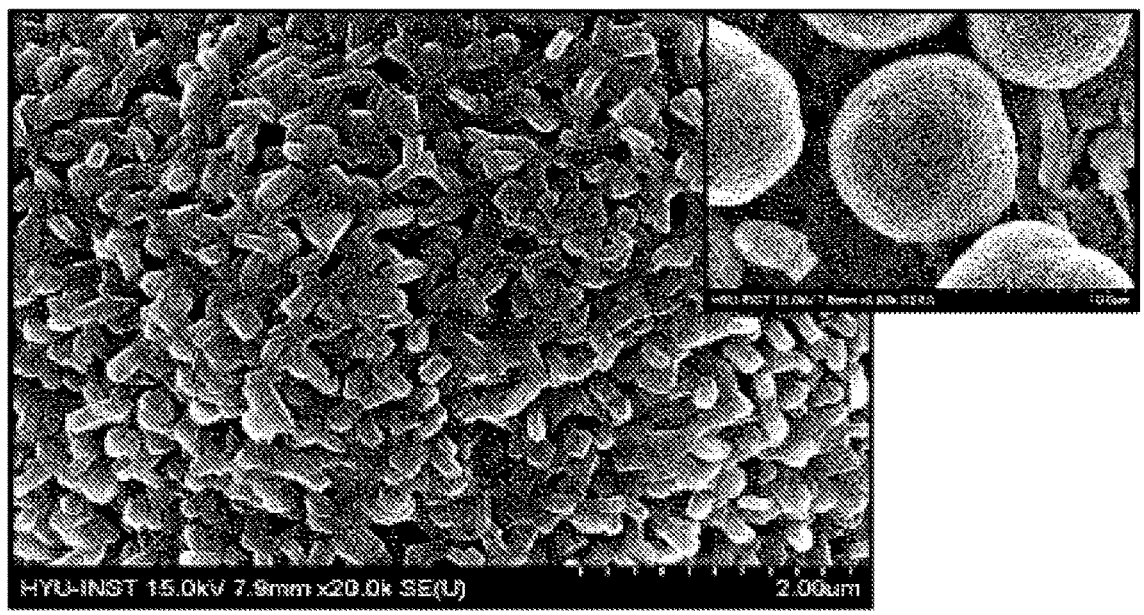
Figure 45:
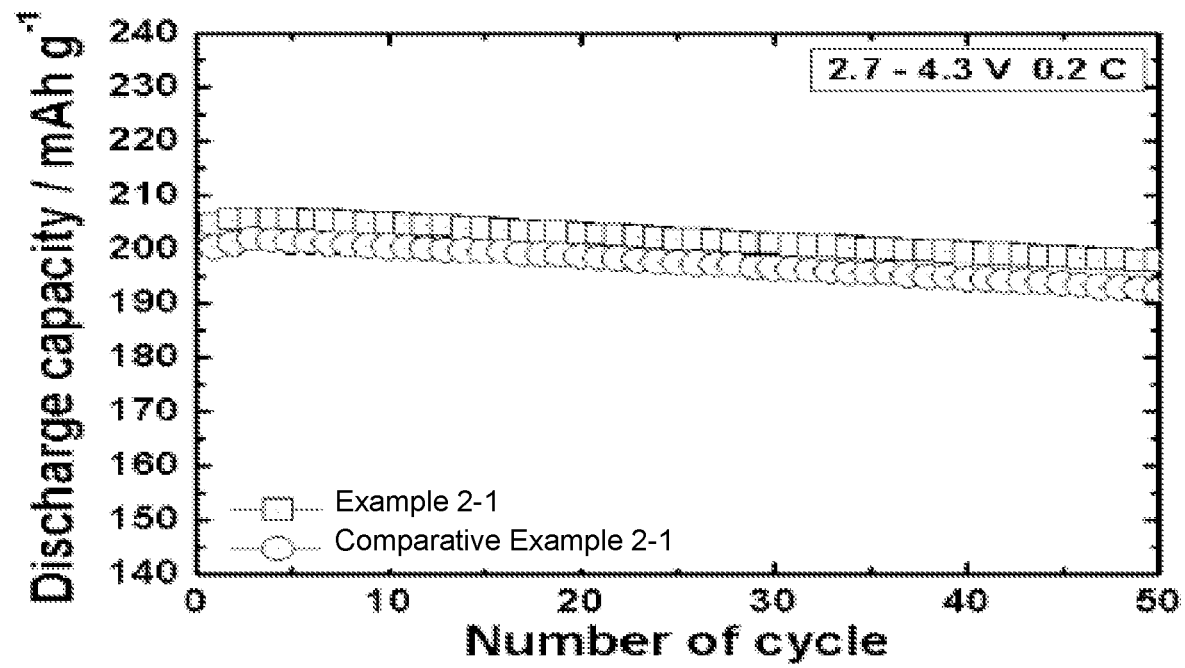
FIGS. 45 to 48: the results of charging/discharging test and the results measuring cycle characteristics of each battery prepared by using the active material prepared in Examples 2-1 to 2-4 of the present invention, respectively.
Figure 46:
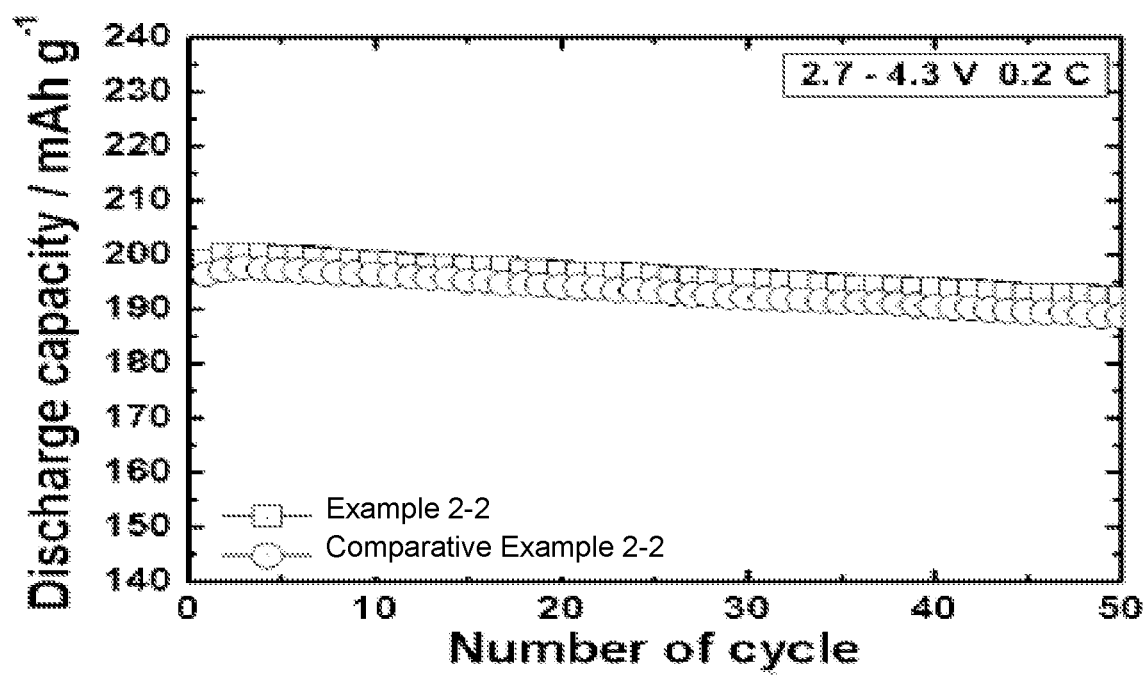
Figure 47:
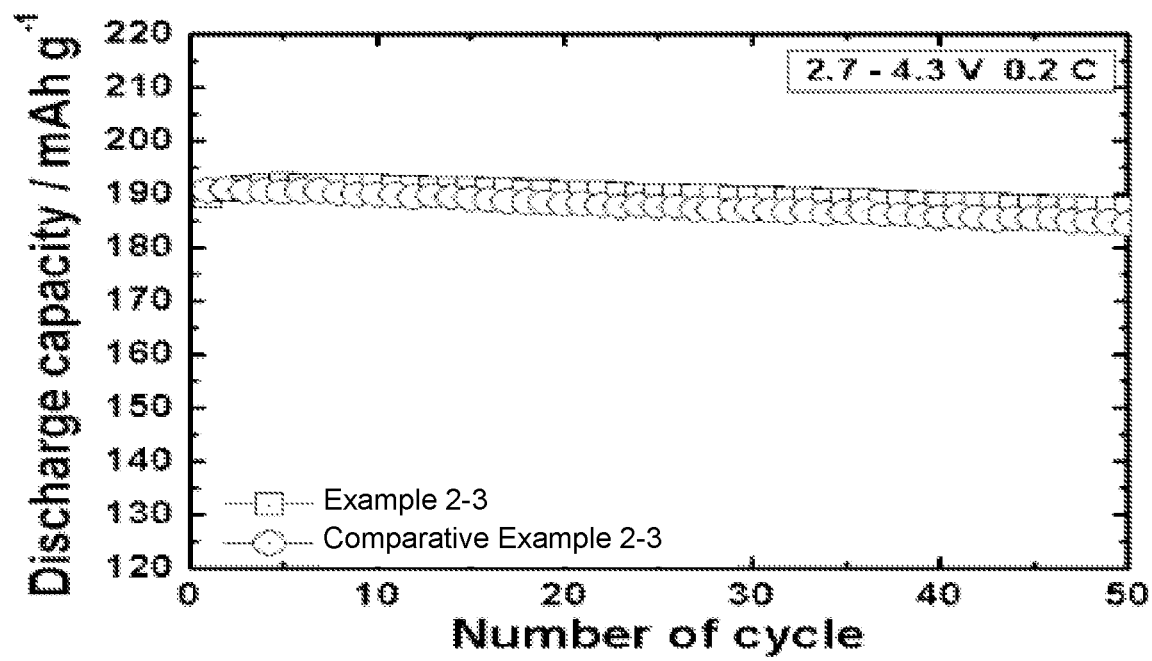
Figure 48:
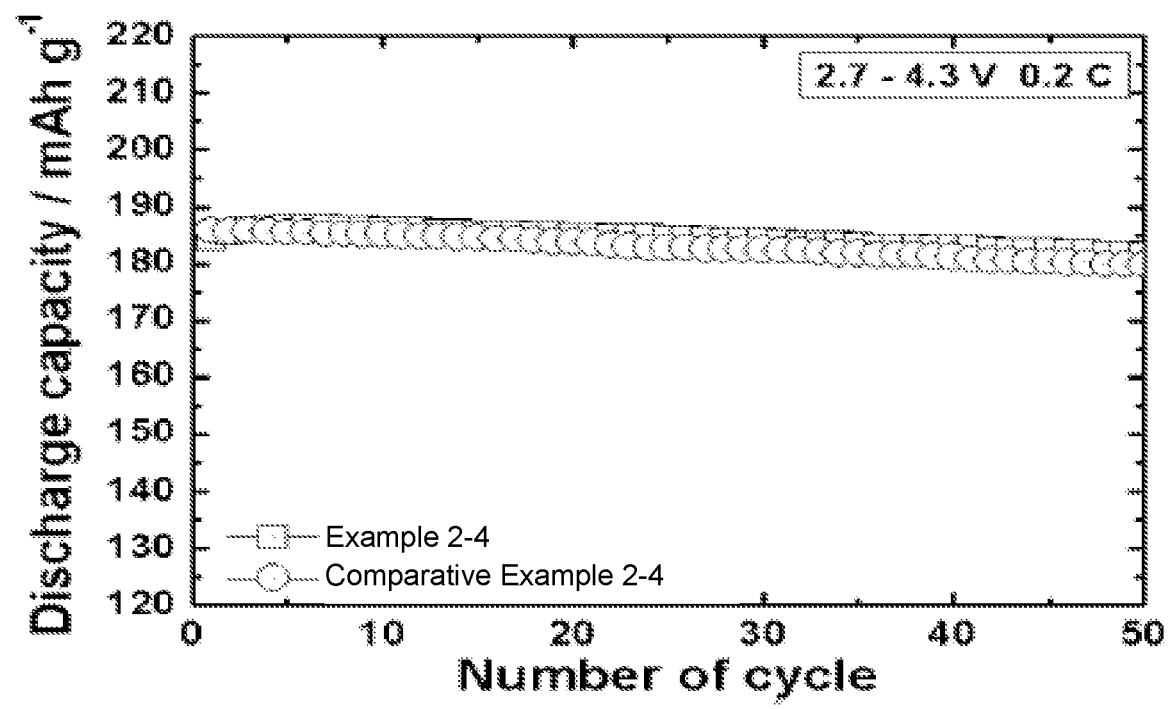

Further, as shown in FIG. 34, for Example 2-5 prepared by using the batch type reactor, it was confirmed that the Ni metal concentration from the core to the surface was constant, and there was concentration gradient, where the Mn concentration was gradually increased with certain gradient, but the Co concentration was gradually decreased with certain gradient.

In FIGS. 30 to 34, unlike the precursor, becoming the concentrations of the Mn and the Co in the core the same was resulted from diffusion between metal salts in the heat-treatment process.

Test Example 2-3

Confirmation of Surface Image of Particles of Precursor and Active Material

Surface images of the precursors and the final active materials prepared in Examples 2-1 to 2-5 were taken by using a scanning electron microscope, and the results are shown in FIGS. 35 to 39 and FIGS. 40 to 44.

Each of the pictures is a surface image with different magnification, and it could be confirmed that each particle was homogeneously formed.

Test Example 2-4

Measuring Charging/Discharging Capacity and Cycle Characteristics

Cathodes were prepared by using the active materials prepared in Examples 2-1 to 2-5 and the active materials prepared in Comparative Examples 2-1 to 2-4, and applied to cylindrical lithium secondary batteries, respectively.

For the batteries prepared by using the active materials prepared in Examples 2-1 to 2-4, charging/discharging test and cycle characteristics were measured, and the results are shown in FIGS. 45 to 48. The charging/discharging was conducted 10 times per each sample at the condition of 2.7.about.4.3 V and 0.2 C, and the average value was taken.

In FIGS. 45 to 48, Example 2-1 and Comparative Example 2-1, Example 2-2 and Comparative Example 2-2, Example 2-3 and Comparative Example 2-3, and Example 2-4 and Comparative Example 2-4 have the same molar ratio of the nickel contained in the whole particle, respectively, thereby showing similar initial charging/discharging capacity and cycle characteristics. However, Examples 2-1 to 2-5 showing concentration gradient showed better performance than Comparative Examples 2-1 to 2-4.

Figure 49:
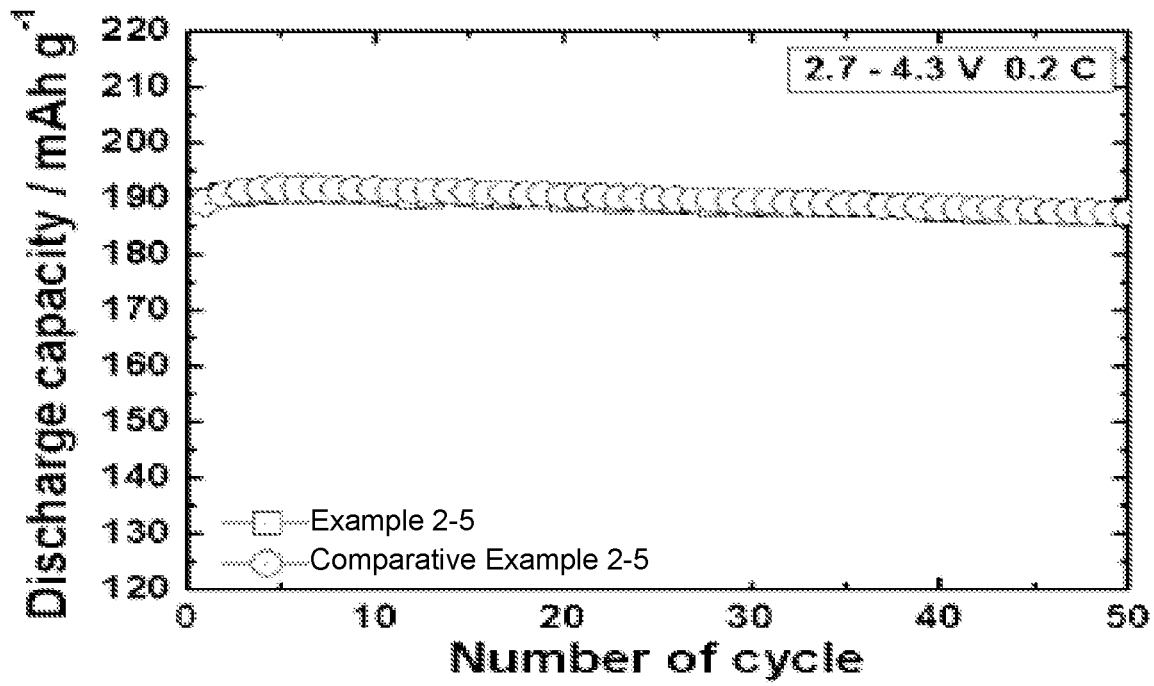
FIG. 49: the result of charging/discharging test and the result measuring cycle characteristics of each battery prepared by using the active material, which has the same concentration gradient and is prepared in Example 2-3 of the present invention prepared by using a CSTR reactor, and Example 2-5 of the present invention prepared by using a BATCH reactor, respectively.
Figure 50:
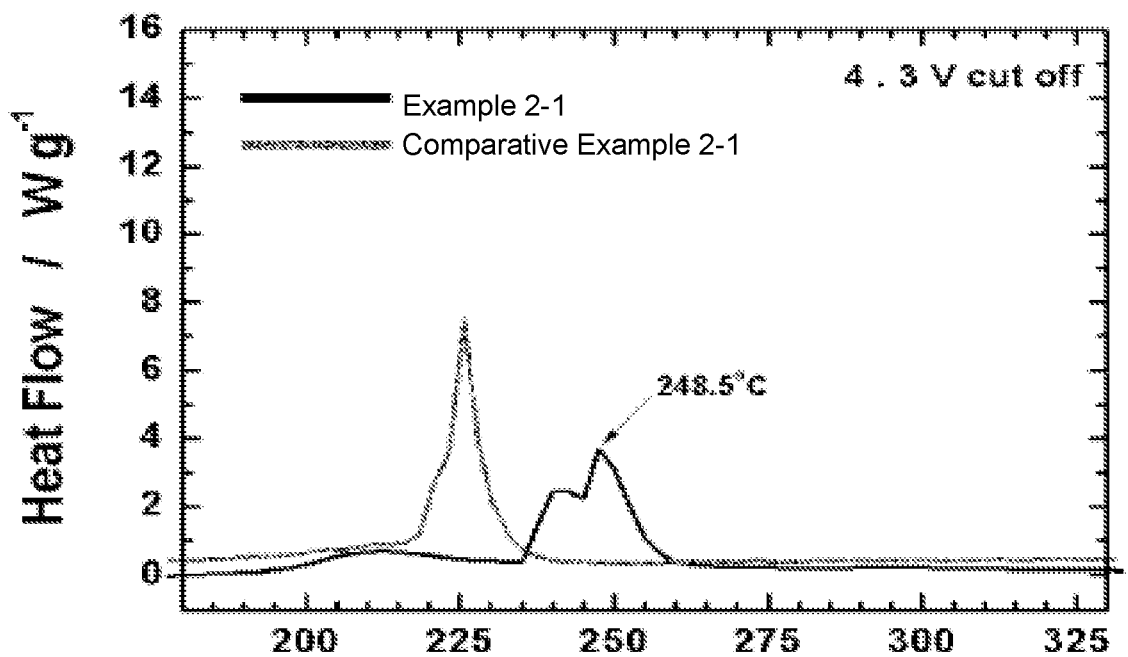
FIGS. 50 to 53: the results measuring heat flow of each cathode including active materials prepared in Examples 2-1 to 2-4 of the present invention and active materials prepared in Comparative examples 2-1 to 2-4, by charging at 4.3 V and then heating at the speed of 10° C./min by using a differential scanning calorimeter (DSC), respectively.
Figure 51:
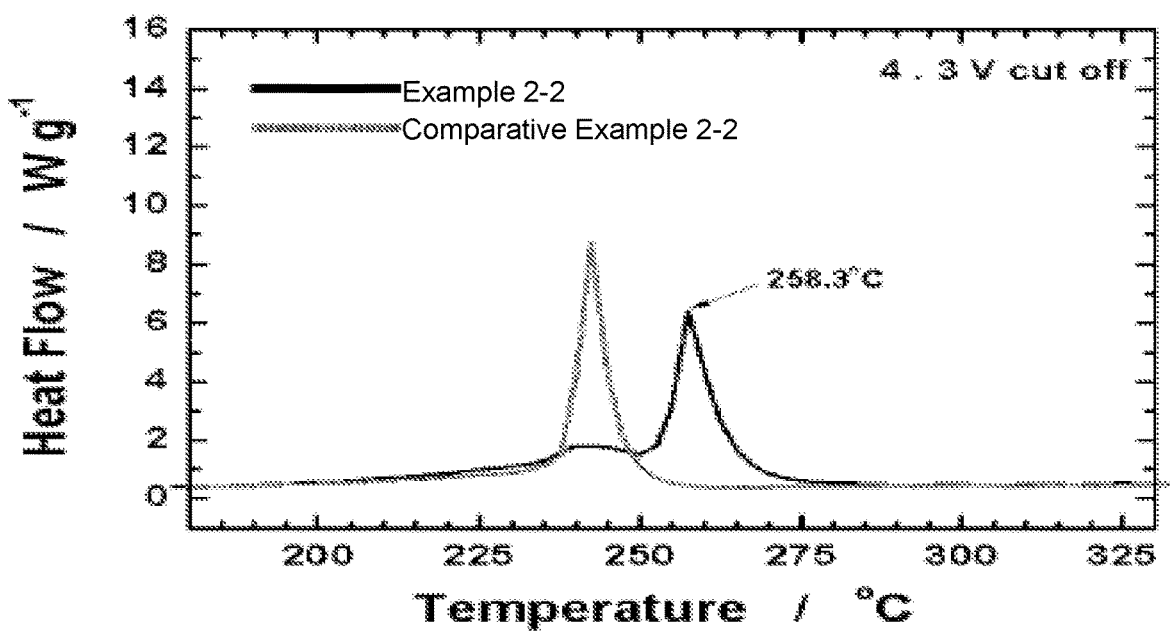
Figure 52:
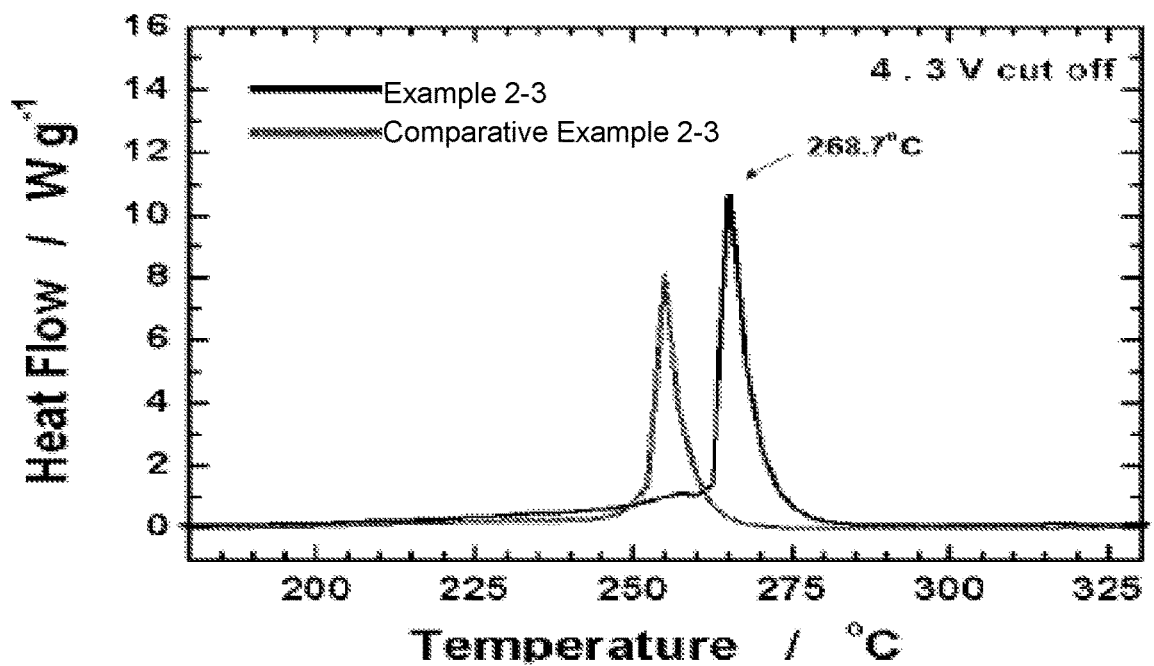
Figure 53:
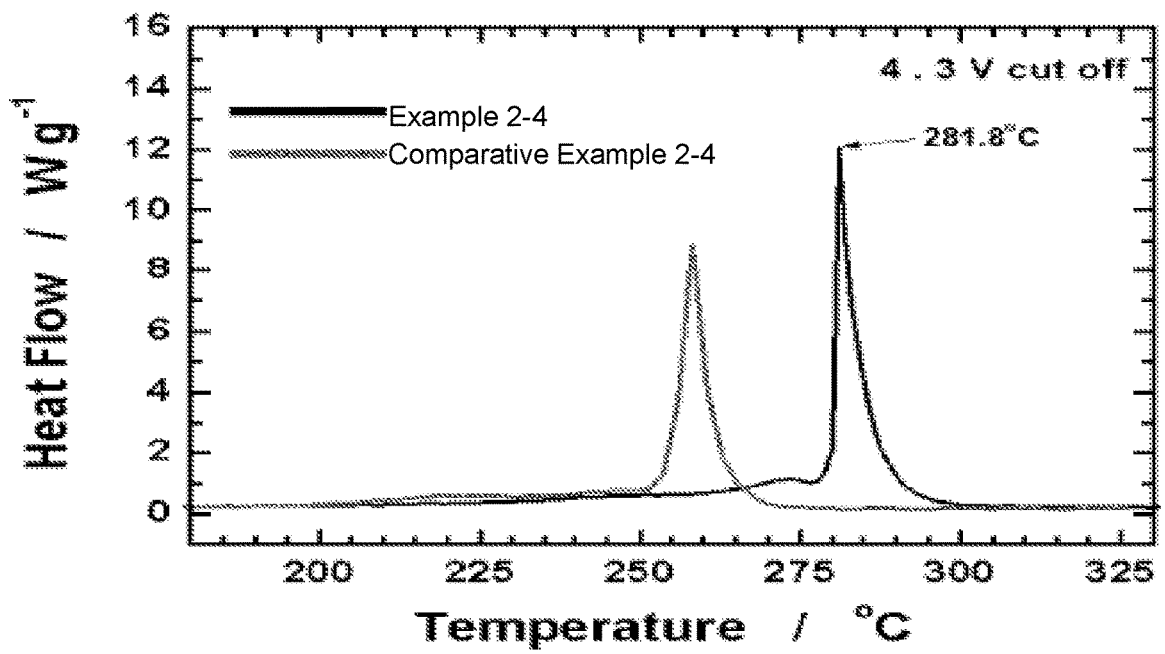

Further, in FIG. 49, when comparing Example 2-3 prepared by using a CSTR reactor and Example 2-5 prepared by using a BATCH reactor, which show the same concentration gradient, they showed identical charge/discharge characteristics.

Test Example 2-5

Evaluation of Thermostability by DSC Measurement

The cathodes containing the active materials prepared in Examples 2-1 to 2-4 and the active materials prepared in Comparative Examples 2-1 to 2-4, were charged at 4.3 V, respectively, and thermostability was measured by using a differential scanning calorimeter (DSC) and heating at a rate of 10° C./min. The results are shown in FIGS. 50 to 53.

As shown in FIGS. 50 to 53, when the active materials prepared in Examples 2-1 to 2-4 according to the present invention were contained, an exothermic peak was showed at the higher temperature in the differential scanning calorimeter (DSC) than when the active materials prepared in Comparative Examples 2-1 to 2-4 were contained. Thus, when the active materials prepared in Examples 2-1 to 2-4 according to the present invention were contained, the thermostability was much improved than when the active materials prepared in Comparative Examples 2-1 to 2-4 were contained.

Namely, in the present invention, the concentration of one metal is constant, and the concentrations of the other two metals are increased or decreased with continuous concentration gradient from the core to the surface part. Accordingly, because the concentrations of the metals inside of the particle are not rapidly changed and show table structure, it could be confirmed that the thermostability is largely increased.

Figure 54:
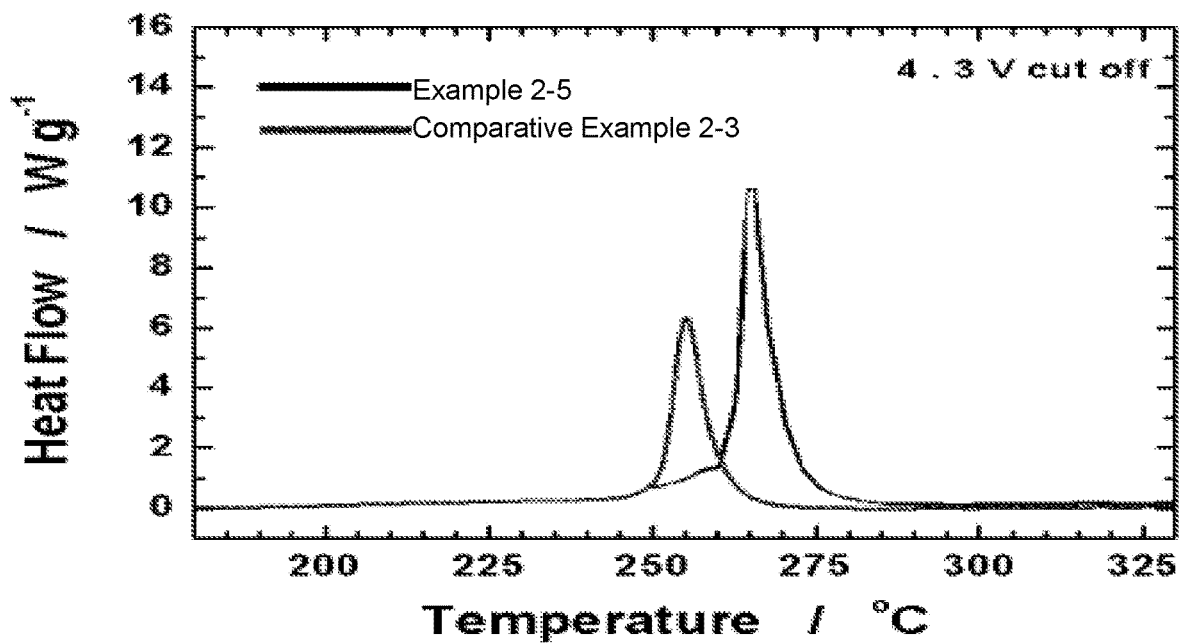
FIG. 54: the results measuring heat flow of each cathode including the active material, which has the same concentration gradient and is prepared in Example 2-3 of the present invention prepared by using a CSTR reactor, and Example 2-5 of the present invention prepared by using a BATCH reactor, by charging at 4.3 V and then heating at the speed of 10° C./min by using a differential scanning calorimeter (DSC), respectively.

Further, in FIG. 54, when comparing Example 2-3 prepared by using a CSTR reactor and Example 2-5 prepared by using a BATCH reactor, which show the same concentration gradient, they showed DSC peaks at the same temperature.

Examples 3

Case of Constant Cobalt Concentration

Example 3-1

In order to prepare a compound, wherein the Co concentration is constant from the core to the surface, the NI concentration is decreased, and the Mn concentration is increased, a 2.4 M metal aqueous solution, prepared by mixing nickel sulfate and cobalt sulfate at the molar ratio of 90:10, as a metal salt aqueous solution for forming the core and a metal aqueous solution containing nickel sulfate, cobalt sulfate and manganese sulfate at the molar ratio of 65:10:25 as a metal salt aqueous solution for forming the surface part were prepared, and a precursor was prepared as described in Example 3-1.

$LiNO_3$ as a lithium salt was mixed to the obtained active material precursor, heated at a rate of 2° C./min, and then pre-calcined by maintaining at 280° C. for 10 hours followed by calcining at 750° C. for 15 hours to obtain a final active material particle. The size of the finally obtained active material particle was 12 μm.

As Comparative Example 3-1, a precursor containing the nickel, cobalt and manganese at the molar ratio of 72:10:18, wherein each metal concentration is the same in the whole particle was prepared.

TABLE 5

|  | Ni | Co | Mn |
|---|---|---|---|
| Comparative Example 3-1 | 72 | 10 | 18 |

Test Example 3-1

Confirmation of Formation of Concentration Gradient in Precursor Particle

Figure 55:
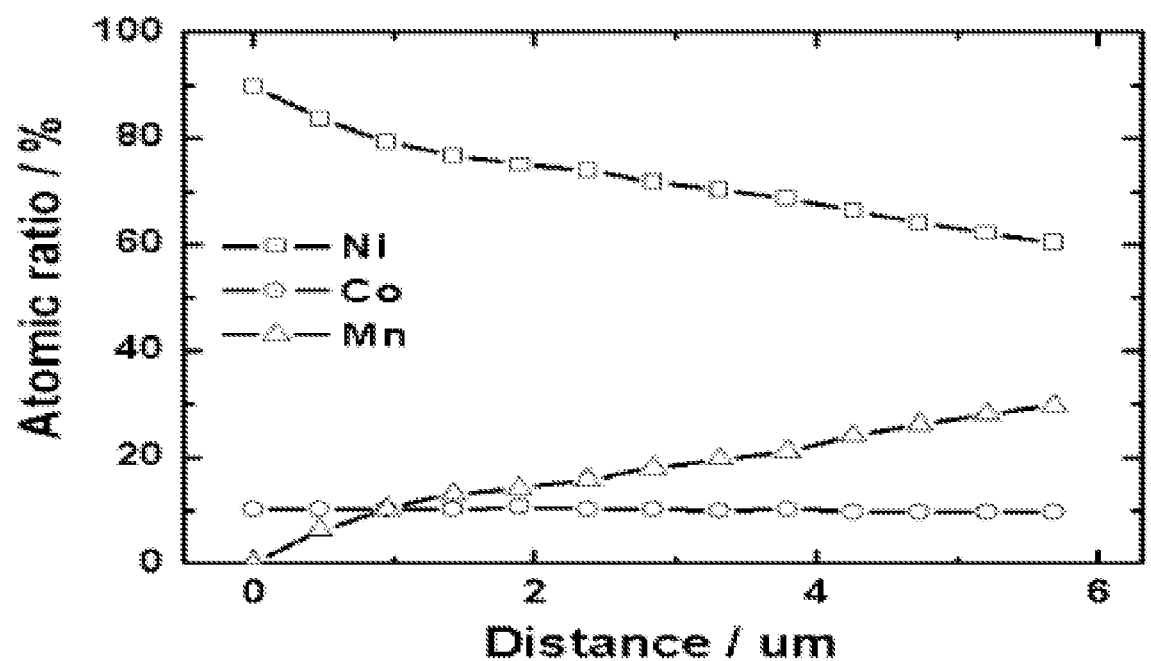
FIG. 55: the result measuring the atomic ratio in the precursor particle prepared in Example 3-1 of the present invention.

In order to confirm the concentration gradient structure of each metal from the core to the surface of the precursor particle of the present invention, the atomic ratio of the precursor particle prepared in Example 3-1 was measured by using EPMA (Electron Probe Micro Analyzer) while moving form the core to the surface part as described in Test Example 3-1, and the results is shown in FIG. 55.

In FIG. 55, it could be confirmed that: the Co metal concentration was constant from the core to the surface, the Mn concentration was gradually increased with certain gradient, but the Ni concentration was gradually decreased with certain gradient.

Test Example 3-2

Figure 56:
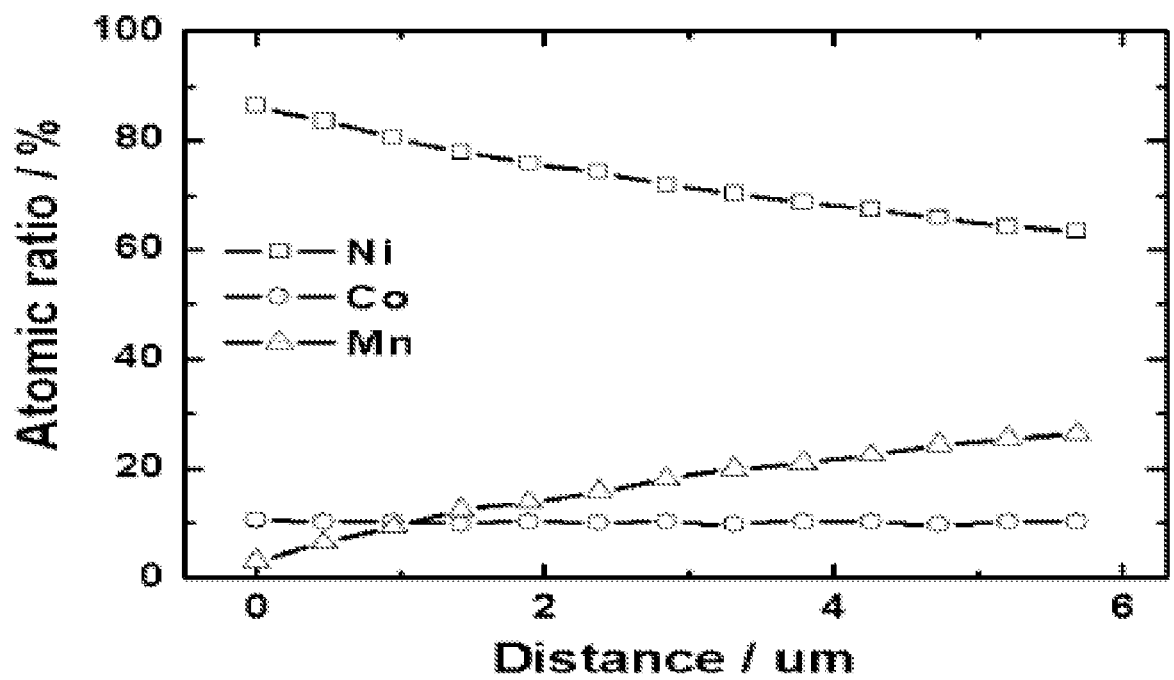
FIG. 56: the results measuring the atomic ratio in the precursor particle prepared in Example 3-1 of the present invention after heat-treating.

Confirmation of Formation of Concentration Gradient in Active Material Particle after Heat-Treatment In order to confirm whether each metal shows concentration gradient from the core to the surface part after heat-treating the precursor particle of the present invention, the atomic ratio of the particle prepared in Example 3-1 was measured by using EPMA (Electron Probe Micro Analyzer) while moving from the core to the surface as described in Test Example 3-2, and the result is shown in FIG. 56.

Test Example 3-3

Confirmation of Surface Image of Particles of Precursor and Active Material

Figure 57:
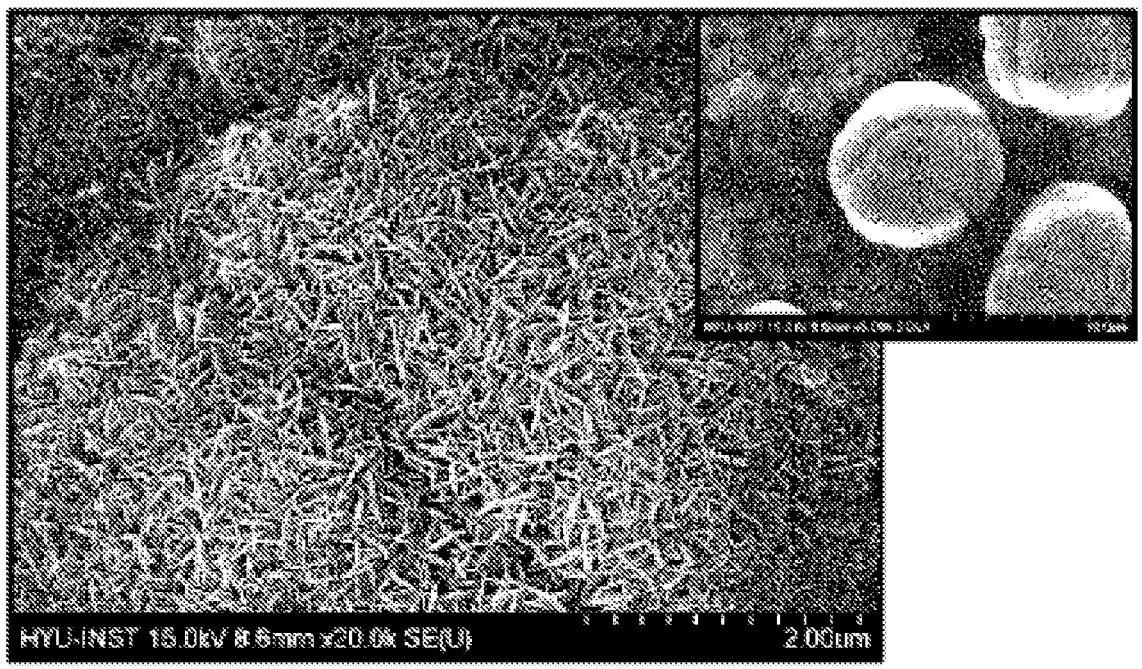
FIGS. 57 to 58: the surface images of the precursor particle and the final active material prepared in Example 3-1 of the present invention measured by scanning electron microscope.
Figure 58:
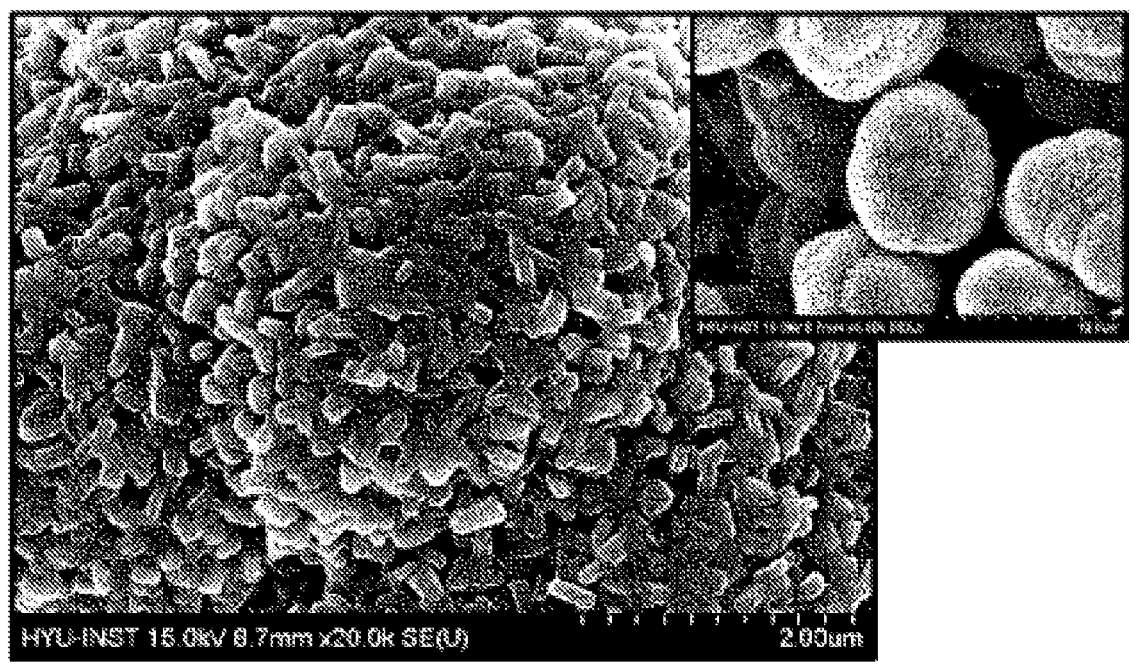

Surface images of the precursors and the final active materials prepared in Example 3-1 and Comparative Example 3-1 were taken by using a scanning electron microscope, and the results are shown in FIGS. 57 to 58.

Each of the pictures is a surface image with different magnification, and it could be confirmed that each particle was homogeneously formed.

Test Example 3-4

Measuring Charging/Discharging Capacity and Cycle Characteristics

Cathodes were prepared by using the active material prepared in Example 3-1 and the active material prepared in Comparative Example 3-1, and applied to cylindrical lithium secondary batteries, respectively.

Figure 59:
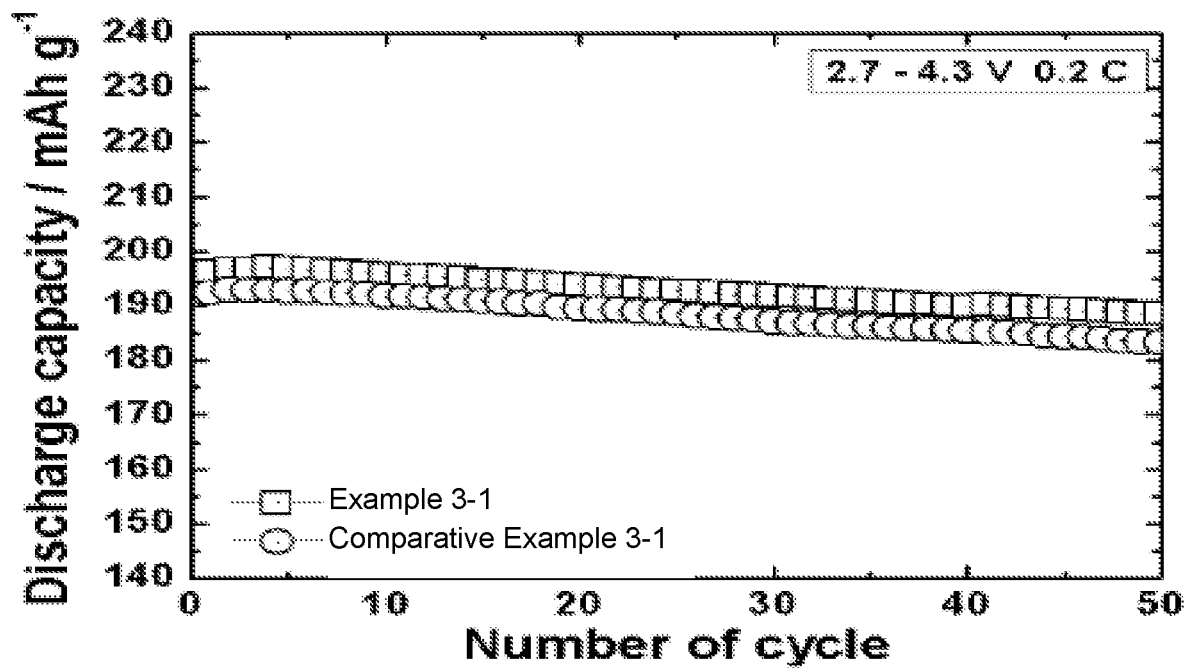
FIG. 59: the results of charging/discharging test and the results measuring cycle characteristics of the battery prepared by using the active material prepared in Example 3-1 of the present invention.

For the batteries prepared by using the active material prepared in Example 3-1 and the active material prepared in Comparative Example 3-1, charging/discharging test and cycle characteristics were measured, and the results are shown in FIG. 59. The charging/discharging was conducted 10 times per each sample at the condition of 2.7.about.4.3 V and 0.2 C, and the average value was taken.

In FIG. 59, Example 3-1 and Comparative Example 3-1 have the same molar ratio of the nickel contained in the whole particle, respectively, thereby showing similar initial charging/discharging capacity and cycle characteristics.

However, Example 3-1 showing concentration gradient showed better performance than Comparative Example 3-1.

Test Example 3-5

Evaluation of Thermostability by DSC Measurement

The cathodes containing the active materials prepared in Example 3-1 and Comparative Example 3-1 were charged at 4.3 V, respectively, and thermostability was measured by using a differential scanning calorimeter (DSC) and heating at a rate of 10° C./min. The results are shown in FIG. 60.

Figure 60:
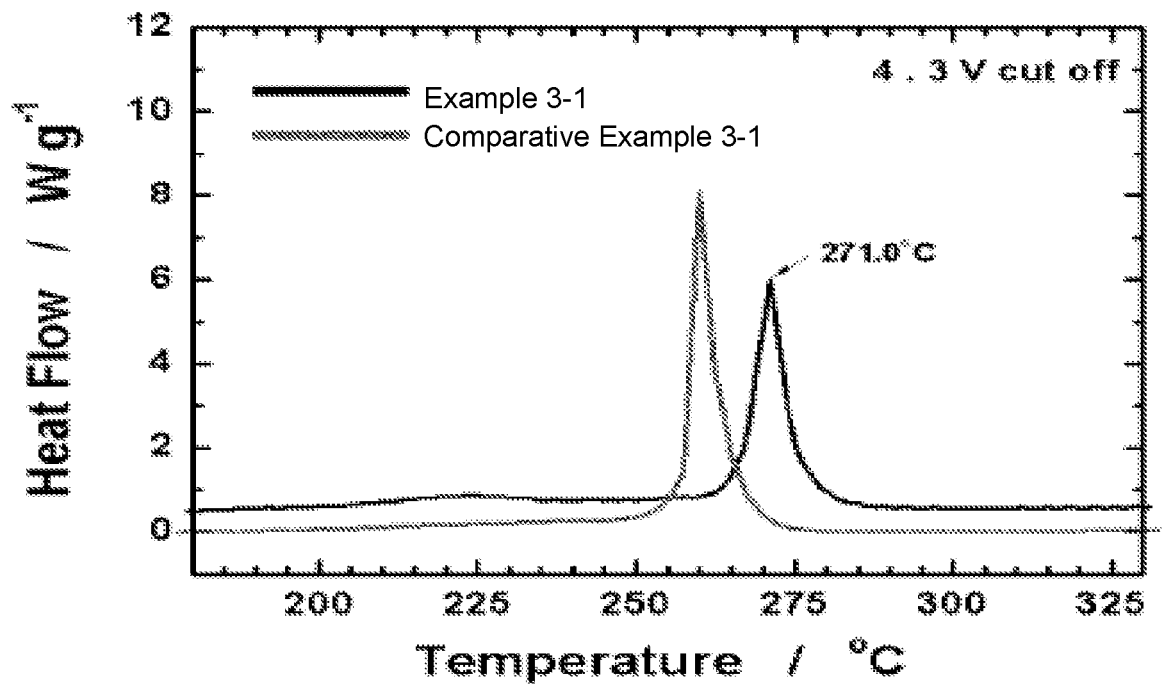
FIG. 60: the results measuring heat flow of each cathode including active materials prepared in Example 2-1 of the present invention and active materials prepared in Comparative example 2-1, by charging at 4.3 V and then heating at the speed of 10° C./min by using a differential scanning calorimeter (DSC).

As shown in FIG. 60, the cathode containing the active material prepared in Example 3-1 according to the present invention showed an exothermic peak at the higher temperature in the differential scanning calorimeter (DSC) than the cathode containing the active material prepared in Comparative Example 3-1. Thus, in the cathode containing the active material prepared in Example 3-1 according to the present invention, wherein the Co was contained constantly, the Ni was decreased with continuous concentration gradient, and the Mn was increased with continuous concentration gradient, and the cathode containing the active material prepared in Comparative Example 3-1 were the same in the composition. But, the active material prepared in Example 3-1, wherein the metal concentration showed concentration gradient in the whole particle, showed much improved thermostability than the active material prepared in Comparative Example 3-1, wherein the metal concentration was constant in the whole particle.

Namely, in the present invention, the concentration of one metal is constant, and the concentrations of the other two metals are increased or decreased with continuous concentration gradient from the core to the surface part. Accordingly, because the concentrations of the metals inside of the particle are not rapidly changed and show table structure, it could be confirmed that the thermostability is largely increased.

The third embodiment of the inventive concept will be described with FIGS. 61A to 114.

Figure 61A:
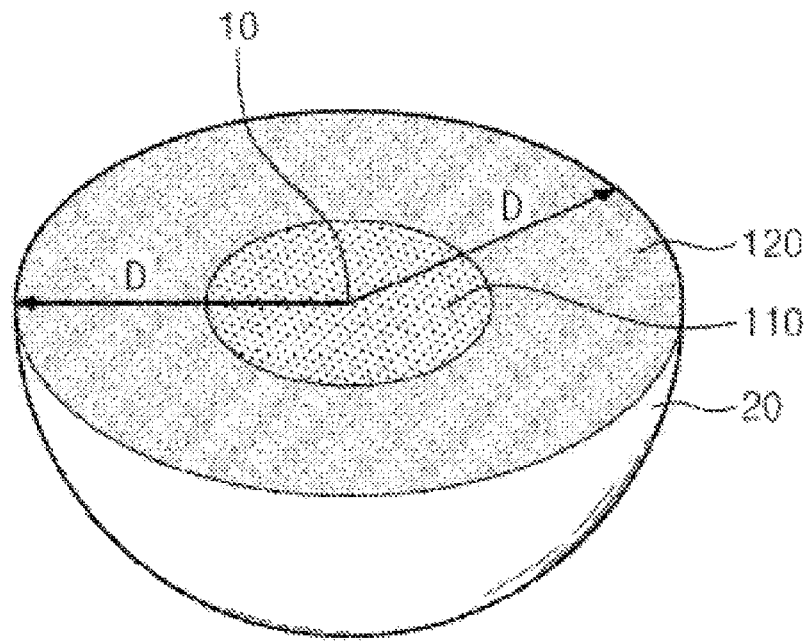
FIG. 61A illustrates the cross section of the second element for explaining the second element of the positive electrode active material according to a first embodiment of the inventive concept.
Figure 61B:
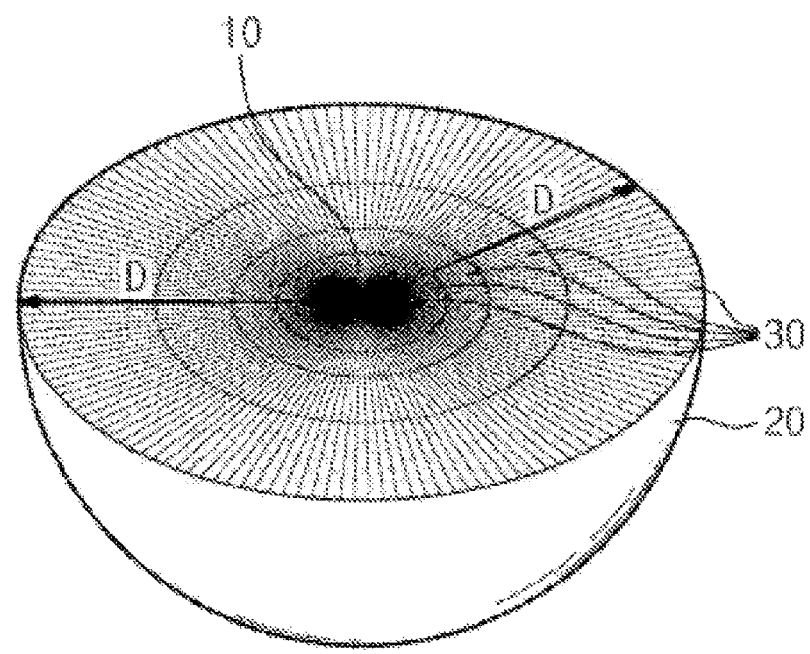
FIG. 61B illustrates the positive electrode active material containing the second element composed of the first element having a rod shape according to a first embodiment of the inventive concept.
Figure 62:
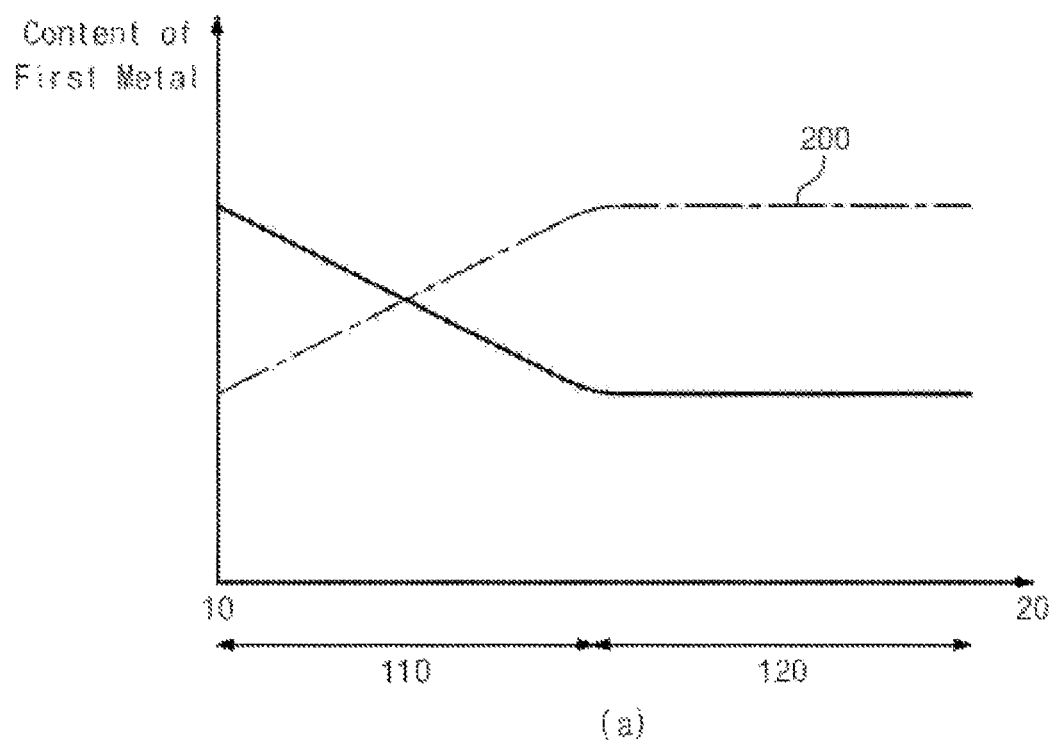
FIGS. 62A and 62B are graphs is a graph illustrating the change in content of the first metal in the second element of the positive electrode active material according to a first embodiment of the inventive concept.
Figure 62:
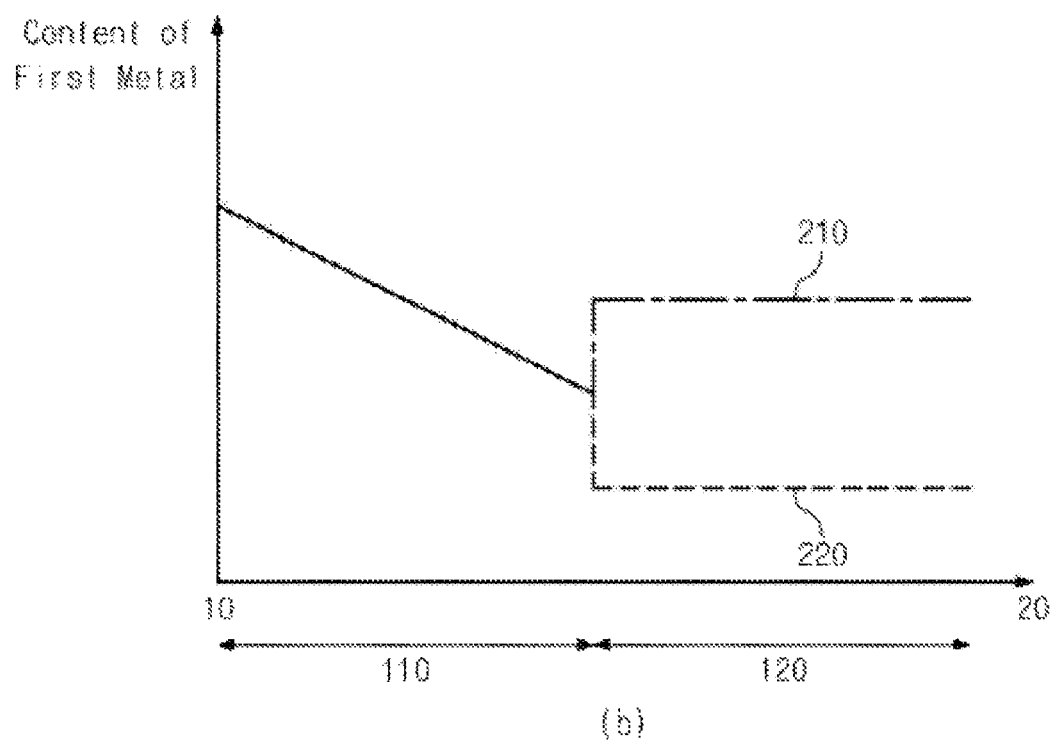

FIG. 61A illustrates the cross section of the second element for explaining the second element of the positive electrode active material according to a first embodiment of the inventive concept. FIG. 61B illustrates the positive electrode active material containing the second element composed of the first element having a rod shape according to a first embodiment of the inventive concept. FIG. 62 is a graph illustrating the change in content of the first metal in the second element of the positive electrode active material according to a first embodiment of the inventive concept.

Referring to FIG. 61A, FIG. 61B, and FIG. 62, the second element of the positive electrode active material according to the first embodiment of the inventive concept may include a center part 10 and a surface part 20. The center part 10 may include a region of the intermediate position, the central position, and/or the inside of the second element, as described in the boilerplate of the description. The surface part 20 may be the exterior surface of the second element.

The second element is illustrated as a sphere in FIG. 61A and FIG. 61B. However, embodiments of the inventive concepts are not limited thereto. In another embodiment, the second element may have a shape with an oval cross section.

The second element may be composed of one or more first elements 30. In other words, the second element may be formed by aggregation of the first elements 30. The first element 30 may extend from the center part 10 toward the surface part 20. In other words, the first element 30 may have a rod shape radiated from the center part 10 toward the surface part 20.

The pathway for a metal ion (e.g., lithium ion) and an electrolyte may be provided between the first elements 30 having the rod shape, namely, between the first elements 30 extending in a direction D from the center part 10 to the surface part 20 of the second element. This enables the positive electrode active material according to an embodiment of the inventive concept to improve the charge and discharge efficiency of a secondary battery.

The first element 30 may be formed of a plurality of metals including a first metal, a second metal, and a third metal. Hence, the second element containing the first element 30 may include the plurality of metals including the first to third metals. For example, the first metal may be nickel (Ni), the second metal may be manganese (Mn), and the third metal may be cobalt (Co). In this case, the second element may be formed of a compound of lithium, nickel, manganese, and cobalt.

The second element may include a concentration gradient portion 110 in which the content of the first metal changes, and a concentration maintained portion 120 in which the content of the first metal is constant. The concentration maintained portion 120 may surround the concentration gradient portion 110. In other words, the concentration gradient portion 110 may correspond to the core of the second element and the concentration maintained portion 120 may correspond to the shell of the second element.

The second element including the concentration gradient portion 110 and the concentration maintained portion 120 may be prepared by controlling the contents of an aqueous solution containing the first metal, an aqueous solution containing the second metal, and an aqueous solution containing the third metal. For example, in a case in which the aqueous solution containing the first metal includes nickel sulfate, the aqueous solution containing the second metal includes manganese sulfate, and the aqueous solution containing the third metal includes cobalt sulfate, nickel-manganese-cobalt hydroxide is prepared using nickel sulfate, manganese sulfate, cobalt sulfate, and a coprecipitation reactor. The second element containing lithium, nickel, manganese, and cobalt may be prepared by mixing the nickel, manganese, cobalt hydroxide with lithium hydroxide and heating and sintering the mixture.

The content of the first metal in the concentration gradient portion 110 may gradually decrease in the direction D from the center part 10 to the surface part 20. The content of at least one of the second metal or the third metal in the concentration gradient portion 110 may gradually increase in a case in which the content of the first metal in the concentration gradient portion 110 gradually decreases. According to an embodiment of the inventive concept, the content 200 of the second metal may gradually increase in the direction D from the center part 10 to the surface part 20 in a case in which the content of the first metal gradually decreases in the direction D from the center part 10 to the surface part 20, as illustrated in (a) of FIG. 62. In this case, the content of the third metal may increase, be maintained, or decrease.

According to an embodiment of the inventive concept, the content of the first metal may continuously change between the concentration gradient portion 110 and the concentration maintained portion 120 as illustrated in (a) of FIG. 62. In this case, the minimum value of the content of the first metal in the concentration gradient portion 110 may be substantially equal to the average value of the content of the first metal in the concentration maintained portion 120. As described above, the minimum value of the content of the first metal in the concentration gradient portion 110 may be the value of the content of the first metal at a part of the outside of the concentration gradient portion 110 close to the concentration maintained portion 120 in a case in which the content of the first metal in the concentration gradient portion 110 gradually decreases in the direction D from the center part 10 to the surface part 20.

Alternatively, according to another embodiment of the inventive concept, the content of the first metal may discontinuously change between the concentration gradient portion 110 and the concentration maintained portion 120, as illustrated in (b) of FIG. 62. In this case, the minimum value of the content of the first metal in the concentration gradient portion 110 may be different from the average value of the content of the first metal in the concentration maintained portion 120. The content 210 or 220 of the first metal in the concentration maintained portion 120 may be higher or lower than the minimum value of the content of the first metal in the concentration gradient portion 110, namely, the value of the content of the first metal at a part of the outside of the concentration gradient portion 110 close to the concentration maintained portion 120.

According to an embodiment of the inventive concept, the contents of the second metal and the third metal in the concentration maintained portion 120 may be constant. Alternatively, according to another embodiment of the inventive concept, the content of at least one of the second metal or the third metal may change in the concentration maintained portion 120.

Unlike the first embodiment of the inventive concept described above, a rate of change in content of the first metal may change in the concentration gradient portion in a second embodiment of the inventive concept. Hereinafter, this will be described with reference to FIGS. 63 to 65.

Figure 5:
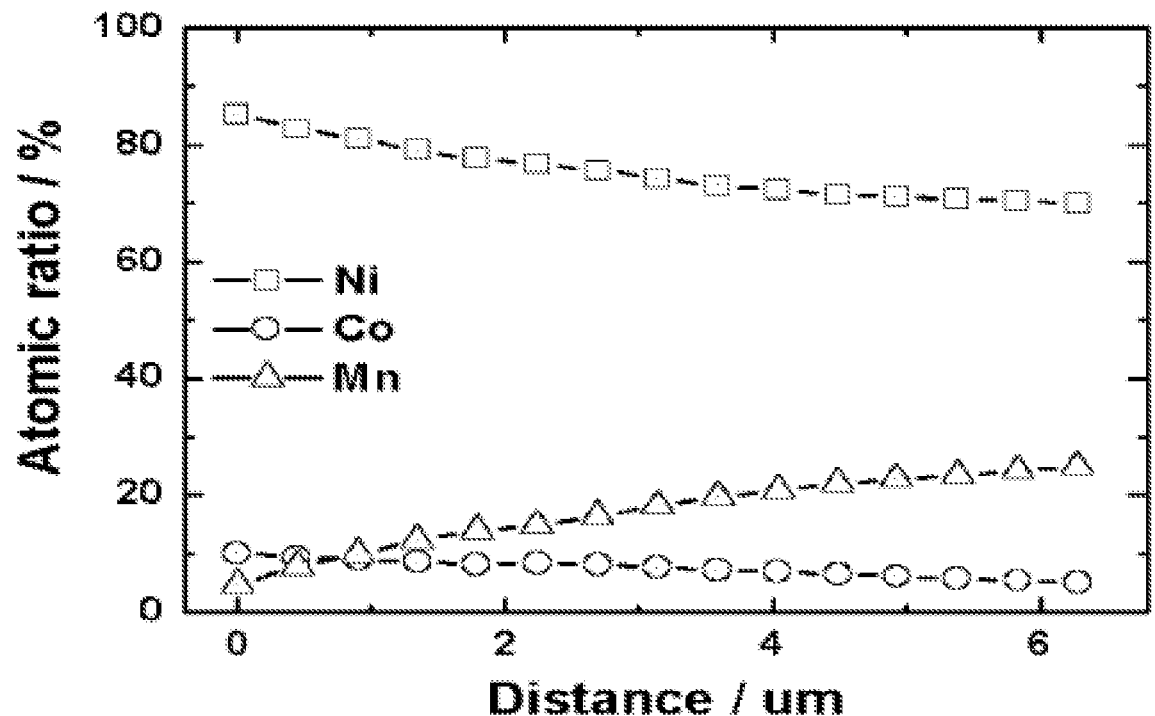
Figure 6:
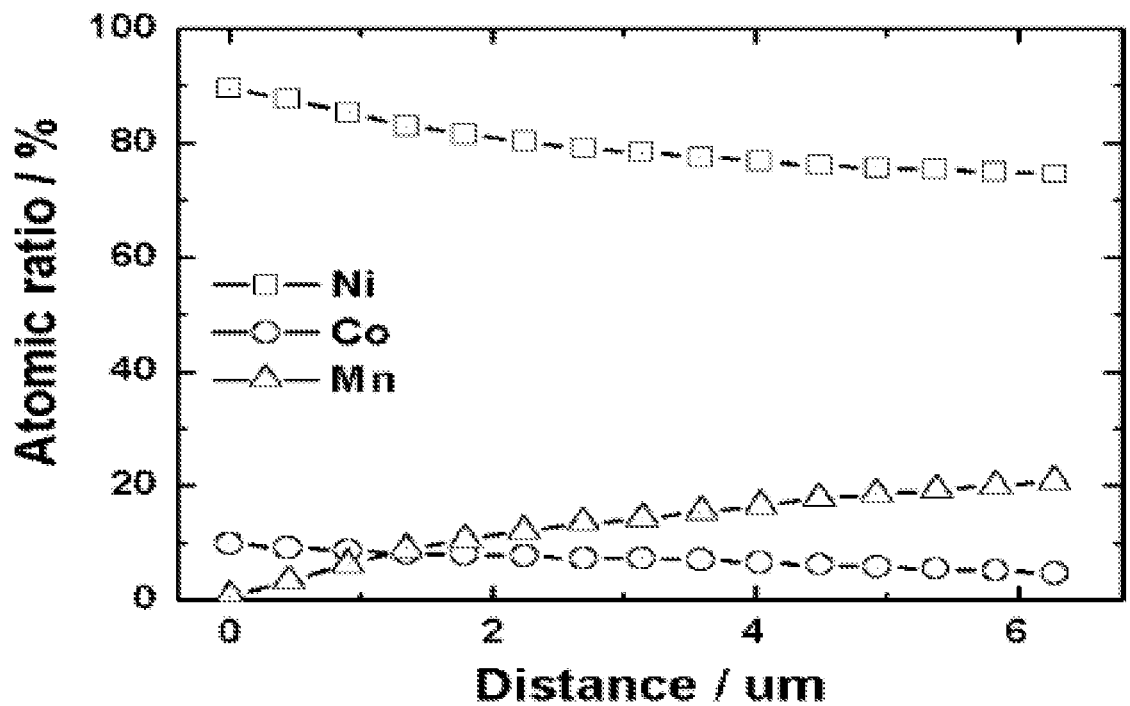
Figure 7:
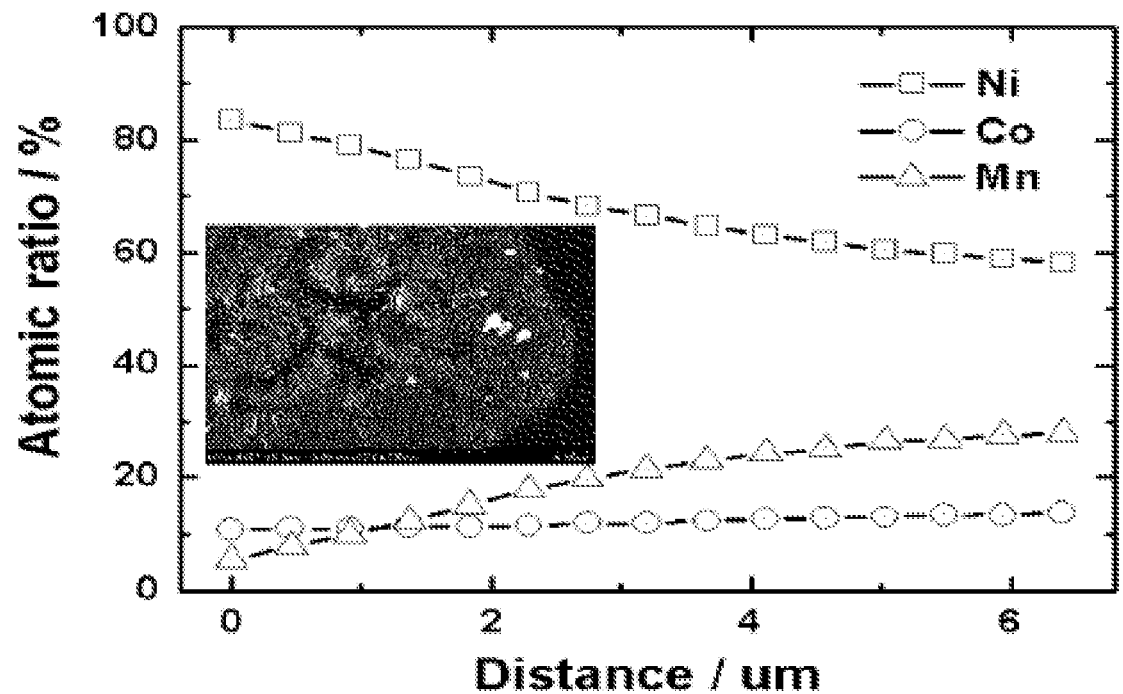
FIGS. 7 to 12: the results measuring the atomic ratio in each precursor particle prepared in Examples 1-1 to 1-6 of the present invention after heat-treating, respectively.
Figure 8:
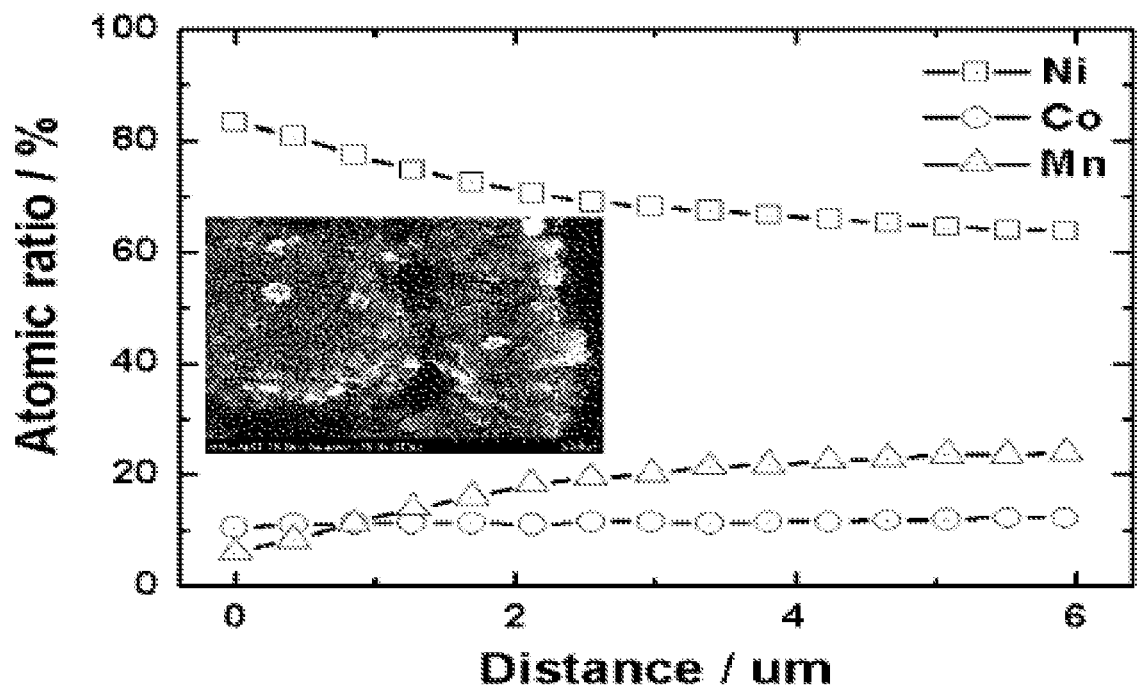
Figure 9:
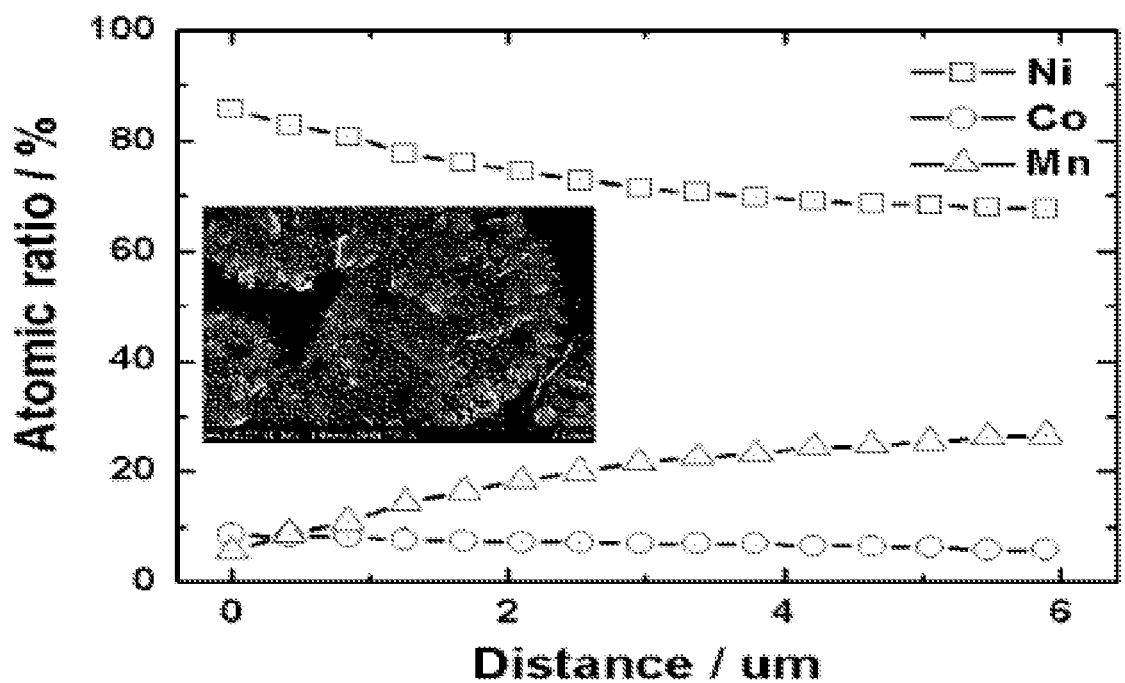
Figure 63:
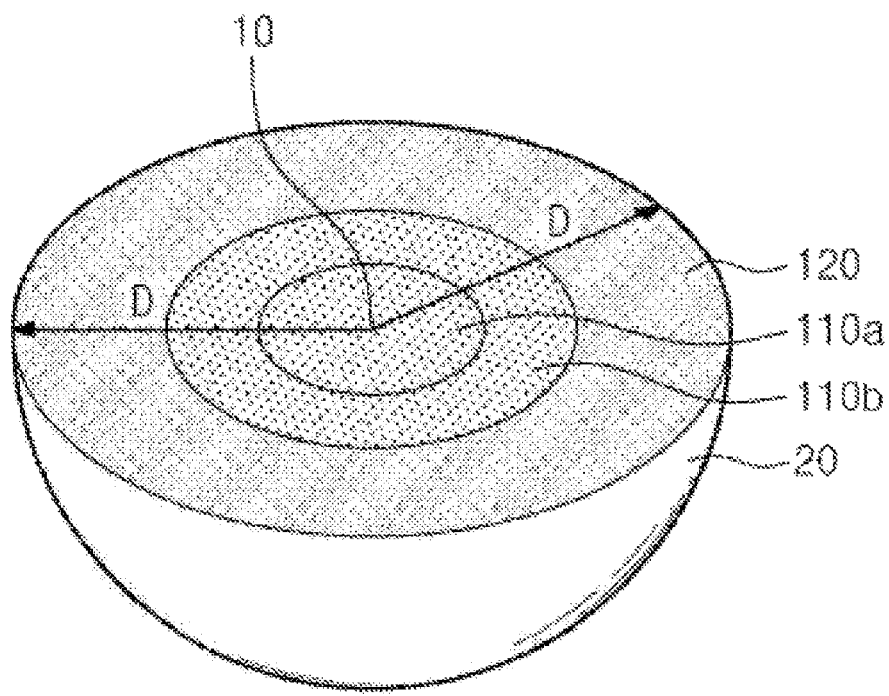
FIG. 63 illustrates the cross section of the second element for explaining the second element of the positive electrode active material according to a second embodiment of the inventive concept.
Figure 64:
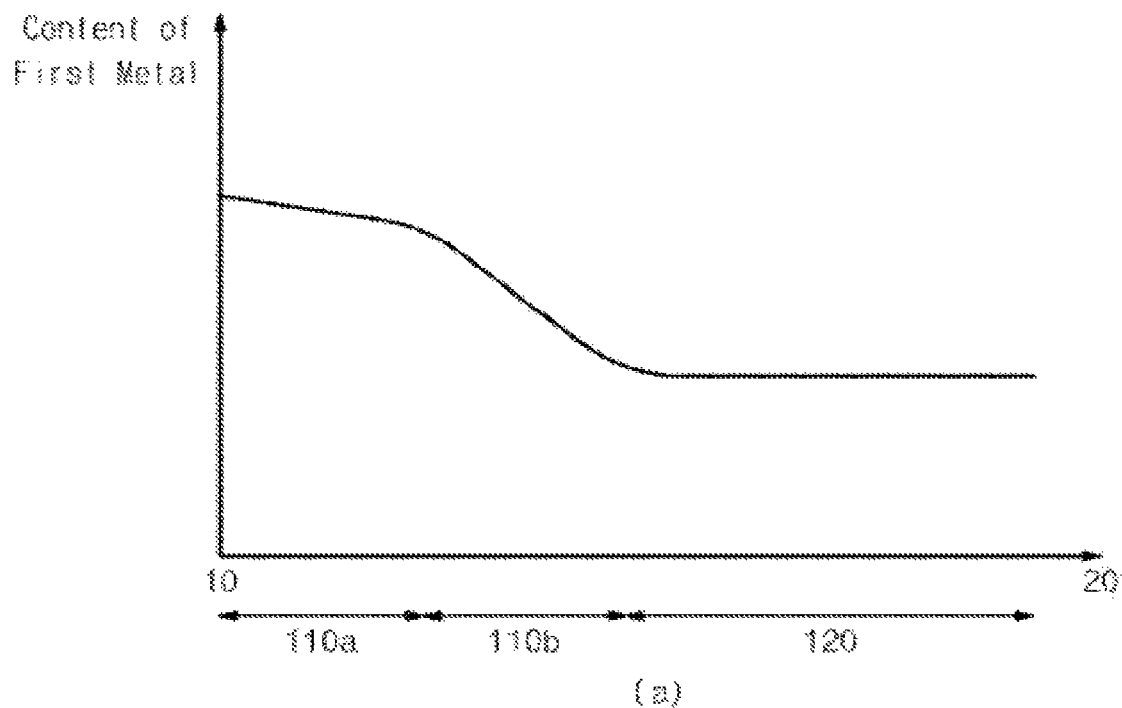
FIGS. 64A, 64B, 65A and 65B are graphs illustrating the change in content of the first metal in the second element of the positive electrode active material according to a second embodiment of the inventive concept.
Figure 64:
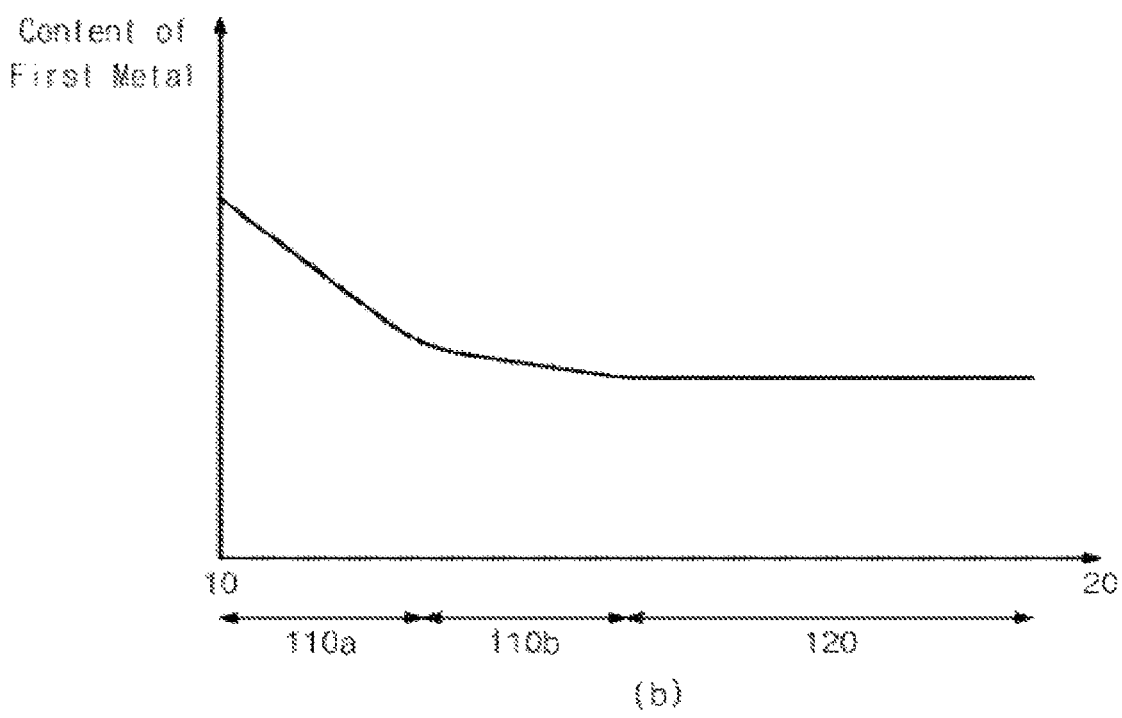

FIG. 63 illustrates the cross section of the second element for explaining the second element of the positive electrode active material according to a second embodiment of the inventive concept, and FIGS. 64 and 5 are graphs illustrating the change in content of the first metal in the second element of the positive electrode active material according to a second embodiment of the inventive concept.

Figure 65:
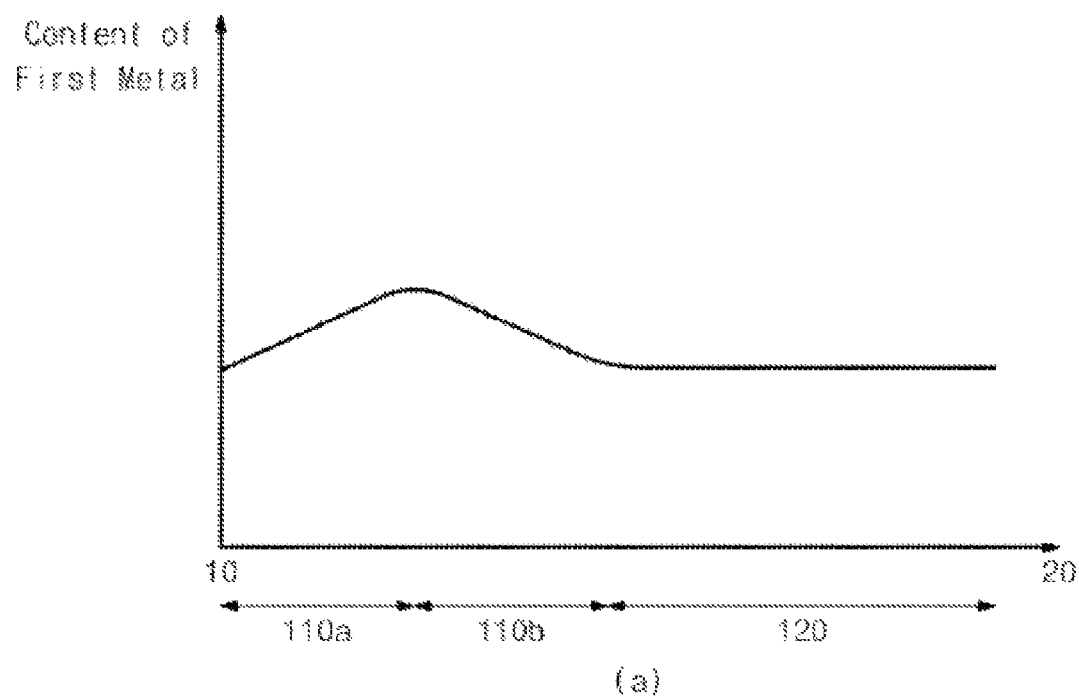
Figure 65:
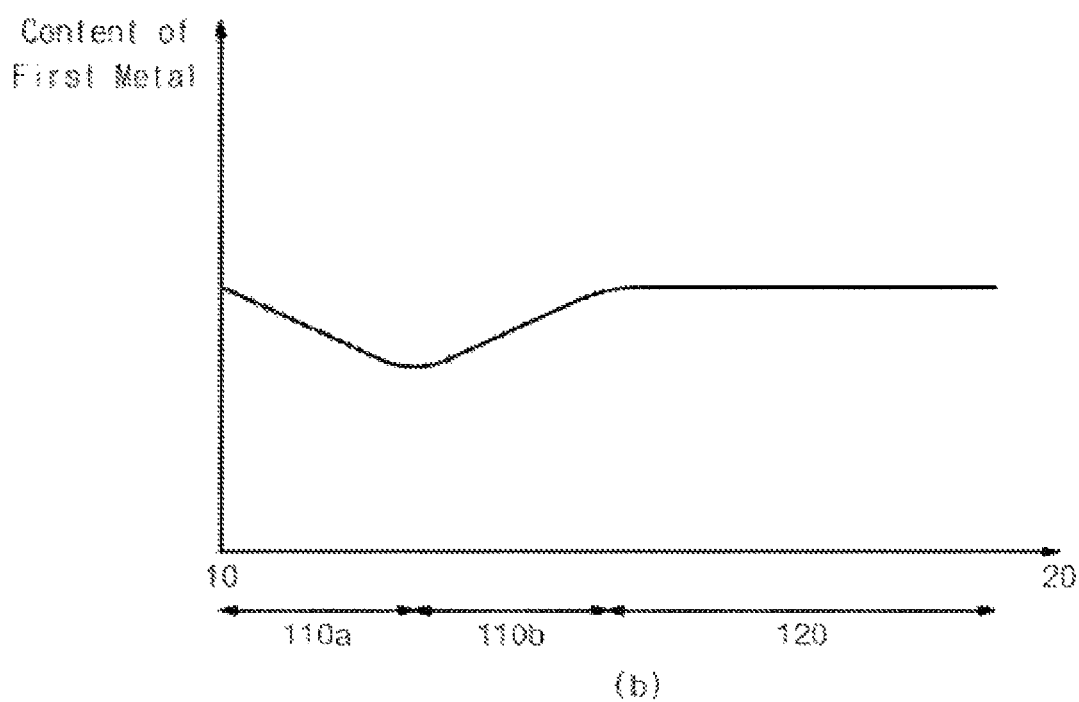

Referring to FIGS. 63 to 65, a second element of a positive electrode active material according to the second embodiment of the inventive concept may be composed of one or more first elements 30 extending from the center part 10 toward the surface part 20 as described with reference to FIG. 61B. The first element 30 may be formed of a plurality of metals including the first metal to the third metal as described with reference to FIG. 61A, FIG. 61B, and FIG. 62.

The second element may include a first concentration gradient portion 110a in which the content of the first metal changes, a second concentration gradient portion 110b which has a rate of change in content of the first metal different from the rate of change in content of the first metal in the first concentration gradient portion 110a, and a concentration maintained portion 120 in which the content of the first metal is constant. The second concentration gradient portion 110b may surround the first concentration gradient portion 110a, and the concentration maintained portion 120 may surround the second concentration gradient portion 110b.

According to an embodiments of the inventive concept, as illustrated in (a) and (b) of FIG. 64, the content of the first metal in the first concentration gradient portion 110a and the content of the first metal in the second concentration gradient portion 110b may gradually decrease in the direction D from the center part 10 to the surface part 20. For example, in the direction D from the center part 10 to the surface part 20, the rate of decrease in content of the first metal in the first concentration gradient portion 110a may be smaller than the rate of decrease in content of the first metal in the second concentration gradient portion 110b, as illustrated in (a) of FIG. 64. Alternatively, for another example, in the direction D from the center part 10 to the surface part 20, the rate of decrease in content of the first metal in the first concentration gradient portion 110a may be greater than the rate of decrease in content of the first metal in the second concentration gradient portion 110b, as illustrated in (b) of FIG. 64.

According to another embodiment of the inventive concept, as illustrated in (a) and (b) of FIG. 65, one of the content of the first metal in the first concentration gradient portion 110a and the content of the first metal in the second concentration gradient portion 110b may increase and the other thereof may decrease in the direction D from the center part 10 to the surface part 20. For example, in the direction D from the center part 10 to the surface part 20, the content of the first metal in the first concentration gradient portion 110a may increase and the content of the first metal in the second concentration gradient portion 110b may decrease, as illustrated in (a) of FIG. 65. Alternatively, for another example, in the direction D from the center part 10 to the surface part 20, the content of the first metal in the first concentration gradient portion 110a may decrease and the content of the first metal in the second concentration gradient portion 110b may increase, as illustrated in (b) of FIG. 65.

In a case in which the contents of the first metal in the first and second concentration gradient portions 110a and 110b gradually decrease or increase in the direction D from the center part 10 to the surface part 20, the contents of the second metal in the first and second concentration gradient portions (110a and 110b) may gradually increase or decrease in the direction D from the center part 10 to the surface part 20, as described with reference to FIG. 62.

According to an embodiment of the inventive concept, as illustrated in FIGS. 64 and 65, the content of the first metal may continuously change between the second concentration gradient portion 110b and the concentration maintained portion 120. In this case, the minimum value or the maximum value of the content of the first metal in the second concentration gradient portion 110b may be equal to the average value of the content of the first metal in the concentration maintained portion 120. Alternatively, according to another embodiment of the inventive concept, as described with reference to (b) of FIG. 62, the content of the first metal may discontinuously change between the second concentration gradient portion 110b and the concentration maintained portion 120. In this case, the minimum value or the maximum value of the content of the first metal in the second concentration gradient portion 110b may be different from the average value of the content of the first metal in the concentration maintained portion 120.

Unlike the embodiments of the inventive concept described above, the concentration maintained portion may include a first concentration maintained portion and a second concentration maintained portion which have different contents of the first metal from each other in according to a third embodiment of the inventive concept. Hereinafter, this will be described with reference to FIGS. 66 and 67.

Figure 66:
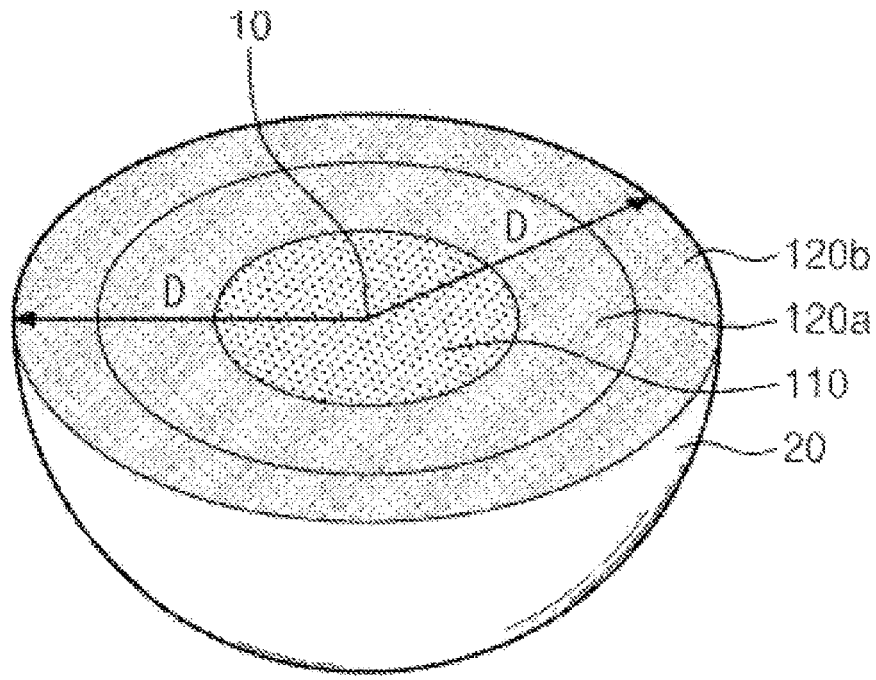
FIG. 66 illustrates the cross section of the second element for explaining the second element of the positive electrode active material according to a third embodiment of the inventive concept.
Figure 67:
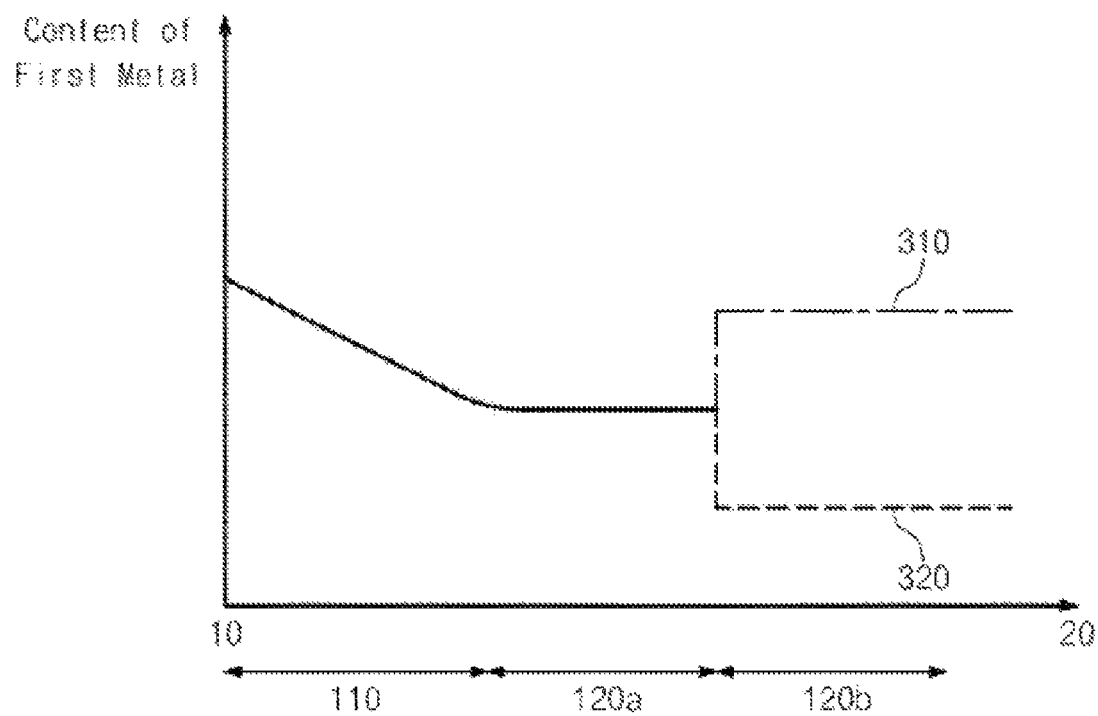
FIG. 67 is a graph illustrating the change in content of the first metal in the second element of the positive electrode active material according to a third embodiment of the inventive concept.

FIG. 66 illustrates the cross section of the second element for explaining the second element of the positive electrode active material according to a third embodiment of the inventive concept, and FIG. 67 is a graph illustrating the change in content of the first metal in the second element of the positive electrode active material according to a third embodiment of the inventive concept.

Referring to FIGS. 66 and 67, a second element of a positive electrode active material according to a third embodiment of the inventive concept may be composed of one or more first elements 30 extending from the center part 10 toward the surface part 20, as described with reference to FIG. 61B. The first element 30 may be formed of a plurality of metals including the first metal to the third metal as described with reference to FIG. 61A, FIG. 61B, and FIG. 62.

The second element may include the concentration gradient portion 110 in which the content of the first metal changes, a first concentration maintained portion 120a in which the content of the first metal is constant, and a second concentration maintained portion 120b in which the content of the first metal is constant but different from the content of the first metal in first concentration maintained portion 120a. The first concentration maintained portion 120a may surround the concentration gradient portion 110. The second concentration maintained portion 120b may surround the first concentration maintained portion 120a.

According to an embodiment of the inventive concept, the content of the first metal in the concentration gradient portion 110 may gradually decrease in the direction D from the center part 10 to the surface part 20. In this case, the content of the second metal in the concentration gradient portion 110 may gradually increase as described with reference to FIG. 62.

The content of the first metal may discontinuous change between the first concentration maintained portion 120a and the second concentration maintained portion 120b. According to an embodiment of the inventive concept, the content of the first metal in the first concentration maintained portion 120a may be lower than a content 310 of the first metal in the second concentration maintained portion 120b. Alternatively, unlike this, according to another embodiment of the inventive concept, the content of the first metal in the first concentration maintained portion 120a may be higher than a content 320 of the first metal in the second concentration maintained portion 120b.

According to an embodiment of the inventive concept, the content of the first metal may continuous change between the concentration gradient portion 110 and the first concentration maintained portion 120a, as illustrated in FIG. 67. In this case, the minimum value of the content of the first metal in the concentration gradient portion 110 may be equal to the average value of the content of the first metal in the first concentration maintained portion 120a. Alternatively, according to another embodiment of the inventive concept, the content of the first metal in the concentration gradient portion 110 may be discontinuous with the average value of the content of the first metal in the first concentration maintained portion 120a, as described with reference to (b) of FIG. 62. In this case, the minimum value of the content of the first metal in the concentration gradient portion 110 may be different from the average value of the content of the first metal in the first concentration maintained portion 120a.

Unlike the embodiments of the inventive concept described above, according to a fourth embodiment of the inventive concept, an outer portion of the second element may correspond to a concentration gradient portion. Hereinafter, this will be described with reference to FIGS. 68 to 70.

Figure 10:
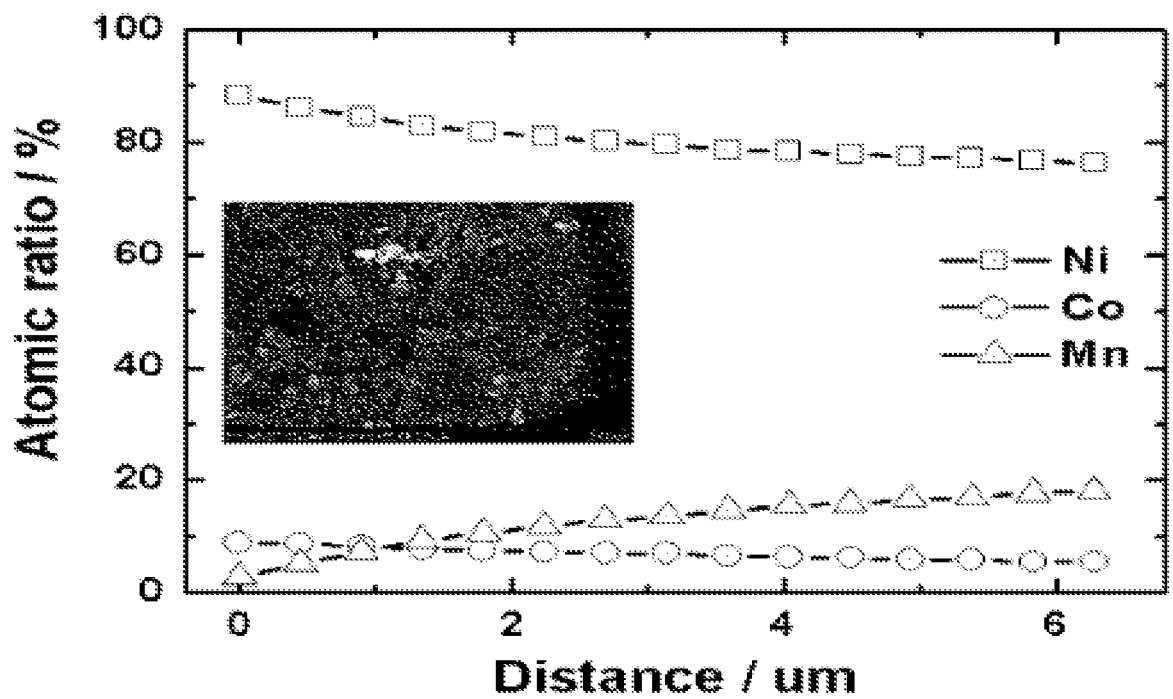
Figure 11:
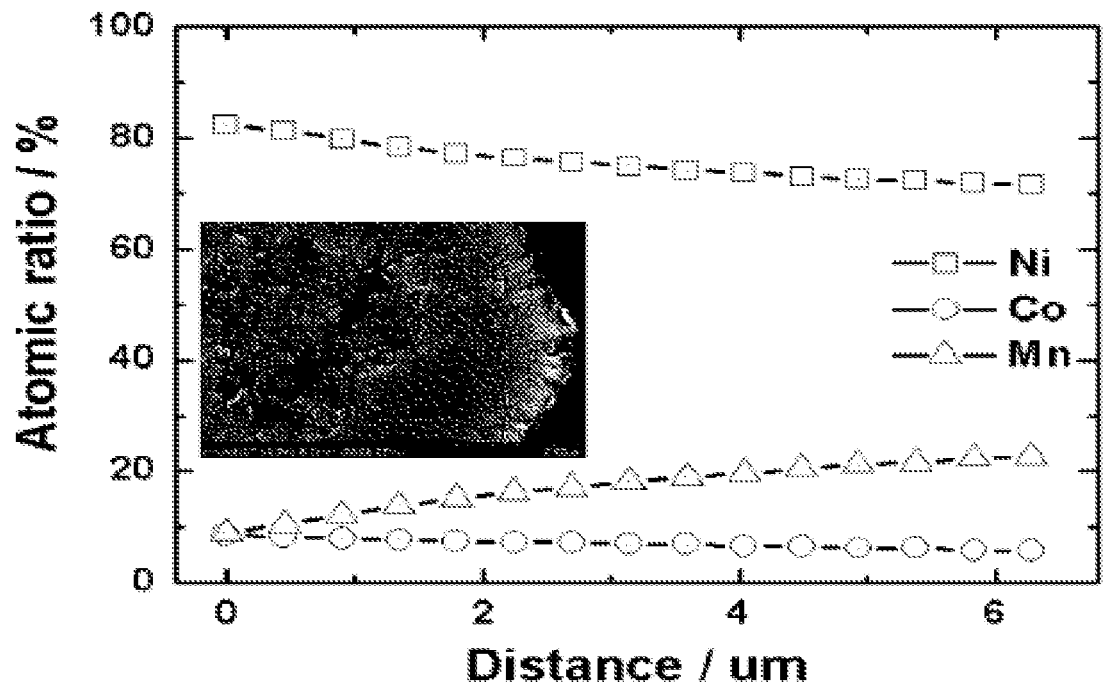
Figure 12:
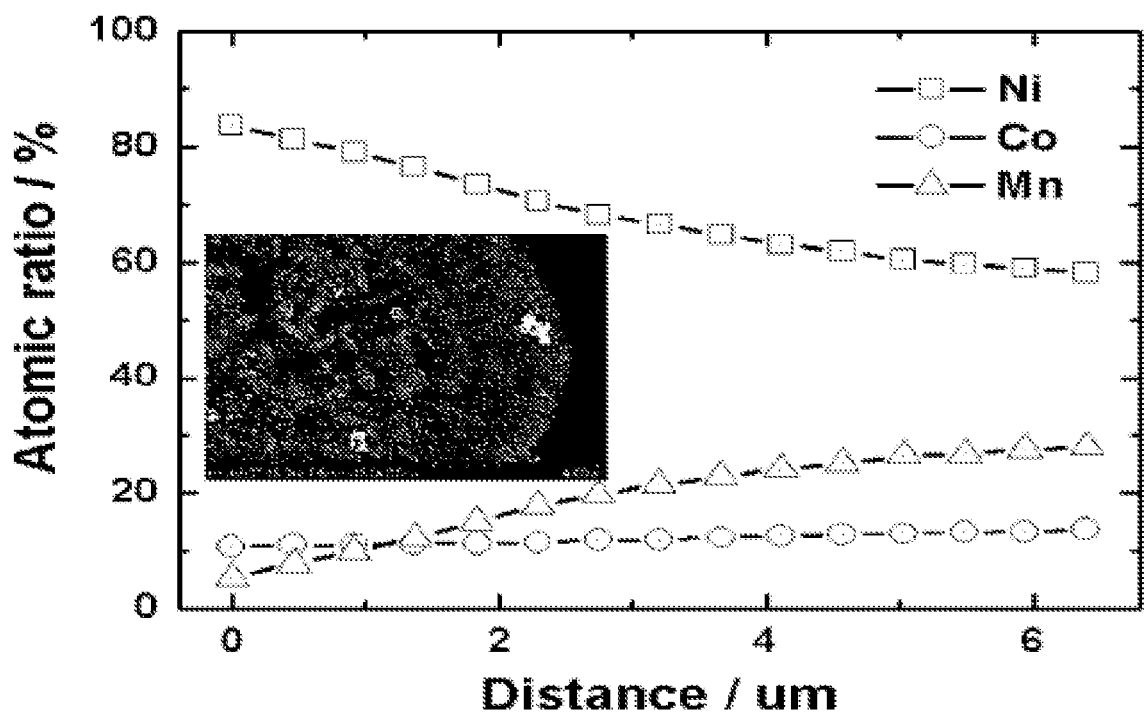
Figure 13:
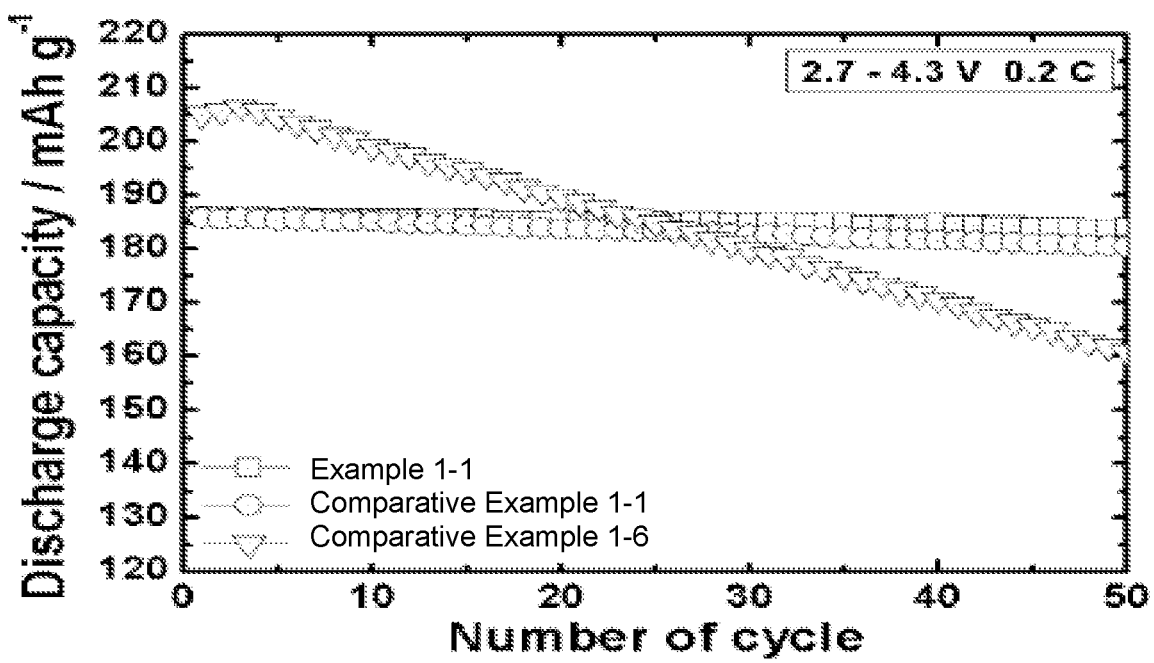
FIGS. 13 to 18: the results of charging/discharging test and the results measuring cycle characteristics of each battery prepared by using the active materials prepared in Examples 1-1 to 1-6 of the present invention and the active materials prepared in Comparative Examples 1-1 to 1-7, respectively.
Figure 14:
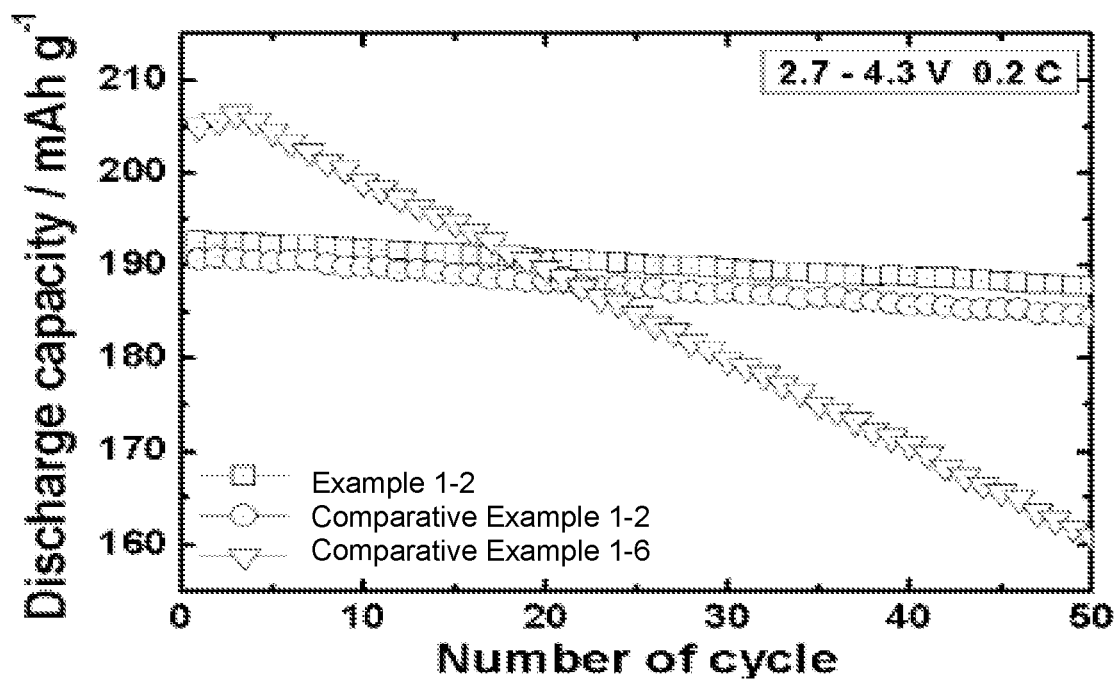
Figure 15:
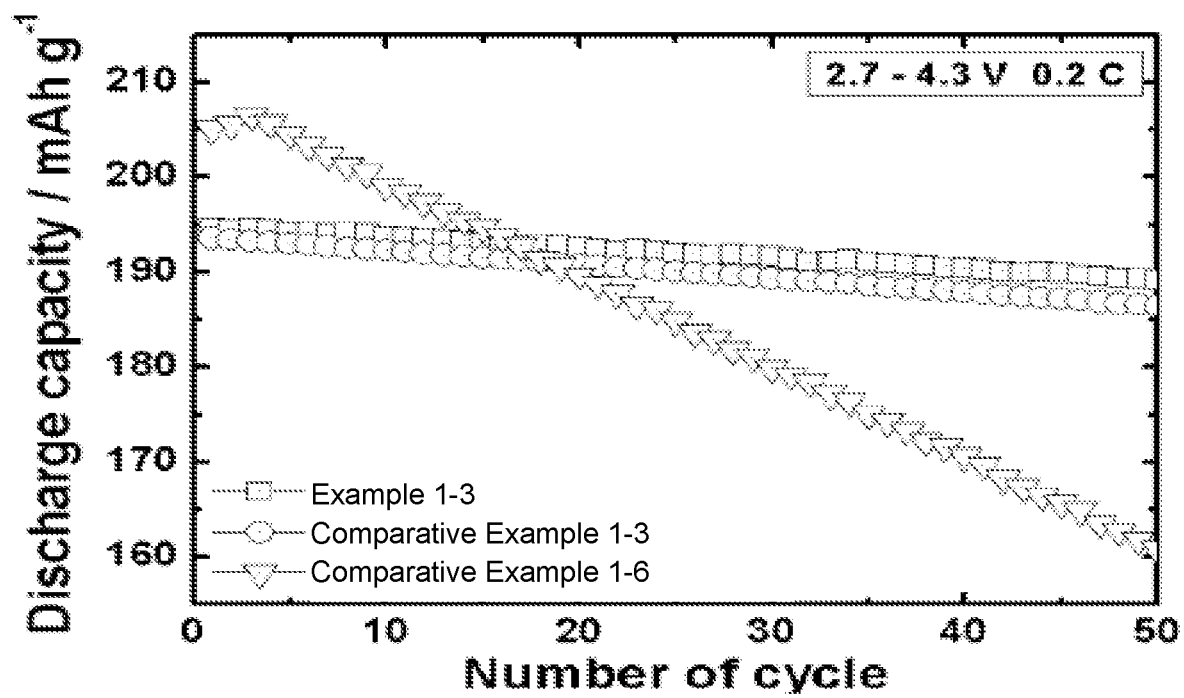
Figure 16:
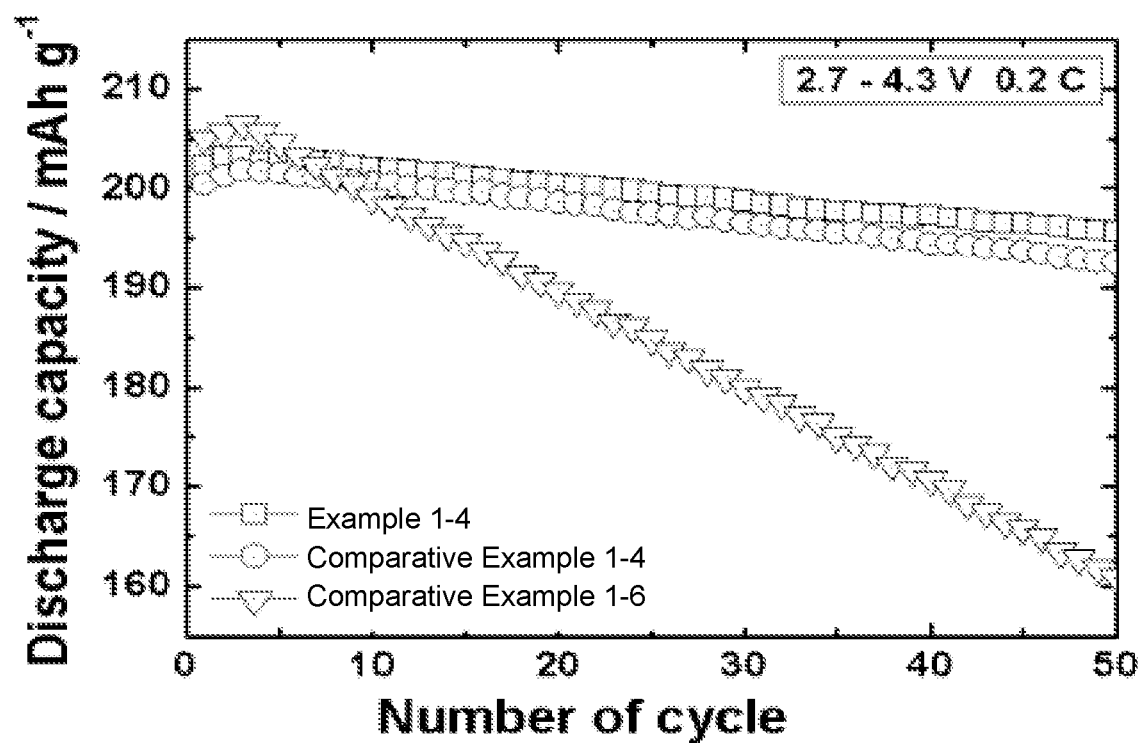
Figure 17:
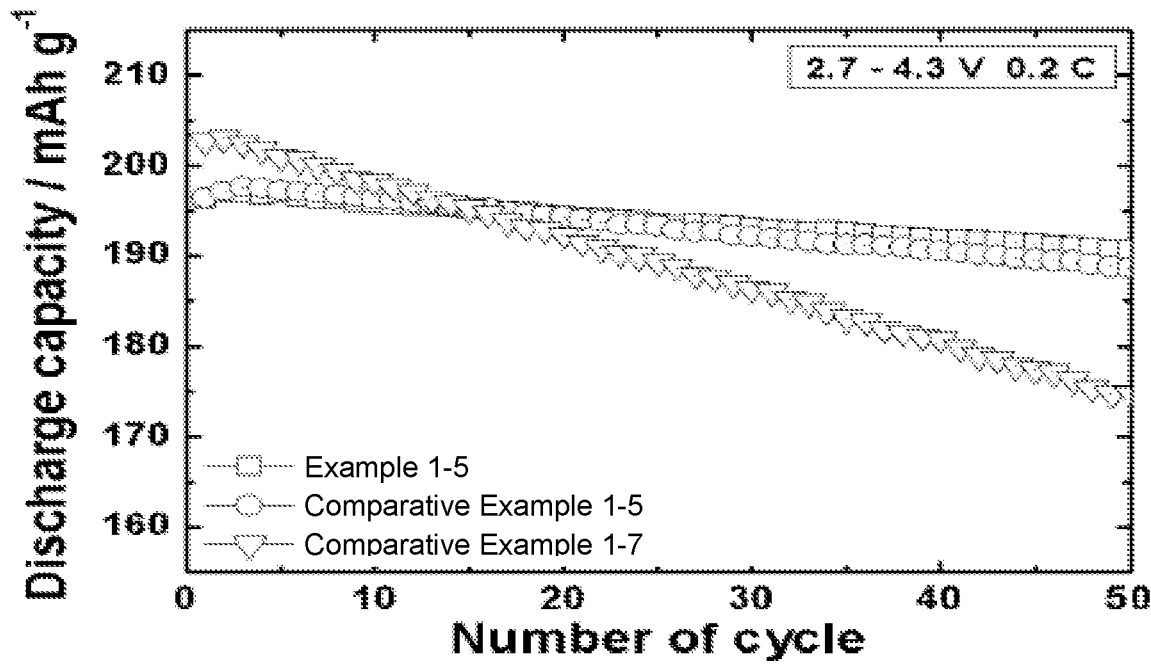
Figure 18:
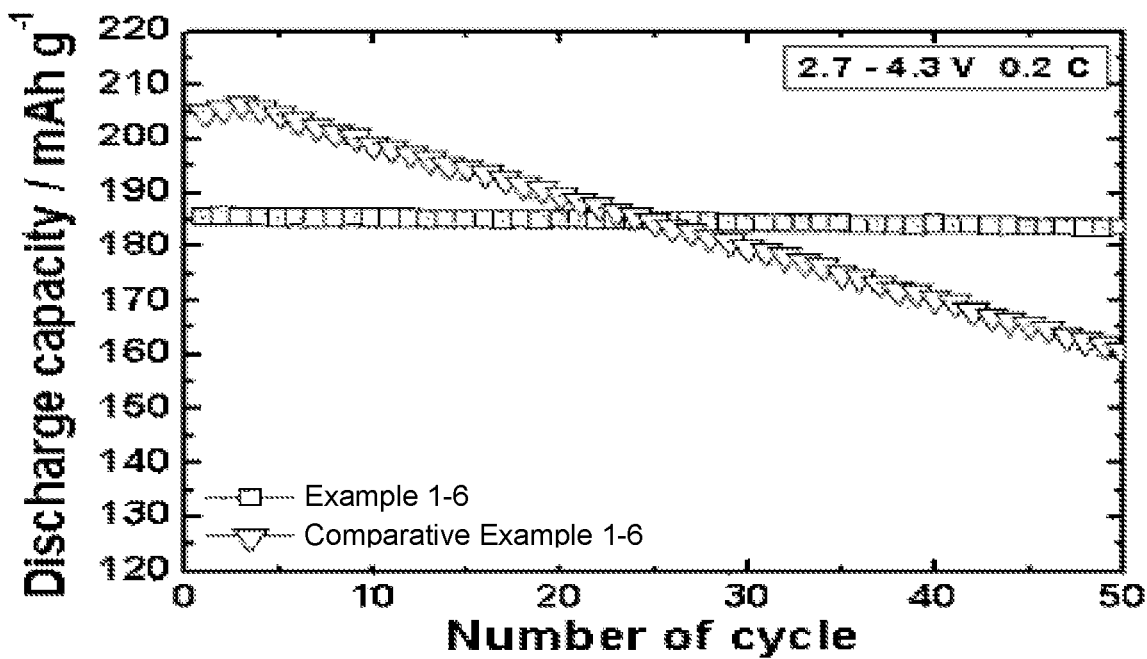
Figure 19:
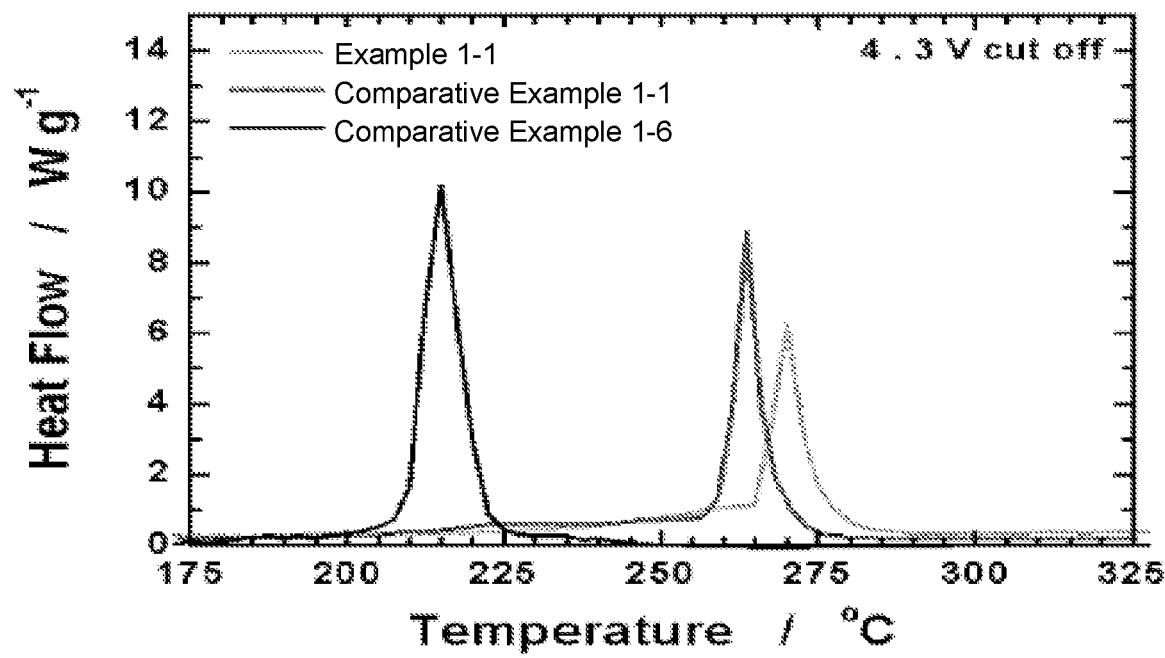
FIGS. 19 to 24: the results measuring heat flow of each cathode including active materials prepared in Examples 1-1 to 1-6 of the present invention and active materials prepared in Comparative examples 1-1 to 1-7, by charging at 4.3 V and then heating at the speed of 10° C./min by using a differential scanning calorimeter (DSC), respectively.
Figure 20:
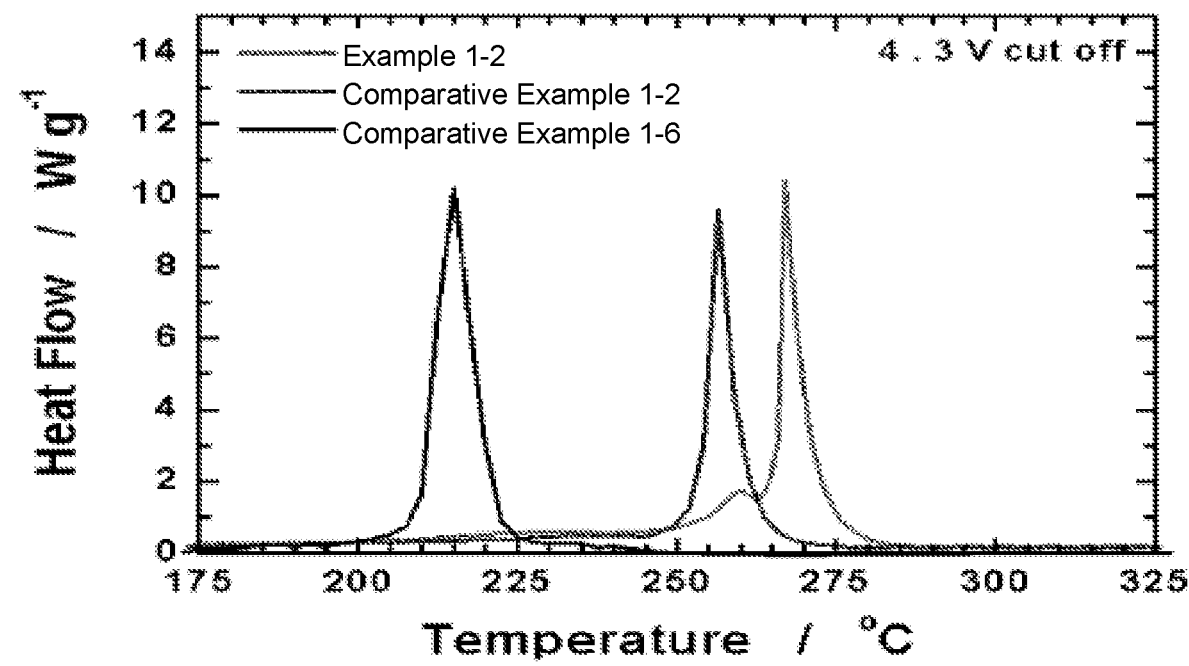
Figure 21:
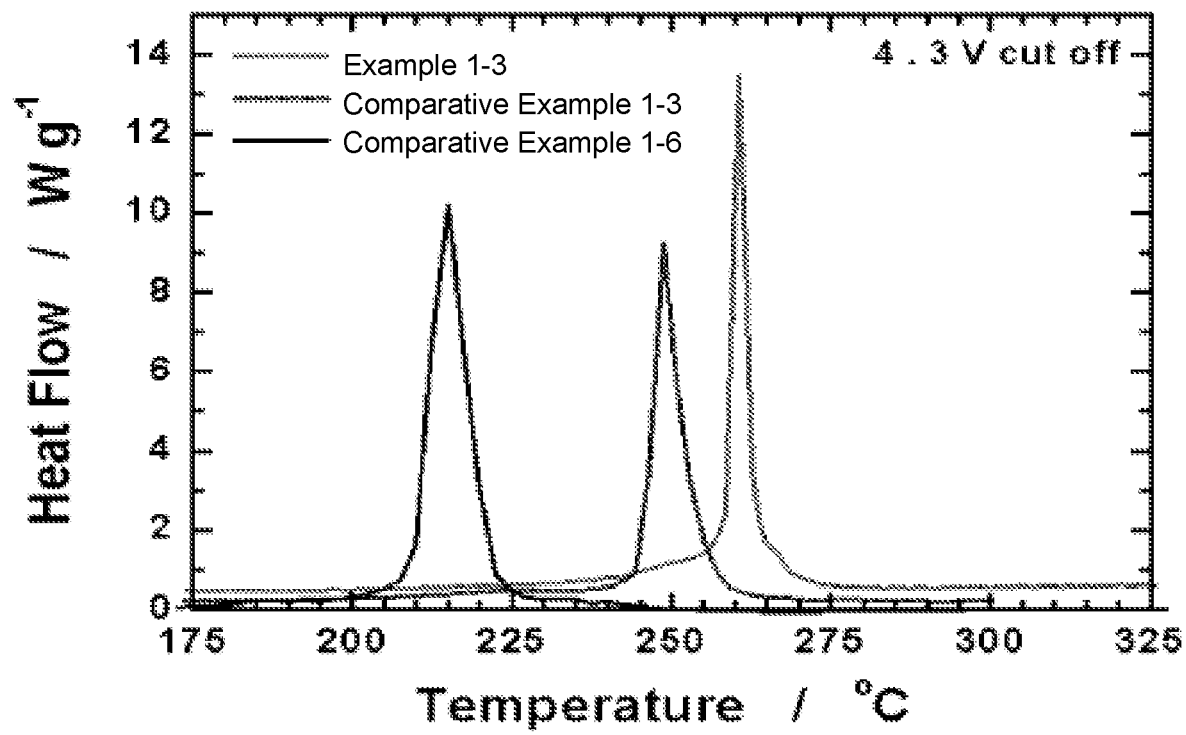
Figure 22:
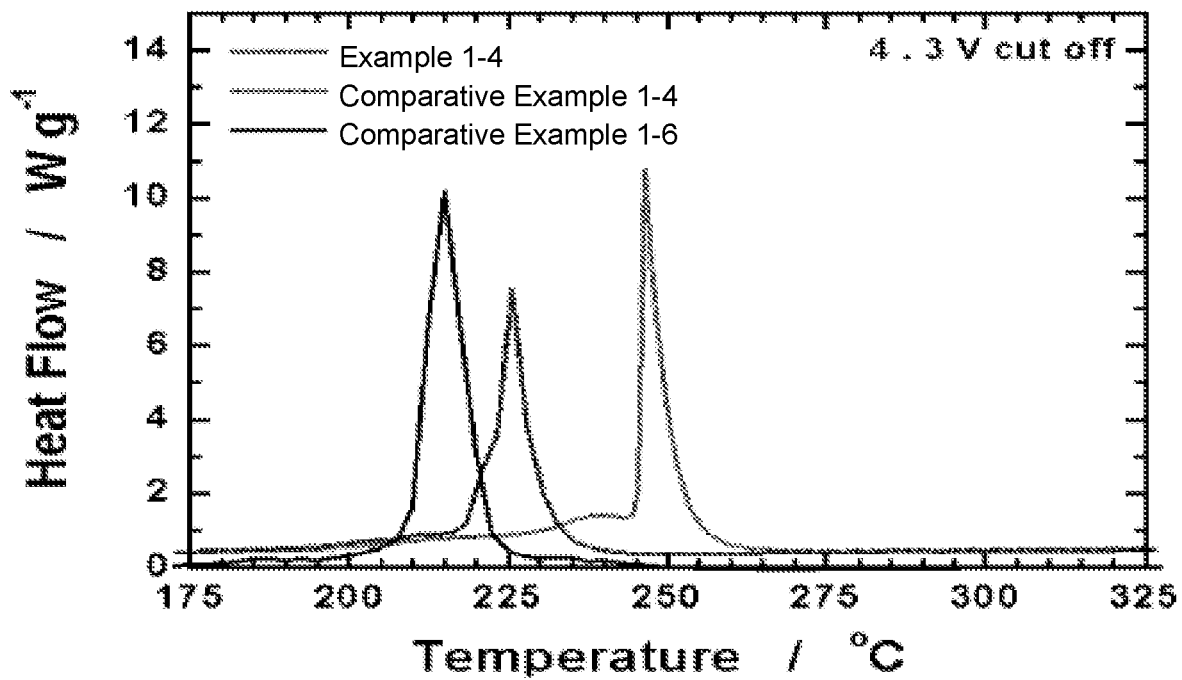
Figure 23:
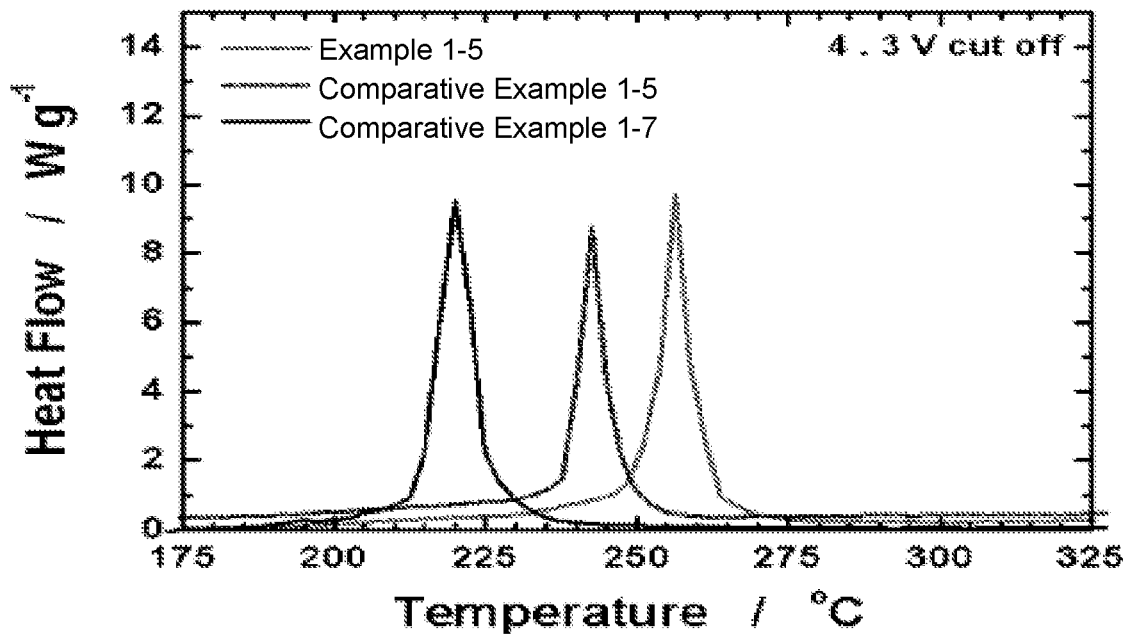
Figure 24:
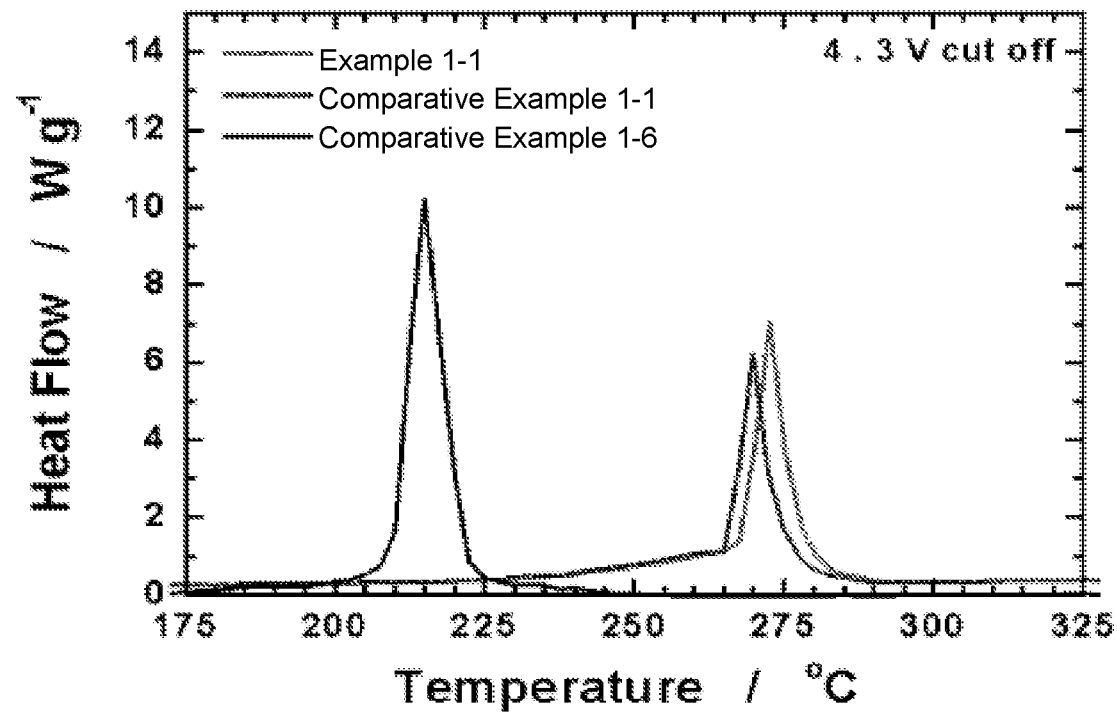
Figure 25:
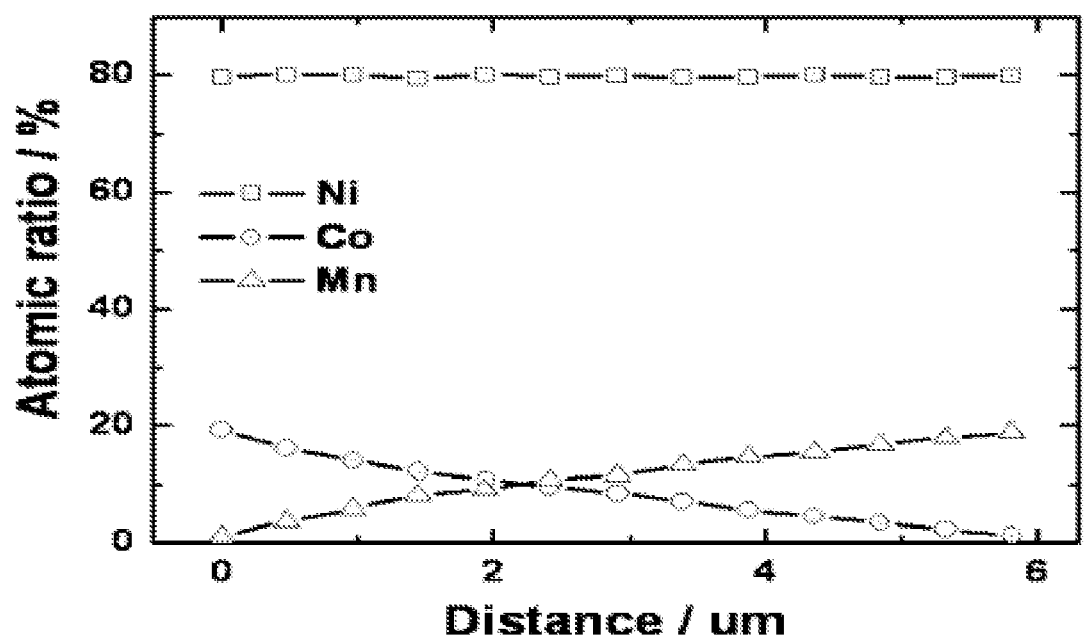
FIGS. 25 to 29: the results measuring the atomic ratio in each precursor particle prepared in Examples 2-1 to 2-5 of the present invention, respectively.
Figure 26:
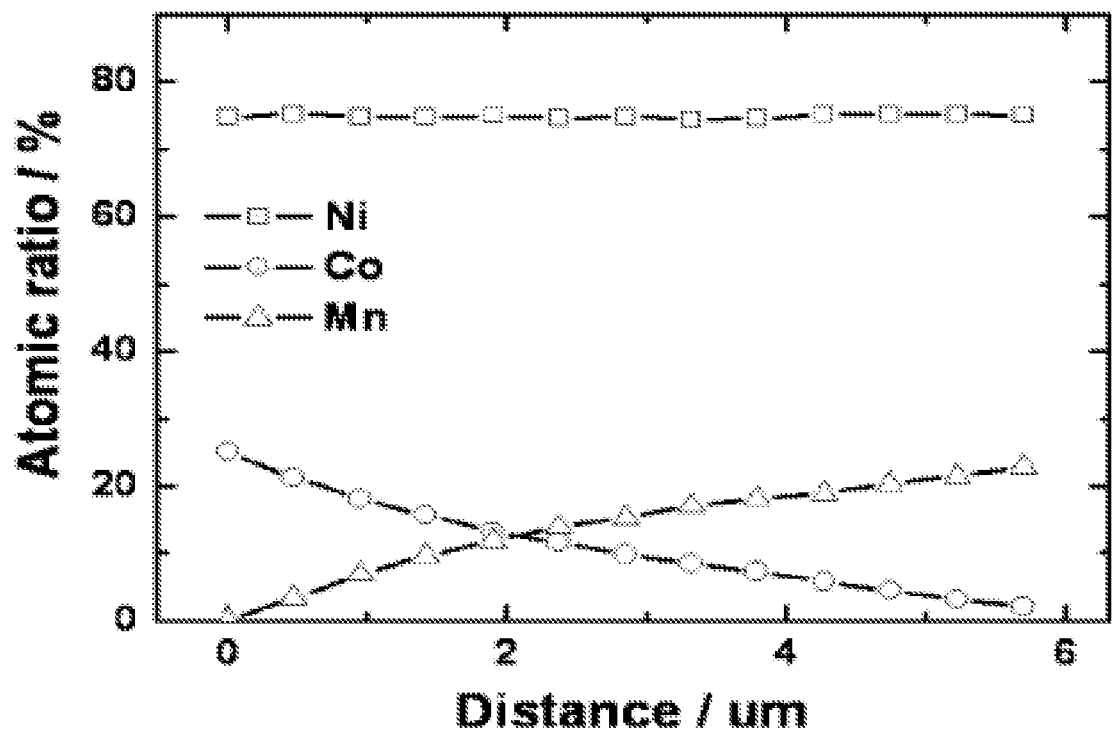
Figure 27:
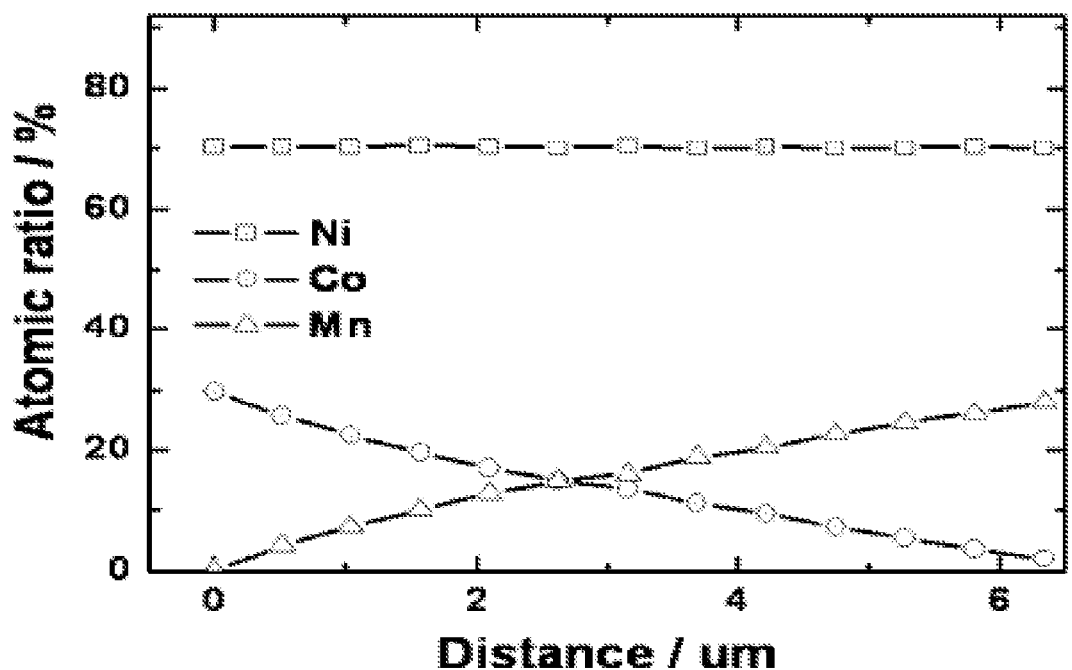
Figure 28:
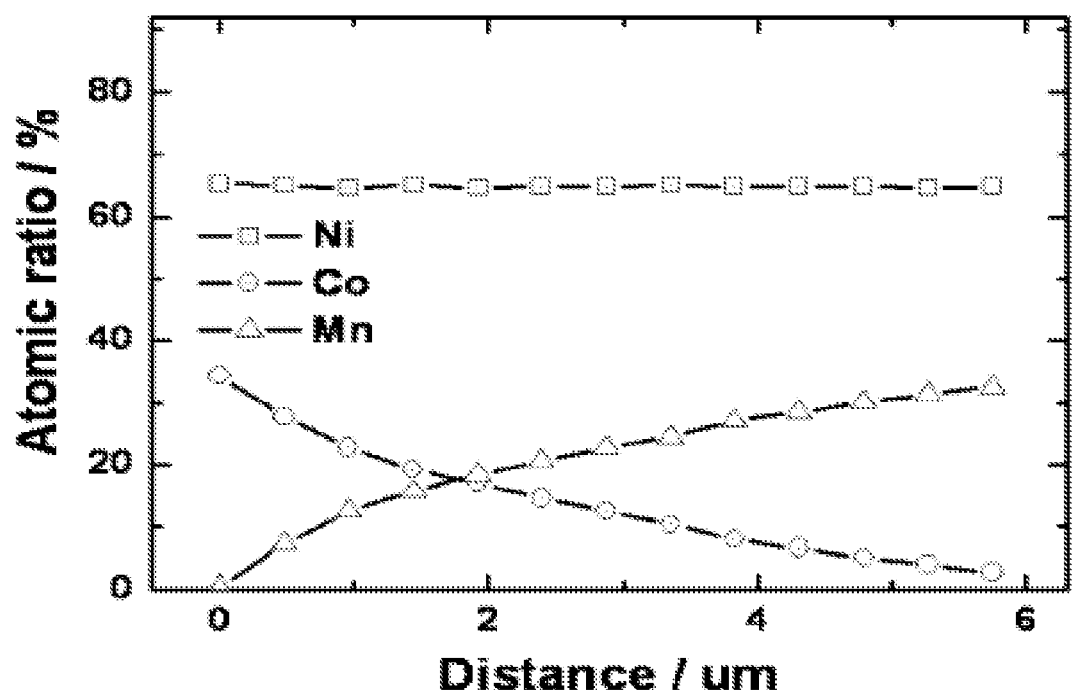
Figure 68:
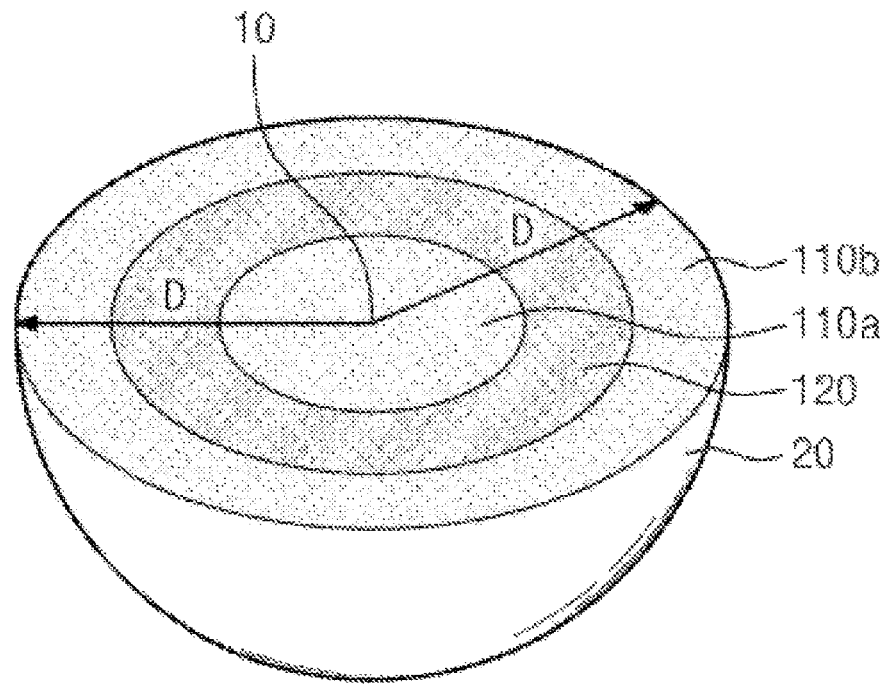
FIG. 68 illustrates the cross section of the second element for explaining the second element of the positive electrode active material according to a fourth embodiment of the inventive concept.
Figure 69:
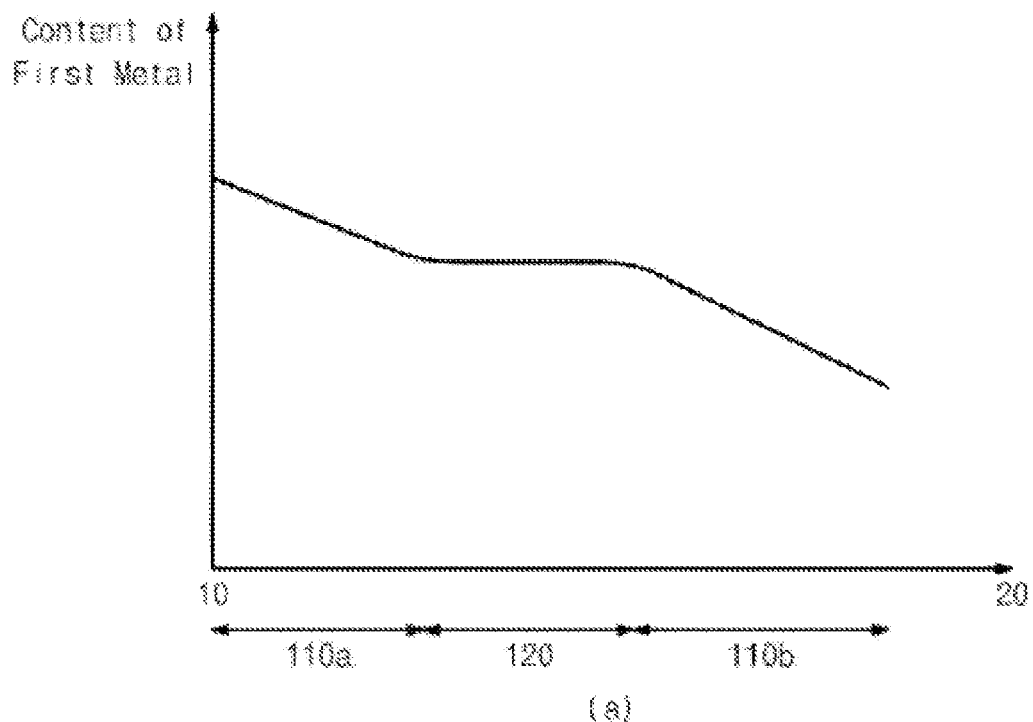
FIGS. 69A, 69B, 70A, and 70B are graphs illustrating the change in content of the first metal in the second element of the positive electrode active material according to a fourth embodiment of the inventive concept.
Figure 69:
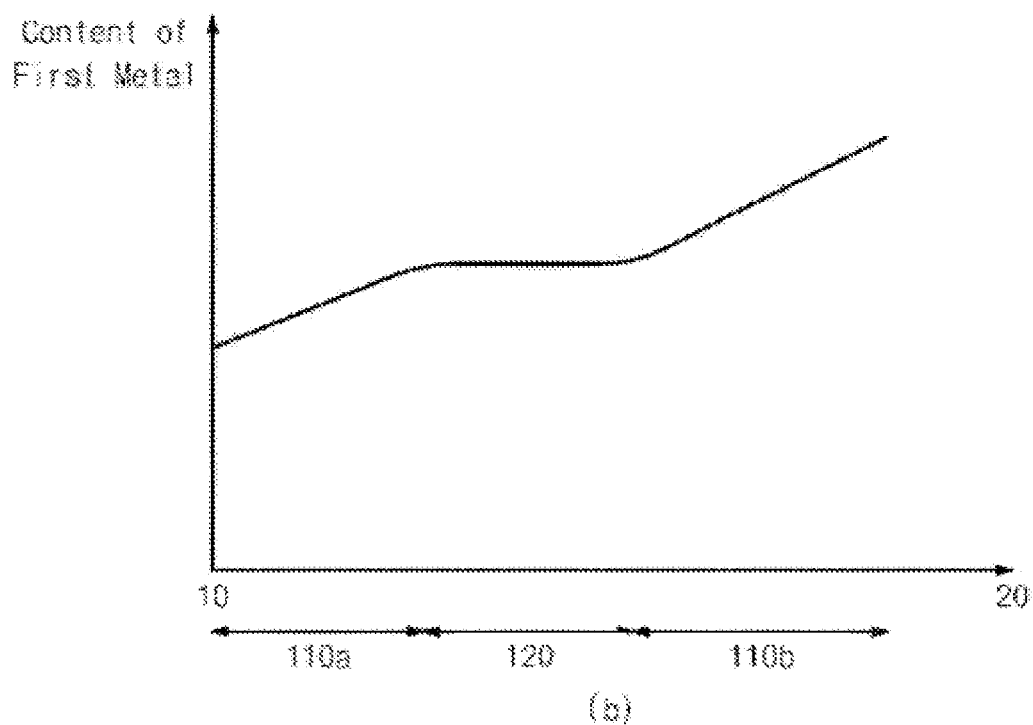

FIG. 68 illustrates the cross section of the second element for explaining the second element of the positive electrode active material according to a fourth embodiment of the inventive concept, and FIGS. 69 and 10 are graphs illustrating the change in content of the first metal in the second element of the positive electrode active material according to a fourth embodiment of the inventive concept.

Figure 70:
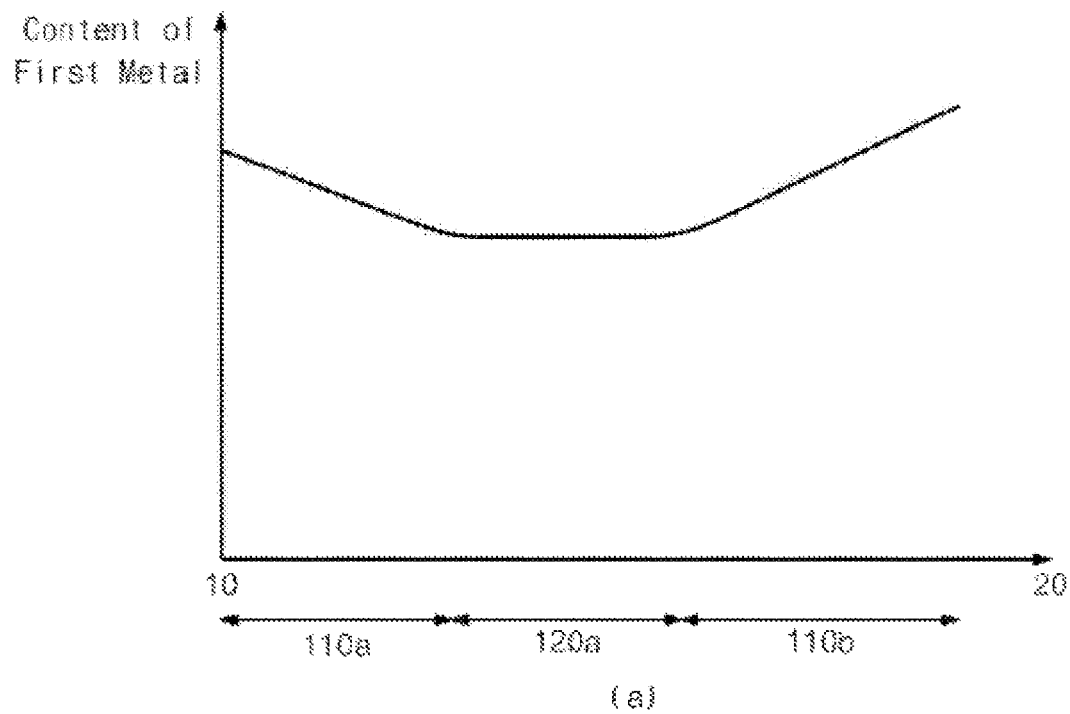
Figure 70:
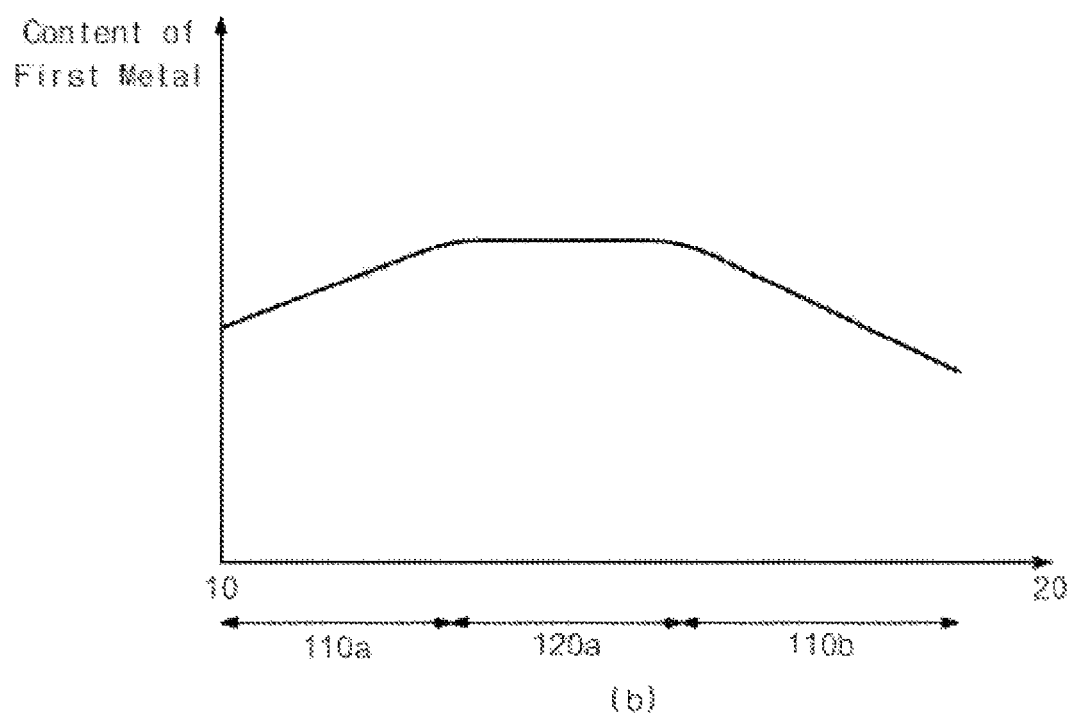
Figure 71:
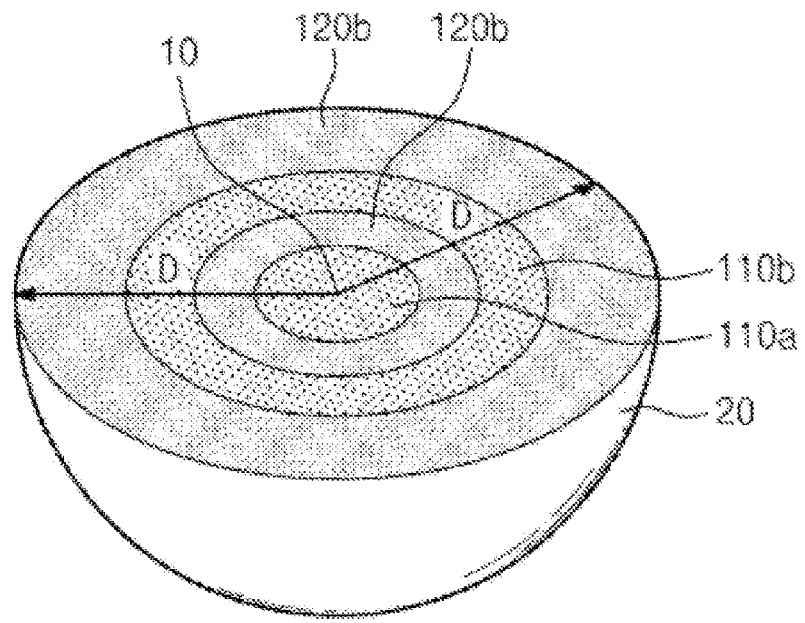
FIG. 71 illustrates the cross section of the second element for explaining the second element of the positive electrode active material according to a modified example of a fourth embodiment of the inventive concept.
Figure 72:
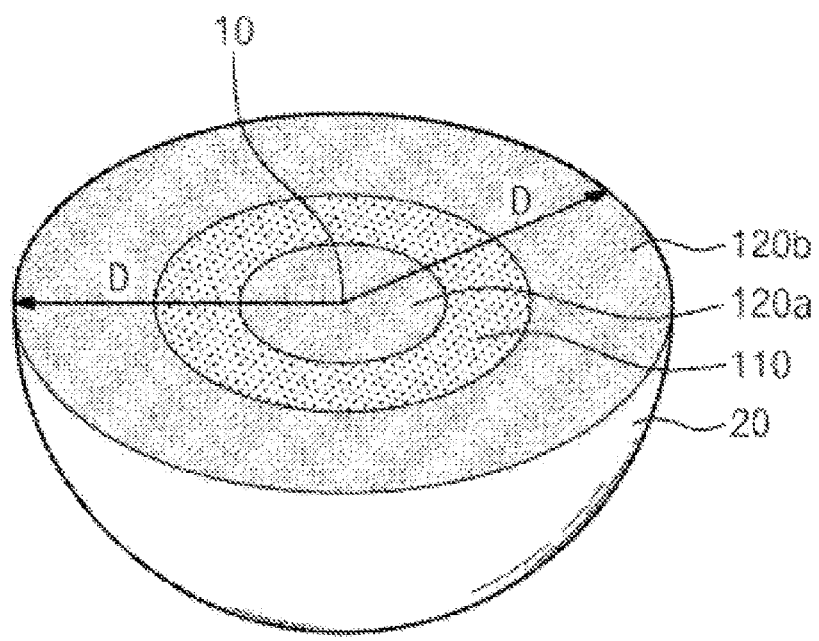
FIG. 72 illustrates the cross section of the second element for explaining the second element of the positive electrode active material according to a fifth embodiment of the inventive concept.

Referring to FIGS. 68 to 70, the second element of the positive electrode active material according to the fourth embodiment of the inventive concept may be composed of one or more first elements 30 extending from the center part 10 toward the surface part 20 as described with reference to FIG. 61B. The first element 30 may be formed of a plurality of metals including the first metal to the third metal as described with reference to FIG. 61A, FIG. 61B, and FIG. 62.

The second element may include a first concentration gradient portion 110a in which the content of the first metal changes, a concentration maintained portion 120 in which the content of the first metal is constant, and a second concentration gradient portion 110b in which the content of the first metal changes. The concentration maintained portion 120 may surround the first concentration gradient portion 110a, and the second concentration gradient portion 110b may surround the concentration maintained portion 120.

According to an embodiment of the inventive concept, as illustrated in (a) of FIG. 69, the content of the first metal in the first concentration gradient portion 110a and the content of the first metal in the second concentration gradient portion 110b may gradually decrease in the direction D from the center part 10 to the surface part 20. According to another embodiment of the inventive concept, as illustrated in (b) of FIG. 69, the content of the first metal in the first concentration gradient portion 110a and the content of the first metal in the second concentration gradient portion 110b may gradually increase in the direction D from the center part 10 to the surface part 20.

Alternatively, according to still another embodiment of the inventive concept, in the direction D from the center part 10 to the surface part 20, the content of the first metal in the first concentration gradient portion 110a may gradually decrease and the content of the first metal in the second concentration gradient portion 110b may gradually increase, as illustrated in (a) of FIG. 70. In this case, the content of the first metal at a part including the interface between the first concentration gradient portion 110a and the second concentration gradient portion 110b may be highest in the inside of the second element.

Alternatively, according to yet still another embodiments of the inventive concept, in the direction D from the center part 10 to the surface part 20, the content of the first metal in the first concentration gradient portion 110a may gradually increase and the content of the first metal in the second concentration gradient portion 110b may gradually decrease, as illustrated in (b) of FIG. 70. In this case, the content of the first metal at a part including the interface between the first concentration gradient portion 110a and the second concentration gradient portion 110b may be lowest in the inside of the second element.

In a case in which the contents of the first metal in the first and second concentration gradient portions 110a and 110b gradually decrease or increase in the direction D from the center part 10 to the surface part 20, the contents of the second metal in the first and second concentration gradient portions (110a and 110b) may gradually increase or decrease in the direction D from the center part 10 to the surface part 20, as described with reference to FIG. 62.

According to an embodiment of the inventive concept, as illustrated in FIGS. 69 and 70, the content of the first metal may continuously change between the first concentration gradient portion 110a and the concentration maintained portion 120 and between the concentration maintained portion 120 and the second concentration gradient portion 110b. In this case, the maximum values or the minimum values of the contents of the first metal in the first and second concentration gradient portions 110a and 110b may be equal to the average value of the content of the first metal in the concentration maintained portion 120. Alternatively, according to another embodiment of the inventive concept, the content of the first metal may discontinuously change between the first concentration gradient portion 110*a* and the concentration maintained portion 120 and between the concentration maintained portion 120 and the second concentration gradient portion 110*b*.

Unlike the fourth embodiment of the inventive concept described above, according to a modified example of the fourth embodiment of the inventive concept, a second concentration maintained portion may surround the second concentration gradient portion 110*b* of the second element according to the fourth embodiment of the inventive concept described with reference to FIG. 68. Hereinafter, this will be described with reference to FIG. 61.

FIG. 61 illustrates the cross section of the second element for explaining the second element of the positive electrode active material according to a modified example of a fourth embodiment of the inventive concept.

Referring to FIG. 61, a second element of a positive electrode active material according to a modified example of the fourth embodiment of the inventive concept may be composed of one or more first elements 30 extending from the center part 10 toward the surface part 20 as described with reference to FIG. 61B. The first element 30 may be formed of a plurality of metals including the first metal to the third metal as described with reference to FIG. 61A, FIG. 61B, and FIG. 62.

The second element may include the first concentration gradient portion 110*a* in which the content of the first metal changes, the first concentration maintained portion 120*a* in which the content of the first metal is constant, the second concentration gradient portion 110*b* in which the content of the first metal changes, and the second concentration maintained portion 120*b* in which the content of the first metal is constant. The first concentration maintained portion 120*a* may surround the first concentration gradient portion 110*a*, the second concentration gradient portion 110*b* may surround the first concentration maintained portion 120*a*, and the second concentration maintained portion 120*b* may surround the second concentration gradient portion 110*b*.

The first concentration gradient portion 110*a*, the first concentration maintained portion 120*a*, and the second concentration gradient portion 110*b* may respectively correspond to the first concentration gradient portion 110*a*, the concentration maintained portion 120, and the second concentration gradient portion 110*b*, which are described with reference to FIGS. 68 to 70.

In a case in which the contents of the first metal in the first and second concentration gradient portions 110*a* and 110*b* are the same as described with reference to FIG. 69, the average value of the content of the first metal in the second concentration maintained portion 120*b* may be different from the average value of the content of the first metal in the first concentration maintained portion 120*a*. In a case in which the contents of the first metal in the first and second concentration gradient portions 110*a* and 110*b* are the same as described with reference to FIG. 70, the average value of the content of the first metal in the second concentration maintained portion 120*b* may be the same as or different from the average value of the content of the first metal in the first concentration maintained portion 120*a*.

According to an embodiment of the inventive concept, the content of the first metal may continuously change between the second concentration gradient portion 110*b* and the second concentration maintained portion 120*b*. In this case, the maximum value or the minimum value of the content of the first metal in the second concentration gradient portion 110*b* may be equal to the average value of the content of the first metal in the second concentration maintained portion 120*b*. Alternatively, according to another embodiment of the inventive concept, the content of the first metal may discontinuously change between the second concentration gradient portion 110*b* and the second concentration maintained portion 120*b*.

Unlike the embodiments of the inventive concept described above, according to a fifth embodiment of the inventive concept, a concentration gradient portion may be disposed between concentration maintained portions. Hereinafter, this will be described with reference to FIGS. 62 and 63.

FIG. 62 illustrates the cross section of the second element for explaining the second element of the positive electrode active material according to a fifth embodiment of the inventive concept. FIG. 63 is a graph illustrating the change in content of the first metal in the second element of the positive electrode active material according to a fifth embodiment of the inventive concept.

Referring to FIGS. 62 and 63, a second element of a positive electrode active material according to the fifth embodiment of the inventive concept may be composed of one or more first elements 30 extending from the center part 10 toward the surface part 20 as described with reference to FIG. 61B. The first element 30 may be formed of a plurality of metals including the first metal to the third metal as described with reference to FIG. 61A, FIG. 61B, and FIG. 62.

The second element may include the first concentration maintained portion 120*a* in which the content of the first metal is constant, the concentration gradient portion 110 in which the content of the first metal changes, and the second concentration maintained portion 120*b* in which the content of the first metal is constant. The concentration gradient portion 110 may surround the first concentration maintained portion 120*a* and the second concentration maintained portion 120*b* may surround the concentration gradient portion 110.

Figure 73:
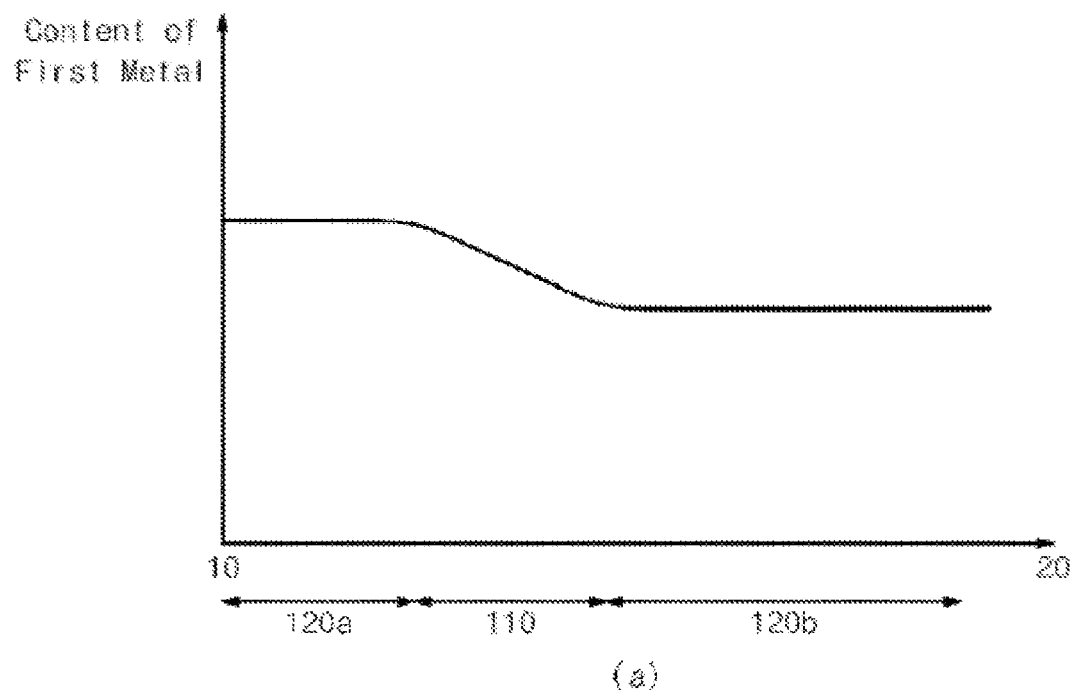
FIGS. 73A and 73B are graphs illustrating the change in content of the first metal in the second element of the positive electrode active material according to a fifth embodiment of the inventive concept.
Figure 73:
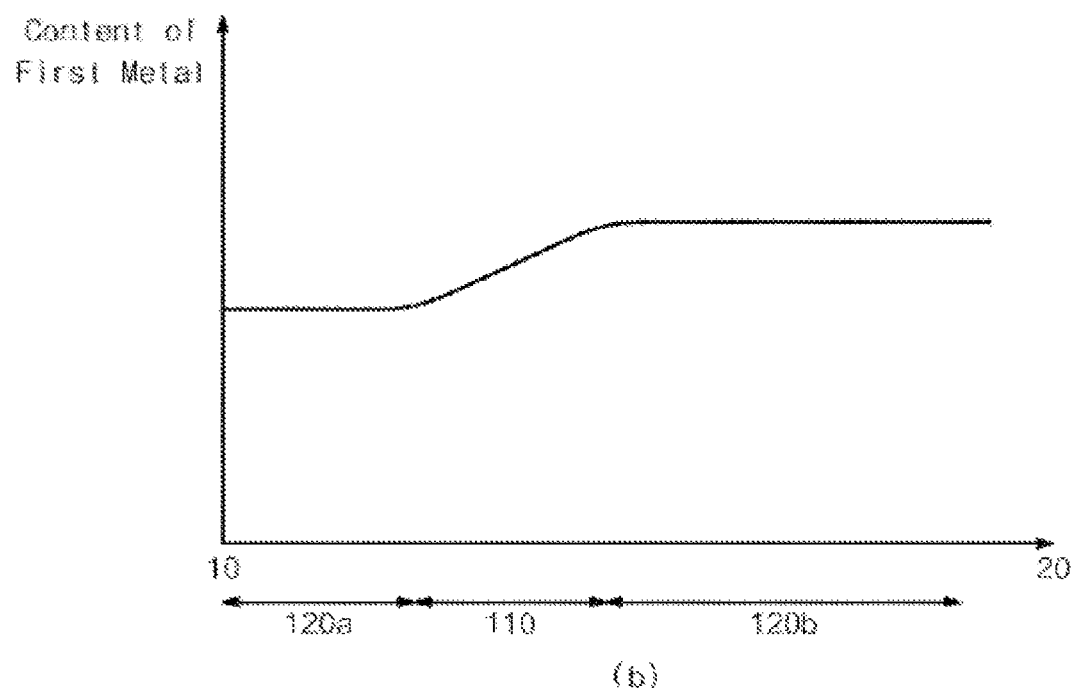

According to an embodiment of the inventive concept, the content of the first metal in the concentration gradient portion 110 may gradually decrease in the direction D from the center part 10 to the surface part 20, as illustrated in (a) of FIG. 73. In this case, the content of the first metal in the first concentration maintained portion 120*a* may be higher than the content of the first metal in the second concentration maintained portion 120*b*.

Alternatively, according to another embodiment of the inventive concept, the content of the first metal in the concentration gradient portion 110 may gradually increase in the direction D from the center part 10 to the surface part 20, as illustrated in (b) of FIG. 73. In this case, the content of the first metal in the first concentration maintained portion 120*a* may be lower than the content of the first metal in the second concentration maintained portion 120*b*.

In a case in which the content of the first metal in the concentration gradient portion 110 gradually decreases or increases in the direction D from the center part 10 to the surface part 20, the content of the second metal in the concentration gradient portion 110 may gradually increase or decrease in the direction D from the center part 10 to the surface part 20, as described with reference to FIG. 62.

According to an embodiment of the inventive concept, the content of the first metal may continuously change between the first maintained concentration portion 120*a* and the concentration gradient portion 110 and between the concentration gradient portion 110 and the second concentration maintained portion 120b. In this case, the maximum value and the minimum value of the content of the first metal in the concentration gradient portion 110 may be equal to the average values of the contents of the first metal in the concentration maintained portions 120a and 120b (or 120b and 120a), respectively. Alternatively, according to another embodiment of the inventive concept, the content of the first metal may discontinuously change between the first maintained concentration portion 120a and the concentration gradient portion 110 and between the concentration gradient portion 110 and the second concentration maintained portion 120b.

Unlike the embodiments of the inventive concept described above, according to a sixth embodiment of the inventive concept, concentration gradient portions may surround a plurality of concentration maintained portions. Hereinafter, this will be described with reference to FIGS. 74 to 76.

Figure 74:
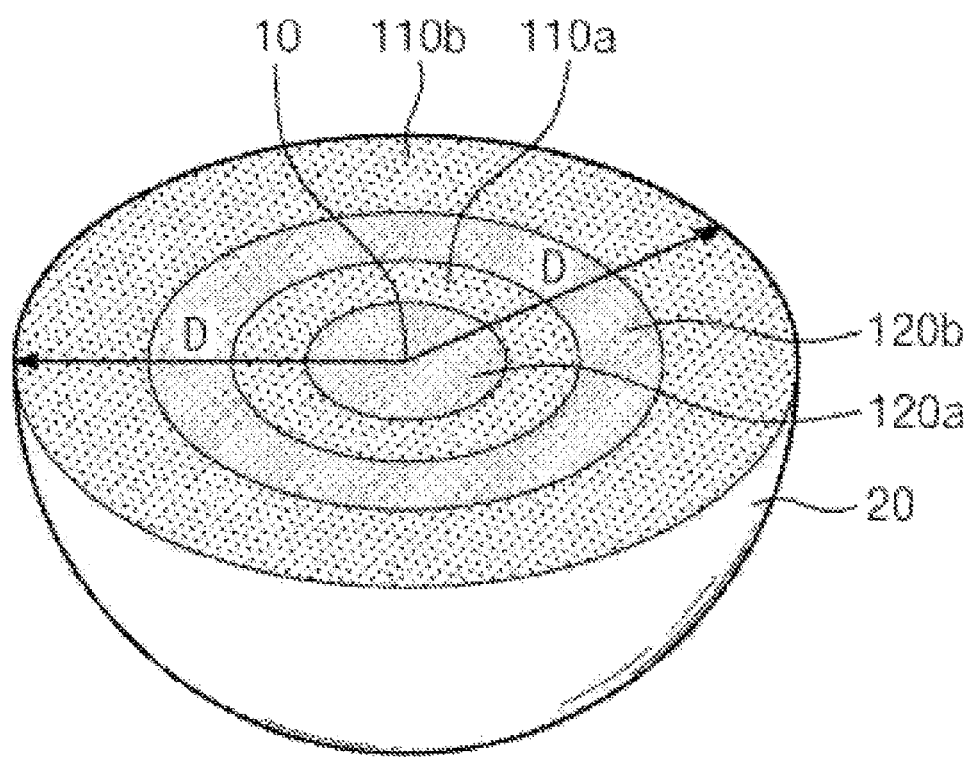
FIG. 74 illustrates the cross section of the second element for explaining the second element of the positive electrode active material according to a sixth embodiment of the inventive concept.
Figure 75:
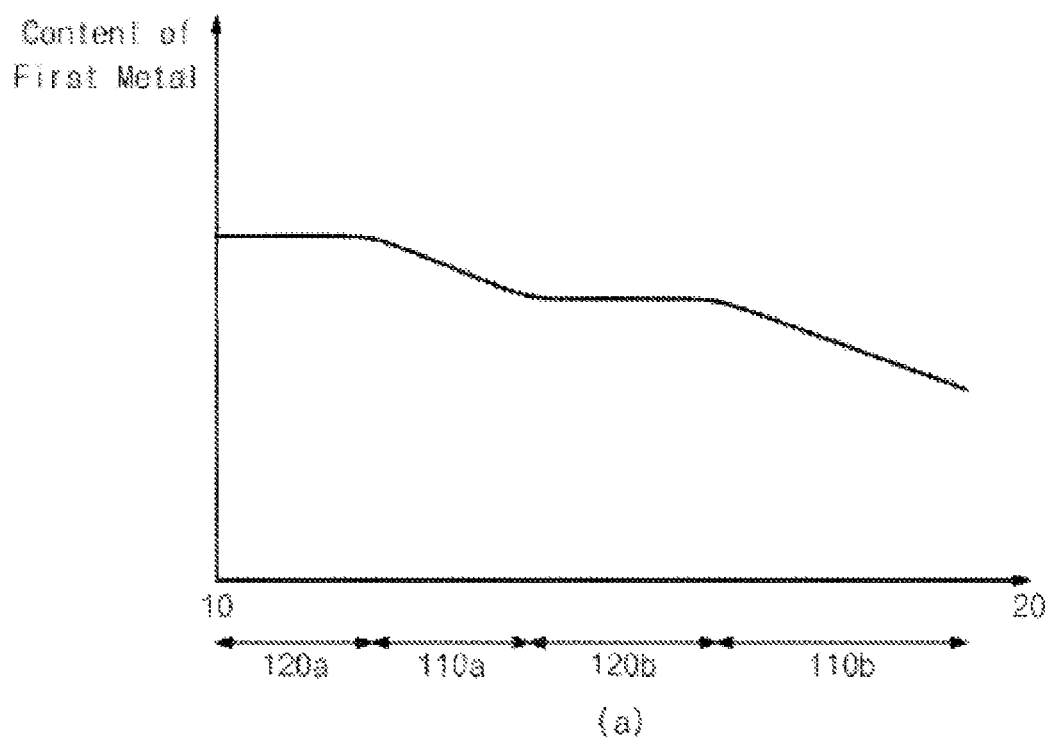
FIGS. 75A, 75B, 76A and 76B are graphs illustrating the change in content of the first metal in the second element of the positive electrode active material according to a sixth embodiment of the inventive concept.
Figure 75:
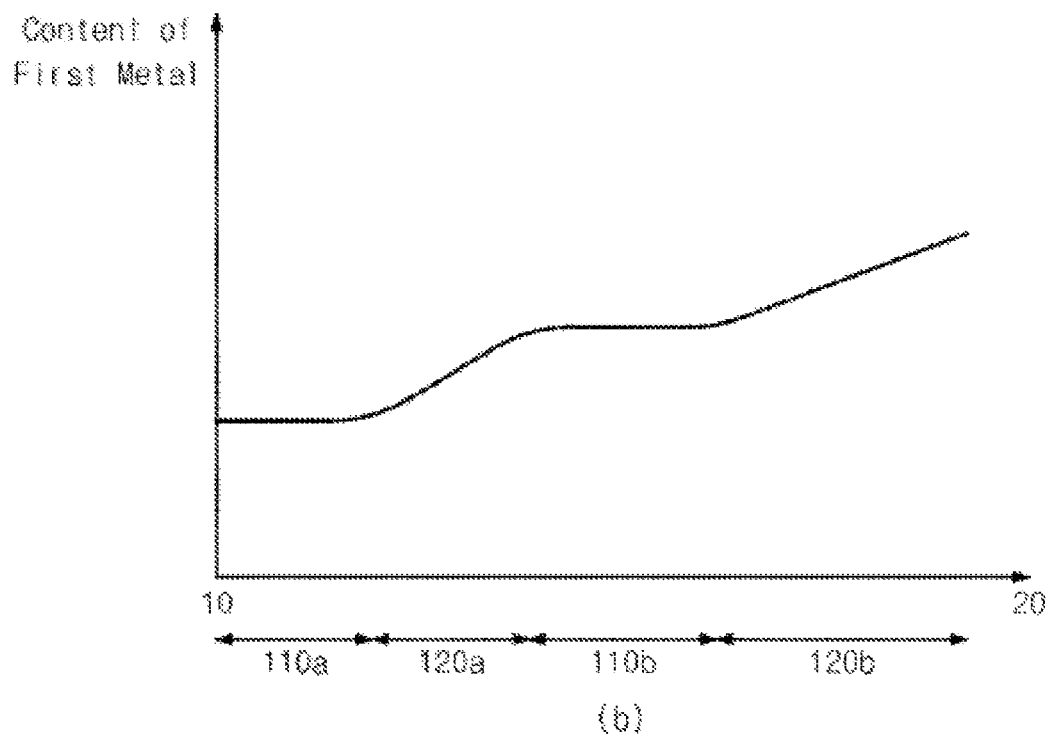
Figure 76:
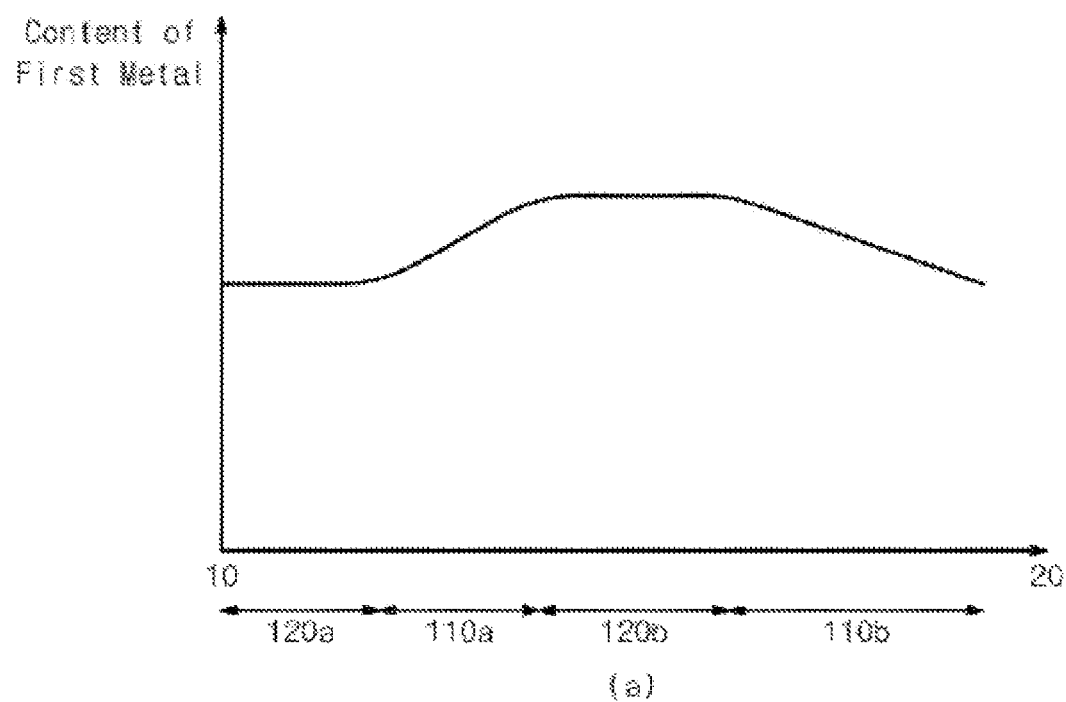
Figure 76:
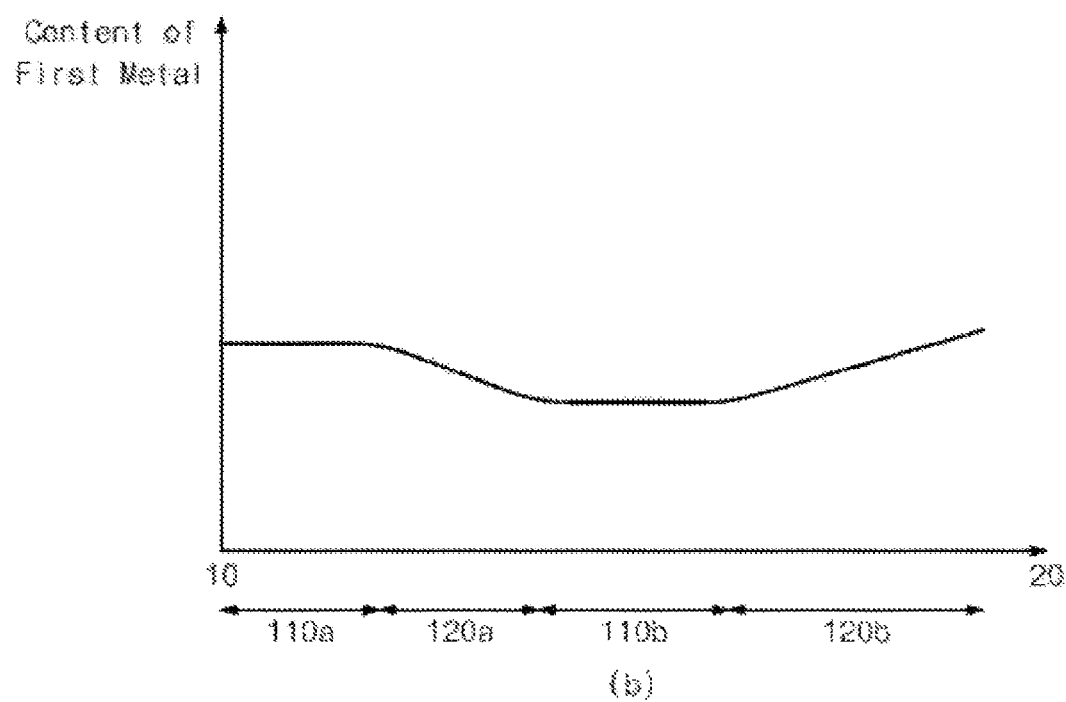

FIG. 74 illustrates the cross section of the second element for explaining the second element of the positive electrode active material according to a sixth embodiment of the inventive concept. FIGS. 75 and 76 are graphs illustrating the change in content of the first metal in the second element of the positive electrode active material according to a sixth embodiment of the inventive concept.

Referring to FIGS. 74 to 76, a second element of a positive electrode active material according to the sixth embodiment of the inventive concept may be composed of one or more first elements 30 extending from the center part 10 toward the surface part 20 as described with reference to FIG. 61B. The first element 30 may be formed of a plurality of metals including the first metal to the third metal as described with reference to FIG. 61A, FIG. 61B, and FIG. 62.

The second element may include the first concentration maintained portion 120a in which the content of the first metal is constant, the first concentration gradient portion 110a in which the content of the first metal changes, the second concentration maintained portion 120b in which the content of the first metal is constant, and the second concentration gradient portion 110b in which the content of the first metal changes. The first concentration gradient portion 110a may surround the first concentration maintained portion 120a, the second concentration maintained portion 120b may surround the first concentration gradient portion 110a, and the second concentration gradient portion 110b may surround the second concentration maintained portion 120b.

According to an embodiment of the inventive concept, as illustrated in (a) of FIG. 75, the contents of the first metal in the first and second concentration gradient portions 110a and 110b may gradually decrease in the direction D from the center part 10 to the surface part 20. Alternatively, according to another embodiment of the inventive concept, as illustrated in (b) of FIG. 75, the contents of the first metal in the first and second concentration gradient portions 110a and 110b may gradually increase in the direction D from the center part 10 to the surface part 20.

Alternatively, according to still another embodiments of the inventive concept, in the direction D from the center part 10 to the surface part 20, the content of the first metal in the first concentration gradient portion 110a may gradually increase and the content of the first metal in the second concentration gradient portion 110b may gradually decrease, as illustrated in (a) of FIG. 76. Alternatively, according to yet still another embodiments of the inventive concept, in the direction D from the center part 10 to the surface part 20, the content of the first metal in the first concentration gradient portion 110a may gradually decrease and the content of the first metal in the second concentration gradient portion 110b may gradually increase, as illustrated in (b) of FIG. 76.

In a case in which the contents of the first metal in the first and second concentration gradient portions 110a and 110b gradually decrease or increase in the direction D from the center part 10 to the surface part 20, the contents of the second metal in the first and second concentration gradient portions (110a and 110b) may gradually increase or decrease in the direction D from the center part 10 to the surface part 20 as described with reference to FIG. 62.

The content of the first metal may continuously or discontinuously change between the first maintained concentration portion 120a and the first concentration gradient portion 110a, between the first concentration gradient portion 110a and the second concentration maintained portion 120b, and between the second concentration maintained portion 120b and the second concentration gradient portion 110b.

Unlike the sixth embodiment of the inventive concept described above, according to a modified example of the sixth embodiment of the inventive concept, a third concentration maintained portion may surround the second concentration gradient portion 110b of the second element according to the sixth embodiment of the inventive concept described with reference to FIG. 74. Hereinafter, this will be described with reference to FIG. 77.

Figure 77:
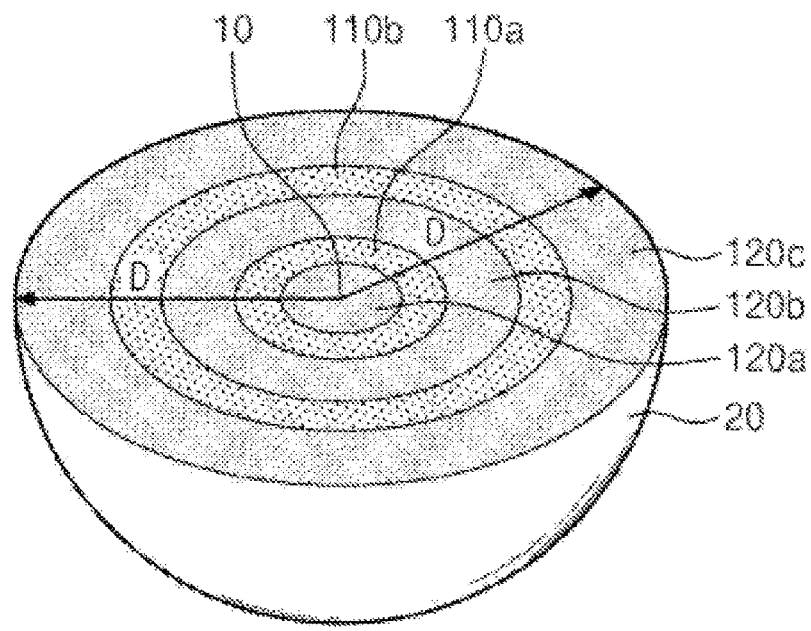
FIG. 77 illustrates the cross section of the second element for explaining the second element of the positive electrode active material according to a modified example of a sixth embodiment of the inventive concept.

FIG. 77 illustrates the cross section of the second element for explaining the second element of the positive electrode active material according to a modified example of a sixth embodiment of the inventive concept.

Referring to FIG. 77, a second element of a positive electrode active material according to a modified example of the sixth embodiment of the inventive concept may be composed of one or more first elements 30 extending from the center part 10 toward the surface part 20 as described with reference to FIG. 61A. The first element 30 may be formed of a plurality of metals including the first metal to the third metal as described with reference to FIG. 61A, FIG. 61B, and FIG. 62.

The second element may further include a third concentration maintained portion 120c which has a constant content of the first metal and surrounds the second concentration gradient portion 110b in addition to the first concentration maintained portion 120a, the first concentration gradient portion 110a, the second concentration maintained portion 120b, and the second concentration gradient portion 110b described with reference to FIG. 74.

In a case in which the contents of the first metal in the first and second concentration gradient portions 110a and 110b are the same as described with reference to FIG. 75, the average value of the content of the first metal in the third concentration maintained portion 120c may be different from the average values of the contents of the first metal in the first and second concentration maintained portions 120a and 120b. Unlike this, in a case in which the contents of the first metal in the first and second concentration gradient portions 110a and 110b are the same as described with reference to FIG. 76, the average value of the content of the first metal in the third concentration maintained portion 120c may be the same as or different from at least one of the average values of the contents of the first metal in the first and second concentration maintained portions 120a and 120b.

According to an embodiment of the inventive concept, the content of the first metal may continuously change between the second concentration gradient portion 110b and the second concentration maintained portion 120b. In this case, the minimum value or maximum value of the content of the first metal in the second concentration gradient portion 110b may be equal to the average value of the content of the first metal in the third concentration maintained portion 120c. Unlike this, according to another embodiment of the inventive concept, the content of the first metal may discontinuously change between the second concentration gradient portion 110b and the third concentration maintained portion 120c.

Unlike the embodiments of the inventive concept described above, according to a seventh embodiment of the inventive concept, a first concentration gradient portion and a second concentration gradient portion which have different rates of change in content of the first metal from each other may compose an outer portion of the second element. Hereinafter, this will be described with reference to FIGS. 78 to 80.

Figure 78:
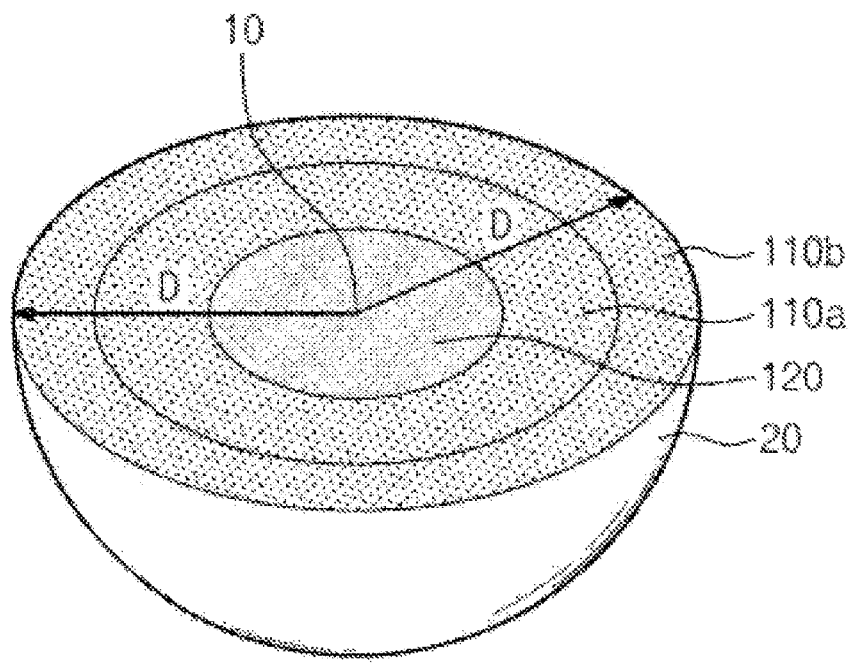
FIG. 78 illustrates the cross section of the second element for explaining the second element of the positive electrode active material according to a seventh embodiment of the inventive concept.
Figure 79:
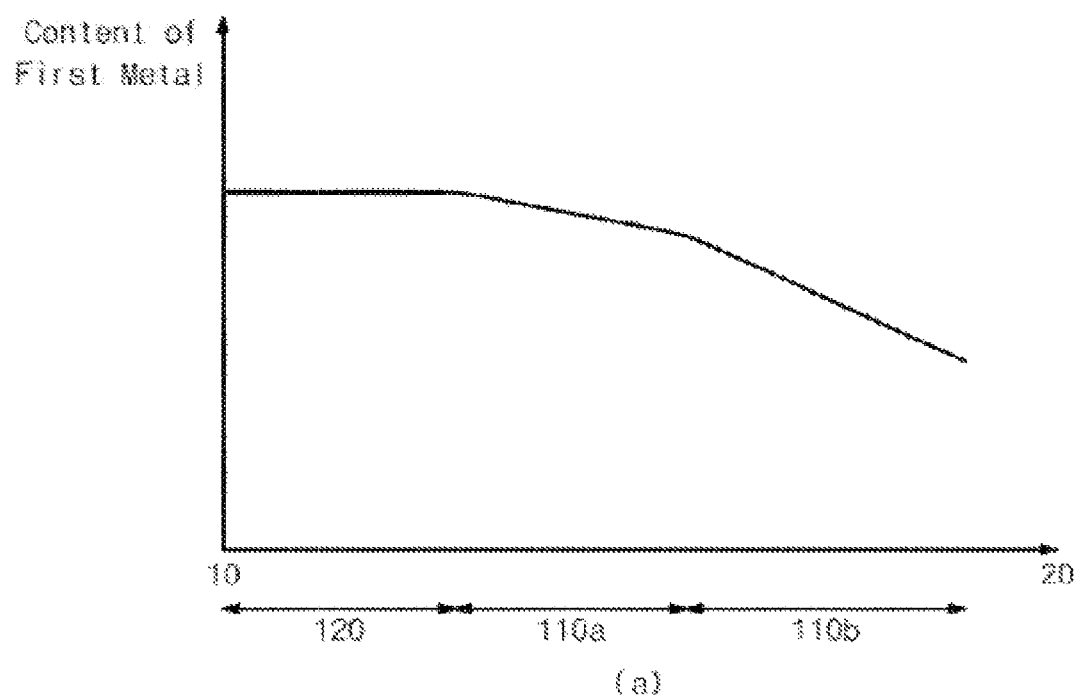
FIGS. 79A, 79B, 80A and 80B are graphs illustrating the change in content of the first metal in the second element of the positive electrode active material according to a seventh embodiment of the inventive concept.
Figure 79:
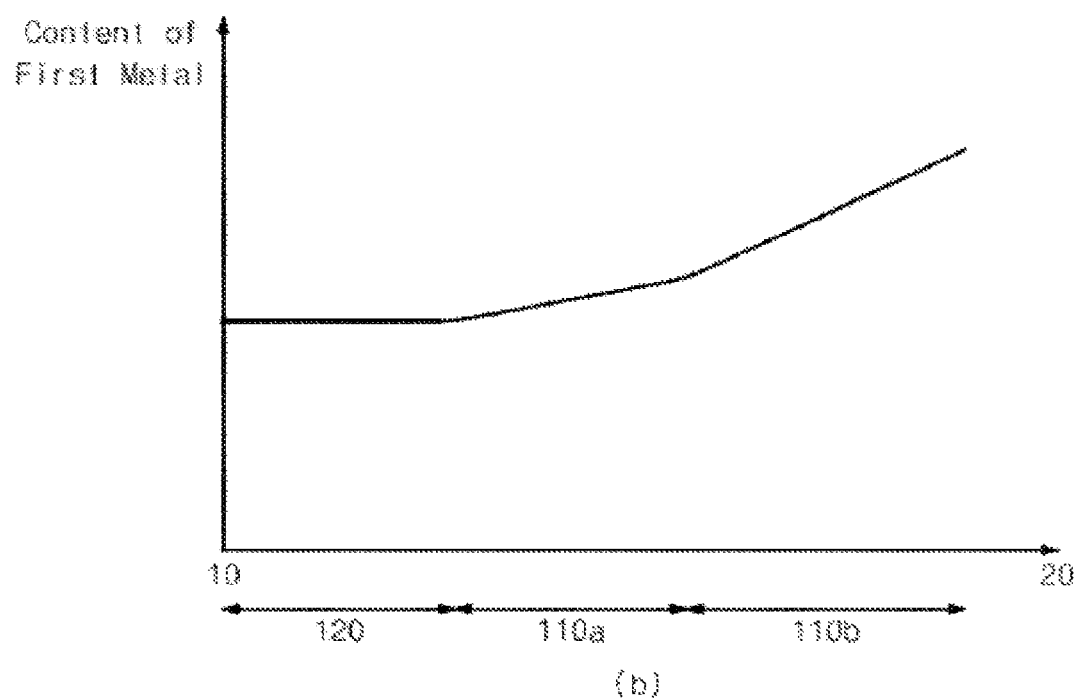
Figure 80:
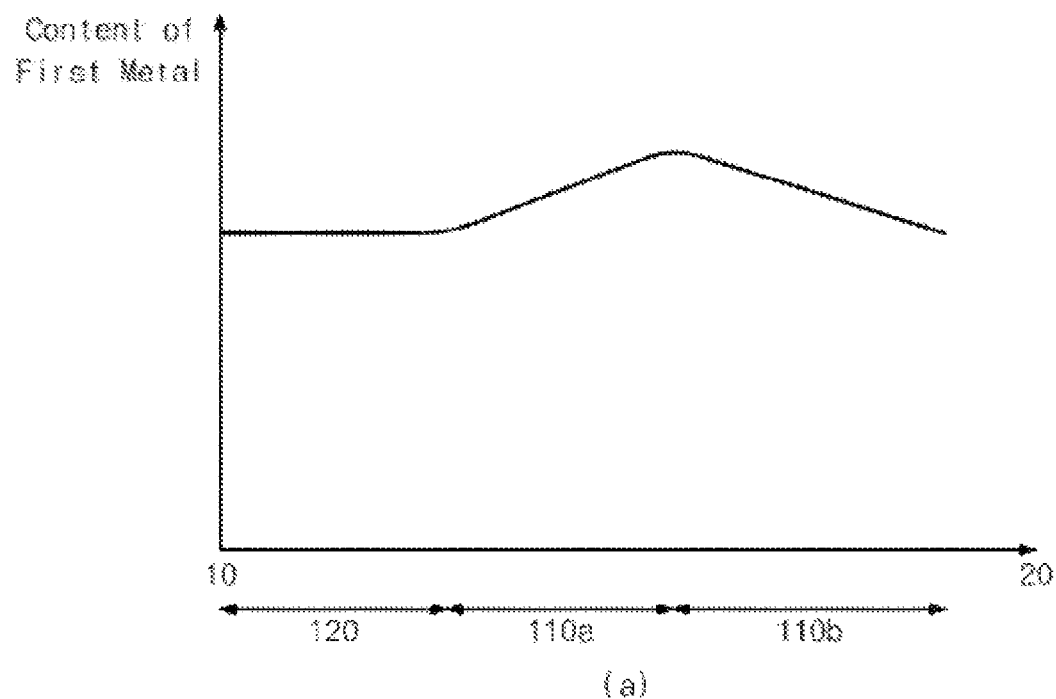
Figure 80:
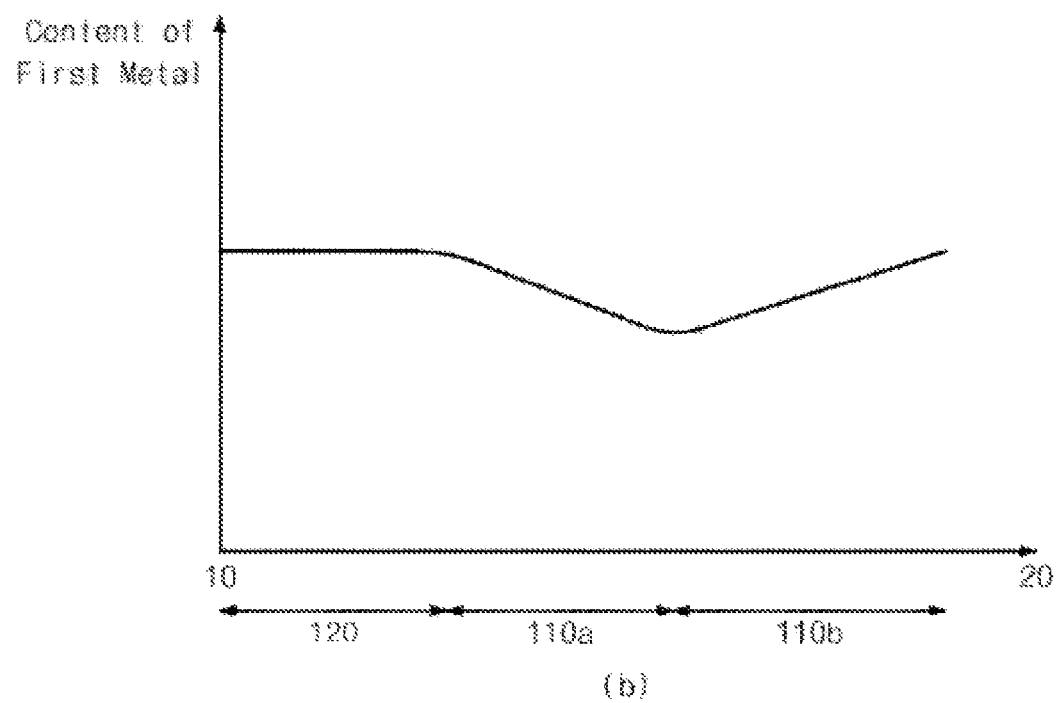

FIG. 78 illustrates the cross section of the second element for explaining the second element of the positive electrode active material according to a seventh embodiment of the inventive concept. FIGS. 79 and 80 are graphs illustrating the change in content of the first metal in the second element of the positive electrode active material according to a seventh embodiment of the inventive concept.

Referring to FIGS. 78 to 80, a second element of a positive electrode active material according to the seventh embodiment of the inventive concept may be composed of one or more first elements 30 extending from the center part 10 toward the surface part 20 as described with reference to FIG. 61B. The first element 30 may be formed of a plurality of metals including the first metal to the third metal as described with reference to FIG. 61A, FIG. 61B, and FIG. 62.

The second element may include the concentration maintained portion 120 in which the content of the first metal is constant, the first concentration gradient portion 110a in which the content of the first metal changes, and the second concentration gradient portion 110b in which the content of the first metal changes. The first concentration gradient portion 110a may surround the concentration maintained portion 120 and the second concentration gradient portion 110b may surround the first concentration gradient portion 110a.

According to an embodiment of the inventive concept, as illustrated in (a) of FIG. 79, the content of the first metal in the first concentration gradient portion 110a and the content of the first metal in the second concentration gradient portion 110b may gradually decrease in the direction D from the center part 10 to the surface part 20. Alternatively, according to another embodiment of the inventive concept, as illustrated in (b) of FIG. 79, the content of the first metal in the first concentration gradient portion 110a and the content of the first metal in the second concentration gradient portion 110b may gradually increase in the direction D from the center part 10 to the surface part 20.

Alternatively, according to still another embodiment of the inventive concept, in the direction D from the center part 10 to the surface part 20, the content of the first metal in the first concentration gradient portion 110a may gradually increase and the content of the first metal in the second concentration gradient portion 110b may gradually decrease, as illustrated in (a) of FIG. 80. In this case, the content of the first metal at a part including the interface between the first concentration gradient portion 110a and the second concentration gradient portion 110b may be highest in the inside of the second element.

Alternatively, according to yet still another embodiment of the inventive concept, in the direction D from the center part 10 to the surface part 20, the content of the first metal in the first concentration gradient portion 110a may gradually decrease and the content of the first metal in the second concentration gradient portion 110b may gradually increase, as illustrated in (b) of FIG. 80. In this case, the content of the first metal at a part including the interface between the first concentration gradient portion 110a and the second concentration gradient portion 110b may be lowest in the inside of the second element.

In a case in which the contents of the first metal in the first and second concentration gradient portions 110a and 110b gradually decrease or increase in the direction D from the center part 10 to the surface part 20, the contents of the second metal in the first and second concentration gradient portions 110a and 110b may gradually increase or decrease in the direction D from the center part 10 to the surface part 20 as described with reference to FIG. 62.

According to an embodiment of the inventive concept, the content of the first metal may continuously change between the first concentration gradient portion 110a and the concentration maintained portion 120. In this case, the minimum value or maximum value of the content of the first metal in the first concentration gradient portion 110a may be equal to the average value of the content of the first metal in the concentration maintained portion 120. Alternatively, according to another embodiment of the inventive concept, the content of the first metal may discontinuously change between the first concentration gradient portion 110a and the concentration maintained portion 120.

Unlike the seventh embodiment according to the inventive concept, according to a modified example of the seventh embodiment of the inventive concept, a second concentration maintained portion may surround the second concentration gradient portion 110b of the second element according to the seventh embodiment of the inventive concept described with reference to FIG. 78. Hereinafter, this will be described with reference to FIG. 81.

Figure 81:
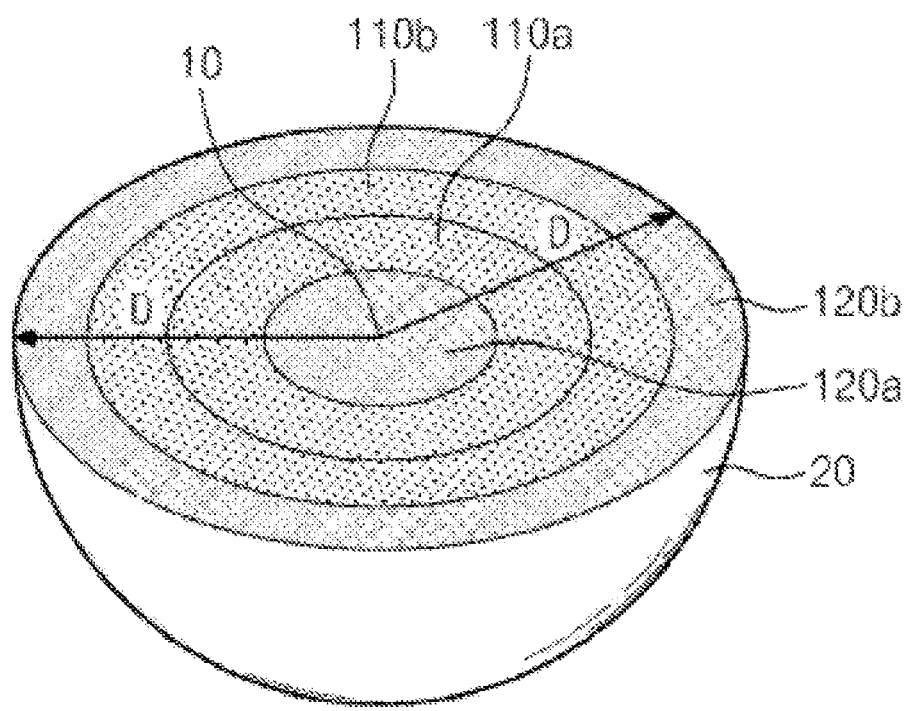
FIG. 81 illustrates the cross section of the second element for explaining the second element of the positive electrode active material according to a modified example of a seventh embodiment of the inventive concept.

FIG. 81 illustrates the cross section of the second element for explaining the second element of the positive electrode active material according to a modified example of a seventh embodiment of the inventive concept.

Referring to FIG. 81, a second element of a positive electrode active material according to a modified example of the seventh embodiment of the inventive concept may be composed of one or more first elements 30 extending from the center part 10 toward the surface part 20 as described with reference to FIG. 61B. The first element 30 may be formed of a plurality of metals including the first metal to the third metal as described with reference to FIG. 61A, FIG. 61B, and FIG. 62.

The second element may include the first concentration maintained portion 120a in which the content of the first metal is constant, the first and second concentration gradient portions 110a and 110b in which the content of the first metal changes, and the second concentration maintained portion 120b in which the content of the first metal is constant. The first concentration gradient portion 110a may surround the first concentration maintained portion 120a, the second concentration gradient portion 110b may surround the first concentration gradient portion 110a, and the second concentration maintained portion 120b may surround the second concentration gradient portion 110b.

The first concentration maintained portion 120a, the first concentration gradient portion 110a, and the second concentration gradient portion 110b may respectively correspond to the concentration maintained portion 120, the first concentration gradient portion 110a, and the second concentration gradient portion 110b which are described with reference to FIGS. 78 to 80.

In a case in which the contents of the first metal in the first and second concentration gradient portions 110a and 110b are the same as described with reference to FIG. 79, the average value of the content of the first metal in the second concentration maintained portion 120b may be different from the average value of the content of the first metal in the first concentration maintained portion 120a. In a case in which the contents of the first metal in the first and second concentration gradient portions 110a and 110b are the same as described with reference to FIG. 80, the average value of the content of the first metal in the second concentration maintained portion 120b may be the same as or different from the average value of the content of the first metal in the first concentration maintained portion 120a.

According to an embodiment of the inventive concept, the content of the first metal may continuously change between the second concentration gradient portion 110b and the second concentration maintained portion 120b. In this case, the minimum value or maximum value of the content of the first metal in the second concentration gradient portion 110b may be the same as the average value of the content of the first metal in the second concentration maintained portion 120b. Unlike this, according to another embodiment of the inventive concept, the content of the first metal may discontinuously change between the second concentration gradient portion 110b and the second concentration maintained portion 120b.

As described above, the second element according to the embodiments of the inventive concept may include the concentration gradient portion in which the content of the first metal changes and the concentration maintained portion in which the content of the first metal is constant. Hence, the first element can be formed in a rod shape, and at the same time, the content of the first metal in the second element can be controlled. This makes it possible to provide the positive electrode active material in which the characteristics (e.g., capacity and/or safety) are maximized due to the first metal.

The positive electrode active material containing the second element according to the embodiments of the inventive concept described above may be included in a positive electrode of a secondary battery. Hereinafter, a secondary battery which contains the positive electrode active material according to the aforementioned embodiments of the inventive concept will be described.

Figure 82:
FIG. 82 is a diagram for explaining a secondary battery which contains the positive electrode active material according to embodiments of the inventive concept.

FIG. 82 is a diagram for explaining a secondary battery which contains the positive electrode active material according to embodiments of the inventive concept.

Referring to FIG. 82, a secondary battery which contains the positive electrode active material according to embodiments of the inventive concept may include a positive electrode 410, a negative electrode 420 facing the positive electrode 410, a separation layer 440 disposed between the positive electrode 410 and the negative electrode 420, and an electrolyte 430 filling a space between the positive electrode 410 and the negative electrode 420.

The positive electrode 410 may contain the positive electrode active material according to the aforementioned embodiments described above.

The negative electrode 420 may contain a negative electrode active material. For example, the negative electrode active material may include at least one of a carbon material (e.g., graphite or hard carbon), a metal material (e.g., Li, Na, Mg, Al, Si, In, Ti, Pb, Ga, Ge, Sn, Bi, Sb, or an alloy thereof), silicon, silicon oxide, or a Ti-based oxide (e.g., $Li_4Ti_5O_{12}$).

The separation layer 440 may include at least one of a polyolefin-based resin, a fluorine-based resin, a polyester-based resin, a polyacrylonitrile resin, or a micro-porous layer formed of a cellulose-based material, or the separation membrane 440 may be obtained by coating at least one of these layers with an inorganic material such as ceramic.

The electrolyte 430 may be impregnated into the separation layer 440, the positive electrode 410, and/or the negative electrode 420. The electrolyte 430 may be a gel polymer-type electrolyte or a liquid electrolyte.

Examples 4

Examples 4-1 to 4-6

Into a coprecipitation reactor (volume: 16 L, output of rotary motor: 80 W or more), 2.5 L of distilled water was introduced, $N_2$ gas was then supplied thereto at a rate of 2 L/min, and the distilled water was stirred at 400 rpm while maintaining the temperature of the reactor at 45° C.

A first aqueous metal solution and a second aqueous metal solution were prepared by mixing nickel sulfate, cobalt sulfate, and manganese sulfate so as to have a composition of $Ni_{x1}Co_{y1}Mn_{z1}OH_2$ (X1, Y1, Z1) and a composition of $Ni_{x2}Co_{y2}Mn_{z2}OH_2$ (x2, y2, z2), respectively, the first aqueous metal solution and the second aqueous metal solution were continuously introduced into the reactor at 0.7 L/hr while mixing them and changing the mixing ratio thereof, and an ammonia solution having a concentration of 25 mol was also continuously introduced into the reactor at 0.07 L/hr, thereby forming the core portion and the concentration gradient portion which had a concentration gradient. In addition, a sodium hydroxide solution having a concentration of 5 mol was supplied into the reactor in order to adjust the pH so that the pH was maintained at 11.5. The speed of impeller was controlled at 400 rpm.

Thereafter, only the second aqueous metal solution was supplied into the reactor for a certain period of time to form the shell portion having constant concentrations of nickel, manganese, and cobalt on the outside of the core portion and the concentration gradient portion which had a concentration gradient, thereby producing a composite metal hydroxide.

The concentrations of the aqueous metal solutions in Examples 4-1 to 4-6 are as presented in the following Table 6.

TABLE 6

| | First aqueous metal solution | | | Second aqueous metal solution | | |
|---|---|---|---|---|---|---|
| | Ni | Co | Mn | Ni | Co | Mn |
| Example 4-1 | 75 | 0 | 25 | 55 | 20 | 25 |
| Example 4-2 | 70 | 0 | 30 | 50 | 20 | 30 |
| Example 4-3 | 78 | 0 | 22 | 54 | 19 | 27 |
| Example 4-4 | 90 | 0 | 10 | 54 | 15 | 31 |
| Example 4-5 | 90 | 5 | 5 | 65 | 10 | 25 |
| Example 4-6 | 96 | 0 | 1 | 54 | 15 | 31 |

The composite metal hydroxide thus prepared was filtered, washed with water, and then dried for 12 hours in a hot air dryer at 110° C. The composite metal hydroxide and lithium hydroxide (LiOH) were mixed at a molar ratio of 1:1, the mixture was subjected to the preliminary firing by heating at a temperature rise rate of 2° C./min and then maintaining at 450° C. for 10 hours and then fired at from 700 to 900° C. for 10 hours, thereby obtaining a positive electrode active material powder.

Comparative Examples 4-1 to 4-3

In Comparative Example 4-1, the positive electrode active material particles containing only the core portion and the concentration gradient portion which had a concentration gradient were prepared in the same manner as in Example 4-1 except that the shell portion having constant concentrations of nickel, manganese, and cobalt was not formed.

In Comparative Example 4-2, composite oxide particles having constant concentrations of nickel, manganese, and cobalt was prepared using an aqueous metal solution having a composition of $Ni_{55}Co_{20}Mn_{25}OH_2$ which corresponds to the composition of the shell portion in Example 4-1. In Comparative Example 4-3, composite oxide particles having constant concentrations of nickel, manganese, and cobalt was prepared using an aqueous metal solution having a composition of $Ni_{65}Co_{10}Mn_{25}OH_2$ which corresponds to the composition of the shell portion in Example 4-5.

<Experimental Example> Taking of EDX Image

Figure 83:
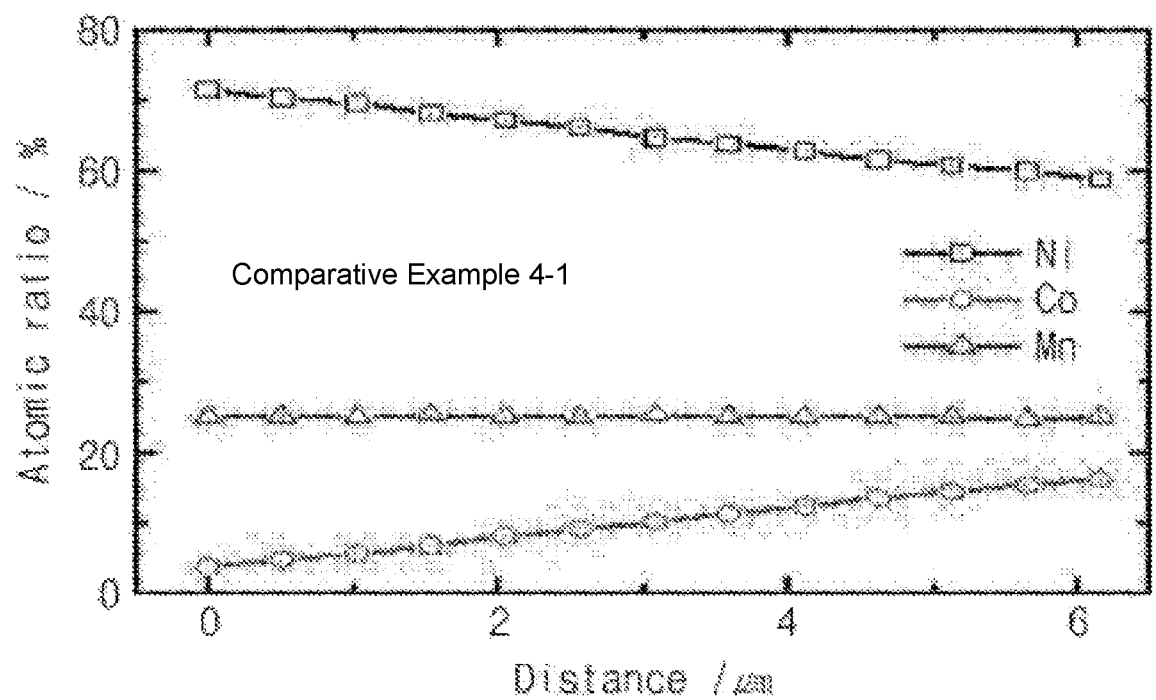
FIGS. 83A and 83B illustrates the concentrations of Ni, Mn, Co depending on the distance from the center in the particles prepared according to an embodiment of the inventive concept and Comparative Example, which are measured by EDX.
Figure 83:
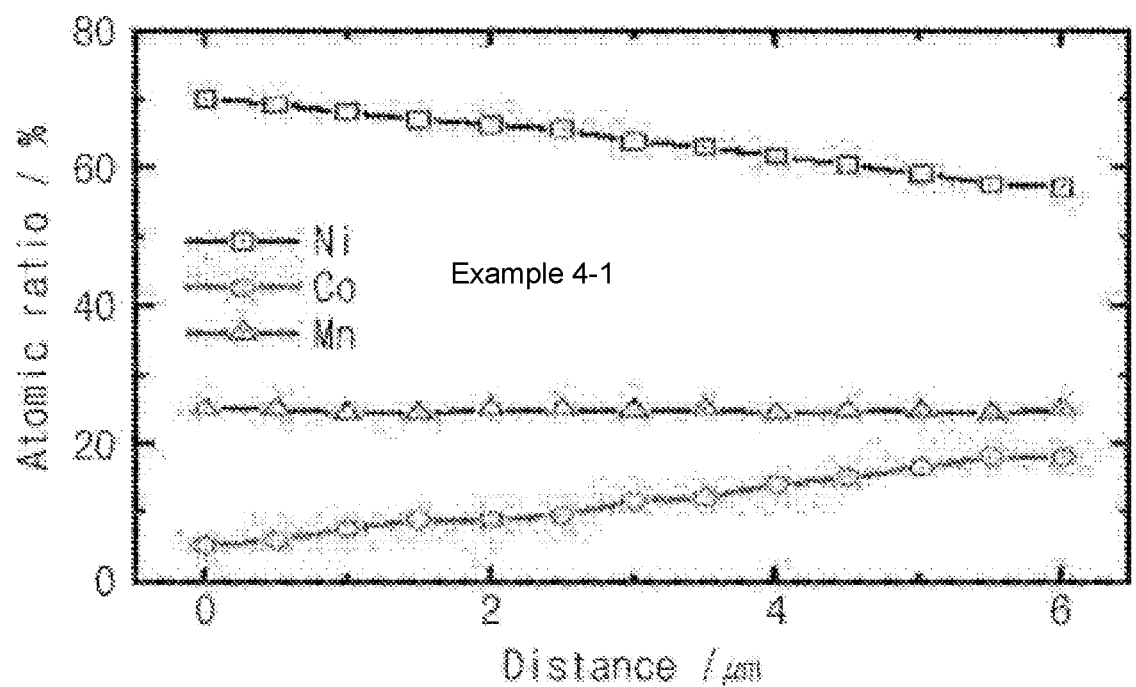

The concentrations of Ni, Mn, and Co depending on the distance from the center in the particles prepared in Example 4-1 and Comparative Example 4-1 were measured by EDX, and the results are illustrated in FIG. 83. From FIG. 83, it can be seen that the magnitude of the concentration gradient in the core portion and the concentration gradient portion is constant as the core portion and the concentration gradient portion have a concentration gradient, a shell portion that is continuous with respect to the core portion and the concentration gradient portion and has constant concentrations of nickel, manganese, and cobalt is formed, and the functional relation of the concentration to the distance is linear in the core portion and the concentration gradient portion in the case of the particles according to Example of the inventive concept.

Experimental Example: Taking of SEM Image

Figure 84:
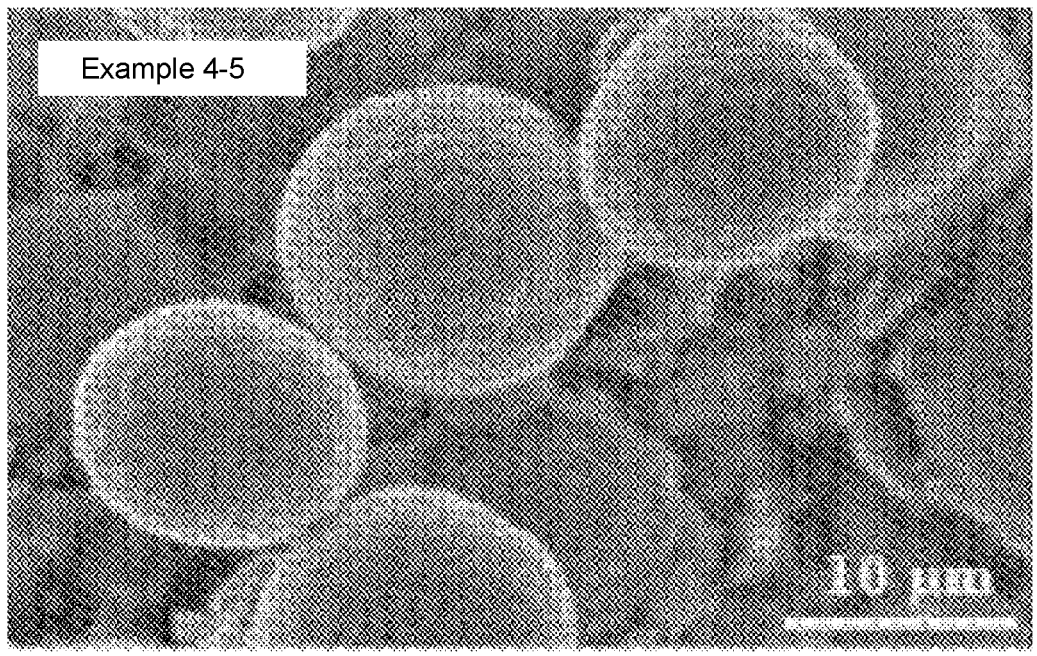
FIG. 84 illustrates SEM images of the particles prepared according to an embodiment of the inventive concept and Comparative Example.
Figure 84:
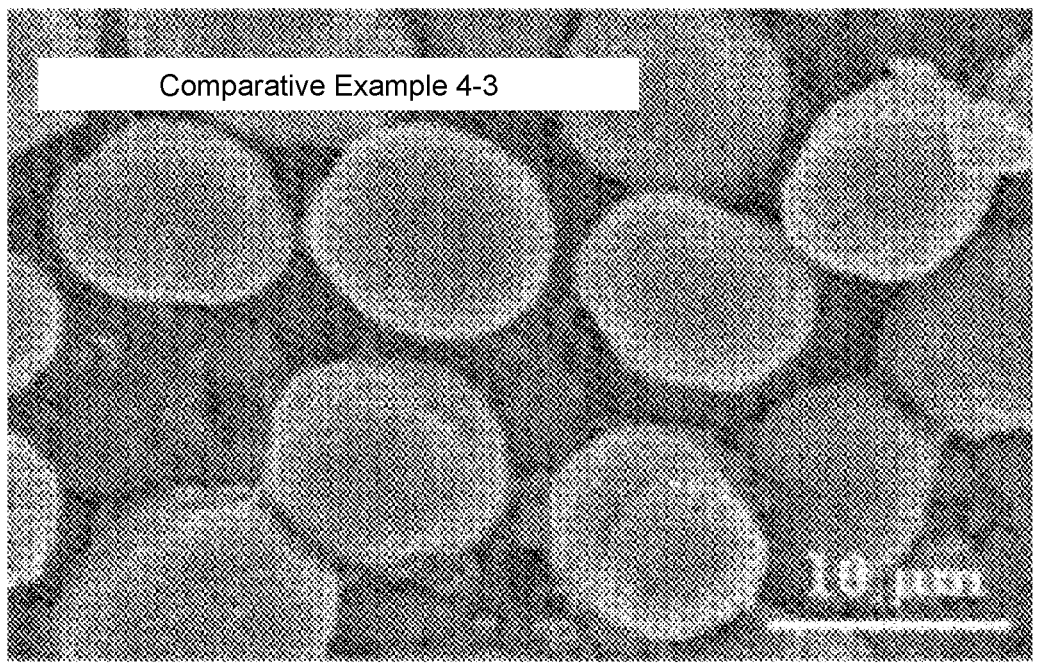

The images of the particles prepared in Example 4-5 and Comparative Example 1-3 were taken using a SEM, and the results are illustrated in FIG. 84.

<Experimental Example> Measurement of Residual Lithium

Into 100 ml of distilled water, 10 g of the active material particles prepared in Example 1-1 and Comparative Example 1-1 were added, respectively, stirred for 10 minutes, then filtered, and subjected to the titration with 10% hydrochloric acid, thereby determining the amount of residual lithium. The amounts of LiOH and $Li_2CO_3$ measured are as presented in the following Table 7.

TABLE 7

|  | Residual LiOH | $Li_2CO_3$ | Sum |
|---|---|---|---|
| Example 4-1 | 4728 | 2101 | 6829 |
| Comparative Example 4-1 | 5728 | 2733 | 8461 |

Figure 85:
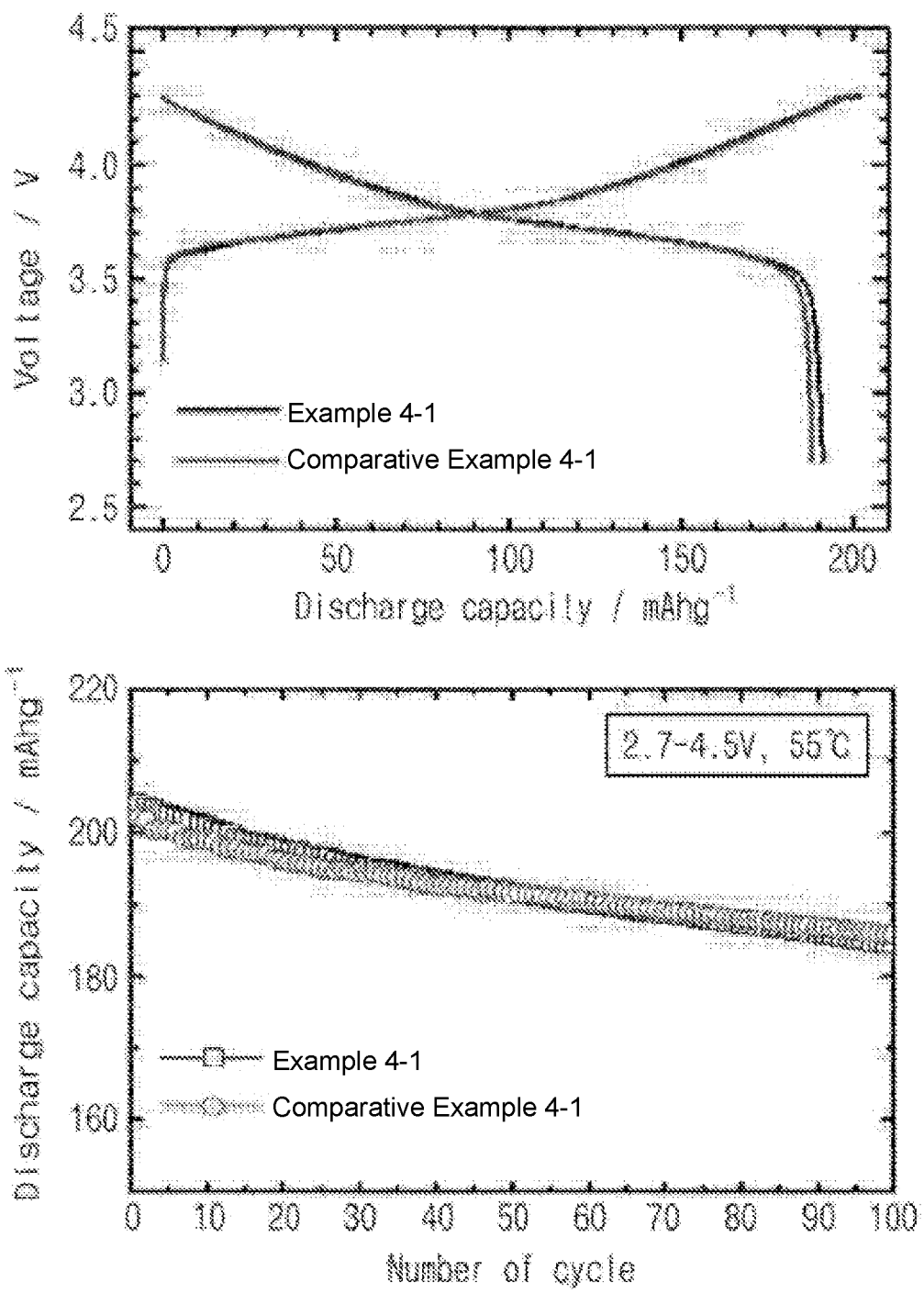
FIGS. 85A, 85B, 86A, 86B and 86C, illustrate the measurement results on charge and discharge characteristics, cycle-life characteristics, and DSC characteristics of the batteries containing the active materials prepared according to an embodiment of the inventive concept and Comparative Example, respectively.
Figure 86:
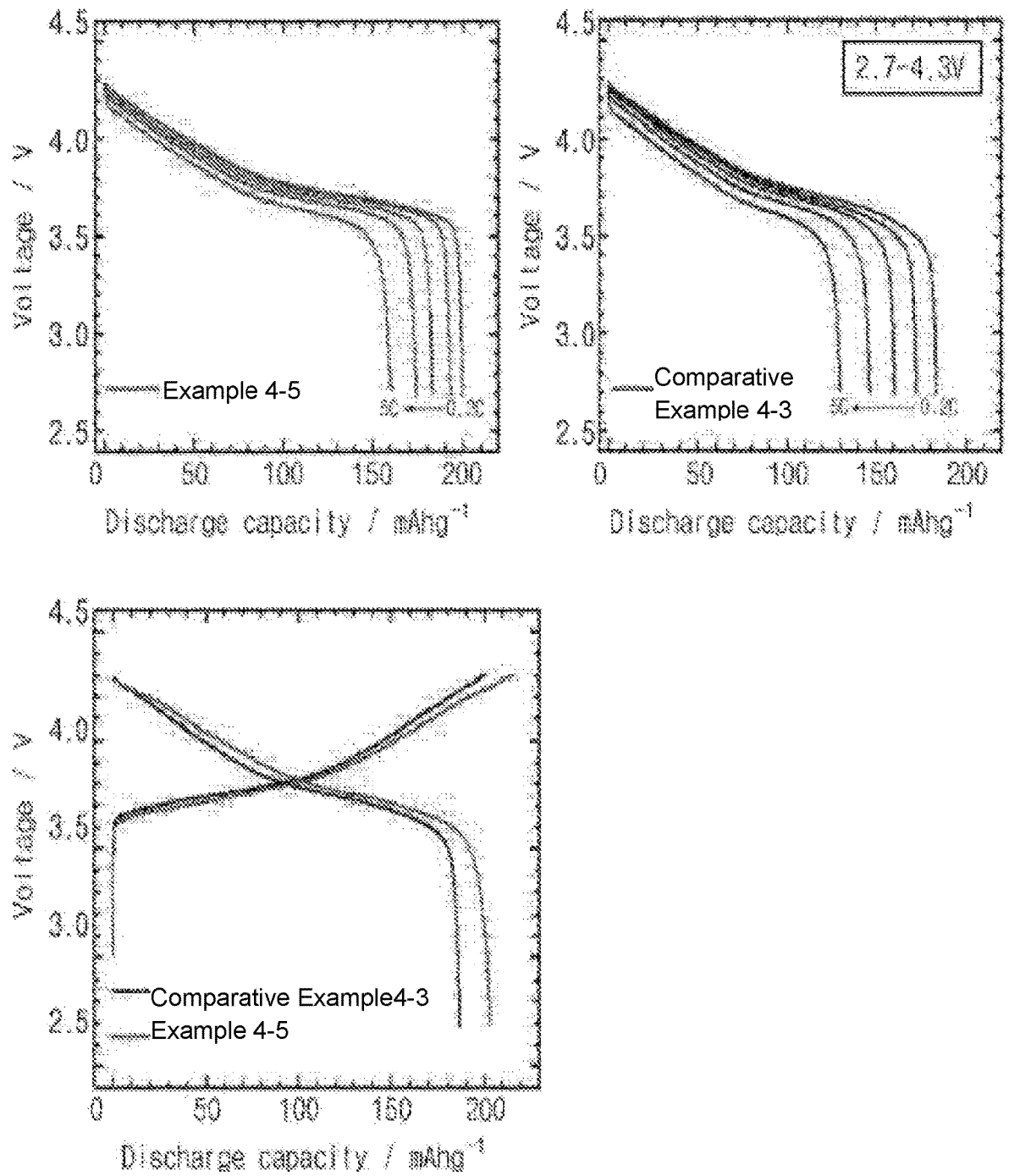

<Experimental Example> Measurement of Charge and Discharge Characteristics, Cycle-Life Characteristics, and DSC The charge and discharge characteristics, cycle-life characteristics, and DSC characteristics of the batteries containing the active materials prepared in Examples 4-1 to 4-6 and Comparative Examples 4-1 to 4-3 were measured, and the results are presented in the following Table 8 and illustrated in FIGS. 85 and 86.

TABLE 8

|  | Discharge capacity | Cycle-life characteristics ($100^{th}$) | DSC |
|---|---|---|---|
| Example 4-1 | 189 mAh/g | 95.2% | 288° C. |
| Example 4-2 | 184 mAh/g | 96.2% | 298° C. |
| Example 4-3 | 190 mAh/g | 96.0% | 289° C. |
| Example 4-4 | 195 mAh/g | 96.1% | 288° C. |
| Example 4-5 | 203 mAh/g | 94.3% | 266° C. |
| Example 4-6 | 196 mAh/g | 95.2% | 286° C. |
| Comparative Example 4-1 | 191 mAh/g | 96.7% | 273° C. |
| Comparative Example 4-2 | 176 mAh/g | 89.2% | 267° C. |
| Comparative Example 4-3 | 186 mAh/g | 90.4% | 272° C. |

Examples 4-7 to 4-10

Into a coprecipitation reactor (volume: 16 L, output of rotary motor: 80 W or more), 2.5 L of distilled water was introduced, $N_2$ gas was then supplied thereto at a rate of 2 L/min, and the distilled water was stirred at 400 rpm while maintaining the temperature of the reactor at 45° C.

A first aqueous metal solution and a second aqueous metal solution were prepared by mixing nickel sulfate, cobalt sulfate, and manganese sulfate so as to have a composition of $Ni_{x1}Co_{y1}Mn_{z1}OH_2$ (X1, Y1, Z1) and a composition of $Ni_{x2}Co_{y2}Mn_{z2}OH_2$ (x2, y2, z2), respectively, the first aqueous metal solution and the second aqueous metal solution were continuously introduced into the reactor at 0.7 L/hr while mixing them and changing the mixing ratio thereof, and an ammonia solution having a concentration of 25 mol was also continuously introduced into the reactor at 0.07 L/hr, thereby forming the core portion and the concentration gradient portion which had a concentration gradient. In addition, a sodium hydroxide solution having a concentration of 5 mol was supplied into the reactor in order to adjust the pH so that the pH was maintained at 11.5. The speed of impeller was controlled at 400 rpm.

Thereafter, a third aqueous metal solution prepared by mixing nickel sulfate, cobalt sulfate, and manganese sulfate so as to have a constant composition of $Ni_{x3}Co_{y3}Mn_{z3}OH_2$ was supplied into the reactor to form the shell portion in which the concentrations of nickel, manganese, and cobalt were constant but different from those at the outermost part of the core portion and the concentration gradient portion, thereby producing a composite metal hydroxide.

The concentrations of the aqueous metal solutions in Examples 4-7 to 4-10 are as presented in the following Table 9.

TABLE 9

| | First aqueous metal solution | | | Second aqueous metal solution | | | Third aqueous metal solution | | | Thickness of shell portion |
|---|---|---|---|---|---|---|---|---|---|---|
| | Ni | Co | Mn | Ni | Co | Mn | Ni | Co | Mn | |
| Example 4-7 | 85 | 6 | 9 | 62 | 13 | 25 | 48 | 20 | 32 | 0.5 μm |
| Example 4-8 | 85 | 6 | 9 | 62 | 13 | 25 | 48 | 20 | 32 | 1.0 μm |
| Example 4-9 | 90 | 5 | 5 | 65 | 10 | 25 | 40 | 30 | 30 | 0.3 μm |
| Example 4-10 | 90 | 5 | 5 | 65 | 10 | 25 | 50 | 20 | 30 | 0.3 μm |

The composite metal hydroxide thus prepared was filtered, washed with water, and then dried for 12 hours in a hot air dryer at 110° C. The composite metal hydroxide and lithium hydroxide (LiOH) were mixed at a molar ratio of 1:1, the mixture was subjected to the preliminary firing by heating at a temperature rise rate of 2° C./min and then maintaining at 450° C. for 10 hours and then fired at from 700 to 900° C. for 10 hours, thereby obtaining a positive electrode active material powder.

Comparative Examples 4-4 and 4-5

In Comparative Example 4-4, positive electrode active material particles were prepared in the same manner as in Example 4-7 except that the shell portion was not formed.
In Comparative Example 4-5, positive electrode active material particles were prepared in the same manner as in Example 4-9 except that the shell portion was not formed.

<Experimental Example> Taking of EDX Image

Figure 87:
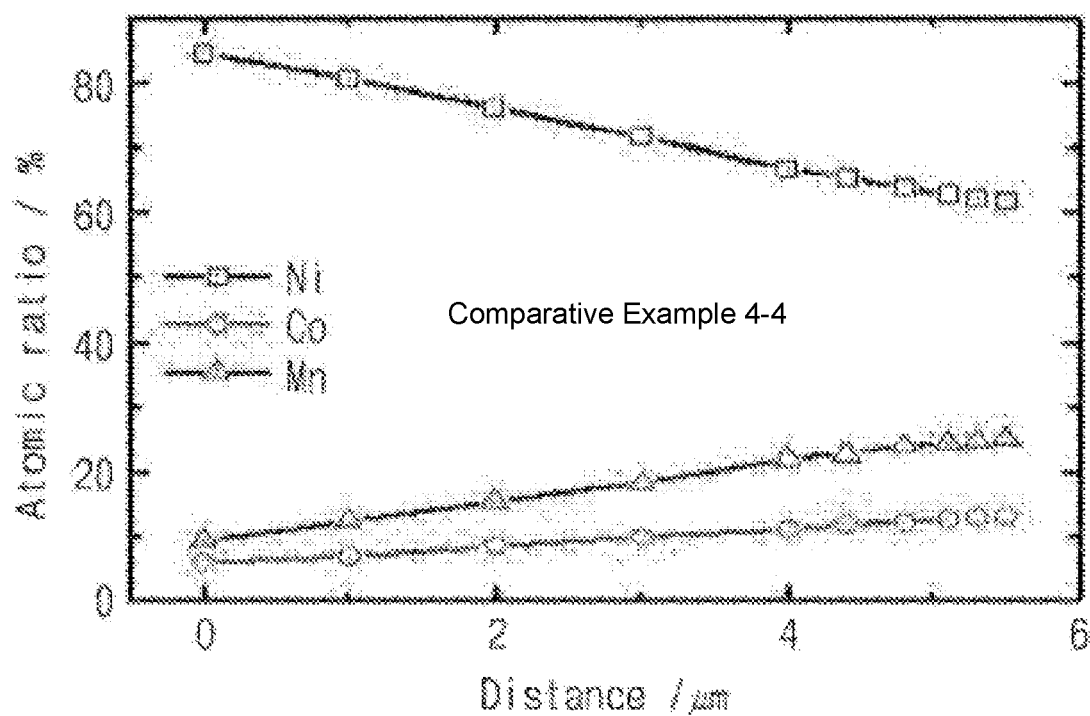
FIGS. 87A, and 87B illustrate: the concentrations of Ni, Mn, Co depending on the distance from the center in the particles prepared according to an embodiment of the inventive concept and Comparative Example, which are measured by EDX.
Figure 87:
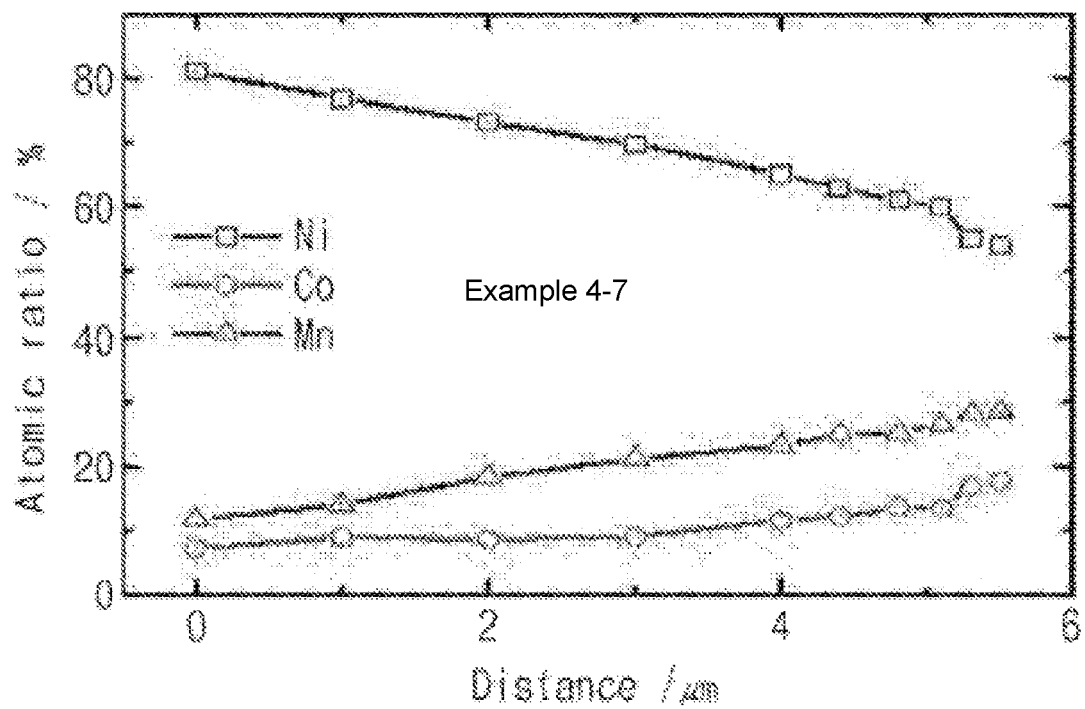

The concentrations of Ni, Mn, and Co depending on the distance from the center in the particles prepared in Example 4-7 and Comparative Example 4-4 were measured by EDX, and the results are illustrated in FIG. 87.

From FIG. 87, it can be seen that the magnitude of the concentration gradient in the core portion and the concentration gradient portion is constant as a shell portion having constant concentrations of nickel, manganese, and cobalt that is formed on the outside of the core portion having a concentration gradient and the functional relation of the concentration to the distance is linear in the core portion and the concentration gradient portion in the case of the particles according to Example of the inventive concept.

<Experimental Example> Measurement of Charge and Discharge Characteristics, Cycle-Life Characteristics, and DSC The charge and discharge characteristics, cycle-life characteristics, and DSC characteristics of the batteries containing the active materials prepared in Examples 3-7 to 3-10 and Comparative Examples 4-4 and 4-5 were measured, and the results are presented in the following Table 10.

TABLE 10

| | Discharge capacity | Cycle-life characteristics (100$^{th}$) | DSC |
|---|---|---|---|
| Example 4-7 | 196 mAh/g | 96.3% | 289° C. |
| Example 4-8 | 192 mAh/g | 97.7% | 297° C. |
| Example 4-9 | 196 mAh/g | 96.3% | 289° C. |
| Example 4-10 | 192 mAh/g | 97.7% | 297° C. |
| Comparative Example 4-4 | 199 mAh/g | 94.3% | 271° C. |
| Comparative Example 4-5 | 204 mAh/g | 93.2% | 263° C. |

Figure 88:
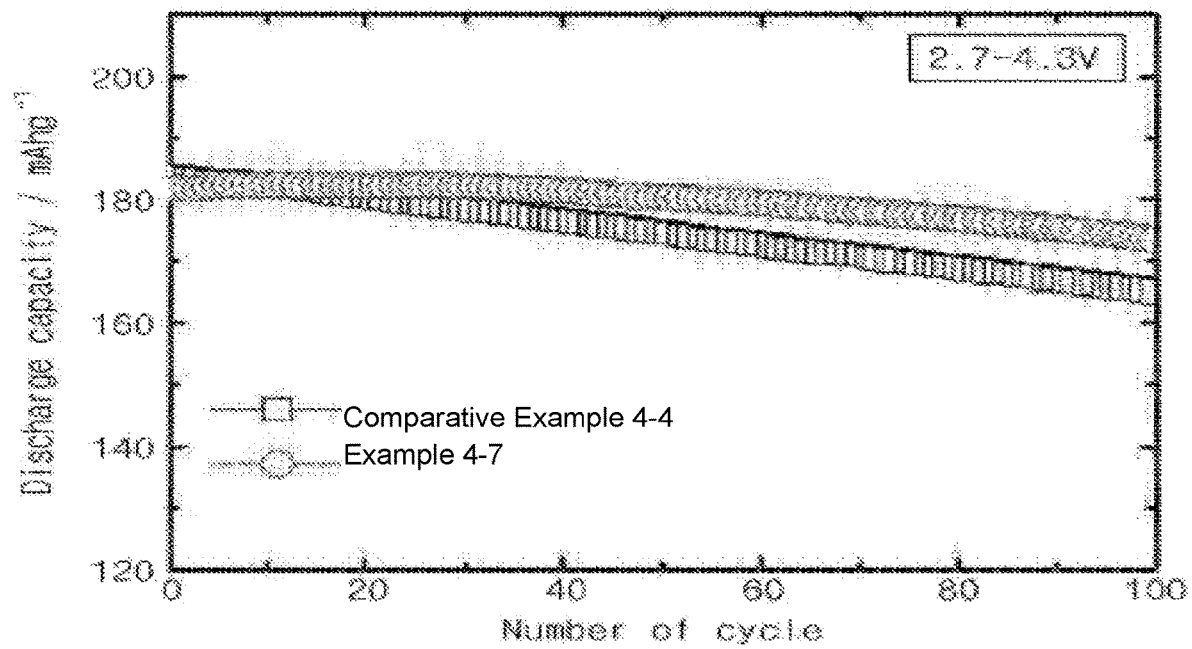
FIG. 88 illustrates the measurement results on charge and discharge characteristics of the batteries containing the active materials prepared according to an embodiment of the inventive concept and Comparative Example.

The charge and discharge characteristics of the batteries containing the active materials prepared in Example 4-7 and Comparative Example 4-4 were measured, and the results are illustrated in FIG. 88.

Examples 4-11 to 4-20

In order to produce particles having different magnitudes of concentration gradient in the core portion and the concentration gradient portion, first, a first aqueous metal solution and a second aqueous metal solution were prepared by mixing nickel sulfate, cobalt sulfate, and manganese sulfate so as to have a composition of $Ni_{x1}Co_{y1}Mn_{z1}OH_2$ (X1, Y1, Z1) and a composition of $Ni_{x2}Co_{y2}Mn_{z2}OH_2$ (x2, y2, z2), respectively, the first aqueous metal solution and the second aqueous metal solution were continuously introduced into the reactor at 0.7 L/hr while mixing them and changing the mixing ratio thereof, and an ammonia solution having a concentration of 25 mol was also continuously introduced into the reactor at 0.07 L/hr, thereby forming the core portion having a first magnitude of concentration gradient.

Thereafter, a third aqueous metal solution was prepared by mixing nickel sulfate, cobalt sulfate, and manganese sulfate so as to have a constant composition of $Ni_{x3}Co_{y3}Mn_{z3}OH_2$, the third aqueous metal solution and the second aqueous metal solution were continuously introduced into the reactor at 0.7 L/hr while mixing them and changing the mixing ratio thereof, and an ammonia solution having a concentration of 25 mol was also continuously introduced into the reactor at 0.07 L/hr, thereby forming the concentration gradient portion having a second magnitude of concentration gradient.

Thereafter, only the third aqueous metal solution prepared by mixing nickel sulfate, cobalt sulfate, and manganese sulfate so as to have a constant composition of $Ni_{x3}Co_{y3}Mn_{z3}OH_2$ was supplied into the reactor to form the shell portion in which the concentrations of nickel, manganese, and cobalt were constant and the same as those at the outermost part of the concentration gradient portion having a second magnitude of concentration gradient. The concentrations of the aqueous metal solutions thus prepared in Examples 4-11 to 4-20 are as presented in the following Table 11.

TABLE 11

| | First aqueous metal solution | | | Second aqueous metal solution | | | Third aqueous metal solution | | | Thickness of shell portion |
|---|---|---|---|---|---|---|---|---|---|---|
| | Ni | Co | Mn | Ni | Co | Mn | Ni | Co | Mn | |
| Example 4-11 | 85 | 6 | 9 | 62 | 13 | 25 | 48 | 20 | 32 | 0.3 μm |
| Example 4-12 | 85 | 6 | 9 | 62 | 13 | 25 | 48 | 20 | 32 | 0.5 μm |
| Example 4-13 | 90 | 5 | 5 | 65 | 10 | 25 | 40 | 30 | 30 | 0.5 μm |
| Example 4-14 | 90 | 5 | 5 | 65 | 10 | 25 | 50 | 20 | 30 | 0.2 μm |
| Example 4-15 | 85 | 1 | 14 | 76 | 9 | 15 | 64 | 11 | 25 | 0.3 μm |
| Example 4-16 | 90 | 1 | 9 | 80 | 8 | 12 | 65 | 10 | 25 | 0.5 μm |
| Example 4-17 | 95 | 1 | 4 | 84 | 7 | 9 | 66 | 9 | 25 | 0.4 μm |
| Example 4-18 | 95 | 2 | 3 | 77 | 7 | 16 | 63 | 11 | 26 | 0.5 μm |
| Example 4-19 | 98 | 1 | 1 | 95 | 2 | 3 | 65 | 10 | 25 | 0.3 μm |
| Example 4-20 | 95 | 2 | 3 | 85 | 5 | 10 | 55 | 18 | 27 | 0.5 μm |

The composite metal hydroxide thus prepared was filtered, washed with water, and then dried for 12 hours in a hot air dryer at 110° C. The composite metal hydroxide and lithium hydroxide (LiOH) were mixed at a molar ratio of 1:1, the mixture was subjected to the preliminary firing by heating at a temperature rise rate of 2° C./min and then maintaining at 450° C. for 10 hours and then fired at from 700 to 900° C. for 10 hours, thereby obtaining a positive electrode active material powder.

Comparative Examples 4-6 and 4-7

In Comparative Example 1-6, composite oxide particles having constant concentrations of nickel, manganese, and cobalt in the entire particle were prepared using an aqueous metal solution having a composition of $Ni_{80}Co_7Mn_{13}OH_2$ which corresponds to the average composition of Example 4-11.

In Comparative Example 4-7, particles of a composite oxide which was represented by $LiNi_{0.8}Co_{0.15}Al_{0.05}O_2$ and known to have a capacity of 200 mAh/g were used.

<Experimental Example> Taking of EDX Image

Figure 89:
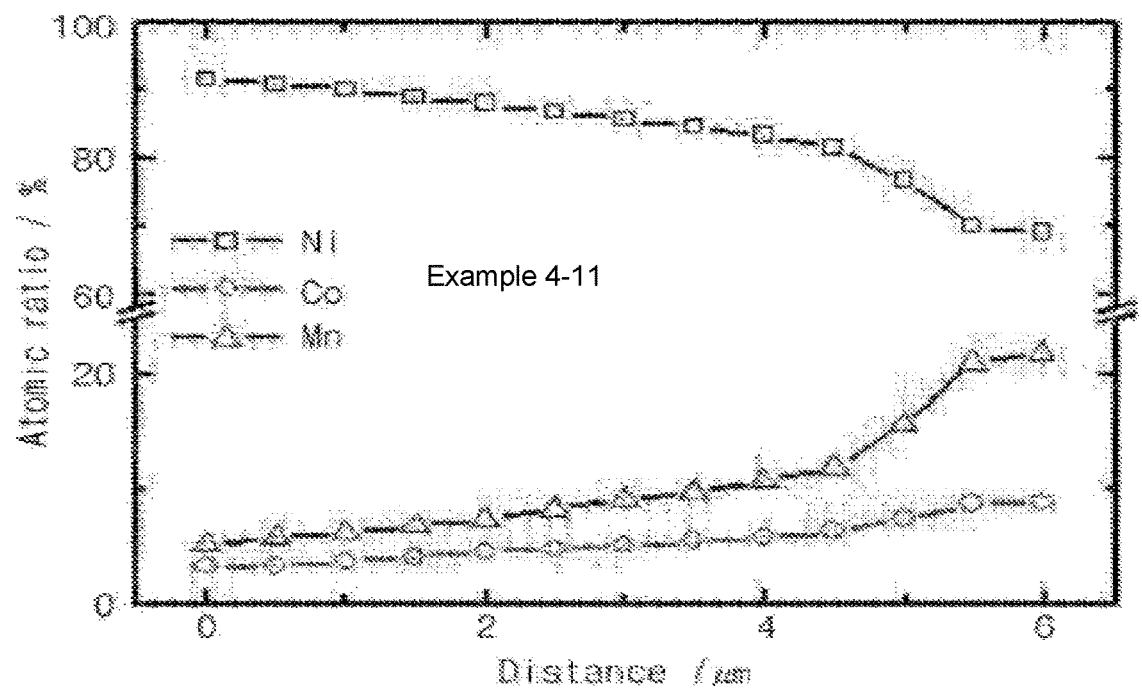
FIGS. 89 and 90 illustrate the concentrations of Ni, Mn, Co depending on the distance from the center in the particles prepared according to embodiments of the inventive concept, which are measured by EDX.

The concentrations of Ni, Mn, and Co depending on the distance from the center in the particles prepared in Example 4-11 were measured by EDX, and the results are illustrated in FIG. 89. From FIG. 89, it can be seen that the concentration is linear with respect to the distance from the center, the magnitudes of the concentration gradient in the core portion and the concentration gradient portion are different from each other, and a shell portion having constant concentrations of nickel, manganese, and cobalt is formed on the outside of the concentration gradient portion in the case of the particles according to Example of the inventive concept.

Figure 90:
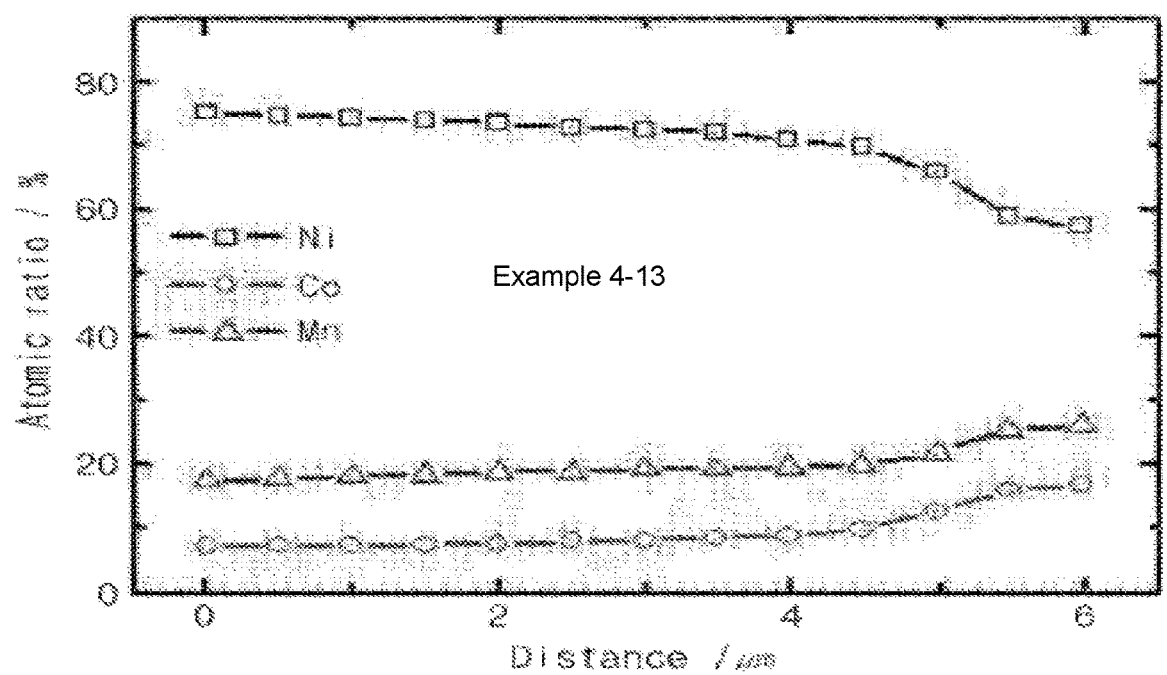

The concentrations of Ni, Mn, and Co depending on the distance from the center in the particles prepared in Example 4-13 were measured by EDX, and the results are illustrated in FIG. 90. From FIG. 90, it can be seen that the concentration to the distance from the center has two straight lines having different inclinations, the magnitudes of the concentration gradient in the core portion and the concentration gradient portion are different from each other, and a shell portion having constant concentrations of nickel, manganese, and cobalt is formed on the outside of the core portion and the concentration gradient portion in the case of the particles according to Example of the inventive concept.

<Experimental Example> Measurement of Charge and Discharge Characteristics, Cycle-Life Characteristics, and DSC The charge and discharge characteristics, cycle-life characteristics, and DSC characteristics of the batteries containing the active materials prepared in Examples 4-11 to 4-20 and Comparative Examples 4-6 and 4-7 were measured, and the results are presented in the following Table 12.

TABLE 12

| | Discharge capacity | Cycle-life characteristics ($100^{th}$) | DSC |
|---|---|---|---|
| Example 4-11 | 221 mAh/g | 94.9% | 250° C. |
| Example 4-12 | 211 mAh/g | 95.3% | 257° C. |
| Example 4-13 | 201 mAh/g | 96.6% | 280° C. |
| Example 4-14 | 205 mAh/g | 96.1% | 277° C. |
| Example 4-15 | 204 mAh/g | 94.3% | 274° C. |
| Example 4-16 | 212 mAh/g | 94.9% | 272° C. |
| Example 4-17 | 216 mAh/g | 94.2% | 268° C. |
| Example 4-18 | 207 mAh/g | 94.8% | 271° C. |
| Example 4-19 | 220 mAh/g | 92.3% | 256° C. |
| Example 4-20 | 209 mAh/g | 95.5% | 272° C. |
| Comparative Example 4-6 | 203 mAh/g | 79.2% | 233° C. |
| Comparative Example 4-7 | 198 mAh/g | 90.8% | 221° C. |

Figure 91:
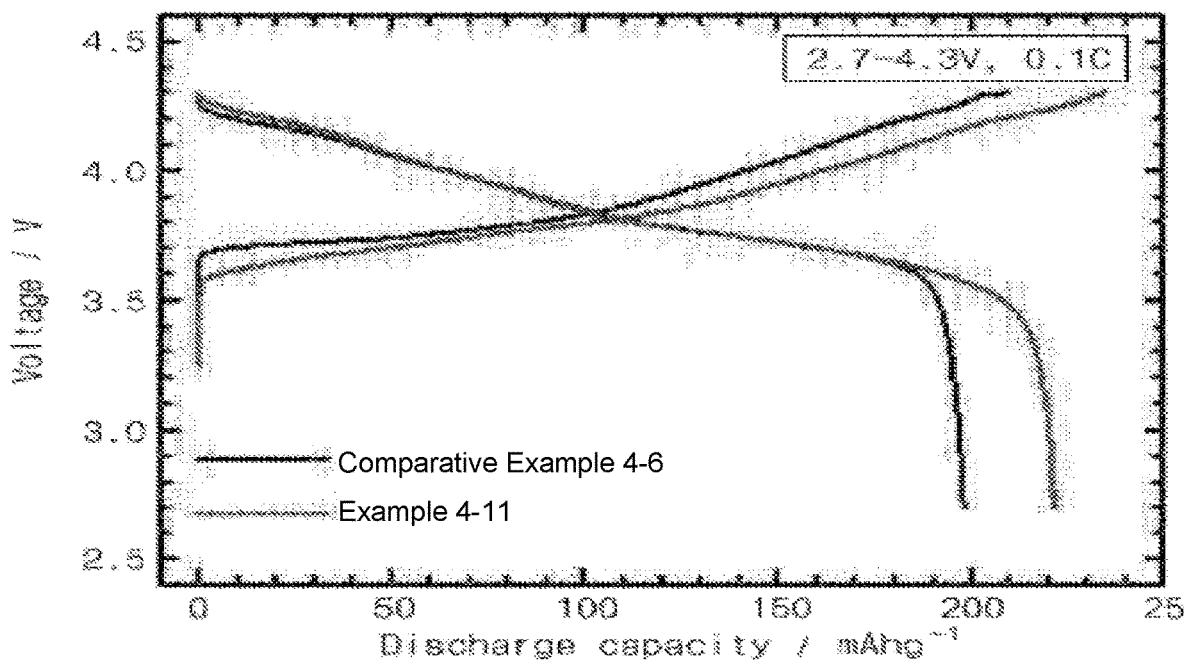
FIGS. 91 to 93 illustrate the measurement results on charge and discharge characteristics, cycle-life characteristics, and DSC characteristics of the particles prepared according to an embodiment of the inventive concept and Comparative Example, respectively.
Figure 92:
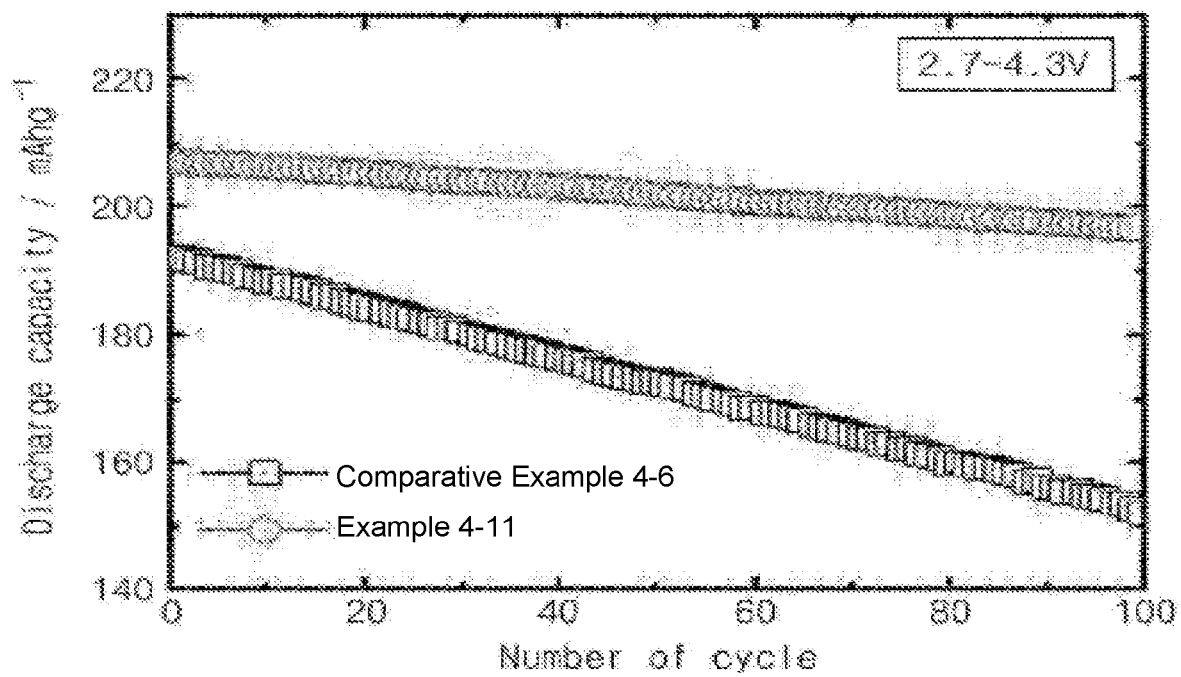
Figure 93:
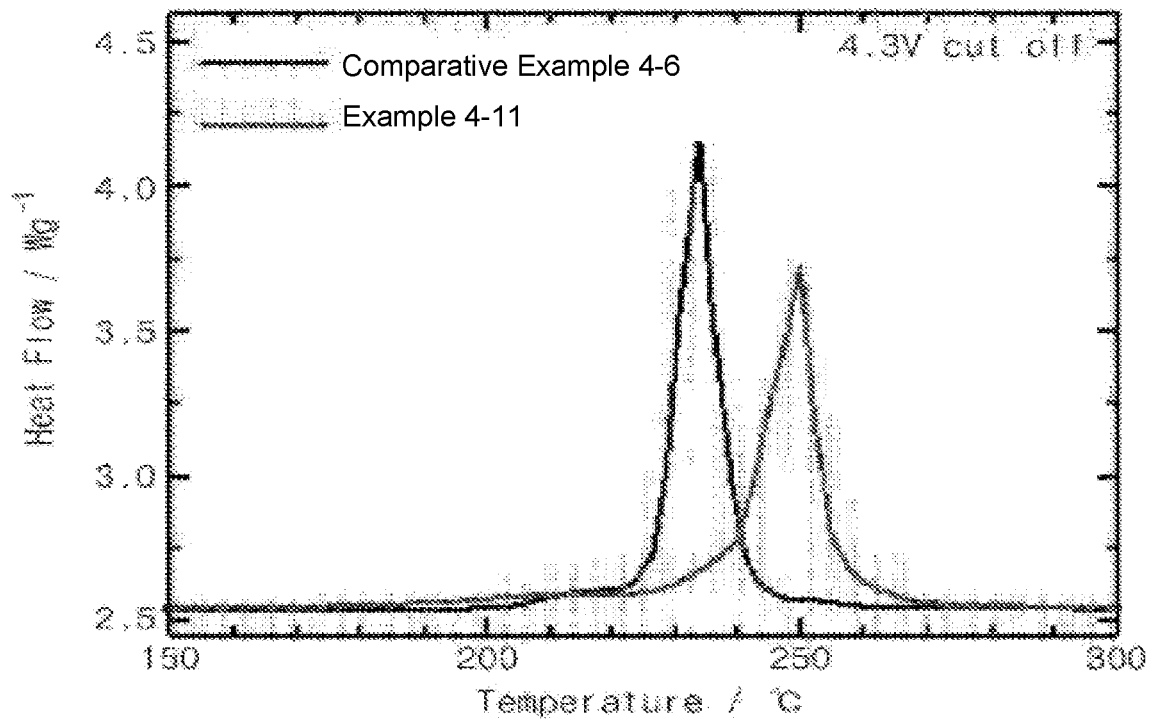

The charge and discharge characteristics, cycle-life characteristics, and DSC characteristics of the particles prepared in Example 4-11 and Comparative Example 4-6 were measured, and the results are illustrated in FIGS. 91 to 93, respectively.

From FIGS. 91 to 93, it has been confirmed that the average composition of the particles in Example 4-11 is the same as the composition of the particles in Comparative Example 1-6, but the charge and discharge characteristics, cycle-life characteristics, and thermal stability are greatly improved in Example 4-11 since the particles in Example 4-11 includes the core portion, and the concentration gradient portion, and the shell portion which has constant concentrations of nickel, manganese, and cobalt and is formed on the outside of the core portion.

Figure 94:
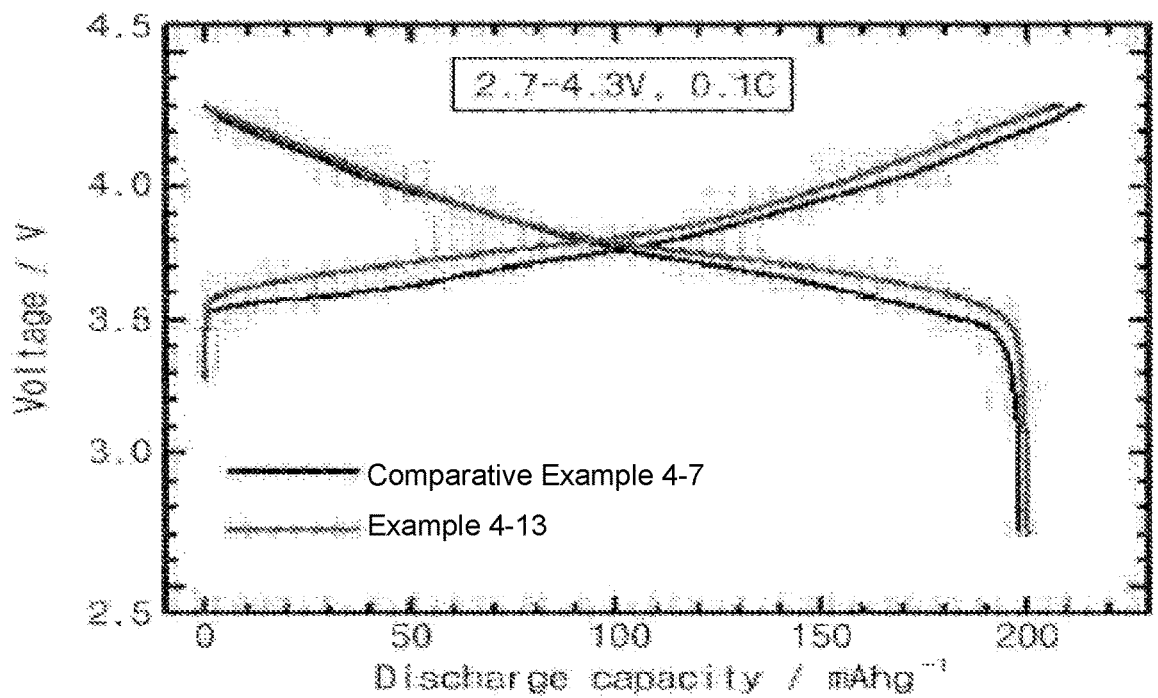
FIGS. 94 to 96 illustrate the measurement results on charge and discharge characteristics, cycle-life characteristics, and DSC characteristics of the particles prepared according to an embodiment of the inventive concept and Comparative Example, respectively.
Figure 95:
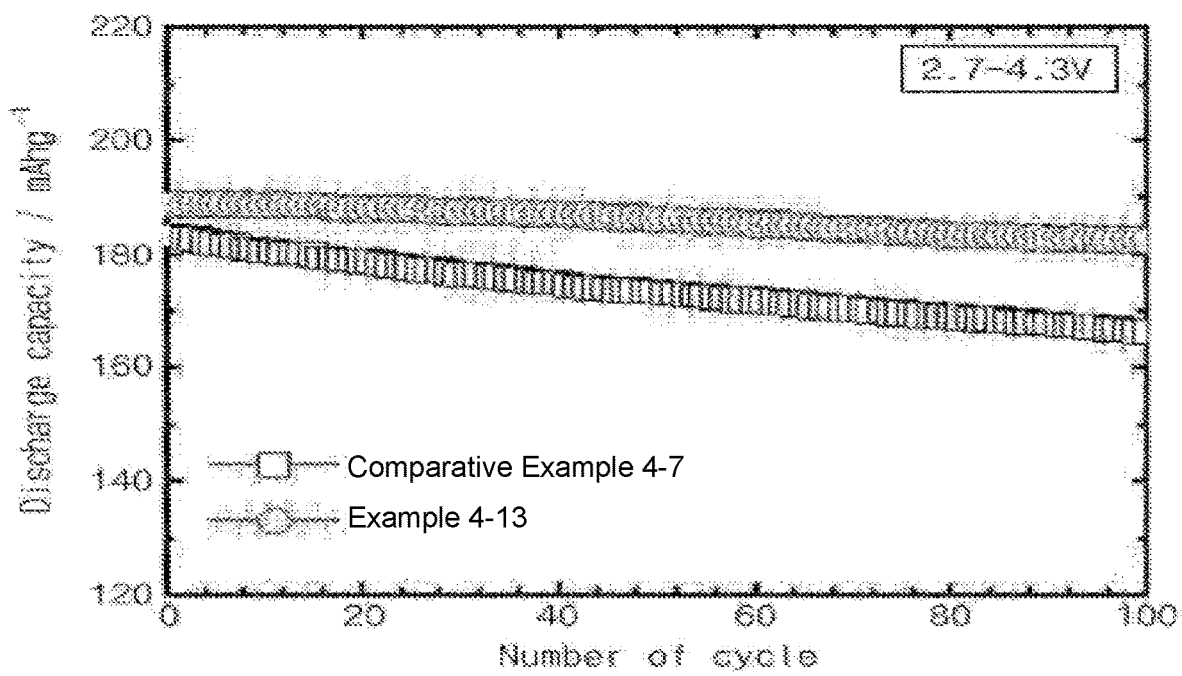
Figure 96:
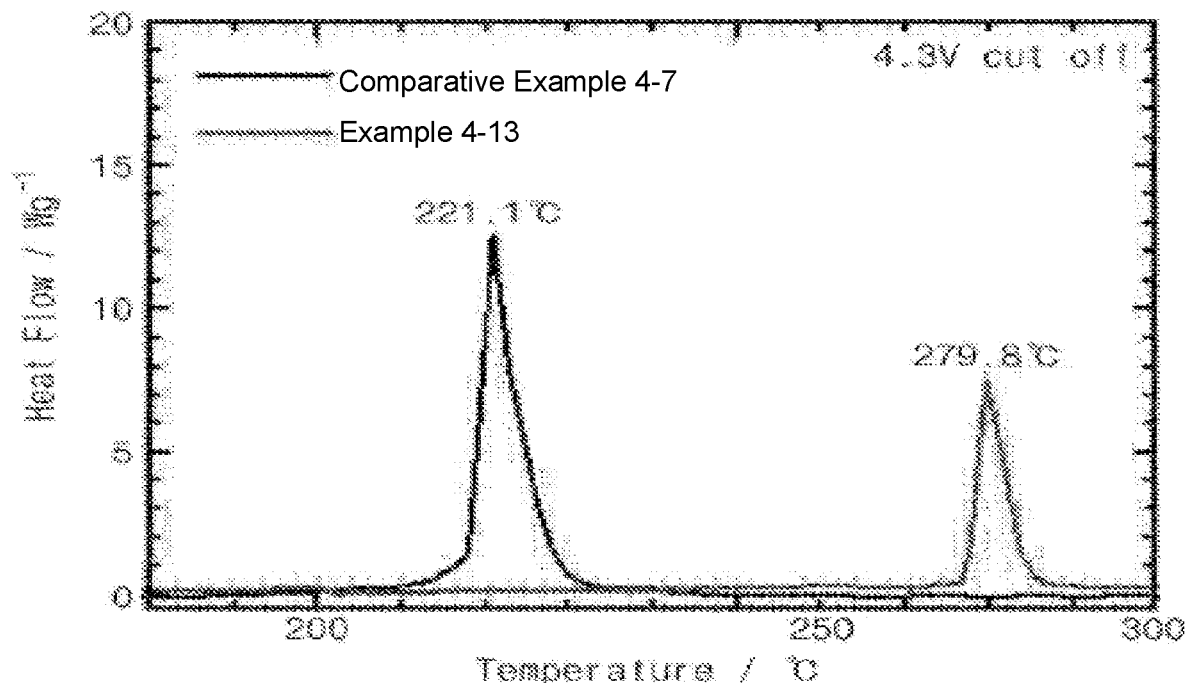

The charge and discharge characteristics, cycle-life characteristics, and DSC characteristics of the particles prepared in Example 4-13 and Comparative Example 4-7 were measured, and the results are illustrated in FIGS. 94 to 96, respectively. From FIGS. 94 to 96, it has been confirmed that the average composition of the particles in Example 4-13 is the same as the composition of the particles in Comparative Example 4-7, but the charge and discharge characteristics, cycle-life characteristics, and DSC characteristics are greatly improved in Example 4-13 as compared to those in Comparative Example 4-7 since the particles in Example 4-13 includes the core portion, and the concentration gradient portion, and the shell portion.

Examples 4-21 to 4-28

In order to produce particles having different magnitudes of concentration gradient in the core portion and the concentration gradient portion, first, a first aqueous metal solution and a second aqueous metal solution were prepared by mixing nickel sulfate, cobalt sulfate, and manganese sulfate so as to have a composition of $Ni_{x1}Co_{y1}Mn_{z1}OH_2$ (X1, Y1, Z1) and a composition of $Ni_{x2}Co_{y2}Mn_{z2}OH_2$ (x2, y2, z2), respectively, the first aqueous metal solution and the second aqueous metal solution were continuously introduced into the reactor at 0.7 L/hr while mixing them and changing the mixing ratio thereof, and an ammonia solution having a concentration of 25 mol was also continuously introduced into the reactor at 0.07 L/hr, thereby forming the core portion having a first concentration gradient.

Thereafter, a third aqueous metal solution prepared by mixing nickel sulfate, cobalt sulfate, and manganese sulfate so as to have a constant composition of $Ni_{x3}Co_{y3}Mn_{z3}OH_2$ and the second aqueous metal solution were continuously introduced into the reactor at 0.7 L/hr while mixing them and changing the mixing ratio thereof, and an ammonia solution having a concentration of 25 mol was also continuously introduced into the reactor at 0.07 L/hr, thereby forming the concentration gradient portion having a second concentration gradient.

Thereafter, only a fourth aqueous metal solution prepared by mixing nickel sulfate, cobalt sulfate, and manganese sulfate so as to have a constant composition of $Ni_{x4}Co_{y4}Mn_{z4}OH_2$ was supplied into the reactor to form the shell portion having constant concentrations of nickel, manganese, and cobalt.

The concentrations of the aqueous metal solutions thus prepared in Examples 4-21 to 4-28 are as presented in the following Table 13.

The composite metal hydroxide thus prepared was filtered, washed with water, and then dried for 12 hours in a hot air dryer at 110° C. The composite metal hydroxide and lithium hydroxide (LiOH) were mixed at a molar ratio of 1:1, the mixture was subjected to the preliminary firing by heating at a temperature rise rate of 2° C./min and then maintaining at 450° C. for 10 hours and then fired at from 700 to 900° C. for 10 hours, thereby obtaining a positive electrode active material powder.

Comparative Example 4-8

In Comparative Example 1-8, composite oxide particles having constant concentrations of nickel, manganese, and cobalt in the entire particle were prepared using an aqueous metal solution having a composition of $Ni_{76}Co_8Mn_{16}OH_2$ which corresponds to the average composition of Example 4-24.

<Experimental Example> Taking of EDX Image

Figure 97:
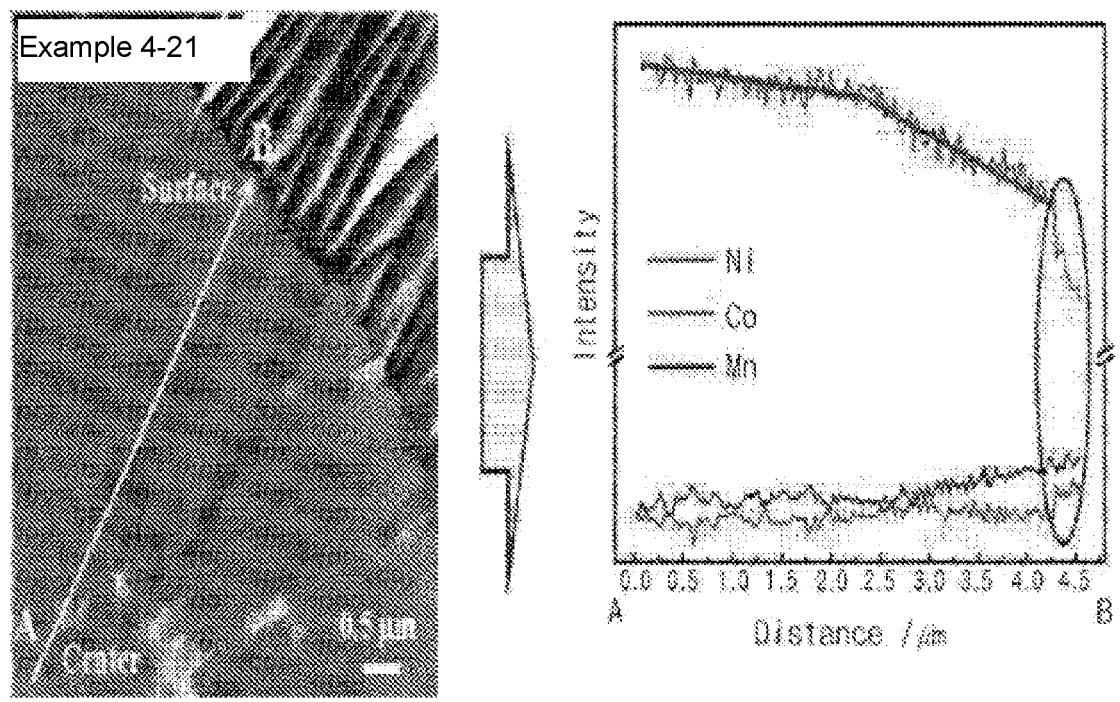
FIG. 97 illustrates the concentrations of Ni, Mn, Co depending on the distance from the center in the particles prepared according to an embodiment of the inventive concept, which are measured by EDX.

The image of the cross section of the particles prepared in Example 21 was taken using a TEM, and the concentrations of Ni, Mn, and Co depending on the distance from the center in the particles were measured by EDX, and the results are illustrated in FIG. 97.

From FIG. 97, it can be seen that the concentration is linear with respect to the distance from the center, the magnitudes of the concentration gradients of nickel, manganese, and cobalt in the core portion are constant, and the magnitudes of the concentration gradients are different in the concentration gradient portion, and the magnitudes of the concentration gradient in the core portion and the concentration gradient portion are two different from each other in the case of the particles according to Example of the inventive concept.

<Experimental Example> Measurement of Charge and Discharge Characteristics, Cycle-Life Characteristics, and DSC The charge and discharge characteristics, cycle-life characteristics, and DSC characteristics of the batteries containing the active materials prepared in Examples 4-21 to 4-28 and Comparative Examples 4-6 and 4-8 were measured, and the results are presented in the following Table 14.

TABLE 13

|  | First aqueous metal solution | | | Second aqueous metal solution | | | Third aqueous metal solution | | | Fourth aqueous metal solution | | | Thickness of shell portion |
| --- | --- | --- | --- | --- | --- | --- | --- | --- | --- | --- | --- | --- | --- |
|  | Ni | Co | Mn | Ni | Co | Mn | Ni | Co | Mn | Ni | Co | Mn |  |
| Example 4-21 | 95 | 2 | 3 | 90 | 4 | 6 | 67 | 9 | 24 | 60 | 15 | 25 | 0.3 μm |
| Example 4-22 | 95 | 2 | 3 | 85 | 5 | 10 | 67 | 11 | 22 | 60 | 13 | 27 | 0.4 μm |
| Example 4-23 | 96 | 2 | 2 | 91 | 4 | 5 | 70 | 10 | 20 | 63 | 12 | 25 | 0.5 μm |
| Example 4-24 | 95 | 2 | 3 | 90 | 4 | 6 | 67 | 9 | 24 | 56 | 17 | 27 | 0.2 μm |
| Example 4-25 | 96 | 2 | 2 | 85 | 5 | 10 | 67 | 11 | 22 | 55 | 15 | 30 | 0.3 μm |
| Example 4-26 | 95 | 2 | 3 | 90 | 4 | 6 | 75 | 8 | 17 | 57 | 16 | 27 | 0.5 μm |
| Example 4-27 | 96 | 2 | 2 | 91 | 3 | 6 | 80 | 7 | 13 | 57 | 16 | 27 | 0.4 μm |
| Example 4-28 | 85 | 5 | 10 | 80 | 7 | 13 | 55 | 15 | 30 | 45 | 20 | 35 | 0.5 μm |

TABLE 14

|  | Discharge capacity | Cycle-life characteristics (100$^{th}$) | DSC |
| --- | --- | --- | --- |
| Example 4-21 | 220 mAh/g | 95.9% | 260° C. |
| Example 4-22 | 215 mAh/g | 95.2% | 262° C. |
| Example 4-23 | 223 mAh/g | 93.7% | 257° C. |
| Example 4-24 | 212 mAh/g | 96.2% | 270° C. |
| Example 4-25 | 211 mAh/g | 96.0% | 271° C. |
| Example 4-26 | 221 mAh/g | 93.9% | 263° C. |
| Example 4-27 | 225 mAh/g | 94.2% | 253° C. |
| Example 4-28 | 195 mAh/g | 97.8% | 291° C. |
| Comparative Example 4-6 | 203 mAh/g | 79.2% | 237° C. |
| Comparative Example 4-8 | 195 mAh/g | 82.5% | 233° C. |

Figure 98:
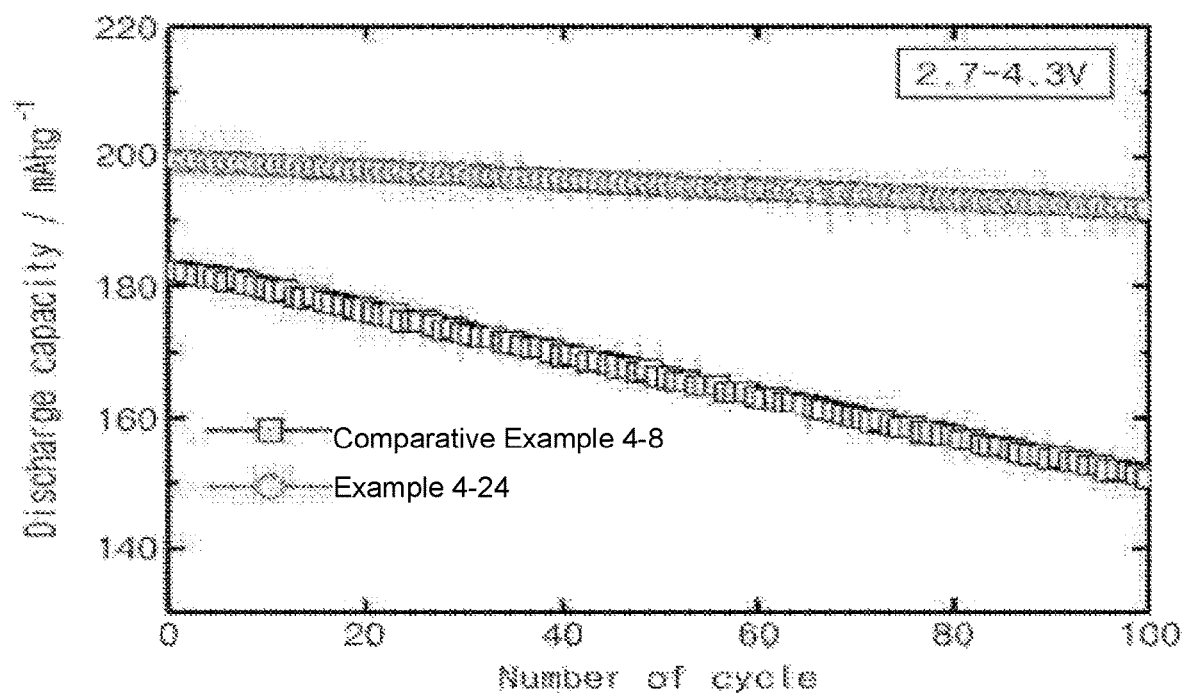
FIGS. 98 to 100 illustrate the measurement results on charge and discharge characteristics, cycle-life characteristics, and DSC characteristics of the particles prepared according to an embodiment of the inventive concept and Comparative Example, respectively.
Figure 99:
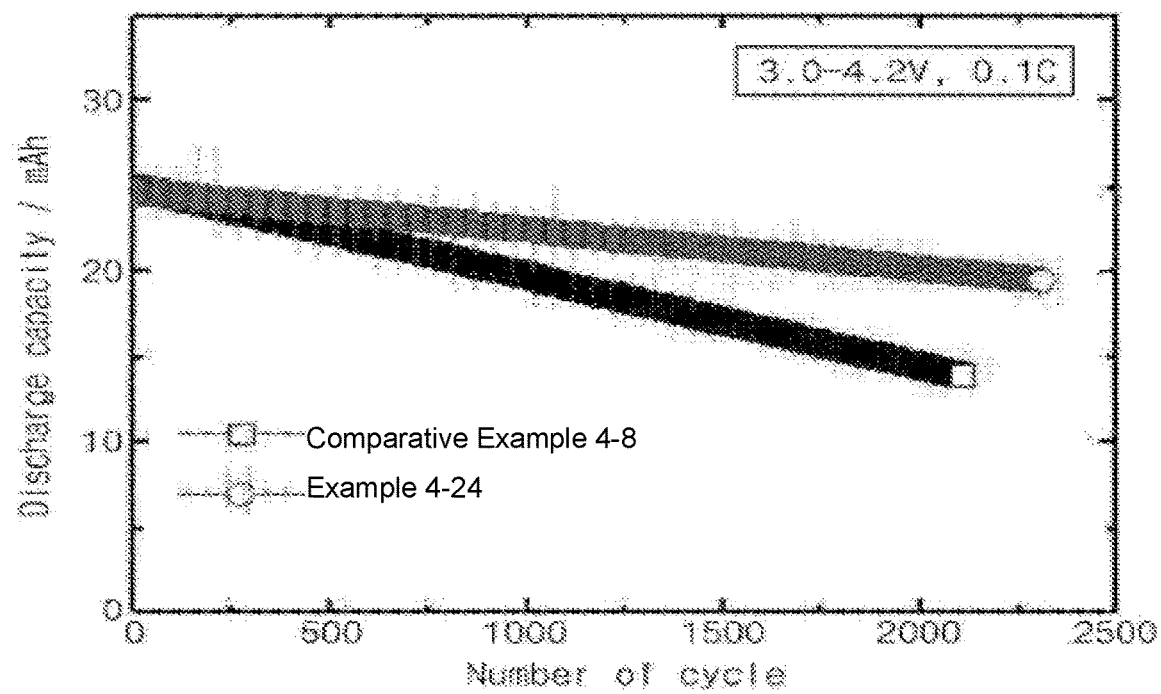
Figure 100:
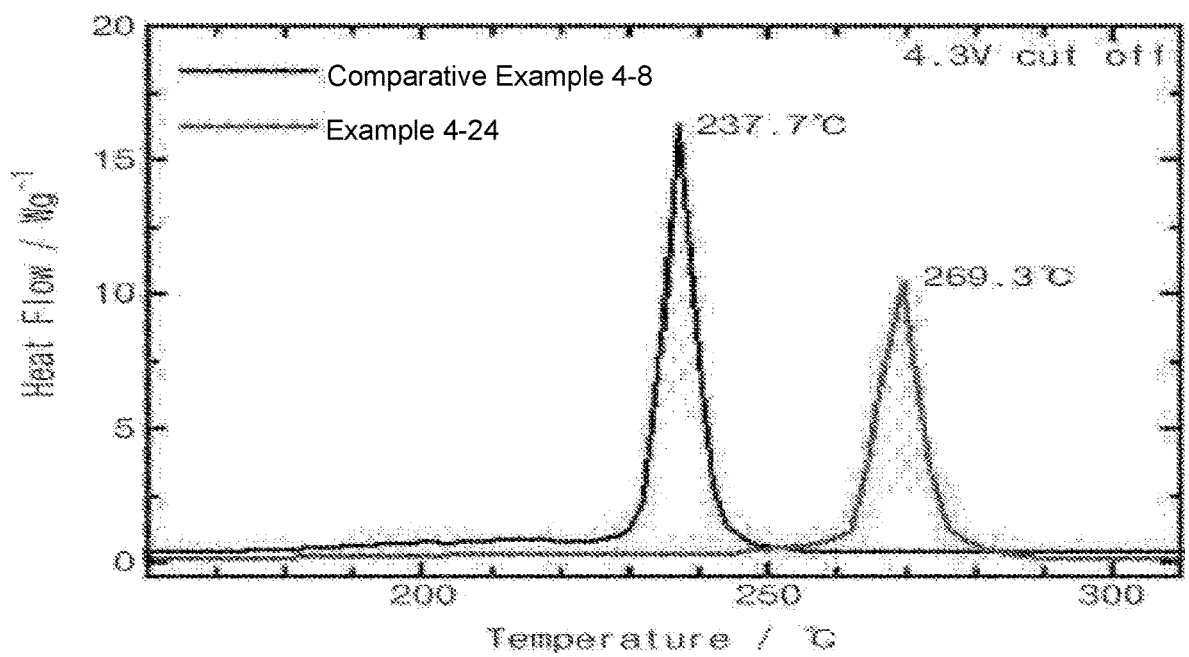

The charge and discharge characteristics, cycle-life characteristics, and DSC characteristics of the particles prepared in Example 4-24 and Comparative Example 4-8 were measured, and the results are illustrated in FIGS. 98 to 100, respectively.

From FIGS. 98 to 100, it has been confirmed that the average composition of the particles in Example 4-24 is the same as the composition of the particles in Comparative Example 4-8, but the charge and discharge characteristics, cycle-life characteristics, and DSC characteristics are greatly improved in Example 4-24 as compared to Comparative Example since the particles in Example 4-24 includes the core portion and the concentration gradient portion in which the concentrations of nickel, manganese, and cobalt have gradients and the shell portion in which the concentrations of nickel, manganese, and cobalt are constant.

<Experimental Example> Measurement of Residual Lithium

The amounts of residual LiOH and $Li_2CO_3$ in the particles prepared in Example 4-21 and Comparative Example 1-6 were measured, and the results are as presented in the following Table 15.

TABLE 15

|  | Residual LiOH | $Li_2CO_3$ | Sum |
| --- | --- | --- | --- |
| Example 4-21 | 5927 | 3950 | 9877 |
| Comparative Example 4-6 | 9469 | 11466 | 20935 |

<Experimental Example> Measurement of Tap Density and BET Surface Area

Figure 101:
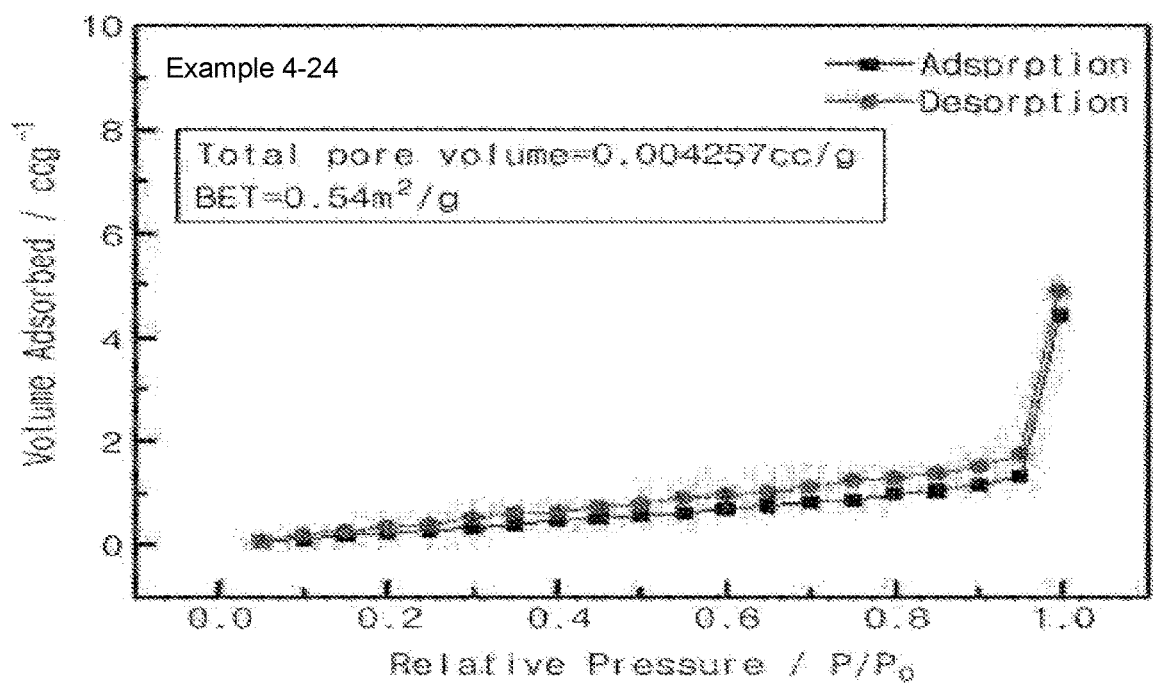
FIG. 101 illustrates the tap density and surface area by the BET method of the particles prepared according to an embodiment of the inventive concept and Comparative Example.

The tap density and surface area by the BET method of the particles prepared in Example 4-21 and Comparative Example 4-6 are as presented in the following Table 16 and illustrated in FIG. 101, respectively.

TABLE 16

|  | Tap density |
| --- | --- |
| Example 4-21 | 2.54 |
| Comparative Example 4-6 | 2.37 |

It can be seen that the tap density is greatly improved in the active material particles prepared in Example of the inventive concept as compared to Comparative Example.

Examples 5

Examples 5-1 to 5-4: Case Having Constant Concentration in Core Portion

Into a coprecipitation reactor (volume: 16 L, output of rotary motor: 80 W or more), 2.5 L of distilled water was introduced, $N_2$ gas was then supplied thereto at a rate of 2 L/min, and the distilled water was stirred at 400 rpm while maintaining the temperature of the reactor at 45° C.

A first aqueous metal solution was prepared by mixing nickel sulfate, cobalt sulfate, and manganese sulfate so as to have concentrations of $Ni_{x1}Co_{y1}Mn_{z1}OH_2$ (X1, Y1, Z1), the first aqueous metal solution was continuously introduced into the reactor at 0.7 L/hr, and an ammonia solution having a concentration of 25 mol was also continuously introduced into the reactor at 0.07 L/hr, thereby forming the inner core portion having constant concentrations of nickel, manganese, and cobalt.

A second aqueous metal solution was prepared so as to have a composition of $Ni_{x2}Co_{y2}Mn_{z2}OH_2$ (x2, y2, z2), the first aqueous metal solution and the second aqueous metal solution were continuously introduced into the reactor at 0.7 L/hr while mixing them and changing the mixing ratio thereof, and an ammonia solution having a concentration of 25 mol was also continuously introduced into the reactor at 0.07 L/hr, thereby forming the first concentration gradient portion having a concentration gradient. In addition, a sodium hydroxide solution having a concentration of 5 mol was supplied into the reactor in order to adjust the pH so that the pH was maintained at 11.5. The speed of impeller was controlled at 400 rpm.

Thereafter, a third aqueous metal solution was prepared by mixing nickel sulfate, cobalt sulfate, and manganese sulfate so as to have a constant composition of $Ni_{x3}Co_{y3}Mn_{z3}OH_2$, and the third aqueous metal solution and the second aqueous metal solution were continuously introduced into the reactor at 0.7 L/hr while mixing them and changing the mixing ratio thereof, and an ammonia solution having a concentration of 25 mol was also continuously introduced into the reactor at 0.07 L/hr, thereby forming the second concentration gradient portion having a concentration gradient. In addition, a sodium hydroxide solution having a concentration of 5 mol was supplied into the reactor in order to adjust the pH so that the pH was maintained at 11.5. The speed of impeller was controlled at 400 rpm.

Thereafter, only the third aqueous metal solution was supplied into the reactor to form the shell portion.

The concentrations of the aqueous metal solutions in Examples 5-1 to 5-4 are as presented in the following Table 17.

TABLE 17

|  | First aqueous metal solution | | | Second aqueous metal solution | | | Third aqueous metal solution | | | Thickness of shell portion |
| --- | --- | --- | --- | --- | --- | --- | --- | --- | --- | --- |
|  | Ni | Co | Mn | Ni | Co | Mn | Ni | Co | Mn |  |
| Example 5-1 | 95 | 2 | 3 | 85 | 6 | 9 | 67 | 9 | 24 | 0.5 μm |

TABLE 17-continued

| | First aqueous metal solution | | | Second aqueous metal solution | | | Third aqueous metal solution | | | Thickness of shell portion |
|---|---|---|---|---|---|---|---|---|---|---|
| | Ni | Co | Mn | Ni | Co | Mn | Ni | Co | Mn | |
| Example 5-2 | 98 | 0 | 2 | 88 | 4 | 8 | 67 | 9 | 24 | 0.3 μm |
| Example 5-3 | 85 | 5 | 10 | 78 | 6 | 16 | 60 | 15 | 25 | 0.5 μm |
| Example 5-4 | 97 | 0 | 3 | 82 | 5 | 13 | 55 | 15 | 30 | 0.3 μm |

The composite metal hydroxide thus prepared was filtered, washed with water, and then dried for 12 hours in a hot air dryer at 110° C. The composite metal hydroxide and lithium hydroxide (LiOH) were mixed at a molar ratio of 1:1, the mixture was subjected to the preliminary firing by heating at a temperature rise rate of 2° C./min and then maintaining at 450° C. for 10 hours and then fired at from 700 to 900° C. for 10 hours, thereby obtaining a positive electrode active material powder.

Comparative Examples 5-1 and 5-2

In Comparative Example 5-1, positive electrode active material particles having constant concentrations of nickel, manganese, and cobalt in the entire particle were prepared using an aqueous metal solution having a composition of $Ni_{82}Co_5Mn_{13}OH_2$ which corresponds to the average composition of the entire particle in Example 5-2.

In Comparative Example 5-2, positive electrode active material particles having constant concentrations of nickel, manganese, and cobalt in the entire particle were prepared using an aqueous metal solution having a composition of $Ni_{76}Co_7Mn_{17}OH_2$ which corresponds to the average composition of the entire particle in Example 5-4.

<Experimental Example> Taking of EDX Image

Figure 102:
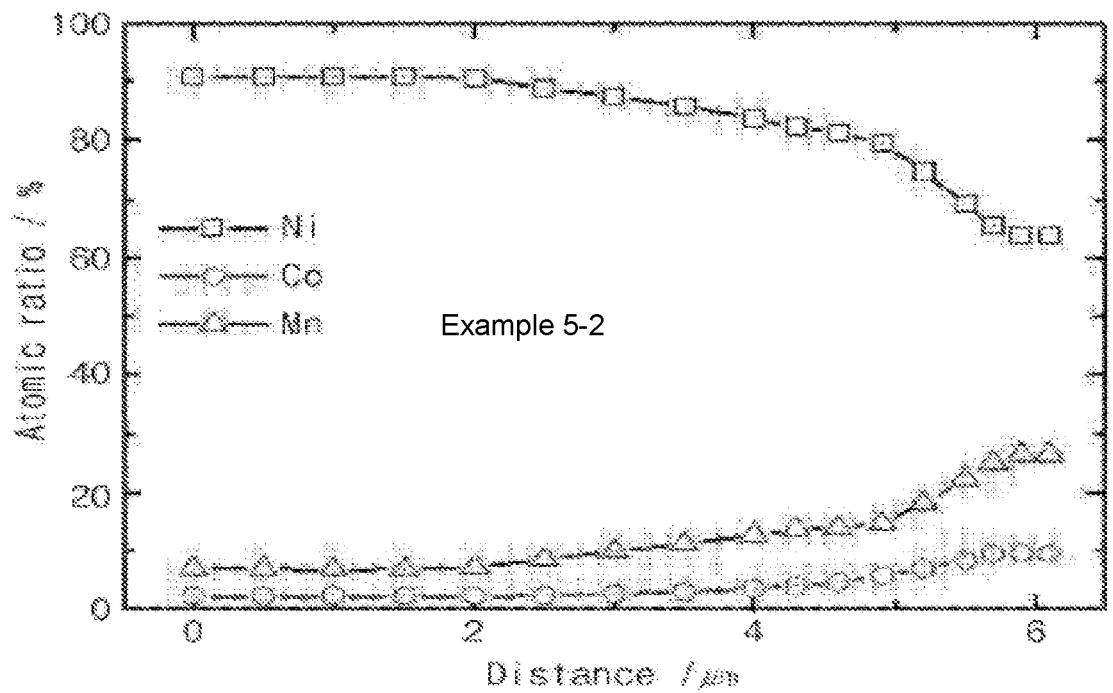
FIG. 102 illustrates the concentrations of Ni, Mn, Co depending on the distance from the center in the particles prepared according to an embodiment of the inventive concept, which are measured by EDX.

The concentrations of Ni, Mn, and Co depending on the distance from the center in the particles prepared in Example 5-2 were measured by EDX, and the results are illustrated in FIG. 102.

From FIG. 102, it can be seen that the first concentration gradient portion and the second concentration gradient portion are disposed between the inner core portion and the outermost shell portion which have constant concentrations of nickel, manganese, and cobalt in the case of the particles according to Example of the inventive concept.

<Experimental Example> Measurement of Charge and Discharge Characteristics, Cycle-Life Characteristics, and DSC The charge and discharge characteristics, cycle-life characteristics, and DSC characteristics of the batteries containing the active materials prepared in Examples 5-1 to 5-4 and Comparative Examples 5-1 and 5-2 were measured, and the results are presented in the following Table 18.

TABLE 18

| | Discharge capacity | Cycle-life characteristics ($100^{th}$) | DSC |
|---|---|---|---|
| Example 5-1 | 217.6 mAh/g | 93.6% | 263.5° C. |
| Example 5-2 | 220.1 mAh/g | 93.1% | 259.6° C. |
| Example 5-3 | 205.3 mAh/g | 94.8% | 272.7° C. |
| Example 5-4 | 211.8 mAh/g | 94.3% | 268.2° C. |
| Comparative Example 5-1 | 209.3 mAh/g | 81.7% | 243.6° C. |
| Comparative Example 5-2 | 198.7 mAh/g | 83.2% | 247.3° C. |

Figure 103:
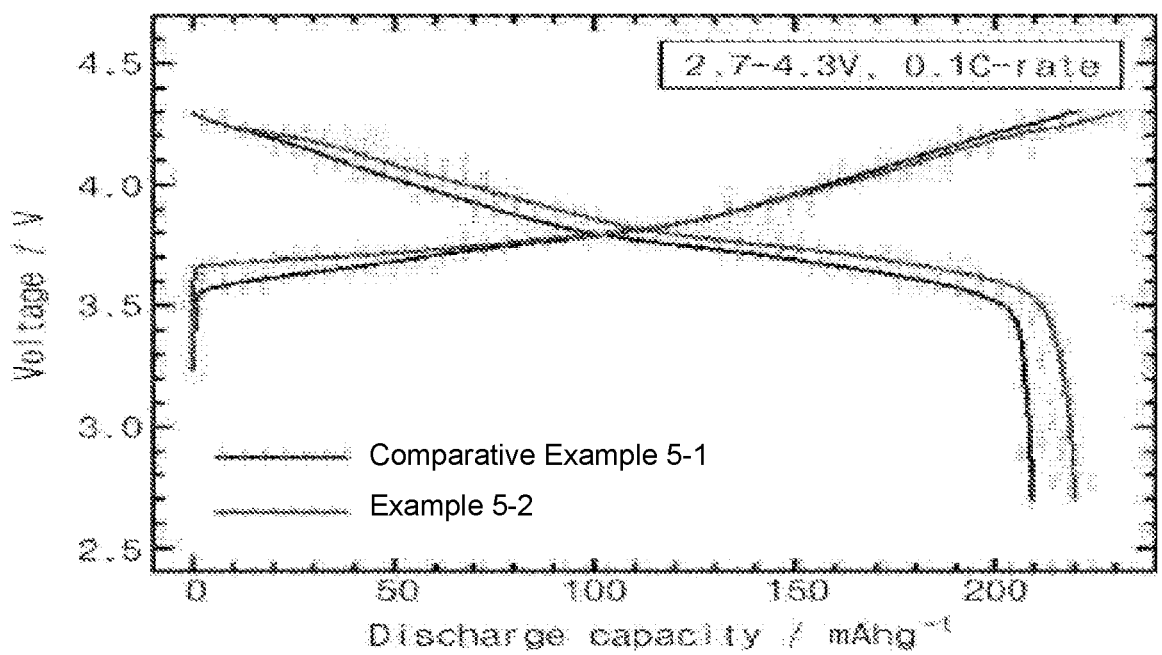
FIGS. 103 to 105 illustrate the measurement results on charge and discharge characteristics, cycle-life characteristics, and DSC characteristics of the particles prepared according to an embodiment of the inventive concept and Comparative Example, respectively.
Figure 104:
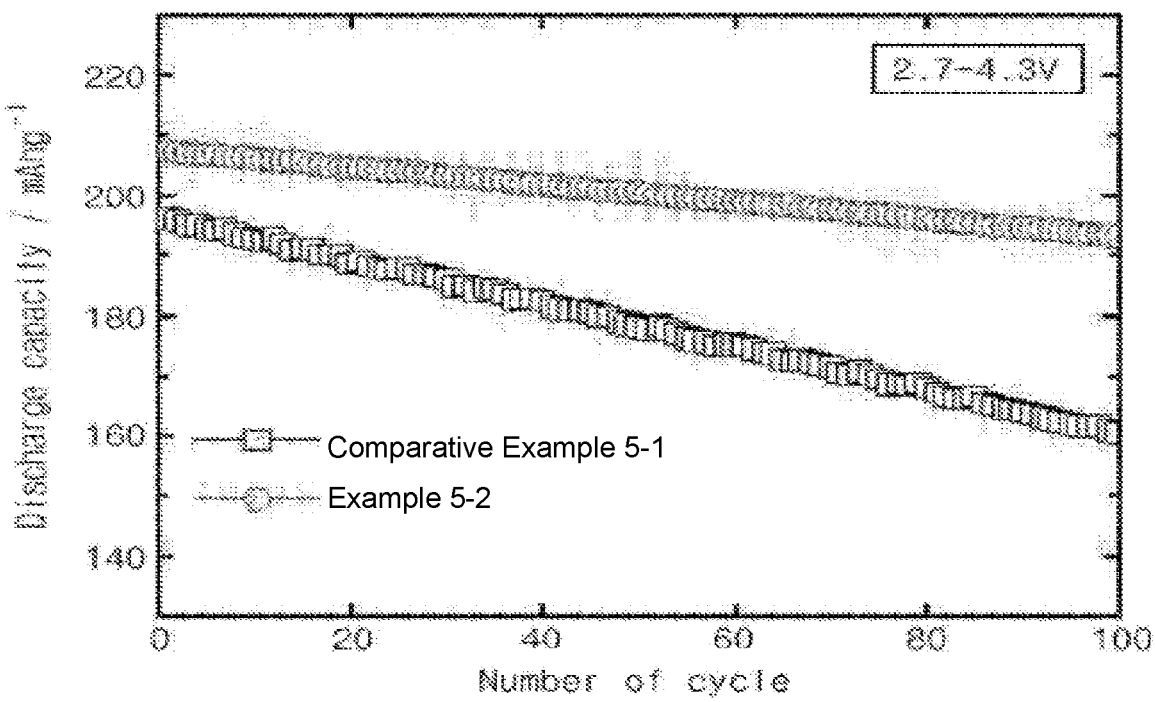
Figure 105:
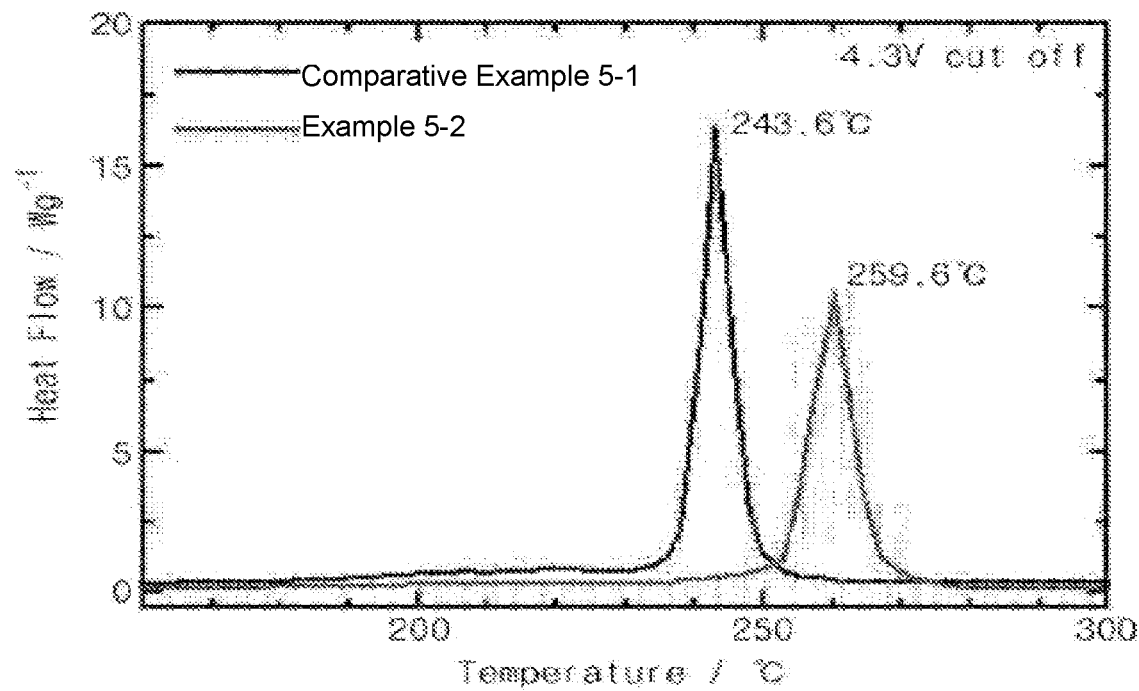

The charge and discharge characteristics, cycle-life characteristics, and DSC characteristics of the particles prepared in Example 5-2 and Comparative Example 5-1 were measured, and the results are illustrated in FIGS. 103 to 105, respectively.

From FIGS. 103 to 105, it has been confirmed that the average composition of the particles in Example 5-2 is the same as the composition of the particles in Comparative Example 5-1, but the charge and discharge characteristics, cycle-life characteristics, and thermal stability are greatly improved in Example 5-2 as compared to Comparative Example 5-1 since the particles in Example 5-2 includes the inner core portion, and the first concentration gradient portion, the second concentration gradient portion, and the shell portion continuous to the second concentration gradient portion although the average concentrations of nickel, manganese, and cobalt thereof are the same as those of the particles in Comparative Example 5-1.

Examples 5-5 to 5-7

Into a coprecipitation reactor (volume: 16 L, output of rotary motor: 80 W or more), 2.5 L of distilled water was introduced, $N_2$ gas was then supplied thereto at a rate of 2 L/min, and the distilled water was stirred at 400 rpm while maintaining the temperature of the reactor at 45° C.

A first aqueous metal solution was prepared by mixing nickel sulfate, cobalt sulfate, and manganese sulfate so as to have concentrations of $Ni_{x1}Co_{y1}Mn_{z1}OH_2$ (X1, Y1, Z1), the first aqueous metal solution was continuously introduced into the reactor at 0.7 L/hr, and an ammonia solution having a concentration of 25 mol was also continuously introduced into the reactor at 0.07 L/hr, thereby forming the inner core portion having constant concentrations of nickel, manganese, and cobalt.

A second aqueous metal solution was prepared so as to have a composition of $Ni_{x2}Co_{y2}Mn_{z2}OH_2$ (x2, y2, z2), the first aqueous metal solution and the second aqueous metal solution were continuously introduced into the reactor at 0.7 L/hr while mixing them and changing the mixing ratio thereof, and an ammonia solution having a concentration of 25 mol was also continuously introduced into the reactor at 0.07 L/hr, thereby forming the first concentration gradient portion having a concentration gradient. In addition, a sodium hydroxide solution having a concentration of 5 mol was supplied into the reactor in order to adjust the pH so that the pH was maintained at 11.5. The speed of impeller was controlled at 400 rpm.

Thereafter, a third aqueous metal solution was prepared by mixing nickel sulfate, cobalt sulfate, and manganese sulfate so as to have a constant composition of $Ni_{x3}Co_{y3}Mn_{z3}OH_2$ and only the third aqueous metal solution was supplied into the reactor to form the shell portion. In addition, a sodium hydroxide solution having a concentration of 5 mol was supplied into the reactor in order to adjust the pH so that the pH was maintained at 11.5. The speed of impeller was controlled at 400 rpm.

The concentrations of the aqueous metal solutions in Examples 5-5 to 5-7 are as presented in the following Table 19.

TABLE 19

| | First aqueous metal solution | | | Second aqueous metal solution | | | Third aqueous metal solution | | | Thickness of shell portion |
|---|---|---|---|---|---|---|---|---|---|---|
| | Ni | Co | Mn | Ni | Co | Mn | Ni | Co | Mn | |
| Example 5-5 | 98 | 0 | 2 | 69 | 8 | 23 | 59 | 11 | 30 | 0.5 μm |
| Example 5-6 | 90 | 3 | 7 | 70 | 10 | 20 | 50 | 15 | 35 | 0.3 μm |
| Example 5-7 | 80 | 10 | 10 | 60 | 15 | 25 | 40 | 20 | 40 | 0.3 μm |

The composite metal hydroxide thus prepared was filtered, washed with water, and then dried for 12 hours in a hot air dryer at 110° C. The composite metal hydroxide and lithium hydroxide (LiOH) were mixed at a molar ratio of 1:1, the mixture was subjected to the preliminary firing by heating at a temperature rise rate of 2° C./min and then maintaining at 450° C. for 10 hours and then fired at from 700 to 900° C. for 10 hours, thereby obtaining a positive electrode active material powder.

Comparative Examples 5-3 and 5-4

In Comparative Example 5-3, positive electrode active material particles having constant concentrations of nickel, manganese, and cobalt in the entire particle were prepared using an aqueous metal solution having a composition of $Ni_{81}Co_5Mn_{14}OH_2$ which corresponds to the average composition of the entire particle in Example 5-5.

In Comparative Example 5-4, positive electrode active material particles having constant concentrations of nickel, manganese, and cobalt in the entire particle were prepared using an aqueous metal solution having a composition of $Ni_{68}Co_{13}Mn_{19}OH_2$ which corresponds to the average composition of the entire particle in Example 5-4.

<Experimental Example> Taking of EDX Image

Figure 106:
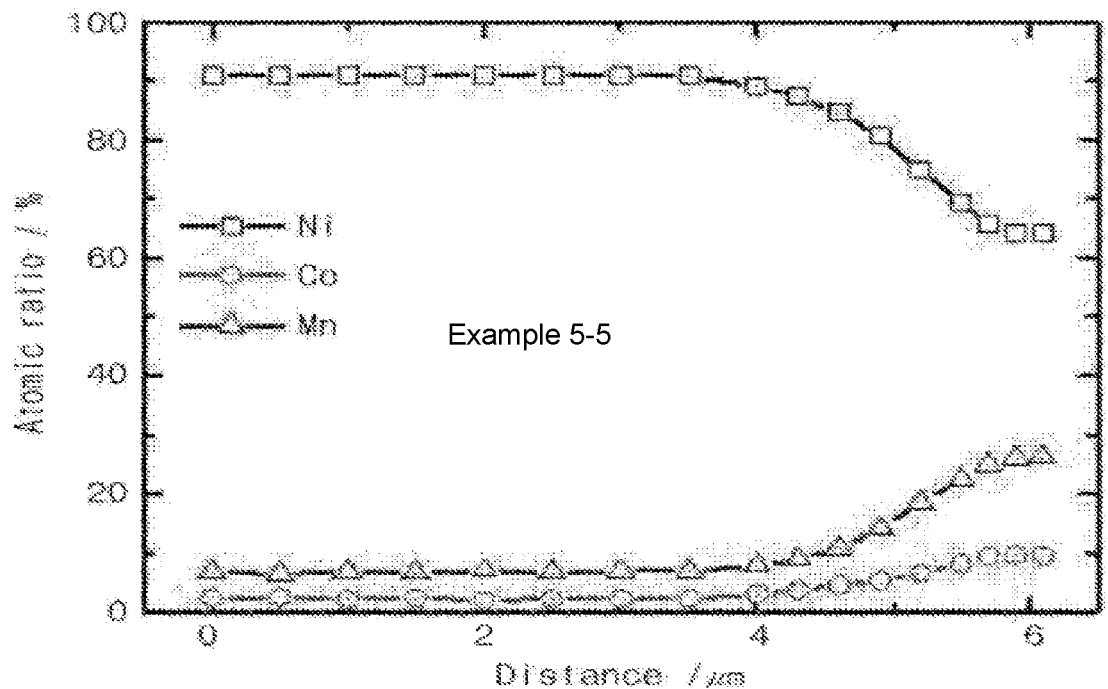
FIG. 106 illustrates the concentrations of Ni, Mn, Co depending on the distance from the center in the particles prepared according to an embodiment of the inventive concept, which are measured by EDX.

The concentrations of Ni, Mn, and Co depending on the distance from the center in the particles prepared in Example 5-5 were measured by EDX, and the results are illustrated in FIG. 106.

From FIG. 106, it can be seen that the concentration gradient portion is formed on the outside of the inner core portion and the shell portion having constant concentrations of nickel, manganese, and cobalt is formed on the concentration gradient portion in the case of the particles according to Example of the inventive concept.

<Experimental Example> Measurement of Charge and Discharge Characteristics, Cycle-Life Characteristics, and DSC The charge and discharge characteristics, cycle-life characteristics, and DSC characteristics of the batteries containing the active materials prepared in Examples 5-5 to 5-7 and Comparative Examples 5-3 and 5-4 were measured, and the results are presented in the following Table 20.

TABLE 20

| | Discharge capacity | Cycle-life characteristics ($100^{th}$) | DSC |
|---|---|---|---|
| Example 5-5 | 220.4 mAh/g | 94.7% | 269.7° C. |
| Example 5-6 | 215.7 mAh/g | 94.9% | 272.2° C. |
| Example 5-7 | 201.8 mAh/g | 96.3% | 286.4° C. |
| Comparative Example 5-3 | 206.7 mAh/g | 84.8% | 234.3° C. |
| Comparative Example 5-4 | 193.2 mAh/g | 88.3% | 271.6° C. |

Figure 107:
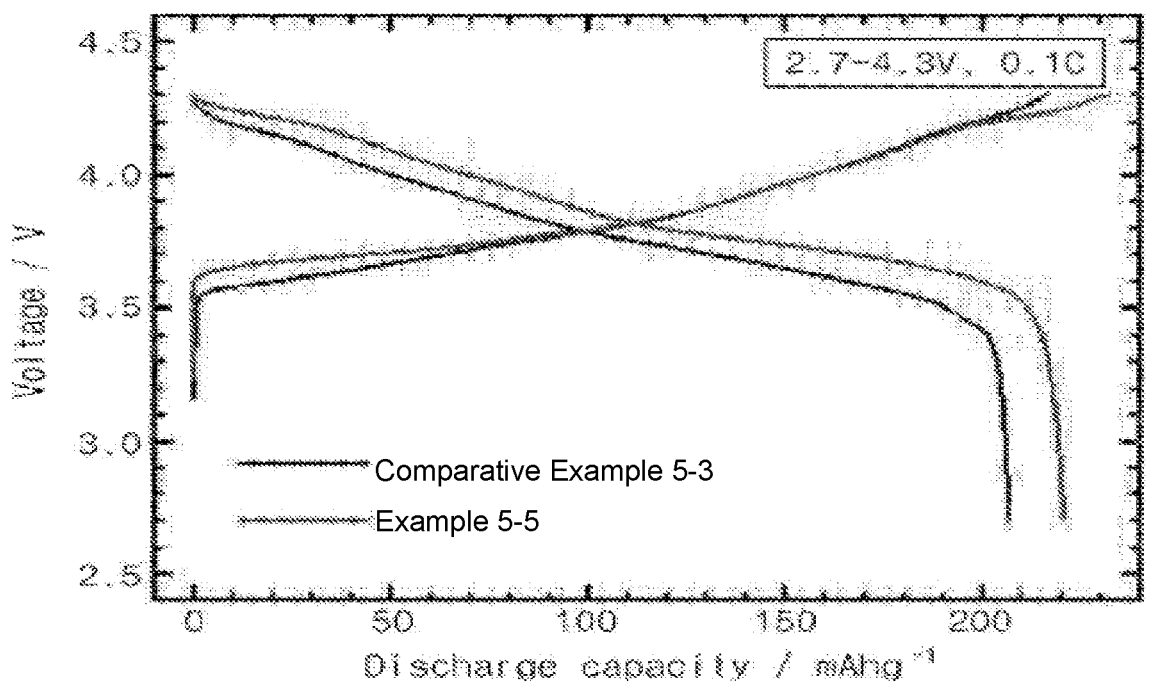
FIGS. 107 to 109 illustrate the measurement results on charge and discharge characteristics, cycle-life characteristics, and DSC characteristics of the particles prepared according to an embodiment of the inventive concept and Comparative Example, respectively.
Figure 108:
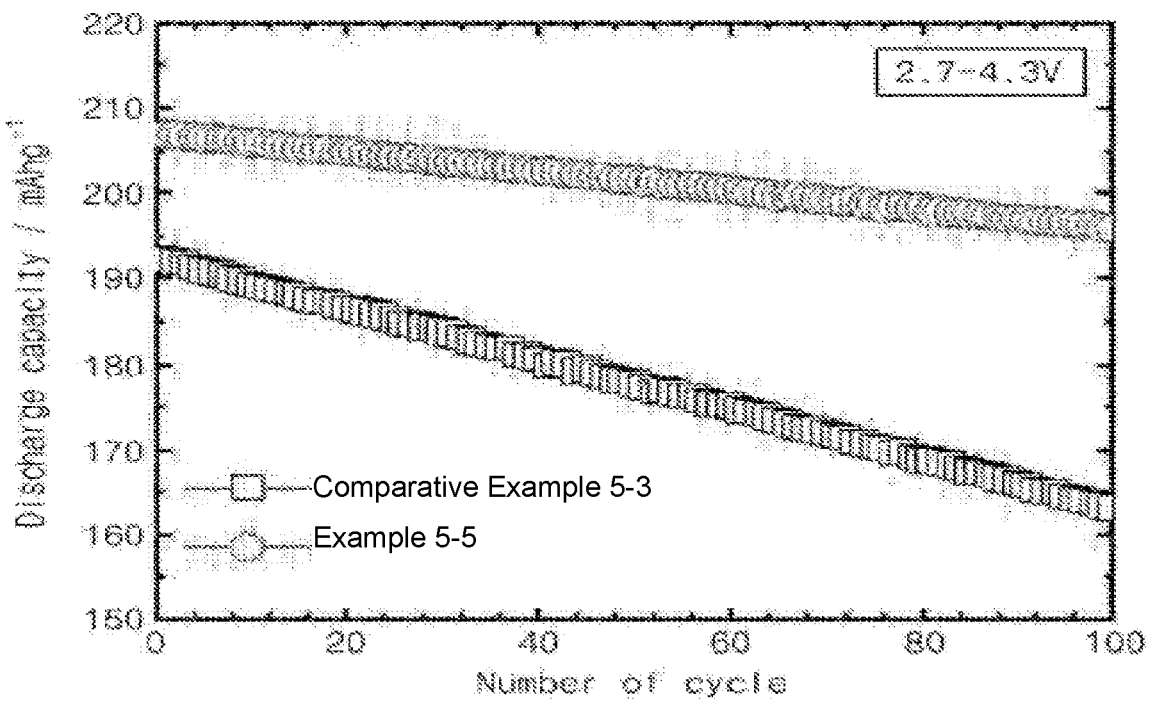
Figure 109:
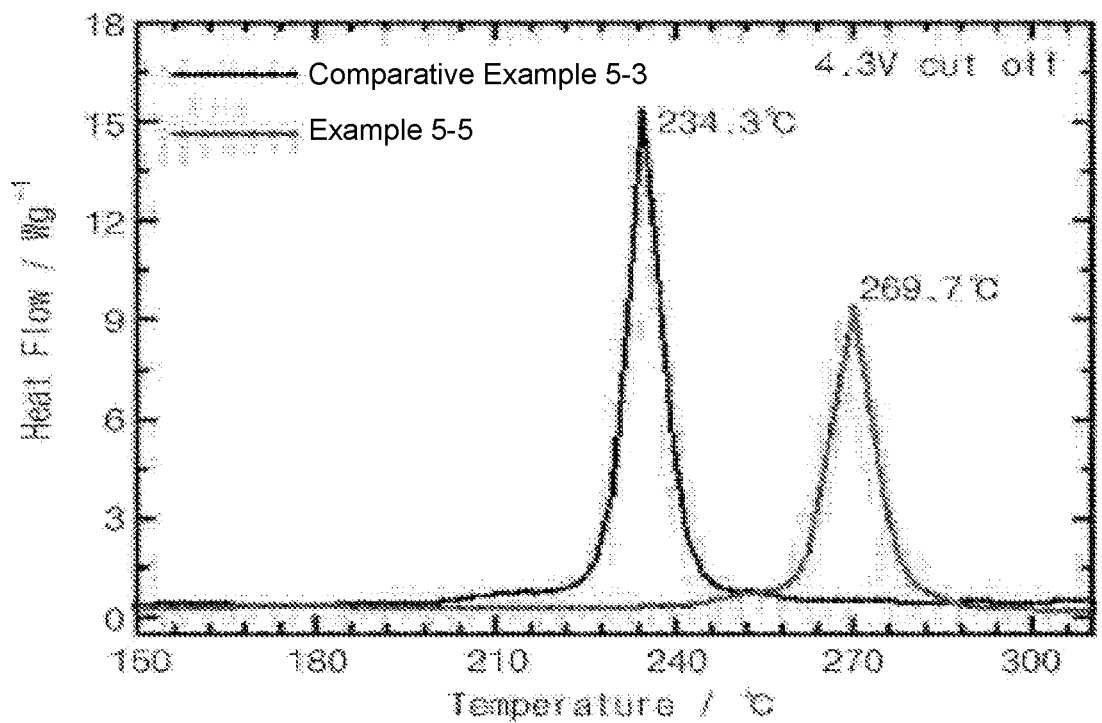

The charge and discharge characteristics, cycle-life characteristics, and DSC characteristics of the particles prepared in Example 5-5 and Comparative Example 5-3 were measured, and the results are illustrated in FIGS. 107 to 109, respectively.

From FIGS. 107 to 109, it has been confirmed that the average composition of the particles in Example 5-5 is the same as the composition of the particles in Comparative Example 5-3, but the charge and discharge characteristics, cycle-life characteristics, and thermal stability are greatly improved in Example 5-5 as compared to Comparative Example 5-3 since the particles in Example 5-5 includes the shell portion having a constant concentration on the outside of the inner core portion and the first concentration gradient portion.

<Experimental Example> Measurement of Residual Lithium

The amounts of LiOH and $Li_2CO_3$ were measured in order to determine the amount of residual lithium in the particles prepared in Example 5-5 and Comparative Example 4-3, and the results are as presented in the following Table 21.

TABLE 21

| Sample | LiOH | $Li_2CO_3$ | Sum of residual lithium |
|---|---|---|---|
| Comparative Example 5-3 | 7124 | 5397 | 12521 |
| Example 5-5 | 3512 | 2699 | 6211 |

It has been confirmed that residual lithium is improved by nearly 50% in the active material according to Example 5-5 of the inventive concept as compared to the active material prepared in Comparative example 5-3.

Examples 6

Examples 6-1 and 6-2

In order to produce particles having two concentration gradients in the core portion, first, a first aqueous metal solution and a second aqueous metal solution were prepared by mixing nickel sulfate, cobalt sulfate, and manganese sulfate so as to have a composition of $Ni_{x1}Co_{y1}Mn_{z1}OH_2$ (X1, Y1, Z1) and a composition of $Ni_{x2}Co_{y2}Mn_{z2}OH_2$ (x2, y2, z2), respectively, the first aqueous metal solution and the second aqueous metal solution were continuously introduced into the reactor at 0.7 L/hr while mixing them and changing the mixing ratio thereof, and an ammonia solution having a concentration of 25 mol was also continuously introduced into the reactor at 0.07 L/hr, thereby forming the core portion having a first concentration gradient.

Thereafter, a third aqueous metal solution prepared by mixing nickel sulfate, cobalt sulfate, and manganese sulfate so as to have a constant composition of $Ni_{x3}Co_{y3}Mn_{z3}OH_2$ and the second aqueous metal solution were continuously introduced into the reactor at 0.7 L/hr while mixing them and changing the mixing ratio thereof, and an ammonia solution having a concentration of 25 mol was also continuously introduced into the reactor at 0.07 L/hr, thereby forming the core portion having a second concentration gradient.

Thereafter, an aqueous solution for the formation of shell portion that was prepared by mixing nickel sulfate, cobalt sulfate, and manganese sulfate so as to have a constant composition of $Ni_{x4}Co_{y4}Mn_{z4}OH_2$ was supplied into the reactor to form the shell portion having a concentration that is different from the concentration at the end of the core portion having a second concentration gradient.

The concentrations of the aqueous metal solutions thus prepared in Examples 6-1 and 6-2 are as presented in the following Table 22.

TABLE 22

| | First aqueous metal solution | | | Second aqueous metal solution | | | Third aqueous metal solution | | | Fourth aqueous metal solution | | | Thickness of shell |
|---|---|---|---|---|---|---|---|---|---|---|---|---|---|
| | Ni | Co | Mn | Ni | Co | Mn | Ni | Co | Mn | Ni | Co | Mn | portion |
| Example 6-1 | 98 | 2 | 2 | 90 | 4 | 6 | 69 | 08 | 23 | 60 | 12 | 28 | 0.5 μm |
| Example 6-2 | 98 | 2 | 2 | 90 | 4 | 6 | 70 | 7 | 23 | 60 | 10 | 30 | 0.5 μm |

The composite metal hydroxide thus prepared was filtered, washed with water, and then dried for 12 hours in a hot air dryer at 110° C. The composite metal hydroxide and lithium hydroxide (LiOH) were mixed at a molar ratio of 1:1, the mixture was subjected to the preliminary firing by heating at a temperature rise rate of 2° C./min and then maintaining at 450° C. for 10 hours and then fired at from 700 to 900° C. for 10 hours, thereby obtaining a positive electrode active material powder.

Comparative Example 6-1

In Comparative Example 6-1, composite oxide particles having constant concentrations of nickel, manganese, and cobalt in the entire particle were prepared using an aqueous metal solution having a composition of $Ni_{80}Co_6Mn_{14}OH_2$.

<Experimental Example> Taking of EDX Image

Figure 110:
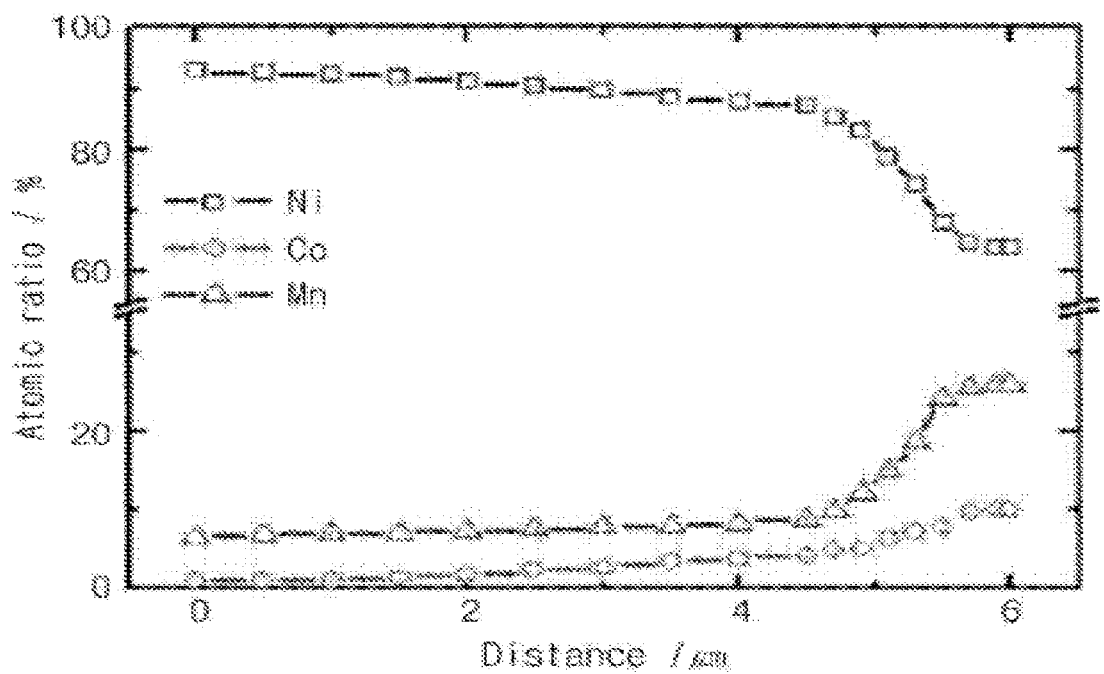
FIG. 110 illustrates the concentrations of Ni, Mn, Co depending on the distance from the center in the particles prepared according to an embodiment of the inventive concept measured by EDX.

The concentrations of Ni, Mn, and Co depending on the distance from the center in the particles prepared in Example 6-1 were measured by EDX, and the results are illustrated in FIG. 110.

From FIG. 110, it can be seen that the core portion has two magnitudes of concentration gradient and the shell portion in which the concentration at the end is maintained is formed in the case of the particles according to Example of the inventive concept.

<Experimental Example> Measurement of Charge and Discharge Characteristics, Cycle-Life Characteristics, and DSC The charge and discharge characteristics, cycle-life characteristics, and DSC characteristics of the batteries containing the active materials prepared in Examples 6-1 and 6-2 and Comparative Example 6-1 were measured, and the results are presented in the following Table 23 and illustrated in FIGS. 111 to 114.

TABLE 23

| | Discharge capacity | Cycle-life characteristics ($100^{th}$) | DSC |
|---|---|---|---|
| Example 6-1 | 223 mAh/g | 95.5% | 270° C. |
| Example 6-2 | 222 mAh/g | 95.9% | 275° C. |
| Comparative Example 6-1 | 207 mAh/g | 84.8% | 234° C. |

Figure 111:
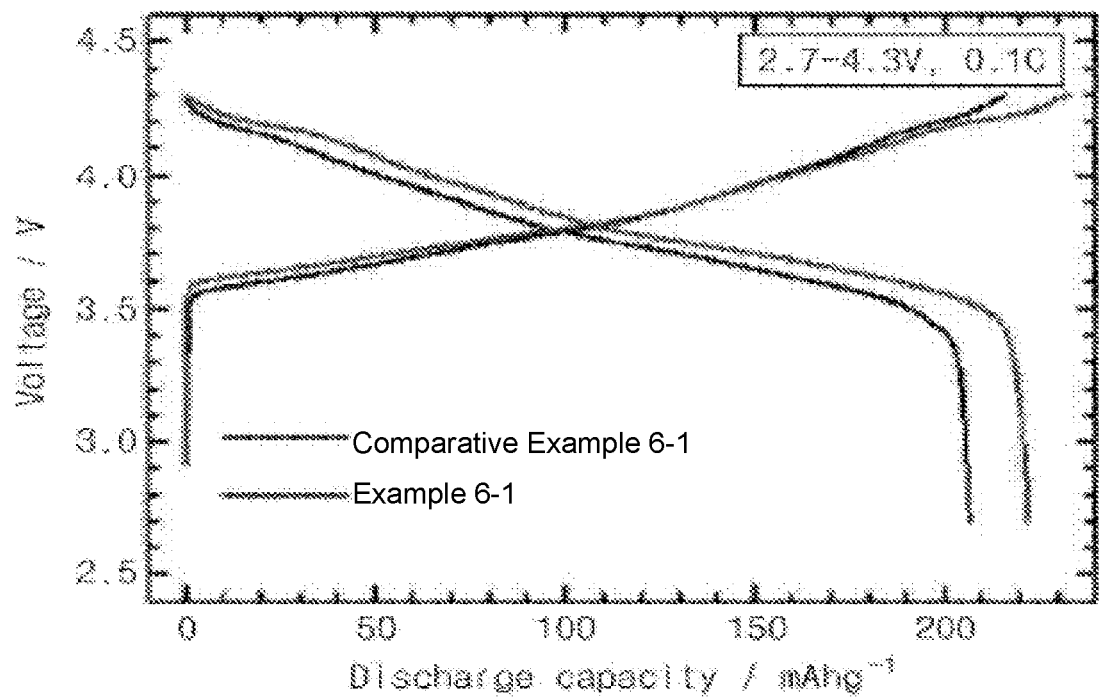
FIGS. 111 to 114 illustrate the measurement results on charge and discharge characteristics, cycle-life characteristics, and DSC characteristics of the batteries containing the active materials prepared according to an embodiment of the inventive concept and Comparative Example, respectively.
Figure 112:
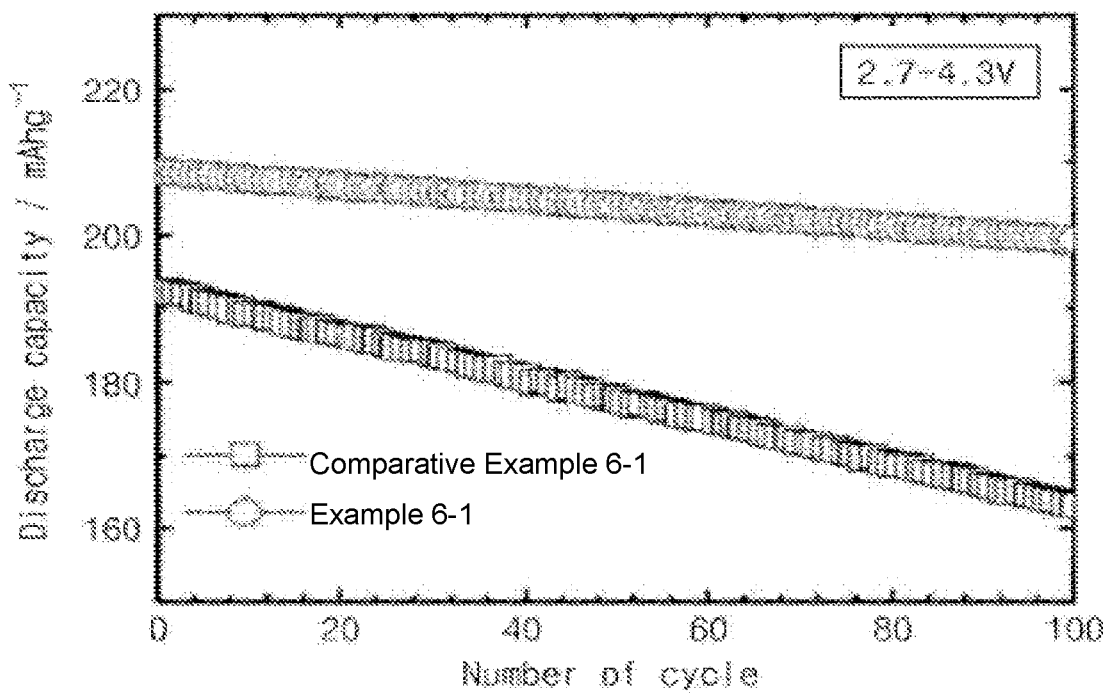
Figure 113:
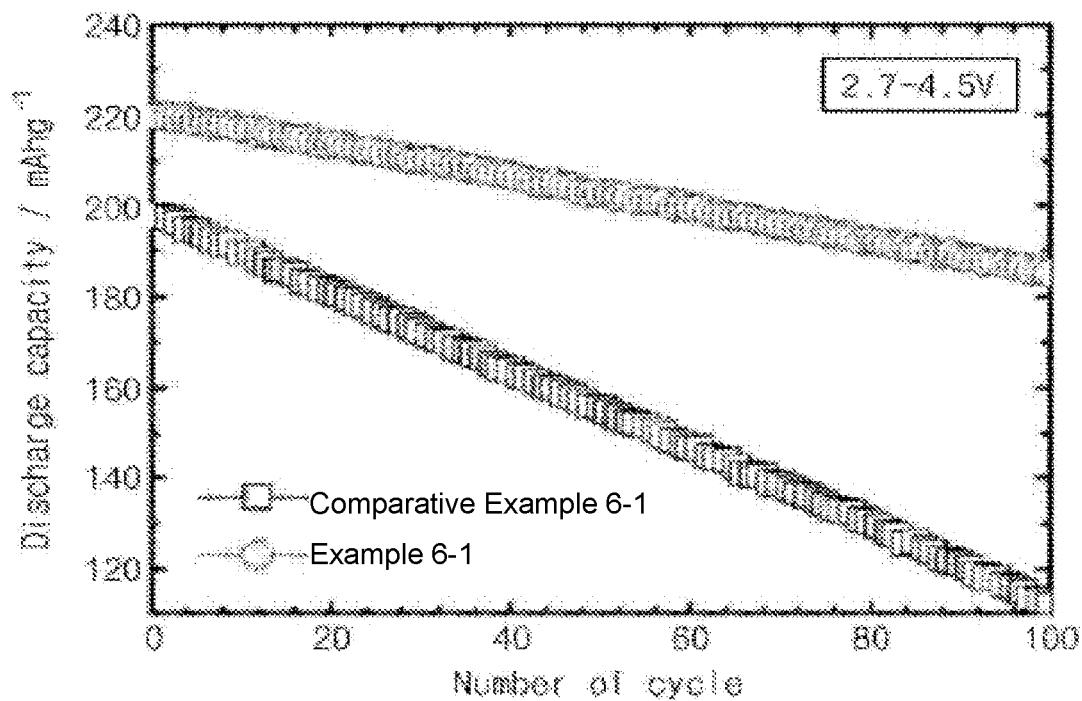
Figure 114:
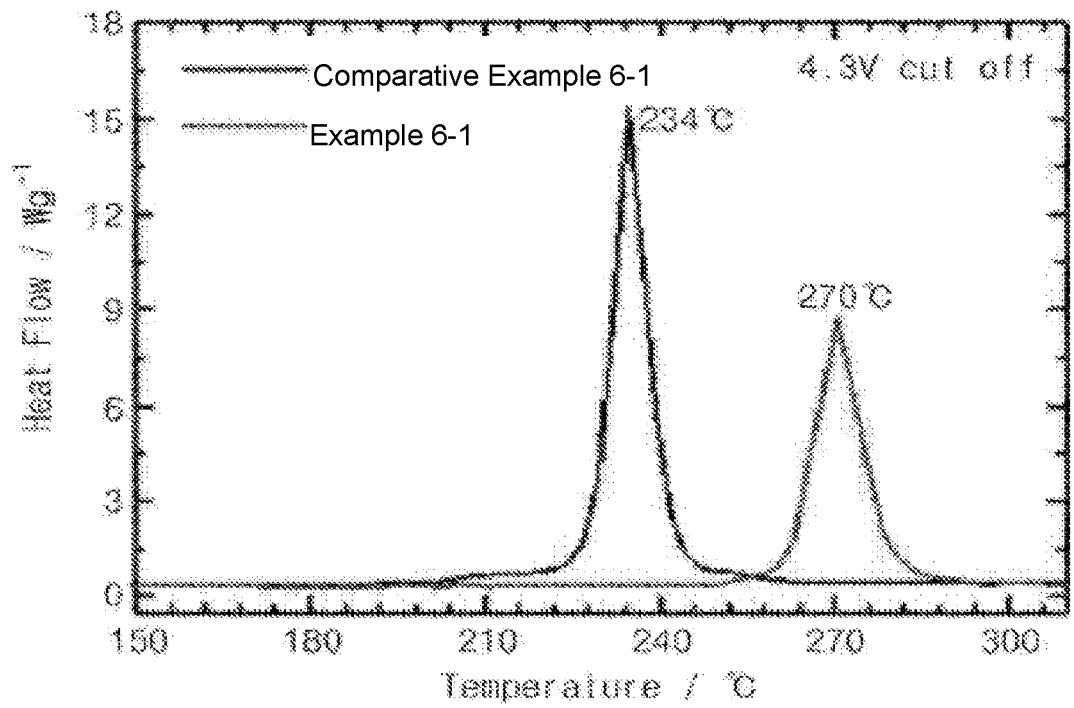

From Table 23 above and FIG. 111 illustrating the charge and discharge characteristics, it has been confirmed that the capacity of the battery including the positive electrode active material according to the inventive concept is 220 mAh/g or more, and from FIG. 114, it can be seen that the thermal stability thereof is greatly improved in the DSC characteristics as the ignition temperature is higher than that in Comparative Example by 40° C. or higher although a high content of nickel is contained to have a high capacity.

<Experimental Example> Measurement of Residual Lithium

The amounts of residual LiOH and $Li_2CO_3$ in the particles prepared in Example 6-1 and Comparative Example 6-1 were measured, and the results are as presented in the following Table 24.

TABLE 24

| | Residual LiOH | $Li_2CO_3$ | Sum |
|---|---|---|---|
| Comparative Example 6-1 | 7124 | 5397 | 12521 |
| Example 6-1 | 3208 | 3095 | 6307 |

From Table 24 above, it has been confirmed that residual lithium in Example 3-1 of the inventive concept has decreased to about 50% of that in Comparative example.

<Experimental Example> Measurement of Tap Density and BET Surface Area

The tap density of the particles prepared in Example 6-1 and Comparative Example 6-1 are as presented in the following Table 25.

TABLE 25

| | Tap density |
|---|---|
| Example 6-1 | 2.52 |
| Comparative Example 6-1 | 2.62 |

In the positive electrode active material according to embodiments of the inventive concept, a shell portion having a constant concentration is formed on the surface of the core portion in which concentrations of nickel, manganese, and cobalt have gradients, and thus the positive electrode active material exhibits excellent cycle-life characteristics and charge and discharge characteristics, has a stabilized crystal structure while having a high capacity, and is structurally stabilized even when being used at a high voltage.

In addition, according to an embodiment of the inventive concept, the positive electrode active material includes a first element containing a first metal and a second element composed of one or more first elements. The second element may include a concentration gradient portion having a content of the first metal changed and a concentration maintained portion having a constant content of the first metal. Consequently, it is possible to provide a positive electrode active material containing the second element with characteristics improved by the first metal as the content of the first metal in the second element can be controlled.

Examples 7

The forth embodiment of the inventive concept will be described with FIGS. 115 to 122.

Into a coprecipitation reactor (volume: 16 L, output of rotary motor: 80 W or more), 2.5 L of distilled water was introduced, $N_2$ gas was then supplied thereto at a rate of 2 L/min, and the distilled water was stirred at 400 rpm while maintaining the temperature of the reactor at 45° C.

A first aqueous metal solution and a second aqueous metal solution were prepared by mixing nickel sulfate, cobalt sulfate, and manganese sulfate so as to have a composition of $Ni_{x1}Co_{y1}Mn_{z1}OH_2$ (X1, Y1, Z1) and a composition of $Ni_{x2}Co_{y2}Mn_{z2}OH_2$ (x2, y2, z2), respectively, the first aqueous metal solution and the second aqueous metal solution were continuously introduced into the reactor at 0.7 L/hr while mixing them and changing the mixing ratio thereof, and an ammonia solution having a concentration of 25 mol was also continuously introduced into the reactor at 0.7 L/hr, thereby forming the first concentration gradient portion. In addition, a sodium hydroxide solution having a concentration of 5 mol was supplied into the reactor in order to adjust the pH so that the pH was maintained at 11.5. The speed of impeller was controlled at 400 rpm.

Thereafter, only the second aqueous metal solution was supplied into the reactor for a certain period of time to form the first concentration maintained portion in which the concentrations of nickel, manganese, and cobalt at the outermost part of the first concentration gradient portion are maintained on the outside of the first concentration gradient portion in a thickness of from 0.2 to 1 μm.

Thereafter, a third aqueous metal solution prepared by mixing nickel sulfate, cobalt sulfate, and manganese sulfate so as to have constant concentrations of $Ni_{x3}Co_{y3}Mn_{z3}OH_2$ was supplied into the reactor while mixing them and changing the mixing ratio of the third aqueous metal solution to the second aqueous metal solution, thereby forming the second concentration gradient portion on the outside of the first concentration maintained portion.

Thereafter, only the third aqueous metal solution was supplied into the reactor for a certain period of time to form the second concentration maintained portion on the outside of the second concentration gradient portion.

The concentrations of the aqueous metal solutions in Examples 7-1 to 7-4 are as presented in the following Table 26.

TABLE 26

| | First aqueous metal solution | | | Second aqueous metal solution | | | Third aqueous metal solution | | | Thickness of second concentration maintained portion |
|---|---|---|---|---|---|---|---|---|---|---|
| | Ni | Co | Mn | Ni | Co | Mn | Ni | Co | Mn | |
| Example 7-1 | 95 | 2 | 3 | 80 | 7 | 13 | 54 | 15 | 31 | 0.3 μm |
| Example 7-2 | 85 | 5 | 10 | 70 | 10 | 20 | 55 | 18 | 27 | 0.5 μm |
| Example 7-3 | 85 | 3 | 12 | 73 | 10 | 17 | 58 | 14 | 28 | 0.4 μm |
| Example 7-4 | 80 | 7 | 13 | 69 | 12 | 19 | 57 | 13 | 30 | 0.2 μm |

The composite metal hydroxide thus produced was filtered, washed with water, and then dried for 12 hours in a hot air dryer at 110° C. The composite metal hydroxide and lithium hydroxide (LiOH) were mixed at a molar ratio of 1:1, the mixture was subjected to the preliminary firing by heating at a temperature rise rate of 2° C./min and then maintaining at 450° C. for 10 hours and then fired at from 700 to 900° C. for 10 hours, thereby obtaining a positive electrode active material powder.

Comparative Examples

In Comparative Example 7-1, particles are produced in the same manner as in Example 7-1 except that a first aqueous metal solution and a second aqueous metal solution were prepared by mixing nickel sulfate, cobalt sulfate, and manganese sulfate so as to have concentration gradients from the center part to the surface part of the entire particle and a composition of $Ni_{85}Co_5Mn_{10}OH_2$ and a composition of $Ni_{57}Co_{16}Mn_{27}OH_2$, respectively, and the first aqueous metal solution and the second aqueous metal solution were mixed while changing the mixing ratio thereof.

In Comparative Example 7-2, positive electrode active material particles having constant concentrations of nickel, manganese, and cobalt in the entire particle were produced using an aqueous metal solution having a composition of $Ni_{62}Co_{14}Mn_{24}OH_2$ which corresponds to the average composition of the particle in Example 7-2.

In Comparative Example 7-3, positive electrode active material particles having constant concentrations of nickel, manganese, and cobalt in the entire particle were produced using an aqueous metal solution having a composition of $Ni_{55}Co_{18}Mn_{27}OH_2$.

<Experimental Example> Taking of EDX Image

Figure 115:
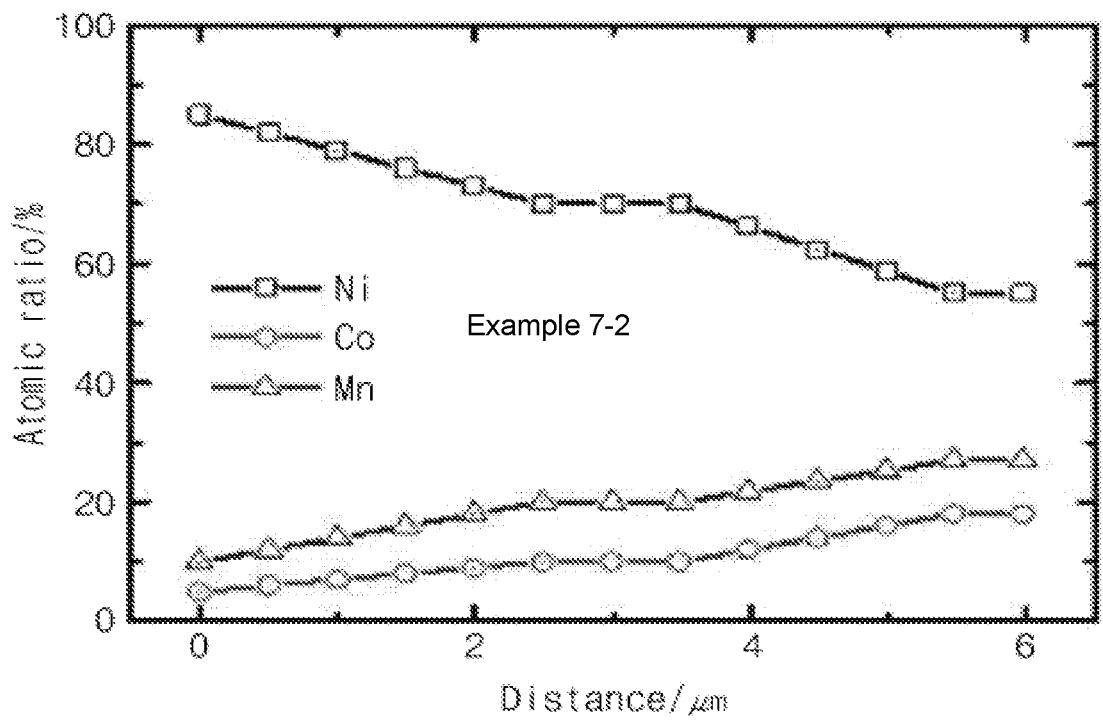
FIG. 115 illustrates the results of concentrations of Ni, Mn, Co depending on the distance from the center in the particles produced in Example of the inventive concept measured by EDX.

The concentrations of Ni, Mn, and Co depending on the distance from the center in the particles produced in Example 7-2 were measured by EDX, and the results are illustrated in FIG. 115.

In FIG. 115, a particle structure in which the first concentration gradient portion, the concentration maintained portion, and the second concentration gradient portion are formed has been confirmed in the case of the particles according to Example of the inventive concept, and it can be seen that the magnitudes of the concentration gradients in the first concentration gradient portion and the second concentration gradient portion are constant as the functional relations between the first concentration gradient portion and the distance and between the second concentration gradient portion and the distance are linear, respectively.

<Experimental Example> Measurement of Battery Characteristics

The charge and discharge characteristics, lifespan characteristics, DSC characteristics, and tap density of the batteries which included the active materials produced in Examples 7-1 to 7-4 and Comparative Examples 1 to 3 were measured, and the results are presented in the following Table 27.

TABLE 27

|  | Capacity (mAh/g) −2.7 to −4.3 V, 0.1 C | Lifespan characteristics (%) −2.7 to −4.3 V, 0.5 C 100$^{th}$ cycle | DSC (° C.) −4.3 V cut off | Tap density (g/cc) |
|---|---|---|---|---|
| Example 7-1 | 199.8 | 95.0 | 281.9 | 2.59 |
| Example 7-2 | 194.4 | 95.6 | 285.2 | 2.60 |
| Example 7-3 | 200.7 | 94.8 | 277.8 | 2.58 |
| Example 7-4 | 196.1 | 95.4 | 283.3 | 2.59 |
| Comparative Example 7-1 | 193.1 | 95.3 | 284.5 | 2.58 |
| Comparative Example 7-2 | 183.7 | 90.8 | 268.0 | 2.50 |
| Comparative Example 7-3 | 178.1 | 95.0 | 286.8 | 2.51 |

Figure 116:
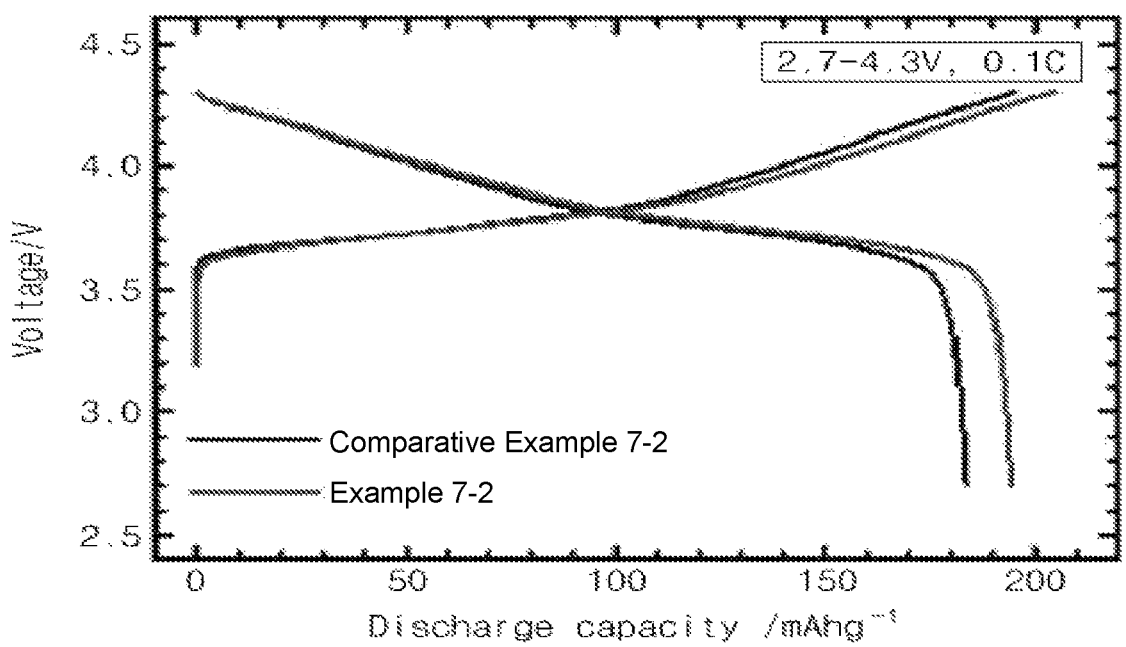
FIGS. 116 to 118 illustrate the results of charge and discharge characteristics, lifespan characteristics, and DSC characteristics measured on the particles produced in Example and Comparative Examples of the inventive concept, respectively.
Figure 117:
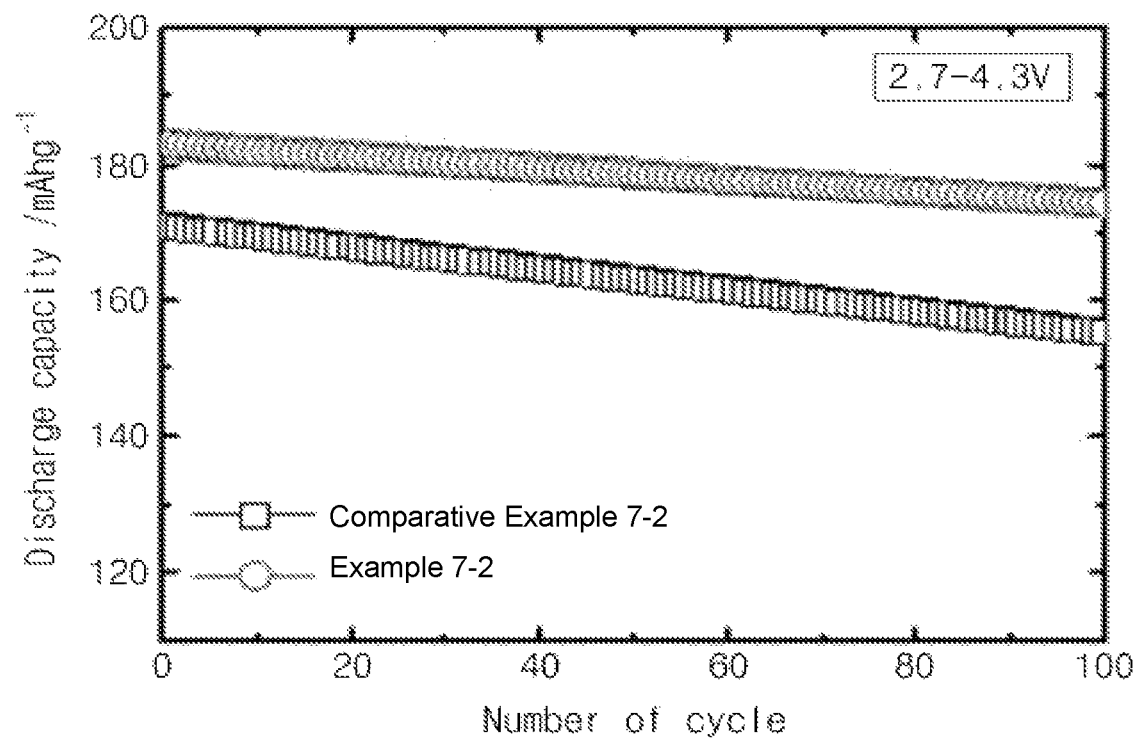
Figure 118:
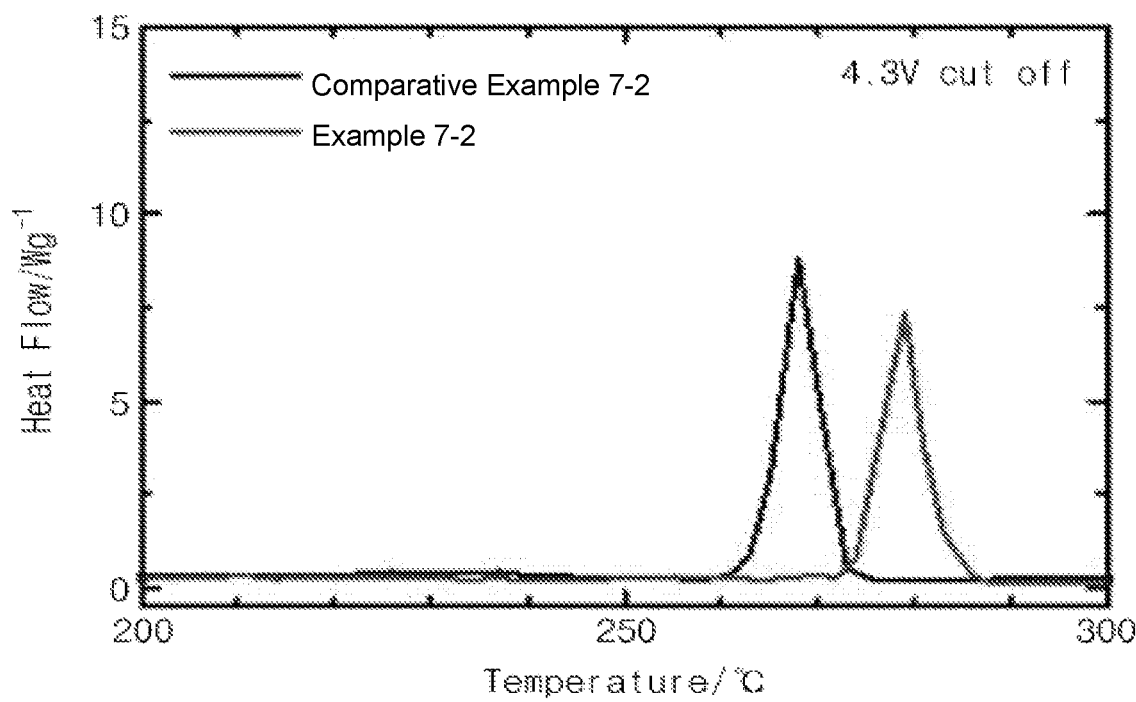

The charge and discharge characteristics, lifespan characteristics, and DSC characteristics of the particles produced in Example 7-2 and Comparative Example 7-2 were measured, and the results are illustrated in FIGS. 116 to 118, respectively.

In FIGS. 116 to 118, it has been confirmed that the composition of particles in Comparative Example 7-2 is the same as the average composition of the particles in Example 7-2 but the charge and discharge characteristics, lifespan characteristics, and thermal stability are greatly improved in Example 7-2 as compared to those in Comparative Example 7-2 since the particles in Example 7-2 includes the first concentration gradient portion, the first concentration maintained portion, the second concentration gradient portion, and the second concentration maintained portion that is continuous with respect to the second concentration gradient portion.

Examples

Into a coprecipitation reactor (volume: 16 L, output of rotary motor: 80 W or more), 2.5 L of distilled water was introduced, $N_2$ gas was then supplied thereto at a rate of 2 L/min, and the distilled water was stirred at 400 rpm while maintaining the temperature of the reactor at 45° C.

A first aqueous metal solution and a second aqueous metal solution were prepared by mixing nickel sulfate, cobalt sulfate, and manganese sulfate so as to have a composition of $Ni_{x1}Co_{y1}Mn_{z1}OH_2$ (X1, Y1, Z1) and a composition of $Ni_{x2}Co_{y2}Mn_{z2}OH_2$ (x2, y2, z2), respectively, the first aqueous metal solution and the second aqueous metal solution were continuously introduced into the reactor at 0.7 L/hr while mixing them and changing the mixing ratio thereof, and an ammonia solution having a concentration of 25 mol was also continuously introduced into the reactor at 0.7 L/hr, thereby forming the first concentration gradient portion. In addition, a sodium hydroxide solution having a concentration of 5 mol was supplied into the reactor in order to adjust the pH so that the pH was maintained at 11.5. The speed of impeller was controlled at 400 rpm.

Thereafter, only the second aqueous metal solution was supplied into the reactor for a certain period of time to form the first concentration maintained portion in which the concentrations of nickel, manganese, and cobalt of the first concentration gradient portion are maintained on the outside of the first concentration gradient portion in a thickness of from 0.2 to 1 μm.

Thereafter, a third aqueous metal solution prepared by mixing nickel sulfate, cobalt sulfate, and manganese sulfate so as to have constant concentrations of $Ni_{x3}Co_{y3}Mn_{z3}OH_2$ was supplied into the reactor while mixing them and changing the mixing ratio of the third aqueous metal solution to the second aqueous metal solution, thereby forming the second concentration gradient portion on the outside of the first concentration maintained portion.

Thereafter, only a fourth aqueous metal solution prepared by mixing nickel sulfate, cobalt sulfate, and manganese sulfate so as to have constant concentrations of $Ni_{x4}Co_{y4}Mn_{z4}OH_2$ was supplied into the reactor for a certain period of time to form the second concentration maintained portion having discontinuous concentrations of nickel, manganese, and cobalt on the outside of the second concentration gradient portion.

The concentrations of the aqueous metal solutions in Examples 7-5 to 7-8 are as presented in the following Table 28.

TABLE 28

| | First aqueous metal solution | | | Second aqueous metal solution | | | Third aqueous metal solution | | | Fourth aqueous metal solution | | | Thickness of second concentration maintained portion |
|---|---|---|---|---|---|---|---|---|---|---|---|---|---|
| | Ni | Co | Mn | Ni | Co | Mn | Ni | Co | Mn | Ni | Co | Mn | |
| Example 7-5 | 93 | 2 | 5 | 82 | 6 | 12 | 65 | 13 | 22 | 59 | 12 | 29 | 0.3 μm |
| Example 7-6 | 90 | 3 | 7 | 80 | 6 | 14 | 63 | 11 | 26 | 57 | 13 | 30 | 0.4 μm |
| Example 7-7 | 85 | 5 | 10 | 73 | 10 | 17 | 61 | 12 | 27 | 55 | 17 | 28 | 0.5 μm |
| Example 7-8 | 80 | 5 | 10 | 70 | 11 | 19 | 60 | 19 | 21 | 56 | 15 | 29 | 0.2 μm |

The composite metal hydroxide thus produced was filtered, washed with water, and then dried for 12 hours in a hot air dryer at 110° C. The composite metal hydroxide and lithium hydroxide (LiOH) were mixed at a molar ratio of 1:1, the mixture was subjected to the preliminary firing by heating at a temperature rise rate of 2° C./min and then maintaining at 450° C. for 10 hours and then fired at from 700 to 900° C. for 10 hours, thereby obtaining a positive electrode active material powder.

Comparative Examples

In Comparative Example 7-4, positive electrode active material particles having constant concentrations of nickel, manganese, and cobalt in the entire particle were produced using an aqueous metal solution having a composition of $Ni_{65}Co_{12}Mn_{23}OH_2$ which corresponds to the average composition of the entire particle in Example 7-7.

In Comparative Example 7-5, positive electrode active material particles having constant concentrations of nickel, manganese, and cobalt in the entire particle were produced using an aqueous metal solution having a composition of $Ni_{65}Co_{12}Mn_{23}OH_2$ which corresponds to the composition of the second concentration gradient portion in Example 7-7.

<Experimental Example> Taking of EDX Image

Figure 119:
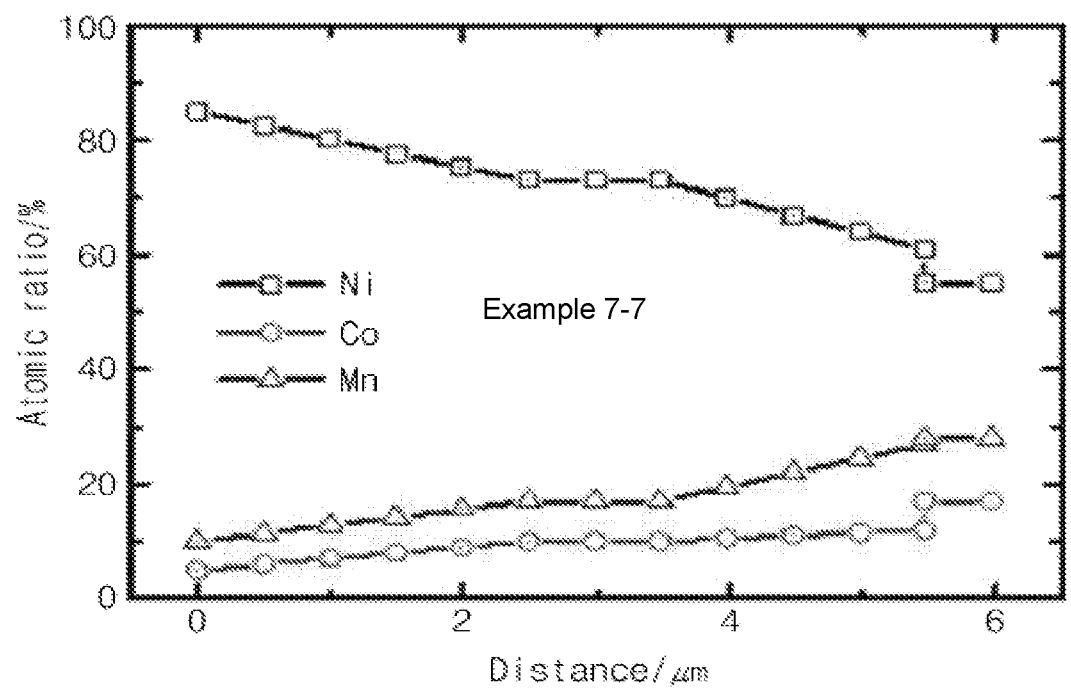
FIG. 119 illustrates the results of concentrations of Ni, Mn, Co depending on the distance from the center in the particles produced in Example of the inventive concept measured by EDX.

The concentrations of Ni, Mn, and Co depending on the distance from the center in the particles produced in Example 7-7 were measured by EDX, and the results are illustrated in FIG. 119.

In FIG. 119, it has been confirmed that the first concentration gradient portion, the first concentration maintained portion, the second concentration gradient portion, and the second concentration maintained portion that is discontinuous with respect to the second concentration gradient portion are formed in the case of the particles according to Example of the inventive concept.

In addition, it can be seen that the magnitudes of the concentration gradients in the first concentration gradient portion and the second concentration gradient portion are constant since the functions of concentration according to distance in the first and second concentration gradient portions are linear.

<Experimental Example> Measurement of Charge and Discharge Characteristics, Lifespan Characteristics, and DSC The charge and discharge characteristics, lifespan characteristics, DSC characteristics, and tap density of the batteries which included the active materials produced in Examples 7-5 to 7-7 and Comparative Examples 7-4 and 7-5 were measured, and the results are presented in the following Table 29.

TABLE 29

| | Capacity (mAh/g) −2.7 to −4.3 V, 0.1 C | Lifespan characteristics (%) −2.7 to −4.3 V, 0.5 C, $100^{th}$ cycle | DSC (° C.) −4.3 V cut off | Tap density (g/cc) |
|---|---|---|---|---|
| Example 7-5 | 205.9 | 94.7 | 275.9 | 2.58 |
| Example 7-6 | 203.3 | 94.9 | 278.8 | 2.59 |
| Example 7-7 | 200.2 | 95.3 | 280.5 | 2.60 |
| Example 7-8 | 197.5 | 95.6 | 284.2 | 2.59 |
| Comparative Example 7-4 | 187.6 | 90.1 | 263.3 | 2.50 |
| Comparative Example 7-5 | 178.8 | 95.1 | 287.1 | 2.49 |

Figure 120:
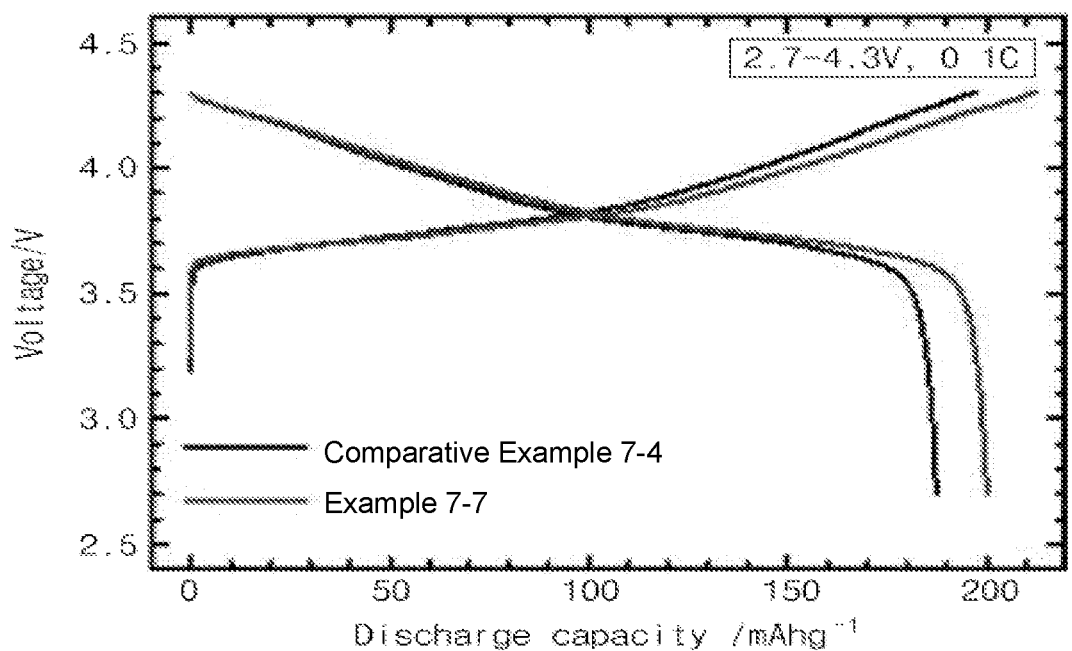
FIGS. 120 to 122 illustrate the results of charge and discharge characteristics, lifespan characteristics, and DSC characteristics measured on the particles produced in Example and Comparative Examples of the inventive concept, respectively.
Figure 121:
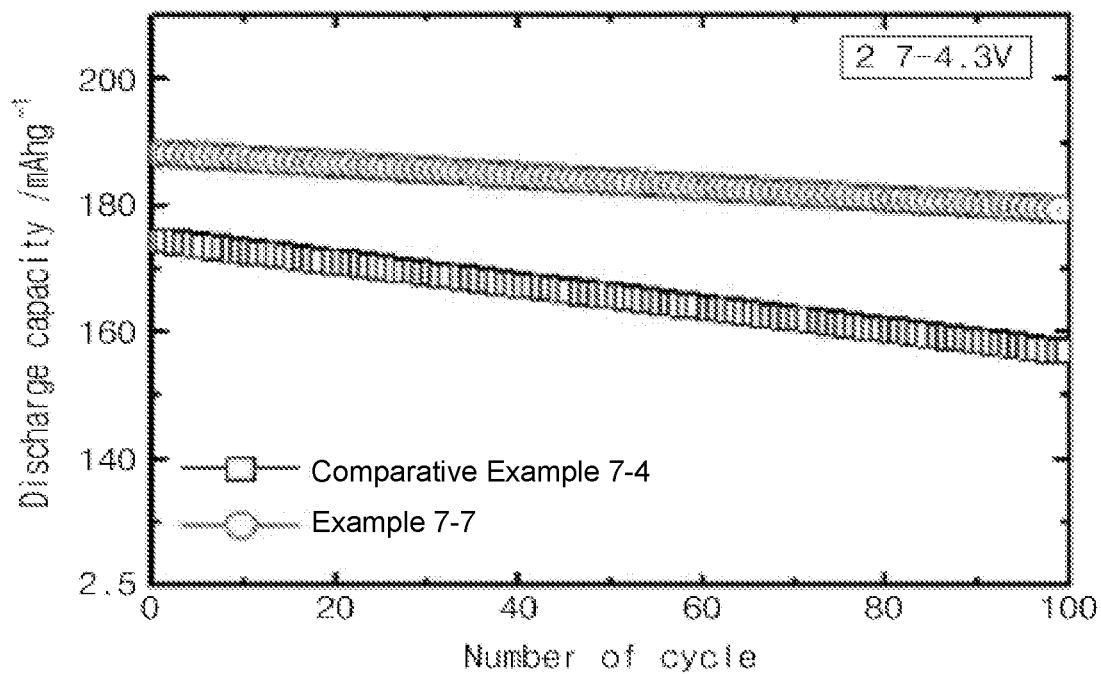
Figure 122:
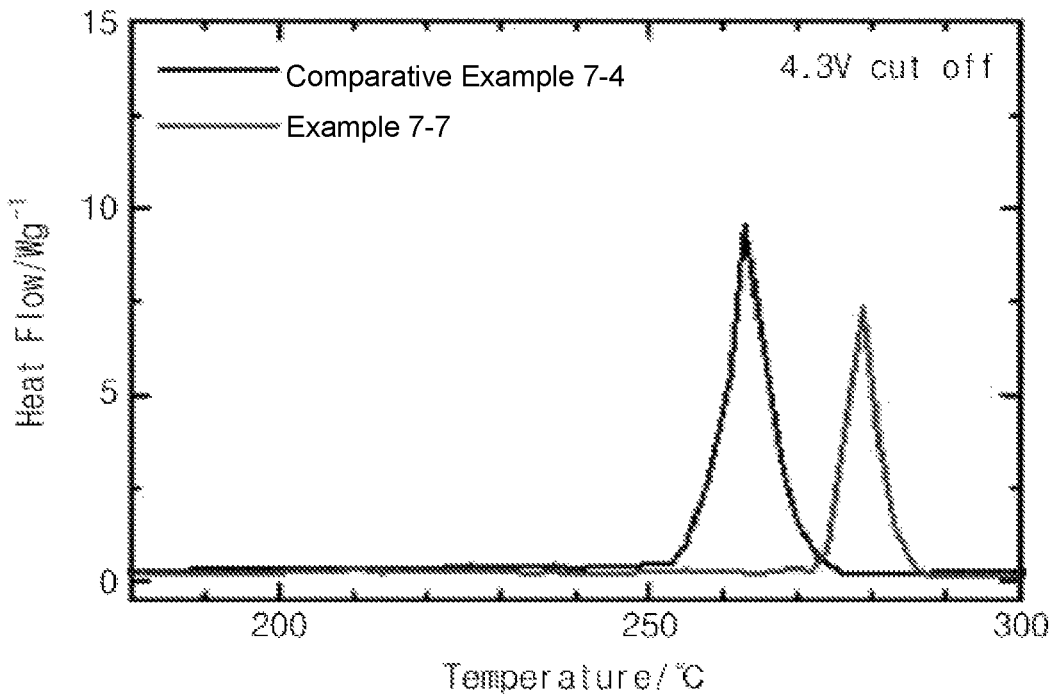

The charge and discharge characteristics, lifespan characteristics, and DSC characteristics of the particles produced in Example 7-7 and Comparative Example 7-4 were measured, and the results are illustrated in FIGS. 120 to 122, respectively.

In FIGS. 120 to 122, it has been confirmed that the composition of particles in Comparative Example 7-4 is the same as the average composition of the particles in Example 7-7 but the charge and discharge characteristics, lifespan characteristics, and thermal stability are greatly improved in Example 7-7 as compared to those in Comparative Example 7-4 since the particles in Example 7-7 includes the first concentration gradient portion, the first concentration maintained portion, the second concentration gradient portion, and the second concentration maintained portion.

The positive electrode active material according to embodiments of the inventive concept includes the first concentration maintained portion between the first concentration gradient portion and the second concentration gradient portion which have concentration gradients of nickel, manganese, and cobalt and the second concentration maintained portion on the outside of the second concentration gradient portion, thus the content of Ni contained in the particle is high so that the capacity is high, the crystal structure is stabilized by the concentration gradient so that excellent lifespan characteristics and charge and discharge characteristics are exhibited, and the positive electrode active material is structurally stabilized even when being used at a high voltage.

The fifth embodiment of the inventive concept will be described with FIGS. 123 to 125.

Examples 8

Into a coprecipitation reactor (volume: 16 L, output of rotary motor: 80 W or more), 2.5 L of distilled water was introduced, $N_2$ gas was then supplied thereto at a rate of 2 L/min, and the distilled water was stirred at 400 rpm while maintaining the temperature of the reactor at 45° C.

A first aqueous metal solution prepared by mixing nickel sulfate, cobalt sulfate, and manganese sulfate so as to have a composition of $Ni_{x1}Co_{y1}Mn_{z1}OH_2$ (X1, Y1, Z1) and a second aqueous metal solution prepared by mixing nickel sulfate, cobalt sulfate, and manganese sulfate so as to have a composition of $Ni_{x2}Co_{y2}Mn_{z2}OH_2$ (x2, y2, z2) were continuously introduced into the reactor at 0.7 L/hr while mixing them and changing the mixing ratio of the second aqueous metal solution to the first aqueous metal solution from 0 to 100, and an ammonia solution having a concentration of 25 mol was also continuously introduced into the reactor at 0.7 L/hr, thereby forming a core portion having a concentration gradient. In addition, a sodium hydroxide solution having a concentration of 5 mol was supplied into the reactor in order to adjust the pH so that the pH was maintained at 11.5. The speed of impeller was controlled at 400 rpm.

A third aqueous metal solution prepared by mixing nickel sulfate, cobalt sulfate, and manganese sulfate so as to have constant concentrations of $Ni_{x3}Co_{y3}Mn_{z3}OH_2$ was supplied into the reactor while mixing them and changing the mixing ratio of the third aqueous metal solution to the second aqueous metal solution from 0 to 100, thereby forming a second core portion. After the second core portion having a desired thickness was formed, only the third aqueous metal solution was supplied into the reactor to form a shell portion having a constant concentration that was the same as the final concentration of the second core portion, thereby producing a composite metal hydroxide.

The concentrations of the aqueous metal solutions in Examples 8-1 to 8-3 are as presented in the following Table 30.

TABLE 30

| | First aqueous metal solution | | | Second aqueous metal solution | | | Third aqueous metal solution | | | Thickness of shell |
|---|---|---|---|---|---|---|---|---|---|---|
| | Ni | Co | Mn | Ni | Co | Mn | Ni | Co | Mn | |
| Example 8-1 | 75 | 5 | 20 | 90 | 7 | 3 | 65 | 10 | 25 | 0.5 μm |
| Example 8-2 | 86 | 0 | 14 | 96 | 0 | 4 | 54 | 15 | 31 | 0.4 μm |
| Example 8-3 | 80 | 10 | 10 | 95 | 2 | 3 | 45 | 20 | 35 | 0.3 μm |

The composite metal hydroxide thus produced was filtered, washed with water, and then dried for 12 hours in a hot air dryer at 110° C. The composite metal hydroxide and lithium hydroxide (LiOH) were mixed at a molar ratio of 1:1, the mixture was subjected to the preliminary firing by heating at a temperature rise rate of 2° C./min and then maintaining at 450° C. for 10 hours and then fired at from 700 to 900° C. for 10 hours, thereby obtaining a positive electrode active material powder.

Examples

The first core portion was formed in the same manner as in Examples above, the second core portion was then formed by mixing the third aqueous metal solution and the second aqueous metal solution while changing the mixing ratio thereof, and only a fourth aqueous metal solution prepared by mixing nickel sulfate, cobalt sulfate, and manganese sulfate so as to have constant concentrations of $Ni_{x4}Co_{y4}Mn_{z4}OH_2$ was supplied into the reactor to form the shell portion.

The concentrations of the aqueous metal solutions prepared in Examples 8-4 and 8-5 are as presented in the following Table 31.

TABLE 31

| | First aqueous metal solution | | | Second aqueous metal solution | | | Third aqueous metal solution | | | Fourth aqueous metal solution | | | Thickness of shell |
|---|---|---|---|---|---|---|---|---|---|---|---|---|---|---|
| | Ni | Co | Mn | Ni | Co | Mn | Ni | Co | Mn | Ni | Co | Mn | |
| Example 8-4 | 80 | 5 | 15 | 90 | 5 | 5 | 50 | 20 | 30 | 40 | 20 | 40 | 0.5 μm |
| Example 8-5 | 75 | 10 | 15 | 95 | 2 | 3 | 65 | 15 | 20 | 55 | 15 | 30 | 0.3 μm |

The composite metal hydroxide thus produced was filtered, washed with water, and then dried for 12 hours in a hot air dryer at 110° C. The composite metal hydroxide and lithium hydroxide (LiOH) were mixed at a molar ratio of 1:1, the mixture was subjected to the preliminary firing by heating at a temperature rise rate of 2° C./min and then maintaining at 450° C. for 10 hours and then fired at from 700 to 900° C. for 10 hours, thereby obtaining a positive electrode active material powder.

Comparative Examples

In Comparative Example 8-1, particles having a constant concentration in the entire particle were produced by supplying an aqueous metal solution having a composition represented by $Ni_{70}Co_9Mn_{21}OH_2$ which corresponds to the average composition of the entire particle in Example 8-2.

In Comparative Example 8-2, particles were produced in the same manner as in Example 8-2 except that the first core portion was not formed in Example 8-2.

In Comparative Example 8-3, particles having a constant concentration in the entire particle were produced by supplying an aqueous metal solution having a composition represented by $Ni_{60}Co_{15}Mn_{25}OH_2$ which corresponds to the average composition of the entire particle in Example 8-4.

<Experimental Example> Taking of EDX Image

Figure 123:
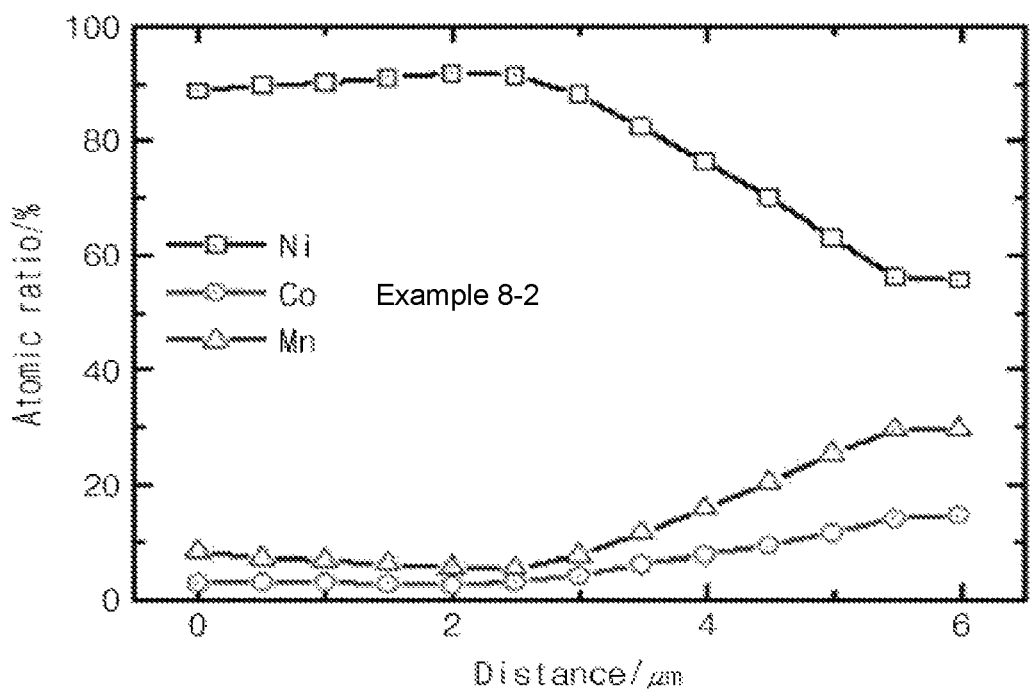
FIG. 123 illustrates the results of EDX measurement on the cross-section of the active materials produced in Example and Comparative Examples of the inventive concept.

The concentrations of Ni, Mn, and Co depending on the distance from the center in the particles produced in Example 8-2 were measured by EDX, and the results are illustrated in FIG. 123.

From FIG. 123, it has been confirmed that the magnitudes of the concentration gradients of the metals in the first core portion and the magnitudes of the concentration gradients of the metals in the second core portion are reversed in the case of the particles according to Example of the inventive concept.

<Experimental Example> Measurement of Charge and Discharge Characteristics, Cycle-Life Characteristics, and DSC The charge and discharge characteristics, cycle-life characteristics, and DSC characteristics of the batteries which included the active materials produced in Examples 8-1 to 8-5 and Comparative Examples 8-1 to 8-3 were measured, and the results are presented in the following Table 32 and illustrated in FIGS. 124 and 125.

TABLE 32

|  | Discharge characteristics | Cycle-Life characteristics ($100^{th}$) | DSC |
| --- | --- | --- | --- |
| Example 8-1 | 208.3 mAh/g | 94.7% | 273.5° C. |
| Example 8-2 | 199.7 mAh/g | 95.0% | 280.7° C. |
| Example 8-3 | 194.8 mAh/g | 95.6% | 288.9° C. |
| Example 8-4 | 187.6 mAh/g | 96.3% | 296.3° C. |
| Example 8-5 | 205.9 mAh/g | 95.2% | 281.6° C. |
| Comparative Example 8-1 | 185.3 mAh/g | 88.2% | 268.2° C. |
| Comparative Example 8-2 | 195.9 mAh/g | 95.2% | 283.5° C. |
| Comparative Example 8-3 | 178.7 mAh/g | 91.2% | 267.6° C. |

Figure 124:
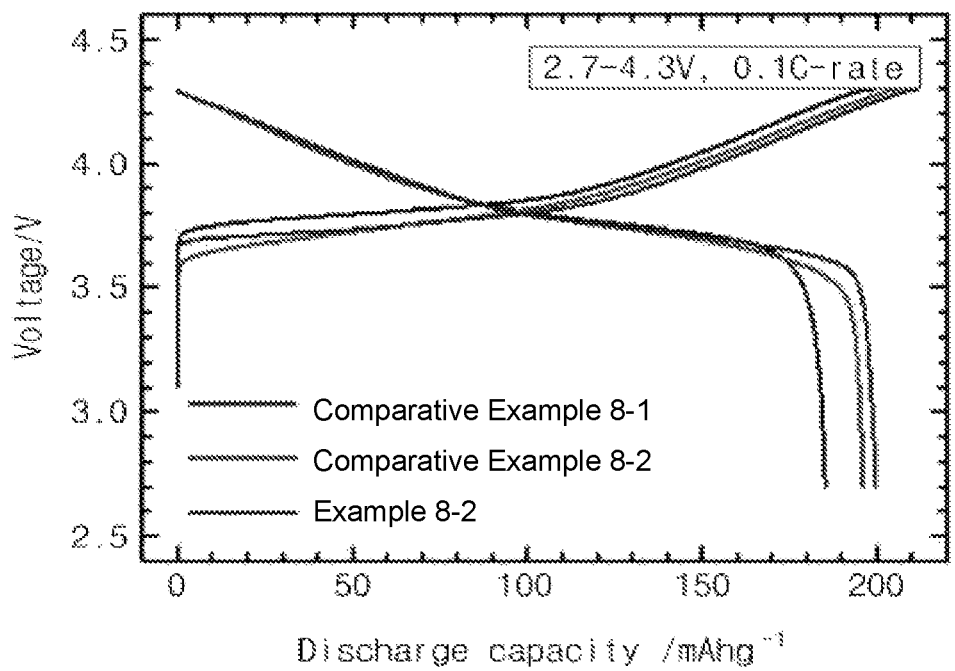
FIGS. 124 and 125 illustrate the results of charge and discharge characteristics and cycle-life characteristics measured on the batteries which include the active materials produced in Example and Comparative Examples of the inventive concept.
Figure 125:
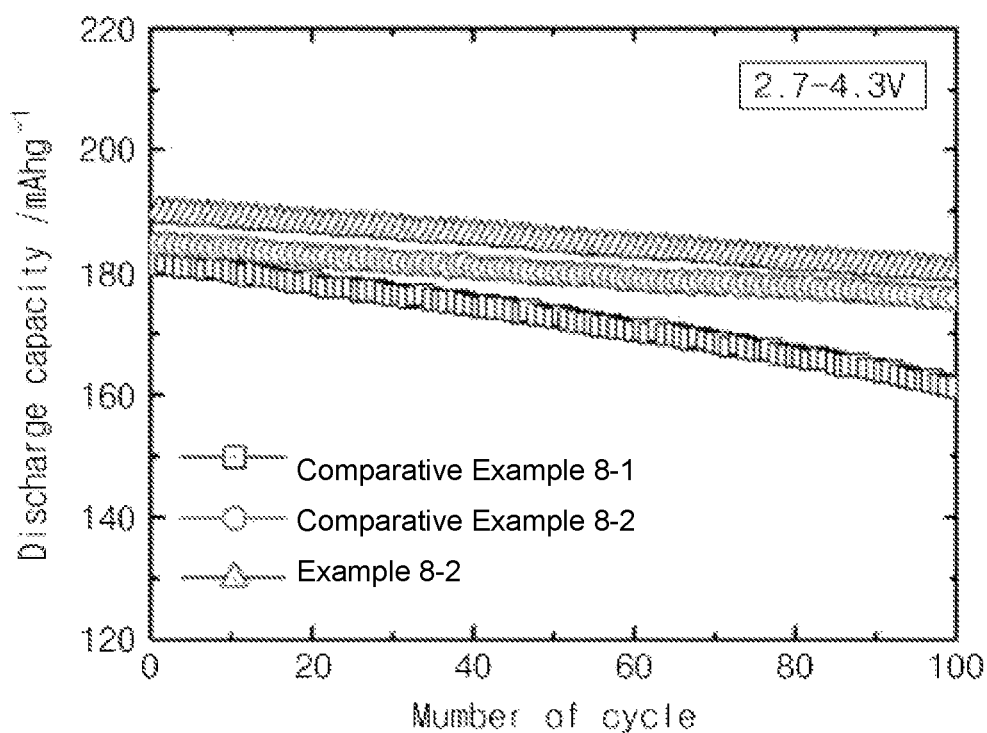

In FIGS. 124 and 125, it has been confirmed that the capacity and the cycle-life characteristics until $100^{th}$ cycle are greatly improved in the active materials produced in Examples of the inventive concept as compared to the active materials produced in Comparative Examples.

The positive electrode active material according to embodiments of the inventive concept exhibits excellent cycle-life characteristics and excellent charge and discharge characteristics as the magnitudes of concentration gradients of nickel, manganese, and cobalt are controlled in two core portions having the concentration gradients, and thus the positive electrode active material has a stabilized crystal structure as well as a high capacity and is structurally stabilized even when being used at a high voltage.

While the inventive concept has been described with reference to exemplary embodiments, it will be apparent to those skilled in the art that various changes and modifications may be made without departing from the spirit and scope of the inventive concept. Therefore, it should be understood that the above embodiments are not limiting, but illustrative.

According to a embodiment of the inventive concept, in the cathode active material for a lithium secondary battery according to the present invention, the concentrations of all metals contained in the cathode active material are increased or decreased with continuous concentration gradient from the core to the surface part. Accordingly, the crystal structure is stabilized and the thermostability is increased because there is no phase boundary having rapid concentration change from the core to the surface part.

According to a embodiment of the inventive concept, in the cathode active material for a lithium secondary battery according to the present invention, the concentration of one metal is constant from the core to the surface part, and the concentrations of the other two metals are increased or decreased with continuous concentration gradient from the core to the surface part. Accordingly, the crystal structure of the particle is stabilized and the thermostability is increased because there is no phase boundary having rapid concentration change from the particle core to the surface part.

Accordingly, the lithium secondary battery having the cathode active material shows excellent capacity characteristics as well as excellent lifetime characteristics and charge/discharge characteristics, and has thermostability even in high temperatures. Particularly, when the Ni concentration of the cathode active material according to the present invention, which shows the whole particle concentration gradient, is maintained constantly, a stable active material showing high capacity can be prepared.

While the invention has been described with respect to the above specific embodiments, it should be recognized that various modifications and changes may be made and also fall within the scope of the invention as defined by the claims that follow.

We claim:

1. A positive active material for lithium secondary battery comprising a particle comprising M1, M2, M3 and Li,
    wherein the particle comprises a center, a surface, and an intermediate portion between the center and the surface,
    wherein M1, M2, and M3 are selected from transition metal and are different each other,
    wherein concentrations of M1, M2, and M3 have continuous concentration gradients from the center to the intermediate portion,
    wherein the concentrations of M1, M2, and M3 have continuous concentration gradient in an entire region of the particle,
    wherein the concentration of M1 decreases in the entire region of the particle, from the center to the surface, and
    wherein the concentrations of M2 and M3 increase in the entire region of the particle, from the center to the surface.

2. A positive active material for lithium secondary battery according to claim 1,
    wherein the particle comprises a same concentration portion in which the concentration of M1 is equal to the concentration of M2, and
    wherein a distance between the center and the same concentration portion is smaller than a distance between the surface and the same concentration portion.

3. A positive active material for lithium secondary battery according to claim 2, wherein the center comprises the same concentration portion.

4. A positive active material for lithium secondary battery according to claim 1, wherein M1 is Ni, and M2 is Co.

5. A positive active material for lithium secondary battery according to claim 4, wherein the particle further comprises Al.

* * * * *